United States Patent [19]

Van Pelt et al.

[11] Patent Number: 4,581,565
[45] Date of Patent: Apr. 8, 1986

[54] H-BRIDGE POWER AMPLIFIER AND METHOD FOR CONTROLLING THE SAME

[75] Inventors: Richard W. Van Pelt, Boulder County; Veda R. Huffman, Larimer County, both of Colo.

[73] Assignee: Storage Technology Corporation, Louisville, Colo.

[21] Appl. No.: 653,750

[22] Filed: Sep. 21, 1984

Related U.S. Application Data

[63] Continuation-in-part of Ser. No. 471,370, Mar. 1, 1983, abandoned.

[51] Int. Cl.$^4$ .............................................. H02P 1/00
[52] U.S. Cl. .................................. 318/294; 318/312; 318/373
[58] Field of Search ............... 318/291, 312, 373, 293, 318/294, 271, 256, 257, 258, 463, 398, 280

[56] References Cited

U.S. PATENT DOCUMENTS

| | | | |
|---|---|---|---|
| 3,427,520 | 2/1969 | Oppedahl | 318/294 X |
| 3,525,883 | 8/1970 | Iordanidis | 318/293 X |
| 3,737,751 | 6/1973 | Lima | 318/463 |
| 3,904,943 | 9/1975 | Klang | 318/398 X |
| 4,275,340 | 6/1981 | Schleupen | 318/294 X |
| 4,319,170 | 3/1982 | Brent | 318/258 X |
| 4,477,751 | 10/1984 | Kanayama | 318/280 |

*Primary Examiner*—Ulysses Weldon
*Attorney, Agent, or Firm*—Bryant R. Gold; Richard E. Kurtz

[57] ABSTRACT

An improved H-bridge power amplifier for controllably driving a dc motor is presented. The motor is connected in the center of the H-bridge in conventional manner. The H-bridge includes a current sense resistor placed between the power supply and a common tie point of the upper transistors of the bridge. Free wheeling diodes are connected from the motor directly to the power supply. This arrangement allows current to flow through the current sense resistor only when one of the upper transistors is on. The power amplifier is operated by selecting an appropriate pair of upper and lower transistors on opposite sides of the bridge so as to cause the current to flow through the motor in a desired direction. Both the upper and lower transistors of the selected pair are held ON until the current as sensed in the current sense resistor equals or exceeds a specified value, typically a desired current level. When this occurs, the upper transistor is turned OFF for a fixed off-time period, during which time the lower transistor is maintained ON. The motor current thereby decays through a path comprising the ON lower transistor, one of the free wheeling diodes, and the motor, which decay path significantly reduces the ripple associated with the motor current. At the end of the fixed off-time, the upper transistor is turned ON, and the process repeats itself. If braking is desired to slow the motor down, a plug inhibit mode is enabled wherein the lower transistor is turned off and the upper transistor is alternately turned ON and OFF.

9 Claims, 11 Drawing Figures

H-BRIDGE POWER AMPLIFIER AND METHOD FOR CONTROLLING THE SAME

CROSS-REFERENCE

This application is a continuation-in-part of application Ser. No. 471,370 filed 3/01/83 now abandoned.

BACKGROUND OF THE INVENTION

This invention relates to control systems and methods for controlling an inductive load, such as a motor. More particularly, the invention relates to an improved power amplifier and control method for controlling the angular velocity and angular acceleration of a DC motor. The system and method disclosed maintain a low ripple current in the motor, simplify the motor control circuitry, conserve power used within the motor, and provide improved motor braking capability.

Switching Servo Amplifiers (SSA) are commonly used in the prior art to supply the drive current to an inductive load, such as a DC motor. Often the output stage used for the SSA is the "H" or "transistor/diode" bridge. An H-bridge comprises 4 power transistors interconnected to form a bridge, with the servo motor being positioned in the center of the bridge, as depicted in FIG. 1. Each transistor Q1–Q4 has a "free wheeling" diode D1–D4 connected, in a reverse current direction, from the emitter to collector. The base voltages of the transistors are controlled by the SSA to turn the transistors Q1–Q4 on and off in the appropriate manner so as to cause a drive current, $I_M$, to flow through the motor M in the desired direction. A current sense resistor R1 is positioned so that the current $I_M$ flows therethrough. A differential amplifier A1 senses the voltage across R1 and converts this voltage to an output signal that indicates the polarity and magnitude of the current $I_M$. The most common method of switching the power transistors of the H-bridge is through the Pulse Width Modulation (PWM) method. In this method, a fixed frequency is typically used and the duty cycle of the waveform is varied to supply the desired drive current $I_M$ to the motor.

Using the prior art scheme shown in FIG. 1, two diagonal power transistors in the H-bridge, such as Q1 and Q4, are simultaneously switched on, thereby causing current $I_M$ to flow through the motor in the direction shown by the arrow. After a period of time, determined by the duty cycle of the PWM waveform, transistors Q1 and Q4 are turned off, and transistors Q2 and Q3 of the H-bridge are turned on, switching the direction of the voltage applied to the motor. Transistors Q2 and Q3 remain on for a period of time, again determined by the duty cycle of the PWM waveform. After this period of time, the second pair of transistors Q2–Q3 is turned off, and the first pair Q1–Q4 is turned on. This "on" and "off" cycle of alternate pairs of transistors is continuously repeated as the servo system controls the acceleration of the motor.

Because a DC motor is an inductive load, the current flowing therethrough cannot be changed instantaneously when an alternate pair of transistors in the H-bridge is turned on. Thus, even though the voltage applied across the motor may approximate an instantaneous change (at the time the transistor pairs switch), the current flowing through the motor assumes a more triangular, or saw tooth waveform. Further, because the torque, and therefore the acceleration, of a DC motor is proportional to the average, or DC, current flowing through the motor (the direction of the acceleration being determined by the direction of the DC current), the servo system achieves the desired torque or acceleration by monitoring the motor current $I_M$ and controlling the duty cycle of the PWM wafeform until the desired average DC current is obtained. Unfortunately, this switching action causes a large ripple current to be ever present in the motor, even though the average current may be the desired amount. That is, while the motor is in motion, drive current is continually being supplied by alternately switching the desired transistor pairs. Even when the motor is not accelerating or decelerating, motor current is beng supplied with the duty cycle of the PWM waveform being 50%, thereby causing the average motor current supplied to the motor to be zero.

Unfortunately, the constant frequency PWM type of controller commonly used in the prior art suffers from several disadvantages: (1) the alternate "on" and "off" cycle of alternate transistor pairs causes a large ripple current to be ever present in the motor, unless the switching frequency is increased; in which case more power is lost in the switching transistors; (2) the large ripple currents in the motor may cause acoustical noise by coupling to the mechanical support members of the servo motor; (3) the AC component of the ripple current dissipates power in the motor, causing the motor to be unduly heated up; and (4) the drive current $I_M$ must be sensed at all times, which sensing consumes still additional power. Further, because the drive current will change directions in the sensing resistor whenever the motor current direction is changed, the differential amplifier must respond to this alternating current direction without introducing undesirable offsets. It is apparent, therefore, that a need exists in the art for an improved PWM amplifier and method for controlling the same wherein the above described disadvantages are not present.

SUMMARY OF THE INVENTION

It is an object of the present invention to provide an improved power amplifier and method of controlling the same for controlling the current delivered to an inductive load wherein the aforecited disadvantages are either eliminated or minimized.

More specifically, it is an object of the present invention to provide such a power amplifier and control system for driving a motor wherein the ripple current flowing through the motor is minimized, thereby conserving power and reducing heat dissipation.

It is a further object of the present invention to provide such an improved power amplifier and control system that is efficient, reliable, and simple to operate, yet that can be readily realized from standard, inexpensive components and parts.

It is still a further object of the present invention to provide an improved H-bridge power amplifier configuration for use with a DC motor wherein the motor current flows through a sensing resistor in the same direction regardless of the direction of the motor current, and further wherein the motor current need only be sensed for a fraction of the time of the power amplifier cycle.

The above and other objects of the present invention are realized with an improved version of an H-transistor/diode bridge. Advantageously, the power sensing resistor is uniquely positioned within the bridge circuit, especially in relation to the free wheeling diodes, so that only the drive current that needs to be measured flows through it. Moreover, this drive current always flows through the sensing resistor in the same direction, thereby obviating the need for sophisticated circuitry that must sense a signal of either polarity. Further, the drive current is switched by the power transistors of the improved H-bridge circuit in a manner that significantly reduces the ripple current in the motor. This is achieved by keeping one of the two selected transistors of the H-bridge circuit on, while selectively switching the other on and off. This selective one-transistor switching is combined with a "plug inhibit" operating mode for braking the motor. During "plug inhibit", the power transistors of the H-bridge are selectively switched so as to convert the motor into a generator, thereby allowing the motor to dissipate its own energy in performing the braking function without introducing additional power from the power source.

BRIEF DESCRIPTION OF THE DRAWINGS

The above and other objects, features, and advantages of the present invention will be better understood from the following more particular description of the invention presented in conjunction with the accompanying drawings, wherein.

DETAILED DESCRIPTION OF THE INVENTION

The following is a description of a preferred embodiment or embodiments of the present invention. This description is given only to illustrate the principals, objectives, and advantages of the invention, and is not to be taken in a limiting sense. The true scope of the invention can be ascertained by referring to the appended claims.

In the description that follows, like numerals will be used to describe like parts throughout. This is true even with respect to a comparison of FIG. 1, the prior art, and FIG. 3, the present invention.

Figure 1:
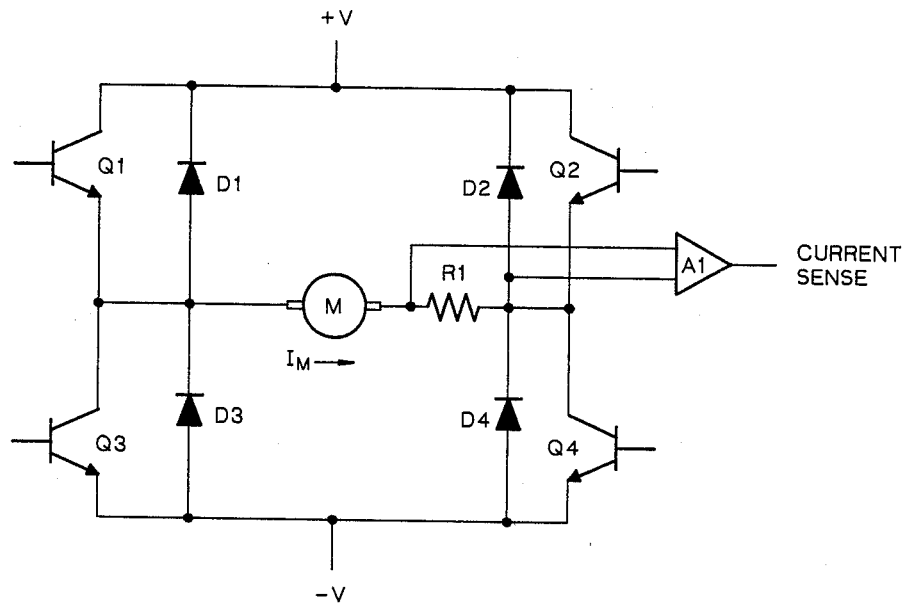
FIG. 1 is a schematic drawing of an H-power amplifier circuit of the prior art.

Referring first to FIG. 1, there is shown a schematic diagram of an H-bridge power amplifier in accordance with a typical embodiment of the prior art. As explained previously, the H-bridge comprises four power transistors interconnected to form a bridge. The motor M is positioned in the center of the bridge. The current flowing through the motor, $I_M$, is controlled by selectively switching transistor pairs Q1 and Q4, or Q2 and Q3. Thus, in order for the motor current $I_M$ to flow in the direction indicated by the arrow in FIG. 1, transistors Q1 and Q4 would both be turned on. If it is desired to reverse the direction of the motor current $I_M$, then the transistor pair Q1 and Q4 would be turned off, and the transistor pair Q2 and Q3 would be turned on.

The motor current $I_M$ flows through the sensing resistor R1 regardless of which transistor pair is turned on. A differential amplifier A1 is connected across R1 to sense the current flowing therethrough. The amplifier A1 thus generates a current sense signal that indicates both the polarity and magnitude of the current $I_M$.

Figure 2:
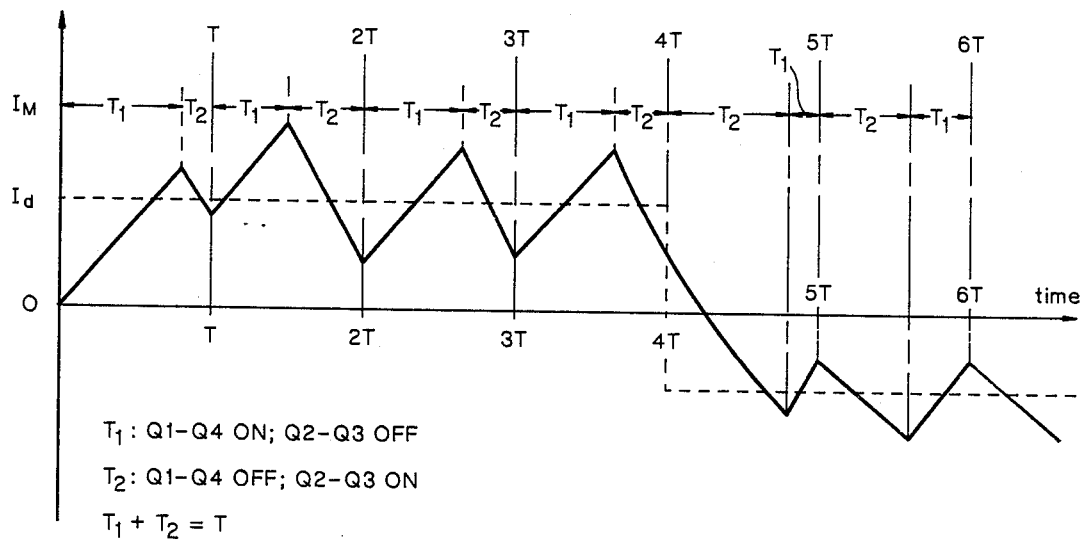
FIG. 2 is a simplified timing diagram of the motor current versus time for the prior art circuit of FIG. 1.

Referring next to FIG. 2, there is shown a simplified timing diagram of the motor current $I_M$ versus time associated with the operation of the circuit of FIG. 1. Because the motor M is a large inductive load, the current cannot change instantaneously when the transistor pairs are selectively turned on or off. Hence, when Q1 and Q4 are turned on, thereby connecting +V and −V across the motor, the current begins to build up exponentially in the motor according to well known principles. However, for the purposes of this application, and in order to simplify the discussions and figures that follow, this exponential increase in the motor current is represented as a linear increase in FIG. 2. (As will be apparent to those skilled in the art, this simplification will not cause a significant distortion for purposes of the discussion that follows.)

The circuit of FIG. 1 operates with a variable duty cycle in conjunction with a fixed period in order to selectively control the motor M. Thus, the transistor pair Q1 and Q4 will be turned on for a first portion of a control cycle T. The transistors Q1 and Q4 will then be turned off, and the transistors Q2 and Q3 will be turned on for the remaning portion of the switching period T. Hence, in FIG. 2, during a first portion of the period T, identified as $T_1$, Q1 and Q4 are on and Q2 and Q3 are off. During the remaining portion of the period T, identified as $T_2$, Q1 and Q4 are off, and Q2 and Q3 are on. The sum of time periods $T_1$ and $T_2$ equal the fixed operating period T.

In order to better appreciate and understand the advantages and features of the present invention, it will be helpful to first understand the operation of the prior art circuit of FIG. 1. Thus, referring to FIG. 2, there is shown, as a dashed line, a curve $I_d$ representing the desired average current that is to flow through the motor M. In order to realize this desired current, the duty cycle is varied as indicated in FIG. 2. That is, during a first period, Q1 and Q4 are left on for almost the entire period, thereby allowing the current $I_M$ to build up towards the desired value $I_d$. During a second period, the duty cycle is varied again in order to cause the average current to be approximately equal to the desired current at the end of the time period 2T. During the third and fourth cycles, the duty cycle is approximately 65%, Q1–Q4 on, which duty cycle maintains the average current at a value approximately equal to the desired current $I_d$. (Note that a duty cycle greater than 50% is required because the negative (decaying) current slope is greater than the positive current slope.) At time 4T, the desired current steps to a negative value. Accordingly, the duty cycle is again varied in order to allow the current $I_M$ to ramp down to the desired value as quickly as possible. The duty cycle is adjusted appropriately so at the end of the 7th period the duty cycle may be approximately 60%, Q2-Q3 on.

As thus described, it is seen that the desired average current $I_d$ is realized by varying the duty cycle in order to force or maintain the actual current $I_M$ in the needed direction. Unfortunately, this process produces a large ripple current that can cause undesirable effects as described previously. Further, the motor current $I_M$ is continuously flowing through the sense resistor R1.

As those skilled in the art will recognize, the diode pairs D2 and D3, and D1 and D4, provide a path for the motor current $I_M$ to flow until the direction of the current can be changed as desired. Thus, referring to both FIGS. 1 and 2, during the first switching period T, the current $I_M$ flows in the direction indicated through a path provided by Q1, R1, and Q4 during the time $T_1$. During the time $T_2$, Q1 and Q4 are turned off and Q2 and Q3 are turned on. However, the motor current $I_M$ cannot flow through Q2 and Q3 until the current $I_M$ has decreased sufficiently to allow a change in direction. Thus, during the time $T_2$ the current path is from the negative supply through the diode D3, the motor M, the resistor R1, and the diode D2 back to the positive supply. When the actual current does go negative, such as between the times 5T and 6T, then the diodes D4 and D1 provide a similar path for the motor current when Q2 and Q3 are turned off. In all situations, however, the motor current $I_M$ flows through the sense resistor R1, thereby dissipating power therein.

Figure 3:
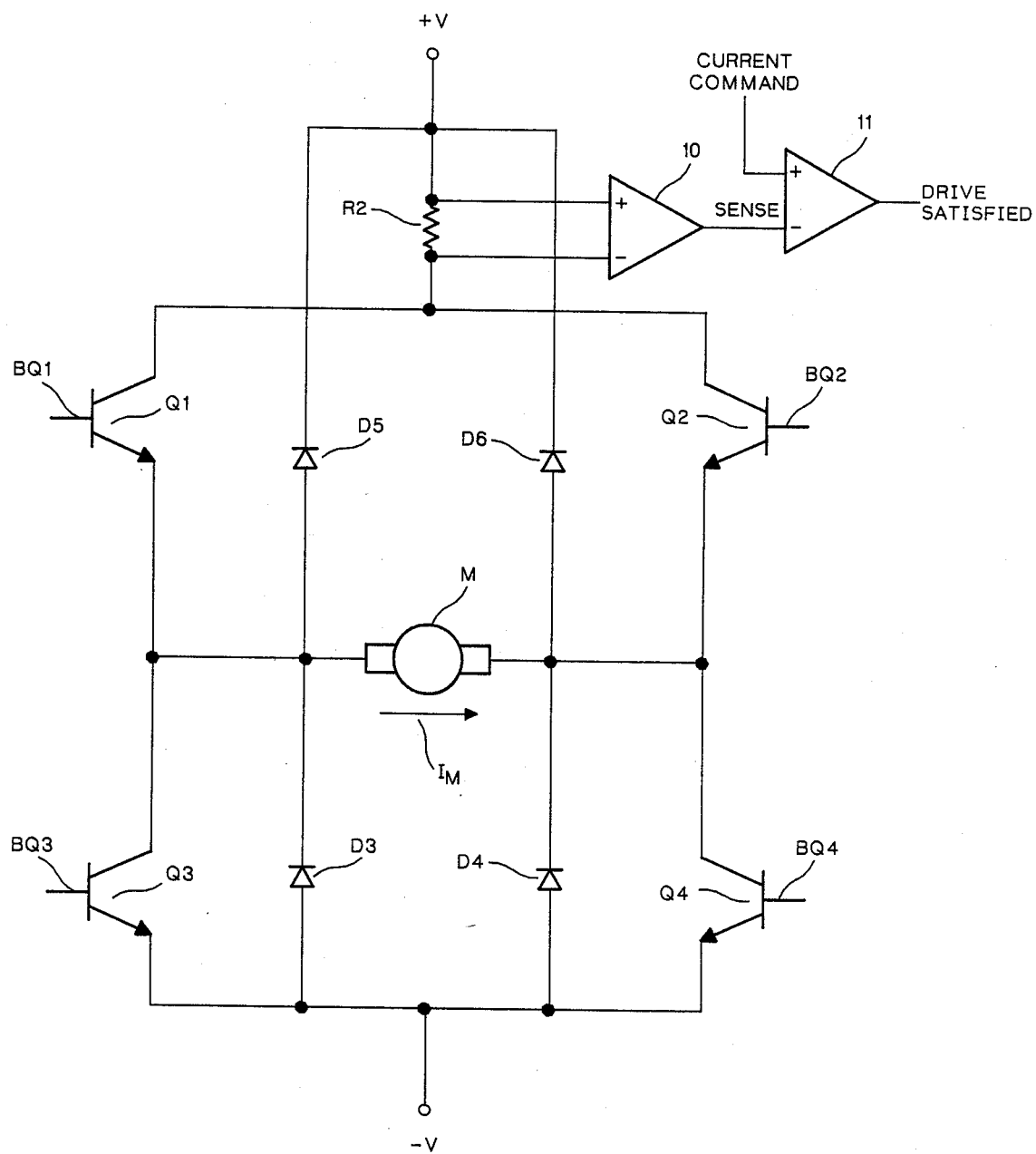
FIG. 3 is a schematic drawing of an improved H-power amplifier circuit built in accordance with the present invention.

Referring next to FIG. 3, there is shown a schematic diagram of an improved H-bridge power amplifier according to the present invention. Four power transistors Q1-Q4 are used as in the prior art and perform the same function as in the prior art (thus, they are given the same numerals or designators as in FIG. 1). The motor M is likewise positioned in the center of the bridge as in the prior art. The free wheeling diodes D3 and D4 are likewise positioned as in FIG. 1. The current sense resistor R2, however, is connected between the collectors Q1 and Q2 and the positive supply. Free wheeling diodes D5 and D6 are then connected as shown between the motor terminals and the upper side of resistor R2. A differential amplifier 10 is connected so as to sense the voltage developed across the resistor R2. The output of the amplifier 10 is compared in a comparator circuit 11 to a current command signal. If the current command signal exceeds the sensed signal, then the output of the comparator 11 is a positive signal, indicating that the drive current to the motor has not been satisfied. As soon as the sense signal exceeds the current command signal, then the output of the comparator 11 goes negative, indicating that the drive current to the motor has been satisfied.

In an alternative embodiment, it would be possible to place the sense resistor R2 between the emitters of transistors Q3 and Q4 and the negative supply $-V$. If this alternative configuration were used, the cathodes of the free wheeling diodes replacing D3 and D4 would be connected to the negative supply $-V$ rather than to the emitters of transistors Q3 and Q4.

The present invention turns off the drive or motor current $I_M$ in a manner distinct from that of the prior art. For example, assuming that the motor current $I_M$ is flowing in the direction shown as a result of having the transistor pair Q1 and Q4 turned on, Q1 is then turned off for a fixed period of time while Q4 is left on. Hence, by leaving Q4 on, the inductive motor current decays through the path from the motor, through Q4, through diode D3, and back to the motor. During this fixed off-time period while Q1 is off, the motor current $I_M$ is not flowing through the sense resistor R2.

Figure 5A:
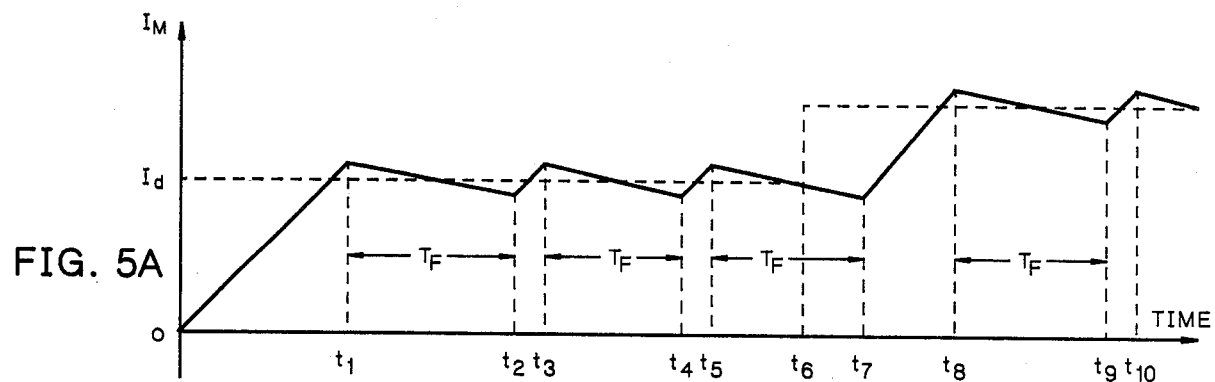
FIGS. 5A, 5B, and 5C are simplified timing diagrams of the motor current or motor velocity versus time for the circuit of FIG. 3, showing various modes of operation that might exist in connection with the operation of the circuit of FIG. 3.
Figure 5B:
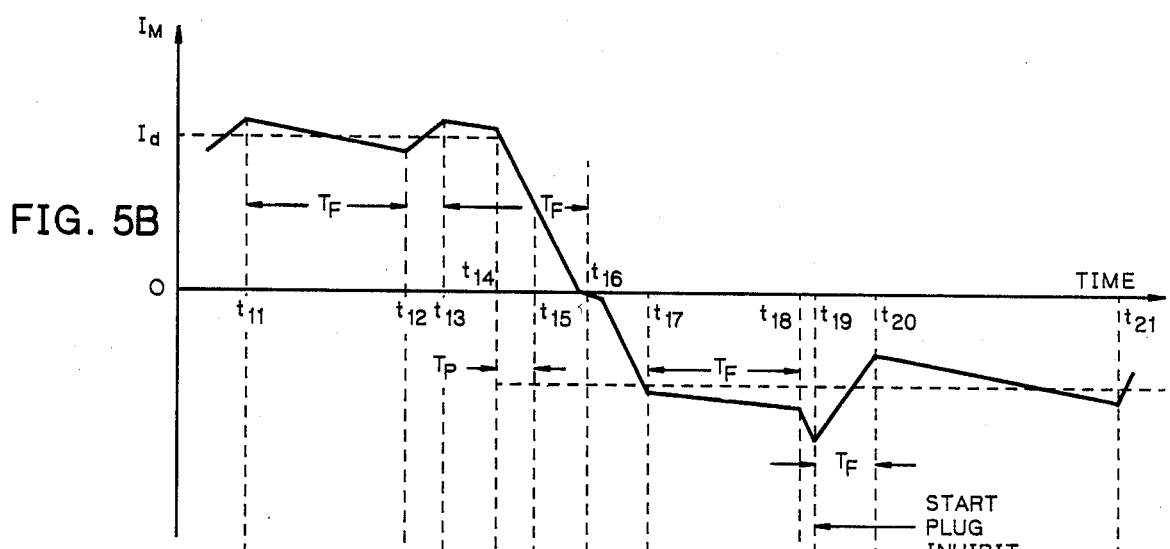

The advantages of using a fixed off-time period as above described are apparent from the timing diagrams of FIGS. 5A and 5B. In these Figures, which show a simplified timing diagram of the motor current $I_M$ versus time, it is seen that the amount of ripple present in the motor current is much smaller than achieved in the prior art for approximately the same switching frequency. To illustrate, consider FIG. 5A. In this Figure a desired current $I_d$ is shown as a dashed line. In order to achieve the desired current, transistors Q1 and Q4 are first turned on as in the prior art, allowing the motor current $I_M$ to ramp up to the desired value. Unlike the prior art, however, once the desired value has been reached, transistor Q1 is turned off for a fixed time period $T_F$. During this fixed off period, the motor current decays through the transistor Q4, which is left on, and through diode D3 back to the motor M. However, the rate of decay is much less than with the prior art circuit because the voltage applied across the motor during this time is zero rather than the 2V applied in the prior art. After the fixed off period, $Q_1$ is again turned on, thereby allowing the current $I_M$ to ramp back up above the desired value $I_d$, at which time Q1 is again turned off for the fixed off-time $T_F$. This process repeats itself, thereby causing the average motor current $I_M$ to approximate the desired current $I_d$. Thus, the basic operating mode of the present invention is to select the appropriate pair of transistors (Q1 and Q4, or Q2 and Q3) for the desired direction as in the prior art. However, unlike the prior art the lower transistor (Q3 or Q4) of the selected pair is turned on and left on, and the upper transistor (Q1 or Q2) is turned on until the desired current is achieved, and then turned off for a fixed period of time.

The present invention further advantageously includes a feature for controllably braking the motor should it be desired to slow down the speed thereof. This feature, called "plug inhibit," ensures that a dynamic brake current path is provided through the sense resistor R2, thereby allowing the brake current to be sensed and the desired control to be maintained. (Without the plug inhibit feature, upon receipt of a current command of a polarity to slow down the motor, the circuit would provide a dynamic brake path through a lower diode and lower transistor without being measured in resistor R2. The result would be a larger than desired current until the motor slows down or the command changes polarity.) This plug inhibit feature is described below in connection with the discussion of FIG. 5B.

Figure 5C:
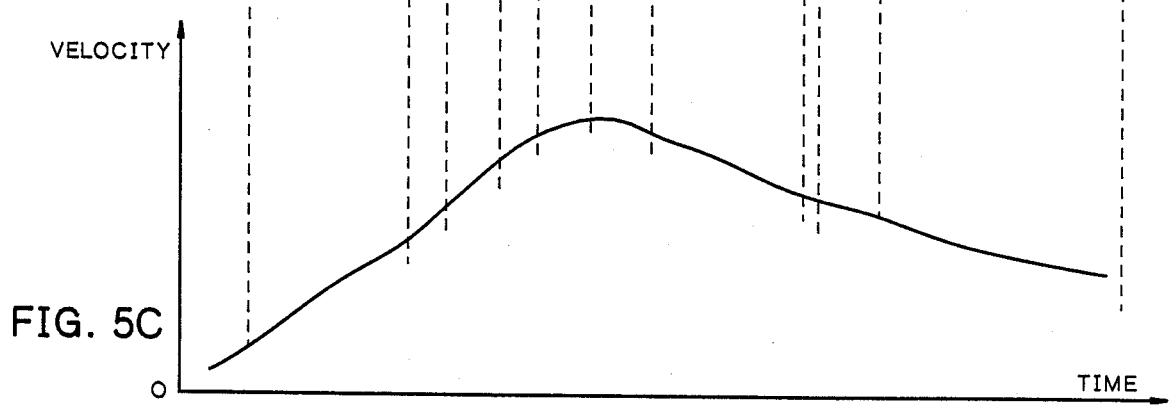

Referring to FIG. 5B, the desired current $I_d$, shown as a dashed line, steps from a first positive value to a lower negative value at time $t_{14}$. Prior to time $t_{14}$, Q4 is on and Q1 is selectively turned on and off as above described, resulting in an increasing motor velocity as shown in FIG. 5C. At time $t_{14}$, the desired current steps to a negative value. According to the present invention, when a change in polarity of the drive current is commanded, all four of the transistors Q1, Q2, Q3, and Q4 are turned off for a prescribed period of time, $T_p$, thereby protecting against an overlap condition (wherein Q1 and Q3, or Q2 and Q4 might be on at the same time) that could possibly damage the transistors. During this time, $T_p$, the motor current, $I_M$, decays toward zero through a path that includes diode D3, the motor M, and diode D6. Also note that during this time period, as during the fixed off-time $T_F$, the motor current does not flow through the sensing resistor R2.

After the overlap protection time $T_p$ has elapsed, at time $t_{15}$, transistor Q3 turns on according to the previously described rules. When the motor current reaches zero, just before $t_{16}$, the back emf of the motor causes current to increase slowly in the negative direction through transistor Q3, diode D4, and the motor M. At time $t_{16}$, the off-time $T_F$ expires and transistor Q2 also turns on, allowing "plugging" current to increase to the new value of $I_d$. Transistor Q2 then turns off at $t_{17}$ for the fixed off-time period $T_F$; and, because there is now a path for dynamic brake current to flow through transistor Q3 and diode D4 (note that motor velocity shown in FIG. 5C is still positive), current continues to increase beyond $I_d$, without being measured by R2. At the end of the fixed off-time $T_f$, at time $t_{18}$, Q2 is turned on according to the regular patter. However, because the motor current is already greater than $I_d$, the "plug inhibit" mode is enabled. That is, the comparator 11 will switch very quickly to the "drive satisfied" state whenever the motor current is greater than $I_d$. The "plug inhibit" mode is enabled whenever the "drive satisfied" line (the output of the comparator 11) is set in a time less than some limit, such as ten microseconds, after one of the upper transistors, Q1 or Q2, is turned on. During, the plug inhibit mode, the lower transistor of the selected transistor pair is turned off in order to increase the rate of decay of current during the off-time period $T_F$ so that the desired current is not exceeded.

Still referring to FIG. 5B, the plug inhibit mode begins at time $t_{19}$, some ten microseconds (or other suitable period) after Q2 is turned on. At $t_{19}$, Q2 turns off according to the usual rule: the upper transistor turns off as soon as current sensed through R2 exceeds the desired current $I_d$. Moreover, at $t_{19}$ Q3 is also turned off by the enabling of the "plug inhibit" mode. With the lower transistor turned off, the upper transistor is selectively turned on and off according to its usual rule, thereby modulating the motor current until the desired current is obtained.

During the plug inhibit mode the source of voltage to provide motor current is the motor back emf rather than an external power supply. When all transistors are off, the current decay rate is greater than normal, and when only an upper transistor is on, the current buildup rate is lower than when the external voltage is applied. It may therefore be beneficial to reduce the off-time $T_F$ during plug inhibit mode as shown in FIG. 5B between $t_{19}$ and $t_{20}$ in order to minimize the ripple current and keep the switching rate up near normal.

The decision to exit the plug inhibit mode is made by measuring the time from turn on of the upper transistor, at time $t_{20}$, to turn off, at time $t_{21}$. If this turn-on time exceeds some prescribed limit, such as 300 microseconds, the plug inhibit mode ends and the system reverts to normal (non-plug inhibit) operation. That is, an on-time of the upper transistor greater than 300 microseconds indicates that the remaining back emf is not adequate to provide the current desired, and the normal operating mode (lower transistor on, upper transistor selectively turned on and off) is then used to achieve the desired current.

Figure 6:
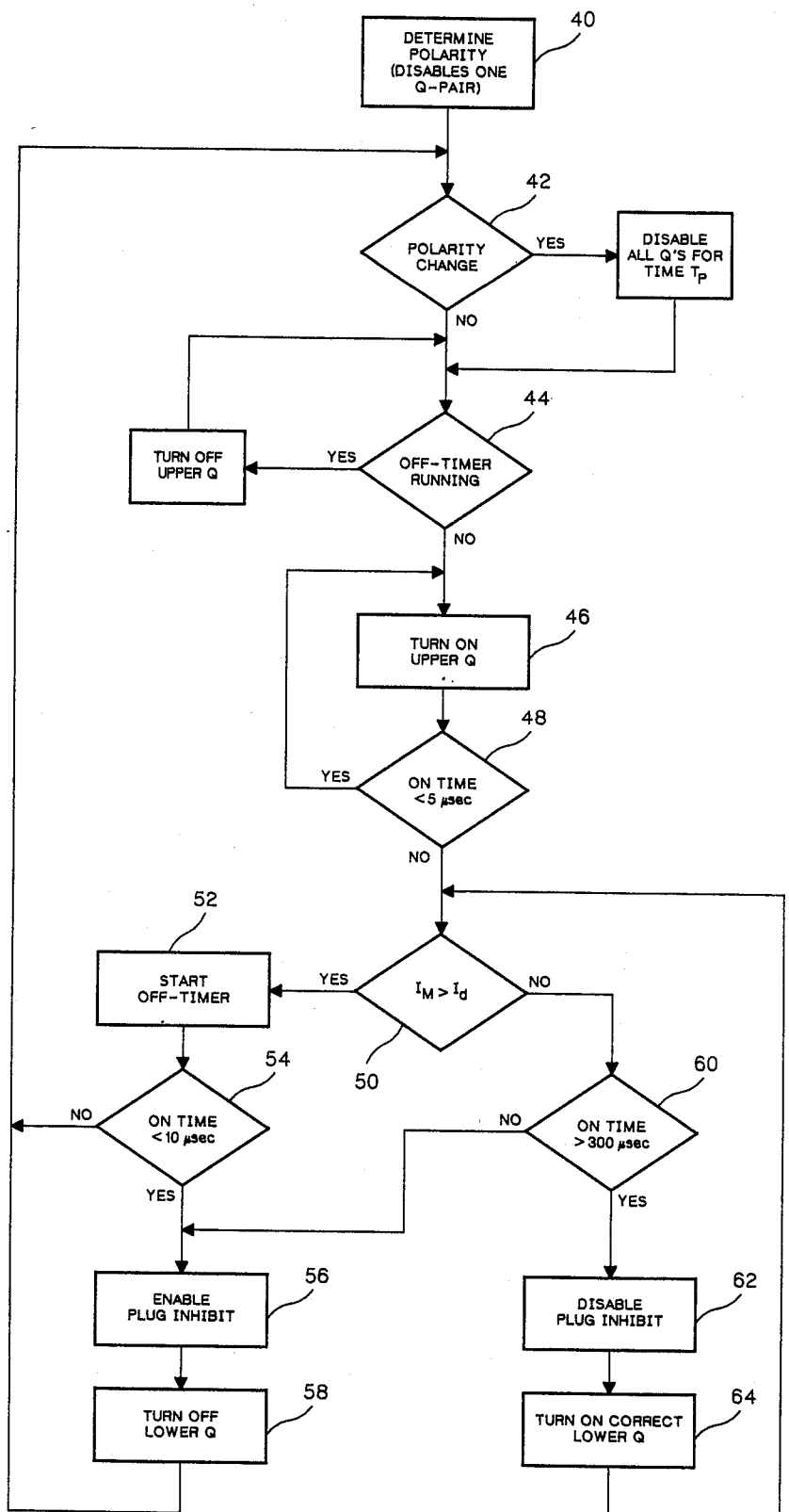
FIG. 6 is a simplified flow chart illustrating the operation of the circuit of FIG. 3.

A simplified flow chart that describes the process explained above in connection with FIGS. 5A and 5B is shown in FIG. 6. Operation of the circuit hinges on making three determinations. The first determination, shown in block 40, is to determine the polarity of the desired motor current. If positive, as shown in FIG. 3, then Q2 and Q3 will be disabled and may not be turned on until there has been a polarity reversal. Once the polarity has been determined, a second decision must be made as to whether or not the polarity has changed from what it was previously, as indicated in the decision block 42. If yes, then all of the transistors are disabled for the overlap protection time $T_P$. After the overlap protection time $T_P$, or after a decision has been made that no polarity change has occurred, a third decision is made, at decision block 44, as to whether the off timer is running. (The off timer is used to define the fixed off-time period $T_F$; and, as will be explained more fully below in connection with FIG. 4, the off-timer starts running whenever a Drive Satisfied signal is received from the comparator 11 indicating that the measured motor current $I_M$ flowing through resistor R2 exceeds the desired current $I_d$.)

If the off-timer is running, i.e., if the time $T_F$ has not yet expired, the upper transistor is turned off. If the off-timer is not running, i.e., if the time $T_F$ has expired, the appropriate upper transistor is turned on (block 46).

Once the upper transistor has been turned on for at least a set time period, such as 5 microseconds (block 48), a decision is made at block 50 as to whether the measured motor current $I_M$ is greater than the desired motor current $I_d$. This minimum time period is used to mask out turn-on transients associated with Q1 or Q2. If yes, the off-timer starts running (block 52). In addition, if the on-time of the upper transistor was less than 10 microseconds (block 54), then the plug inhibit mode is enabled (block 56) and the lower transistors are turned off (block 58). If the on-time of the upper transistor is greater than 10 microseconds (block 54), then the flow chart returns to a polarity check (block 42).

Should it be determined that the motor current $I_M$ is not greater than the desired current $I_d$ (block 50), then a determination is made as to whether the on-time of the upper transistor has exceeded a longer time limit, such as 300 microseconds (block 60). If so, plug inhibit is disabled (block 62), the appropriate lower transistor is turned on (block 64), and a determination is again made as to whether $I_M$ is greater than $I_d$ (block 50). If, at block 60, it is determined that the on-time of the upper transistor has not exceeded 300 microseconds, then that indicates the back emf of the motor is adequate to provide the desired current, and the plug inhibit mode is continued.

Figure 4:
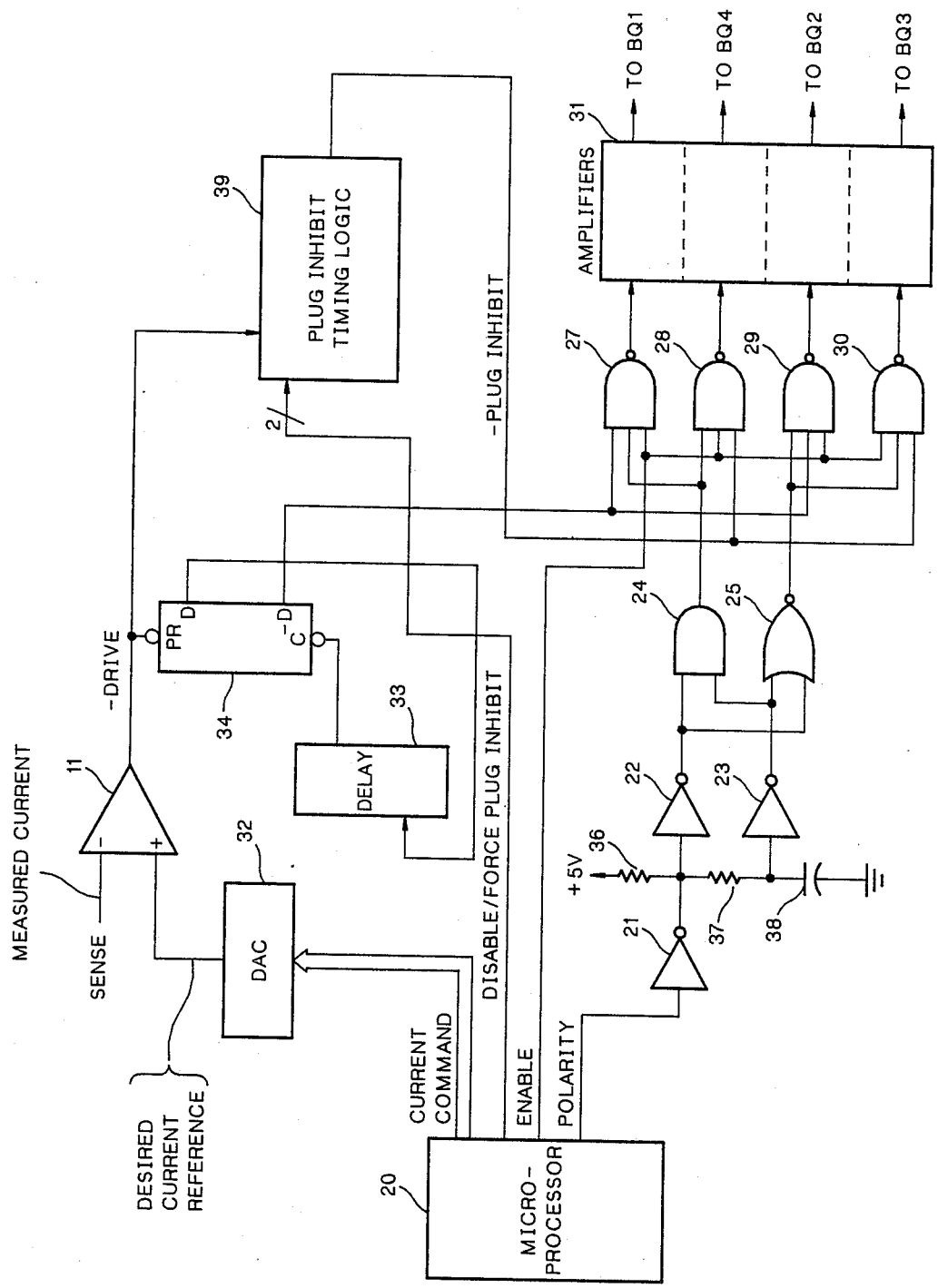
FIG. 4 is a logic/block diagram of a controller circuit in accordance with the present invention that could be used to selectively control the circuit of FIG. 3.

Referring next to FIG. 4, there is shown a logic/-block diagram of a controller circuit that could be used to control the operation of the circuit shown in FIG. 3 as described above in connection with FIGS. 5 and 6. The outputs of the amplifiers 31 are connected to the bases BQ1–BQ4 of the transistors Q1–Q4. These amplifiers 31 are driven by four 3-input NAND gates 27–30. The particular details associated with the amplifiers are not important to the present invention, and those skilled in the art will readily be able to design appropriate amplifiers for driving the transistors Q1–Q4. The microprocessor 20, or equivalent, provides an indication of the desired mode of operation. An ENABLE signal is used to enable all four NAND gates 27–30. In the absence of an ENABLE signal, all four transistors Q1-Q4 will be turned off. The microprocessor 20 also provides a POLARITY signal that determines the direction of the drive (or motor current) or the direction of braking. An inverter 21 has an open collector output, with a pull-up resistor 36, which allows the RC network 37-38 to be used in conjunction with the inverters 22-23, AND gate 24, and NOR gate 25 to insure that the transistors Q1-Q4 are turned on and off in the proper sequence without causing damage to any of them. That is, the RC network 37-38 is responsible for generating the overlap protection time $T_P$ referred to earlier. Note that the POLARITY signal allows either NAND gates 27, 28 or NAND gates 29, 30 to be enabled, but never both pairs at the same time. Thus, the polarity signal controls which pair of transistors in the H-bridge amplifier circuit (FIG. 3) may be enabled.

The microprocessor 20, or equivalent control module, also provides a CURRENT COMMAND signal indicating the desired motor current $I_d$. In the preferred embodiment, this signal is a binary signal which is supplied to a digital-to-analog converter (DAC) 32. The analog output of the DAC 32 is compared to the SENSE value (the output of the amplifier 10 in FIG. 3) by the comparator circuit 11. When the two inputs agree, the output of the comparator 11 will go low, presetting the flip flop 34. The D output of the flip flop 34 starts running the off-timer 33. While the off-timer 33 is timing out, the -D output of the flip flop 34 will go low, disabling NAND gates 27 and 29. This turns off the appropriate upper transistor Q1 or Q2. When the delay 33 times out for its fixed tme, $T_F$, the flip-flop 34 is cleared and the -D output again enables NAND gates 27 and 29, which thus allows the appropriate upper transistor to be turned on.

The PLUG INHIBIT signal is used to cause controlled braking. The PLUG INHIBIT Timing Logic 39, provides the timing signals needed to make the decisions referred to in blocks 54 and 60 of FIG. 6. In practice, therefore, the Timing Logic 39 either enables or disables the PLUG INHIBIT signal depending upon the interval between the drive satisfied pulses generated by the comparator 11. When the PLUG INHIBIT signal is high, the motor is controlled as shown in FIG. 5A. When the signal is low, the NAND gates 28 and 30 are disabled, thereby turning off the lower transistors. The ENABLE and POLARITY signals then control the operation of NAND gates 27 and 29, which in turn control the turn on and turn off of Q1 and Q2 respectively. As explained, when only the upper transistor is on, the motor is being braked. When braking, the CURRENT COMMAND, signal DAC 32, comparator 11, flip-flop 34 and delay 33 all function as previously described.

Figure 8:
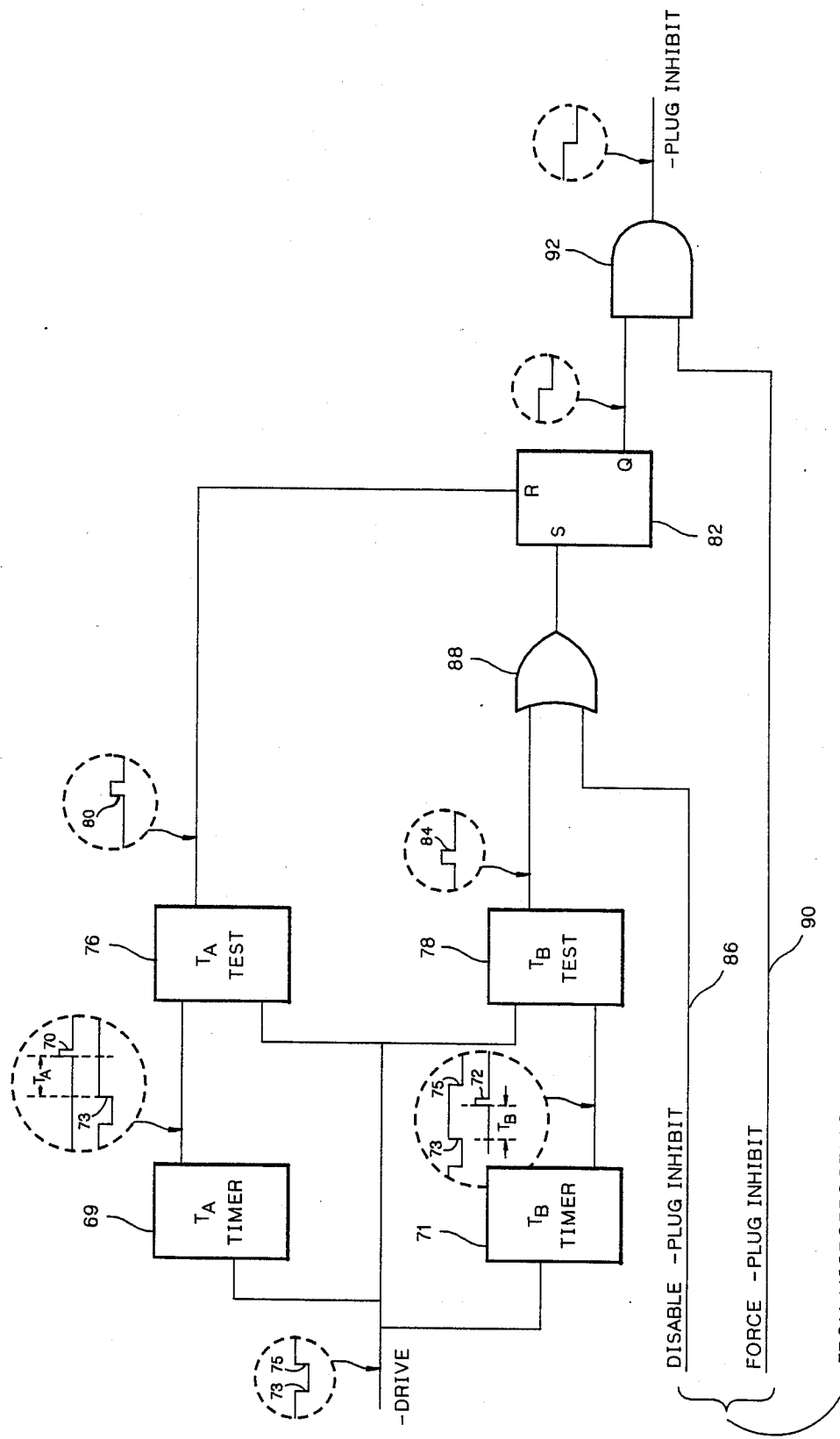
FIG. 8 is a logic/block diagram of the Plug Inhibit Timing Logic of FIG. 4.

A more detailed logic/block diagram of The Plug-Inhibit Timing Logic 39 (see FIG. 4) is shown in FIG. 8. FIG. 8 is best understood with reference to the timing diagram of FIG. 9, as well as to the controller circuit of FIG. 4. Hence, in the discussion that follows, reference should be made to all three figures.

The output signal from the comparator 11 is labeled -DRIVE in the figures. This signal goes low when the drive is satisfied (when the sensed or measured motor current exceeds the desired motor current), and it goes high when the drive is not satisfied (when the sensed motor current is less than the desired motor current). Two timers, identified as Timer 69 and Timer 71 in FIG. 8, are triggered by the rising edge 73 of the -DRIVE signal. Timer 69 generates a timing pulse 70 that occurs a prescribed time $T_A$ after the rising edge 73 of the -DRIVE signal. Similarly, Timer 71 generates a timing pulse 72 that occurs a prescribed time $T_B$ after the rising edge 73 of the -DRIVE signal. In the preferred embodiment, timer $T_A$ is approximately 10 microseconds and time $T_B$ is approximately 300 microseconds. The occurrence of the two timing pulses 70 and 72 is compared against the occurrence of a falling edge 75 of the -DRIVE signal at a $T_A$ Test circuit 76 and a $T_B$ Test circuit 78, respectively. If the -DRIVE signal has gone back to a high level prior to the lapse of the relatively short $T_A$ time period (e.g., 10 microseconds), then the Plug Inhibit mode is enabled and only the upper transistor (FIG. 3) may be turned on. This Plug Inhibit condition is realized in FIG. 8 by the $T_A$ Test circuit 76 generating a trigger pulse 80 whenever the specified condition occurs (-DRIVE goes high prior to occurrence of $T_A$ pulse). This pulse 80 resets a flip flop 82, or equivalent circuit, so that the plug inhibit signal, identified as -PLUG INHIBIT in the figures, goes low.

If the -DRIVE signal remains at a high level after the lapse of the relatively long $T_B$ time period (e.g., 300 microseconds), then the Plug Inhibit mode is disabled and the lower transistor (FIG. 3) may operate in normal fashion. Disabling of the plug inhibit mode is realized in FIG. 8 by the $T_B$ Test circuit 78 generating a trigger pulse 84 whenever the specified condition occurs (-DRIVE goes high after $T_B$ occurs). This pulse is used to set the flip flop 82, thereby causing the -PLUG INHIBIT signal to go high.

As indicated in FIG. 8, two additional control signals from the microprocessor 20 (FIG. 4) may be used to set/reset the Plug Inhibit mode. A first signal, on signal line 86, identified as DISABLE -PLUG INHIBIT, is combined with the trigger pulse 84 in an OR gate 88 prior to being directed to flip flop 82. Hence, either the trigger pulse 84 or a signal sent from the microprocessor over signal line 86, may be used to disable the Plug Inhibit mode. A second signal, on signal line 90, is ANDed with the output of flip flop 82 in an AND gate 92. Hence, the microprocessor 20 can directly force the enabling of the Plug Inhibit mode by controlling the signal on signal line 92. In the preferred embodiment, where the motor being controlled is used in a high performance tape drive system, such as the 4600 Tape Subsystem manufactured by Storage Technology Corporation of Louisville, Colo., the control signals on signal lines 86 and 90 are used to control Plug Inhibit only in special situations, such as in a low current situation as might occur during an automatic tape threading operation, and in a tape rewind situation. At all other times, Plug Inhibit is controlled as above described.

Figure 9:
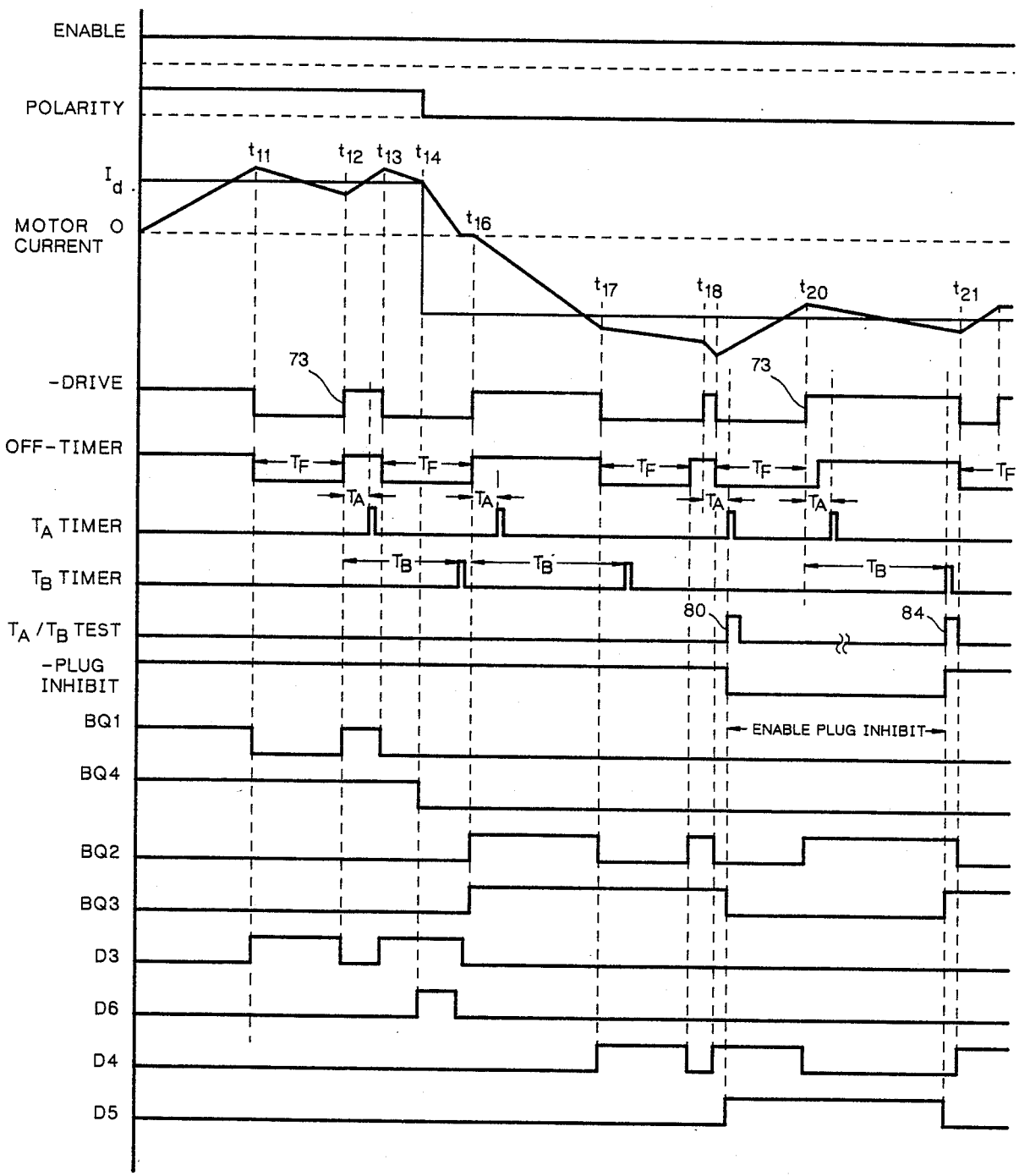
FIG. 9 is a timing diagram of the various control signals used during the operation of the circuits of FIG. 3 ad FIG. 4.

FIG. 9 depicts some of the waveforms and signals associated wit the operation of the circuits shown in FIG. 3, FIG. 4, and FIG. 8. No fixed scale is used with respect to the horizontal axis. The current waveform shown in FIG. 9 is a simplified equivalent to the current waveform shown in FIG. 5B, and the various timing references, e.g. $t_{11}$, $t_{12}$, $t_{16}$ indicated thereon are the same for both figures. Accordingly, the previous discussion describing the various events that occur in connection with the description of FIG. 5B also applies to FIG. 9. Included in FIG. 9 is an indication of when current is flowing through each of the four diodes D3, D4, D5, and D6 (FIG. 3), as well as when each of the four transistors Q1, Q2, Q3, and Q4 are turned on. (A diode has current flowing therethrough whenever its respective signal is high; a transistor is turned on whenever its respective base signal, identified as BQ1, BQ2, BQ3, or BQ4, is high).

Figure 7:
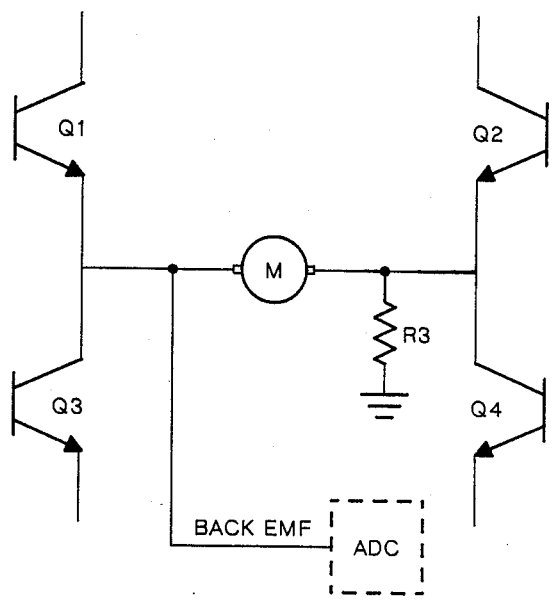
FIG. 7 is a partial schematic diagram of an alternative embodiment of the H-power amplifier of the present invention, showing the preferred placement of additional components that are used to measure the motor velocity.

Advantageously, the velocity of the motor can be determined as part of this invention by sensing the back EMF of the motor when all four transistors of the H-bridge are off and the motor current $I_M$ is 0. This technique of sensing the back EMF voltage to determine motor velocity is not new. However, this technique in combination with the improved H-bridge power amplifier of the present invention is believed to be a novel combination. FIG. 7 shows one side of the motor being connected to ground by a resistor R3. In the preferred embodiment this resistor would be on the order of 2,000 ohms, so that within a few milliseconds of having all four transistors turned off, the voltage on the other side of the armature can be sensed, indicating the back EMF directly without the need for differential sensing with its common mode problems.

As thus described, an improved H-bridge power amplifier and method for controlling the same has been disclosed. The circuit and control method described provide a motor current that has a much lower ripple than has been realized in the prior art at approximately the same switching frequency. Further, the current command and current sense circuits may both be unipolar, thereby simplifying the analog circuitry associated therewith. The polarity of the sensed motor current $I_M$ is inferred from knowledge of which of the two transistors Q1 or Q2 is turned on. More significantly, the motor current flows through the sensing resistor only when one of the upper transistors of the H-bridge power amplifier is turned on, which is the only time that the current needs to be sensed. Thus, the power is not dissipated in the sensing resistor when not needed as occurs in the prior art. The control circuitry (FIG. 4) associated with the present invention is relatively simple as compared to the complex circuits used to vary the duty cycle used in the prior art. Advantageously, this circuitry may be realized using conventional components that are readily available from many manufacturers. Advantageously, the constant off-time, $T_F$, associated with the present invention may be readily modified by merely adjusting the delay of the timer 33 (FIG. 4). In fact, multiple constant off-times could be selectively used depending upon the particular mode of operation. By selectively choosing $T_F$, the frequency of the ripple in the motor current can be controlled to a large degree, thereby allowing a low switching rate if desired.

Attached hereto and filed as a part hereof is Appendix A, containing a microprocessor program listing ("code") of a representative program that could be used to control a microprocessor 20 for a tape drive system that uses a motor controlled by the H-bridge power amplifier of the present invention. This representative program comprises the best mode contemplated for carrying out the control of a high performance tape drive subsystem, such as the 4600 Tape Subsystem manufactured by Storage Technology Corporation of Louisville, Colo. In the preferred embodiment, the microprocessor used is a model Z8000, commercialy available from Zilog Inc. of Cupertino, Calif. It is noted that only a small portion of the code included in Appendix A, such as as p. 16 line 1018, and p. 39, lines 2263, 2264, relate directly to the invention as herein described and claimed. Other portions of the code are used to generate the CURRENT COMMAND words that are fed into the DAC 32 (FIG. 4) in order to generate the desired current reference signal. Still other parts define the ENABLE and POLARITY signals described in connection with FIG. 4 and FIG. 9. As such, it is to be emphasized that the invention can be practiced without the aid of a microprocessor. Any suitable controller would suffice.

While the present invention has been described by reference to a particular embodiment thereof, those skilled in the art will recognize numerous variations and modifications that could be made thereto to perform equivalent functions. Accordingly, the scope of the present invention is to be ascertained by reference to the appended claims.

APPENDIX A

```
  1                              LIST    A,O,X
  2   0000       DEBUG1:   EQU    0            INCLUDE CODE TO PLAY WITH INDICATOR LED'S
  3              ;
  4   0000       DEBUG2:   EQU    0            INCLUDE CODE TO DUMP TRACE INFORMATION TO
  5              ;                              IN-CIRCUIT EMULATOR MEMORY
  6   0001       CALMOD1:  EQU    1            MODIFY CALIBRATE ROUTINE TO ADJUST CURRENT
  7              ;                              BASED ON PREDICTED LOOP VELOCITY
  8   0001       HITCHCMD: EQU    1            ADD CODE TO BYPASS TURNAROUND DELAY WHEN
  9              ;                              THE CONTROLLER DOES A FORWARD HITCH
 10   0001       STRETCH:  EQU    1            MODIFY GO AND STOP REFERENCE POSITIONS AT
 11              ;                              200 IPS TO REDUCE POSSIBILITY OF LOOPING
 12              ;                              OUT DUE TO STRETCHED TAPE
 13   0001       STRETCH3: EQU    1            ADJUST COLUMN SENSOR READING WHEN COLUMN VAC
 14              ;                              AVAILABLE SWITCH INDICATES INSUFFICIENT
 15              ;                              VACUUM.  (ADD WIRE CL D29 TO RS A36)
 16   0000       DEBUG3:   EQU    0            USE COLUMN VACUUM SENSORS TO CORRECT THE
 17              ;                              LOOP POSITION READINGS
 18   0001       STRETCH4: EQU    1            BYPASS LOOKING AT COLUMN VACUUM AVAILABLE
 19              ;                              SWITCH WHILE CALIBRATING
 20              ;
 21              ;*********************************************************
 22              ;* ********************************************************* *
 23              ;* *                                                       * *
 24              ;* *                                                       * *
 25              ;* *            DIGITAL REEL SERVOSYSTEM                   * *
 26              ;* *                                                       * *
 27              ;* *                                                       * *
 28              ;* *   DATE:  11-APR-84              LEVEL 02.R            * *
 29              ;* *                                                       * *
 30              ;* *                                                       * *
 31              ;* ********************************************************* *
 32              ;*********************************************************
 34   0000
 35              ;***********************************************************************
 36              *                                                                       *
 37              *             ============ CHANGE LOG ============                      *
 38              *                                                                       *
267                    LIST  S
268              *                                                                       *
269              *       DATE:  26-JUN-83              LEVEL:02    VERSION:O             *
270              *                                                                       *
271              *       36.  ADDED CODE TO RECOGNIZE A HITCH COMMAND AND BYPASS THE     *
272              *            TURNAROUND DELAYS AND IGNORE THE DIRECTION CHANGE WHILE    *
273              *            IN HITCH MODE.                                             *
274              *                                                                       *
275              *                                                                       *
276              *       DATE:  5-JAN-84               LEVEL:02    VERSION:P             *
277              *                                                                       *
278              *       37.  CHANGED THE GO REFERENCE POSITION TO 3" FROM COLUMN        *
279              *            MIDDLE AND STOP REFERENCE TO 3" FROM COLUMN MIDDLE.        *
280              *            OLD POSITIONS WERE 4.5" AND 1.4".  LEFT 75/125 IPS         *
281              *            REFERENCES AT 4.5" AND 0".  MAKING THE RUN POSITION        *
282              *            FARTHER AWAY FROM THE ENDS OF THE COLUMNS AT 200 IPS       *
283              *            REDUCES THE POSSIBILITY THAT STRETCHED TAPE WILL CAUSE     *
284              *            A LOOP-OUT.                                                *
285              *                                                                       *
286              *                                                                       *
287              *       DATE:  14-JAN-84              LEVEL:02    VERSION:Q             *
288              *                                                                       *
289              *       38.  ADDED CODE TO LOOK AT THE COLUMN VACUUM AVAILABLE SWITCH   *
290              *            AND ADJUST THE COLUMN SENSOR READING IF IT INDICATES       *
291              *            A LOSS OF COLUMN VACUUM (USUALLY DUE TO STRETCHED OR       *
292              *            CUT TAPE).                                                 *
293              *                                                                       *
294              *                                                                       *
295              *       DATE:  23-JAN-84              LEVEL:02    VERSION:P             *
296              *                                                                       *
297              *       39.  ADDED THE DEBUG3 CODE TO CALCULATE AND STORE TRUE COLUMN   *
298              *            POSITION BY CORRECTING THE COLUMN SENSOR READINGS BASED    *
299              *            ON COLUMN VACUUM MEASUREMENTS MADE WITH ANOTHER PAIR OF    *
300              *            VACUUM SENSORS.                                            *
301              *                                                                       *
302              *                                                                       *
303              *       DATE:  11-APR-84              LEVEL:02    VERSION:R             *
304              *                                                                       *
305              *       40.  ADDED CODE TO CHECK FOR LOOP OVERSHOOT BEFORE CALLING      *
306              *            THE NONLINEAR ROUTINE WHEN CALCULATING PREDICTED           *
307              *            CURRENT DURING TURN-AROUND DELAYS.  THIS KEEPS THE         *
308              *            NONLINEAR CALCULATIONS FROM INCORRECTLY CALCULATING        *
309              *            A LOW PREDICED CURRENT WHEN THE LOOPS ARE ACTUALLY         *
310              *            SO FAR BEYOND THE PREDICTED TARGET POSITION THAT           *
311              *            THE CAPSTAN STARTING WOULD CAUSE AN IMMEDIATE LOOPOUT.     *
312              *                                                                       *
313              ***********************************************************************

315              ;
316              ;
317              ;***********************************************************
318              *            ======== MAP ========                          *
319              *      Z80-MEMORY MAPPED INPUT/OUTPUT AND RAM               *
320              ;***********************************************************
321              ;
```

```
322
323             ;
324   1000      Y:        EQU    1000H      POINTER TO THE RAM
325             ;
326   1080      STACKLOC: EQU    Y+128      STACK POINTER LOCATION
327             ;
328   2000      X:        EQU    2000H      POINTER TO I/O PORTS
329             ;
330             ;
331             ;###############################################################*
332             *                    Z-80 I/O MAPPED PORTS                      *
333             *###############################################################*
334             ;
335             ;               ======== X INDEX ========
336             ;
337             *======================= ADC BYTE 2 =======================
338             ;
339   0002      FBEMFSEN: EQU    2          FILE REEL BACK EMF SENSOR
340             ;
341             *======================= ADC BYTE 3 =======================
342             ;
343   0003      MBEMFSEN: EQU    3          MACHINE REEL BACK EMF SENSOR
344             ;
345             *======================= ADC BYTE 4 =======================
346             ;
347   0004      FCOLSEN:  EQU    4          FILE COLUMN POSITION SENSOR (PAWNEE)
348             ;                           MORE POSITIVE VOLTAGES INDICATE LOOP
349             ;                           CLOSER TO THE TOP OF THE DECK
350             ;
351             *======================= ADC BYTE 5 =======================
352             ;
353   0005      MCOLSEN:  EQU    5          MACHINE COLUMN POSITION SENSOR (PAWNEE)
354             ;                           MORE POSITIVE VOLTAGES INDICATE LOOP
355             ;                           CLOSER TO THE BOTTOM OF THE DECK
356             ;
357                       IF     DEBUG3     DEFINE THE COLUMN VACUUM SENSORS
358             FVACSEN:  EQU    6          FILE COLUMN VACUUM SENSOR
359             MVACSEN:  EQU    7          MACHINE COLUMN VACUUM SENSOR
360                       ENDIF
361             ;
362             *======================= PPI BYTE 0 =======================
363             ;
364   0008      FILEMOT:  EQU    8          OUTPUT TO D/A CONVERTER FOR FILE REEL MOTOR
365             ;
366             ;                  0        LSB  (BIT 0 FOR THE CONVERTER)
367             ;FILEPOL: EQU    7          FILE CURRENT POLARITY BIT (1=CW TORQUE)
368             ;
369             ;
370             *======================= PPI BYTE 1 =======================
371             ;
372   0009      MACHMOT:  EQU    9          OUTPUT TO D/A CONVERTER FOR MACH REEL MOTOR
373             ;
374             ;                  0        LSB (BIT 0 FOR THE CONVERTER).
375             ;MACHPOL: EQU    7          MACH CURRENT POLARITY BIT (1=CW TORQUE)
376             ;
377   0007      POLBIT:   EQU    7          CURRENT POLARITY BIT (SAME FOR BOTH REELS)
378             ;
379             *======================= PPI BYTE 2 =======================
380             ;
381   000A      CONTROL:  EQU    10            CONTROL SIGNALS.
382             ;
383   0000      FBRAKE:   EQU    0          FILE REEL DYNAMIC BRAKE COMMAND (LOW).
384   0001      FREELENB: EQU    1          ENABLE FILE REEL CMD (ACTIVE LOW).
385   0002      MREELENB: EQU    2          ENABLE MACH REEL CMD (ACTIVE LOW).
386   0003      MBRAKE:   EQU    3          MACH REEL DYNAMIC BRAKE COMMAND (LOW).
387                       IF     STRETCH3
388   0004      LOWVAC:   EQU    4          COLUMN VACUUM AVAILABLE SENSOR (HI=NO VACUUM)
389                       ELSE
390             ;/FCOLLDD: EQU    4          FILE COLUMN VACUUM STATUS (ACTIVE LOW)
391                       ENDIF
392             ;/MCOLLDD: EQU    5          MACH COLUMN VACUUM STATUS (ACTIVE LOW)
393   0006      FBEMFPOL: EQU    6          FILE REEL DIRECTION STATUS (FWD=HI;BWD=LO)
394   0007      MBEMFPOL: EQU    7          MACH REEL DIRECTION STATUS (FWD=HI;BWD=LO)
395             ;
396             ;
397             *======================= PPI BYTE 3 =======================
398             ;
399   0008      PPICTRL:  EQU    11         PPI CONTROL PORT.
400             ;
401             *======================= PPI2 BYTE 0 =======================
402             ;
403   0010      REGO:     EQU    16
404             ;
405             *****THE FOLLOWING 2 BITS MUST REMAIN TOGETHER AND IN THIS ORDER*****
406   0000      SLDCFILE: EQU    0          SLOW DOWN CONDITION, FILE REEL (ACTIVE LOW)
407   0001      SLDCMACH: EQU    1          SLOW DOWN CONDITION, MACHINE REEL (ACT LOW)
408             ;
409             ;THE SLOW DOWN CONDITION BITS ARE ALSO USED FOR TURN AROUND DELAYS.
410             *****THE FOLLOWING 2 BITS MUST REMAIN TOGETHER AND IN THIS ORDER*****
411   0000      SLDCFWD:  EQU    0          DO TURN AROUND DELAY BEFORE GOING FWD (LOW)
412   0001      SLDCBWD:  EQU    1          DO TURN AROUND DELAY BEFORE GOING BWD (LOW)
413   0002      FILEACW:  EQU    2          FILE REEL CLOCKWISE (ACTIVE LOW)
414   0003      FILEACCW: EQU    3          FILE REEL COUNTER CLOCKWISE (ACTIVE LOW)
415   0004      MACHACW:  EQU    4          MACH REEL CLOCKWISE (ACTIVE LOW)
416   0005      MACHACCW: EQU    5          MACH REEL COUNTER CLOCKWISE (ACTIVE LOW)
```

```
417  0006                    GATEENAB: EQU    6          +GATE ENABLE TO TIMER CHIPS
418                                    EQU    7          -TAPE TENSION SWITCH FOR SOFTWARE CONTROL
419                          ;
420                          *====================== PPI2 BYTE 1 ======================
421                          ;
422  0011                    REG1:     EQU    17
423                          ;
424  0000                    ADCDEAD:  EQU    0          BIT SET INDICATED ADC IS REALLY HUNG
425  0001                    MNONLINB: EQU    1          MACHINE NON-LINEAR FLAG
426  0002                    FNONLINB: EQU    2          FILE NON-LINEAR FLAG
427  0003                    ALPLGINF: EQU    3          ALLOW HARDWARE PLUG INHIBIT (FILE REEL)
428  0004                    ALPLGINM: EQU    4          ALLOW HARDWARE PLUG INHIBIT (MACH REEL)
429  0005                    ADCERR:   EQU    5          BIT SET INDICATES ADC TOOK TOO LONG TO CONVERT
430                                    IF     DEBUG1 ;LED OUTPUT BITS
431                          MACHHIGH: EQU    6          ;/MACHINE LOOP IS ABOVE MIDPOINT FLAG
432                          FILEHIGH: EQU    7          ;/FILE LOOP IS ABOVE MIDPOINT FLAG
433                                    ENDIF
434                          ;
435                          ;
436                          *====================== PPI2 BYTE 2 ======================
437                          ;
438  0012                    REG2:     EQU    18         VARIOUS INPUT BITS
439  0012                    VELREG:   EQU    REG2       REGISTER WITH THE VELOCITY FLAG BITS
440                          ;
441                          ;/CORONA: EQU    0          THIS BIT IS 1 ON CORONA, 0 ON PAWNEE
442  0001                    V125IPS:  EQU    1          125 IPS FLAG (MINUS ACTIVE)
443  0002                    V75IPS:   EQU    2          75 IPS FLAG (MINUS ACTIVE)
444                          ;                           BOTH BITS ARE 1 FOR 200 IPS
445                          ;
446                          *====================== PPI2 BYTE 3 ======================
447                          ;
448  0013                    PPI2CTRL: EQU    19         PPI2 CONTROL PORT
449                          ;
450                          *====================COMMAND REGISTER====================
451                          ;
452  0020                    COMMAND:  EQU    32         COMMANDS INPUT REGISTER
453  0020                    EOCBYTE:  EQU    COMMAND    BYTE CONTAINING END OF CONVERSION BIT
454                          ;
455  0000                    ENBLRLS:  EQU    0          ENABLE REELS COMMAND (ACTIVE LOW)
456  0001                    GO:       EQU    1          GO COMMAND (ACTIVE LOW)
457  0002                    FORWARD:  EQU    2          FORWARD COMMAND  (ACTIVE LOW)
458  0003                    EOC:      EQU    3          END OF CONVERSION (ACTIVE HIGH)
459  0004                    TOC1:     EQU    4          TIMER 1 OUTPUT (ACTIVE HIGH)
460                          ;         BIT    5
461                          ;         EQU    6
462                          ;         BIT    7
463                          ;
464                          ;
465                          *====================REELS   REGISTER====================
466                          ;
467  0028                    REELS:    EQU    40         COMMAND CODES FOR THE REELS
468                          ;
469                          ;                0          MACH REEL CONTROL BIT A.
470                          ;                1          MACH REEL CONTROL BIT B.
471                          ;                2          MACH REEL CONTROL BIT C.
472                          ;                3          FILE REEL CONTROL BIT A.
473                          ;                4          FILE REEL CONTROL BIT B.
474                          ;                5          FILE REEL CONTROL BIT C.
475                          ;/GROUND:  EQU    6          REEL MOTOR GROUND.
476  0007                    BIAS:     EQU    7          REEL MOTOR BIAS.
477                          ;
478                          *====================== PIT BYTE 0 ======================
479                          ;
480  0030                    FPULSEOF: EQU    48         FILE REEL OFF DELAY
481                          ;
482                          *====================== PIT BYTE 1 ======================
483                          ;
484  0031                    MPULSEOF: EQU    49         MACHINE REEL OFF DELAY
485                          ;
486                          *====================== PIT BYTE 2 ======================
487                          ;
488  0032                    TIMER1:   EQU    50         DELAY COUNTER (1USEC SAMPLING)
489                          ;
490                          *====================== PIT BYTE 3 ======================
491                          ;
492  0033                    PITCTRL:  EQU    51         PIT CONTROL PORT
493                          ;
494                          ****************************************
495                          *       MEMORY ALLOCATION LIST         *
496                          ****************************************
497                          ;
498                          ************************************************************
499                          *                                                          *
500                          *  LOCATIONS IN RAM ADDRESSED USING ABSOLUTE ADDRESSING    *
501                          *                                                          *
502                          ************************************************************
503                          ;
504                                    ORG    Y          START AT THE BEGINNING OF THE RAM
505                          ;
506                          *****THE FOLLOWING 6 BYTES MUST REMAIN TOGETHER AND IN THIS ORDER*****
507                          ;
508  1000                    FPOS8:    DS     1          FILE POSITION 8 MILLISECONDS AGO
509  1001                    FPOS16:   DS     1          FILE POSITION 16 MILLISECONDS AGO
510  1002                    FPOS24:   DS     1          FILE POSITION 24 MILLISECONDS AGO
511  1003                    FPOS32:   DS     1          FILE POSITION 32 MILLISECONDS AGO
```

```
512  1004           FPOS40:   DS    1         FILE POSITION 40 MILLISECONDS AGO
513                 ;
514  1005           FREF8:    DS    1         FILE REFERENCE 8 MILLISECONDS AGO
515  1006           FREF16:   DS    1         FILE REFERENCE 16 MILLISECONDS AGO
516  1007           FREFS8:   DS    1         FILE SLOW REFERENCE 8 MILLISECONDS AGO
517                 ;
518  0007           FILTLENF: EQU   FREF16-FPOS8+1  LENGTH OF FILE REEL FILTERS
519                 ;
520  1008           MPOS8:    DS    1         MACHINE POSITION 8 MILLISECONDS AGO
521  1009           MPOS16:   DS    1         MACHINE POSITION 16 MILLISECONDS AGO
522  100A           MPOS24:   DS    1         MACHINE POSITION 24 MILLISECONDS AGO
523  100B           MPOS32:   DS    1         MACHINE POSITION 32 MILLISECONDS AGO
524  100C           MPOS40:   DS    1         MACHINE POSITION 40 MILLISECONDS AGO
525                 ;
526  100D           MREF8:    DS    1         MACHINE REFERENCE 8 MILLISECONDS AGO
527  100E           MREF16:   DS    1         MACHINE REFERENCE 16 MILLISECONDS AGO
528  100F           MREFS8:   DS    1         MACHINE SLOW REFERENCE 8 MILLISECONDS AGO
529                 ;
530  0007           FILTLENM: EQU   MREF16-MPOS8+1  LENGTH OF MACHINE REEL FILTERS
531                 ;
532                 *****THE FOLLOWING 17 BYTES MUST REMAIN TOGETHER AND IN THIS ORDER*****
533                 ;
534  1010           FILEREF:  DS    2         FILE REEL FAST REFERENCE
535  1012           FREFNGO:  DS    2         FILE REEL FAST REFERENCE NO-GO OFFSET
536  1014           FREFGO:   DS    2         FILE REEL FAST REFERENCE GO OFFSET
537  1016           FREFREW:  DS    2         FILE REEL FAST REFERENCE REWIND OFFSET
538                 ;
539  1018           FILEREFS: DS    2         FILE REEL SLOW REFERENCE
540  101A           FREFSNGO: DS    2         FILE REEL SLOW REFERENCE NO-GO OFFSET
541  101C           FREFSGO:  DS    2         FILE REEL SLOW REFERENCE GO OFFSET
542  101E           FREFSREW: DS    2         FILE REEL SLOW REFERENCE REWIND OFFSET
543  1020           FLIM:     DS    1         POINT WHICH IS EQUAL TO GO REFERENCE
544                 ;
545                 *****THE FOLLOWING 17 BYTES MUST REMAIN TOGETHER AND IN THIS ORDER*****
546                 ;
547  1021           MACHREF:  DS    2         MACHINE REEL FAST REFERENCE
548  1023           MREFNGO:  DS    2         MACHINE REEL FAST REFERENCE NO-GO OFFSET
549  1025           MREFGO:   DS    2         MACHINE REEL FAST REFERENCE GO OFFSET
550  1027           MREFREW:  DS    2         MACHINE REEL FAST REFERENCE REWIND OFFSET
551                 ;
552  1029           MACHREFS: DS    2         MACHINE REEL SLOW REFERENCE
553  102B           MREFSNGO: DS    2         MACHINE REEL SLOW REFERENCE NO-GO OFFSET
554  102D           MREFSGO:  DS    2         MACHINE REEL SLOW REFERENCE GO OFFSET
555  102F           MREFSREW: DS    2         MACHINE REEL SLOW REFERENCE REWIND OFFSET
556  1031           MLIM:     DS    1         POINT WHICH IS EQUAL TO GO REFERENCE
557                 ;
558                 INITO:              ;THE FOLLOWING BYTES ARE CLEARED ONCE
559                 ;                   ;  WHEN THE PROGRAM FIRST STARTS
560                 ;
561  1032           OLDCMD:   DS    1         LAST SPEED-CONTROL-MODE OR GAIN COMMAND
562                 ;
563                 *****THE FOLLOWING 2 BYTES MUST REMAIN TOGETHER AND IN THIS ORDER*****
564  1033           MVELREF:  DS    1         SPEED CTL MODE VELOCITY REFERENCE (MACHINE)
565  1034           FVELREF:  DS    1         SPEED CTL MODE VELOCITY REFERENCE (FILE)
566                 ;
567                           IF    DEBUG3
568                 *****THE FOLLOWING 2 BYTES MUST REMAIN TOGETHER AND IN THIS ORDER*****
569                 FVACFACT: DS    1         FILE COLUMN SENSOR VACUUM CORRECTION FACTOR
570                 FMIDDLE:  DS    1         FILE COLUMN MIDPOINT
571                 *****THE FOLLOWING 2 BYTES MUST REMAIN TOGETHER AND IN THIS ORDER*****
572                 MVACFACT: DS    1         MACHINE COLUMN SENSOR VACUUM CORRECTION FACTOR
573                 MMIDDLE:  DS    1         MACHINE COLUMN MIDPOINT
574                           ELSE
575                 *****THE FOLLOWING 2 BYTES MUST REMAIN TOGETHER AND IN THIS ORDER*****
576  1035           FMIDDLE:  DS    1         FILE COLUMN MIDPOINT
577  1036           MMIDDLE:  DS    1         MACHINE COLUMN MIDPOINT
578                           ENDIF
579                 ;
580  0005           INITOCNT: EQU   $-INITO  NUMBER OF BYTES TO BE CLEARED ON INITIAL START
581                 ;
582                 INIT2:              ;THE FOLLOWING BYTES WILL BE CLEARED
583                 ;                   ;  BEFORE ENTERING SERVMOT
584                 ;
585  1037           YK:       DS    1         PRESENT LOOP POSITION STORAGE
586  1038           INTCTR:   DS    1         INTERRUPT COUNTER
587  0007           FILEOUT:  EQU   7         BIT 7 OF THE INTERRUPT COUNTER IS SET WHILE
588                 ;                         CALCULATING FILE REEL CURRENT, CLEAR FOR MACH
589  1039           REWDLYCT: DS    1         DELAY BEFORE RESETTING REW SLOW DOWN CONDITION
590                           IF    CALMOD1
591  103A           PREDVELF: DS    1         PREDICTED FILE COLUMN LOOP VELOCITY (USED
592                 ;                           DURING CALIBRATION ONLY)
593  103B           PREDVELM: DS    1         PREDICTED MACHINE COLUMN LOOP VELOCITY
594                           ENDIF
595                 ;
596  0005           INIT2CNT: EQU   $-INIT2  NUMBER OF BYTES TO BE CLEARED BEFORE SERVMOT
597                 ;
598  103C           LOOPVEL:  DS    1         CURRENT LOOP POSITION - OLD LOOP POSITION
599                 ;
600  103D           LGDLYCTR: DS    1         EXTENDED HIGH GAIN DELAY COUNTER
601                 ;
602  103E           STEADYCT: DS    1         WHEN THIS BYTE HAS BEEN DECREMENTED TO 1,
603                 ;                           STEADY STATE OPERATION HAS BEEN ACHIEVED
604                 ;                           (ONLY USED AT 200 IPS)
605  103F           REELVECT: DS    2         NEXT OPERATION VECTOR
606  1041           REELCNTR: DS    1         NEXT OPERATION DELAY TIME
607                 ;
```

```
608  1042            INIT1:    EQU   $           THE FOLLOWING FLAGS ARE CLEARED
609                                              BEFORE FEEDMOT
610                  ;
611                  ****************************************************************
612                  *                                                              *
613                  *              ======= Y INDEX =======                         *
614                  *                                                              *
615                  * LOCATIONS IN RAM ADDRESSED USING THE INDEX REGISTER "Y"      *
616                  *                                                              *
617                  ****************************************************************
618                  ;
619                            ORG   $-Y         ADJUST FOR RELATIVE ADDRESSING
620                  ;
621                  ;
622                  *################## CONDITION FLAGS ######################
623                  ;
624  0042            FLAGS:    DS    1           FLAGS REGISTER
625                  ;
626  0000            LIMFLG:   EQU   0           COL SENSOR READING LIMIT FLAG (ACTIVE HIGH)
627  0001            POLFLAG:  EQU   1           REEL CURRENT POLARITY FLAG (BOTH REELS)
628                  *****THE FOLLOWING BIT MUST BE IN THE SAME POSITION*****
629                  *****AS THE FORWARD BIT IN THE COMMAND REGISTER       *****
630  0002            OLDDIR:   EQU   2           PREVIOUS DIRECTION FLAG
631  0003            LOWGAINF: EQU   3           FILE REEL LOW GAIN FLAG
632  0004            LOWGAINM: EQU   4           MACHINE REEL LOW GAIN FLAG
633  0005            REWGAINF: EQU   5           REWIND GAIN FLAG
634                  ;         EQU   6
635                  *****THE FOLLOWING FLAG MUST BE IN BIT 7*****
636  0007            V200FLAG: EQU   7           200 IPS DRIVE FLAG
637                  ;
638                  *==============================================================
639                  ;
640  0043            FLAGSCAL: DS    1           CALIBRATION FLAGS
641                  ;
642                  ;         EQU   0
643                  ;         EQU   1
644                  ;         EQU   2
645                  ;         EQU   3
646                  ;         EQU   4
647  0005            CALRGMF:  EQU   5           CALIBRATE REFERENCE GENERATION MODE (FILE)
648  0006            CALRGMM:  EQU   6           CALIBRATE REFERENCE GENERATION MODE (MACH)
649                  *****THE FOLLOWING FLAG MUST BE IN BIT 7*****
650  0007            CALIBFLG: EQU   7           CALIBRATION IN PROGRESS FLAG
651                  ;
652                  *==============================================================
653                  ;
654  0044            TRNFLGCT: DS    1           DELAY BEFORE RESETTING TURN AROUND FLAG
655                  ;                           (CONTAINS NEGATIVE NUMBER FOR TURN AROUND
656                  ;                            FLAG SET AND 0 FOR TURN AROUND FLAG CLEAR)
657  0007            TRNFLAG:  EQU   7           LEFTMOST BIT IS THE TURN AROUND FLAG
658                  ;
659                  *==============================================================
660                  ;
661  0045            TRNPLSCT: DS    1           DELAY BEFORE RESETTING TURN AROUND PULSE
662                  ;                           (NEGATIVE WHEN PULSE SET, 0 WHEN CLEAR)
663  0007            TRNPULSE: EQU   7           LEFTMOST BIT IS THE TURN AROUND PULSE BIT
664                  ;
665  0004            INIT1CNT: EQU   $+Y-INIT1   NUMBER OF BYTES OF FLAGS TO CLEAR
666                  ;
667                  *==============================================================
668                  ;
669  0046            DIRSAV:   DS    1           BIT 2 IS USED TO SAVE THE DIRECTION BIT
670                  ;                           DURING TURN AROUND DELAY HANDLING
671                  ;
672                  *==============================================================
673                  ;
674                  ****************************************************************
675                  *                                                              *
676                  *  LOCATIONS IN RAM ADDRESSED USING ABSOLUTE ADDRESSING        *
677                  *                                                              *
678                  ****************************************************************
679                  ;
680                            ORG   $+Y         RETURN TO ABSOLUTE ADDRESSING
681                  ;
682  1047            CALERR:   DS    1           DIFFERENCE BETWEEN POSITION AND REFERENCE
683  1048            CALERSAV: DS    1           ABOVE BYTE SAVED FOR CALIBRATION PURPOSES
684  1049            AVRGECUR: DS    2           STORAGE FOR CURRENT AVERAGING DURING CAL
685  104B            CALCTR:   DS    1           COUNTER FOR TIMING PHASES OF CALIBRATION
686  104C            FATMOSPH: DS    1           FILE COLUMN SENSOR ATMOSPHERIC READING
687  104D            MATMOSPH: DS    1           MACHINE COLUMN SENSOR ATMOSPHERIC READING
688                  ;
689                  *****THE FOLLOWING 9 BYTES MUST REMAIN TOGETHER*****
690  104E            SAMPCTR:  DS    1           SAMPLE COUNTER FOR AVERAGING REEL CURRENT
691  104F            FMAVRGE:  DS    2           STORAGE FOR FILE MIDPOINT AVERAGING
692  1051            MMAVRGE:  DS    2           STORAGE FOR MACHINE MIDPOINT AVERAGING
693  1053            FGAVRGE:  DS    2           STORAGE FOR FILE COLUMN GAIN AVERAGING
694  1055            MGAVRGE:  DS    2           STORAGE FOR MACHINE COLUMN GAIN AVERAGING
695                            IF    DEBUG3
696                  *****THE FOLLOWING 2 BYTES MUST REMAIN TOGETHER AND IN THIS ORDER*****
697                  FULLVACF: DS    1           FILE COLUMN FULL VACUUM READING
698                  ATMVACF:  DS    1           FILE VACUUM SENSOR ATMOSPHERIC READING
699                  *****THE FOLLOWING 2 BYTES MUST REMAIN TOGETHER AND IN THIS ORDER*****
700                  FULLVACM: DS    1           MACHINE COLUMN FULL VACUUM READING
701                  ATMVACM:  DS    1           MACHINE VACUUM SENSOR ATMOSPHERIC READING
702                  YKA:      DS    1           ADJUSTED LOOP POSITION STORAGE
703                            ENDIF
```

```
704                        IF    DEBUG2      EXTRA STORAGE FOR TRACE DUMPING
705                  *****THE FOLLOWING 4 BYTES MUST REMAIN TOGETHER AND IN THIS ORDER*****
706                  FILEPT:   DS    2          FILE REEL TRACE BUFFER POINTER
707                  MACHPT:   DS    2          MACHINE REEL TRACE BUFFER POINTER
708                  FSAVTABL: EQU   3000H      FILE REEL TRACE BUFFER STARTING ADDRESS
709                  MSAVTABL: EQU   4000H      MACHINE REEL TRACE BUFFER STARTING ADDRESS
710                  ;
711                            IF    DEBUG3.EQ.0
712                            ORG   (($-1).AND.0FFF8H)+08H  ;/START ON A NICE EVEN BOUNDARY
713                            ENDIF
714                  FMTAB:    EQU   $          ;/KEEP THE 4 FILE COLUMN MIDPOINT
715                  ;                          ;/  VALUES HERE FOR DEBUG PURPOSES
716                  MMTAB:    EQU   $+5        ;/KEEP THE 4 MACHINE COLUMN MIDPOINT
717                            ENDIF            ;/  VALUES HERE FOR DEBUG PURPOSES
718                  ;
719                  ;
720                  ******************************************
721                  *              CONSTANTS                  *
722                  ******************************************
723                  ;
724                  *-------- PIT MODES OF OPERATION --------*
725                  ;
726  0000            MODE0:    EQU   0          INTERRUPT ON TERMINAL COUNT
727  0002            MODE1:    EQU   2
728  0004            MODE2:    EQU   4
729  0006            MODE3:    EQU   6          SQUARE WAVE GENERATOR
730  0008            MODE4:    EQU   8
731  000A            MODE5:    EQU   0AH        HARDWARE TRIGGERED STROBE
732                  ;
733                  *----------- PIT READ/LOAD -------------*
734                  ;
735  0000            RL0:      EQU   00H        COUNTER LATCHING OPERATION (READ)
736  0010            RL1:      EQU   10H
737  0020            RL2:      EQU   20H
738  0030            RL3:      EQU   30H        READ/LOAD TWO BYTES (LSB FIRST)
739                  ;
740                  *--------- COUNTER SELECT CODE ---------*
741                  ;
742  0000            SC0:      EQU   00H        SELECT COUNTER ZERO
743  0040            SC1:      EQU   40H           "       "    ONE
744  0080            SC2:      EQU   80H           "       "    TWO
745                  ;
746                  *========================================*
747                  ;
748  0002            LTHRSHLD: EQU   2          LINEAR RANGE LIMIT
749  0008            MOTION:   EQU   8          MOTION THRESHOLD.  (IS THIS VALUE RIGHT??)
750                  ;/REFKGO:   EQU   1728     FAST REFERENCE OFFSET, GO SET
751                  ;/REFKNOGO: EQU   576      FAST REFERENCE OFFSET, GO RESET
752                  ;/REFSGO:   EQU   324      SLOW REFERENCE OFFSET, GO SET, NOT REWIND
753                  ;/REFSNOGO: EQU   108      SLOW REFERENCE OFFSET, GO RESET
754                  ;/REFSREW:  EQU   240      SLOW REFERENCE OFFSET, REWIND
755  000B            MONFOFF:  EQU   0BH        MACHINE REEL ON, FILE REEL OFF
756  000D            FONMOFF:  EQU   0DH        FILE REEL ON, MACHINE REEL OFF
757  00A0            LOWDELAY: EQU   160        MUST SEE LOW GAIN COMMAND FOR 160 MS
758                  ;                          BEFORE ACTUALLY SETTING LOW GAIN MODE
759  00FA            TRNPLS:   EQU   100H-(24/4) TURN AROUND PULSE COUNTER INITIALIZATION
760                  ;                          VALUE FOR 24 MS TURN AROUND PULSE
761  0002            CURTADLY: EQU   2          DELAY TO REDUCE TRANSIENT CURRENT WHEN
762                  ;                          CHANGING CURRENT POLARITY.  (APPROX 20 US)
763                  ***** FOR THE TIME BEING, THE FOLLOWING TWO VALUES MUST BE EQUAL*****
764  007F            FILEMAX:  EQU   127        FILE REEL SERVO CURRENT LIMIT
765  007F            MACHMAX:  EQU   127        MACHINE REEL SERVO CURRENT LIMIT
766  0024            LOADMAX:  EQU   36         LOAD CURRENT LIMIT
767  007F            TRNMAX:   EQU   127        CURRENT MUST BE LESS THAN THIS VALUE FOR
768                  ;                          A TURN AROUND TO BE ALLOWED
769  0048            IMAXREW:  EQU   72         MAXIMUM CURRENT ALLOWED BEFORE SETTING SLOW
770                  ;                          DOWN CONDITION ON A REWIND
771  0040            SLGMAX:   EQU   64         CURRENT LIMIT USED WHEN AN OVERFLOW OCCURS
772                  ;                          DURING SIMULATED LOW GAIN CALCULATION
773  000C            MAXREWER: EQU   12         MAXIMUM POSITION ERROR ALLOWED BEFORE SETTING
774                  ;                          MACHINE REEL SLOW DOWN CONDITION
775  0007            VACTEN:   EQU   7          LOW GAIN VACUUM TENSION CURRENT ??CHECK VALUE?
776  0002            VACTENHG: EQU   8/4        HIGH GAIN VACUUM TENSION CURRENT / 4
777  0010            LDVACTEN: EQU   16         VACUUM TENSION TERM DURING LOAD
778  0082            LDTEN:    EQU   82H        FILE REEL CURRENT DURING SPACE FORWARD
779  0002            UNLDTEN:  EQU   02H        MACH REEL CURRENT DURING SPACE BACKWARD
780                  ;                          PC BOARD CLOCK IS 26.526MHZ / 16
781  067A            MILLISEC: EQU   1658       ONE MILLISECOND COUNT
782  02EA            HIPULSE:  EQU   746        HIGH GAIN OFF PULSE WIDTH (450 US)
783  05DC            MIDPULSE: EQU   1500       LOAD/UNLOAD OFF PULSE WIDTH
784  0818            LOWPULSE: EQU   2072       LOW GAIN OFF PULSE WIDTH (1250 US)
785                  ;
786  0030            CCINIT:   EQU   48         INITIAL LOAD OF CALIBRATION COUNTER
787  001C            SLGTIME:  EQU   28         SET LOW GAIN AFTER 160 MS
788  0064            STUBBYLT: EQU   100        TIME IN MILLISECONDS THAT IT TAKES THE LOWER
789                  ;                          STUBBY TO LOAD AND COLUMN VACUUM TO COME UP
790                  ;                          FOLLOWING THE MACHINE COLUMN LOW GAIN COMMAND
791                  ;                          (THIS ASSUMES THAT AIR BEARINGS ARE TURNED ON
792                  ;                          WHEN THE MACH COLUMN LOW GAIN CMD IS ISSUED)
793  00FB            STEADYDL: EQU   250+1      GO MUST BE SET FOR 250 MS BEFORE RECOGNIZING
794                  ;                          STEADY STATE OPERATION
795  0010            AVTIME:   EQU   16         COLLECT AVERAGE CURRENT FROM
796                  ;                          CALCTR=16 THROUGH CALCTR=1
797  0004            SAMPLES:  EQU   4          4 MIDPOINTS WILL BE CALCULATED AND
798                  ;                          THEN AVERAGED TOGETHER
799  002B            FMGUESS:  EQU   43         FILE MIDPOINT GUESS REFERENCED
```

```
800                                             ;                           TO ATMOSPHERIC
801   002B            MMGUESS:   EQU    43            MACHINE MIDPOINT GUESS
802   000E            FCALTARG:  EQU    14            FILE COLUMN CALIBRATION TARGET
803                                             ;                           REFERENCED TO ATMOSPHERIC
804                                             ;                           (SENSE HOLE NUMBER 8)
805   000E            MCALTARG:  EQU    14            MACHINE COLUMN CALIBRATION TARGET
806                                             ;                           REFERENCED TO ATMOSPHERIC
807                                             ;                           (SENSE HOLE NUMBER 9)
808   002A            MPOFFST:   EQU    42            DISTANCE ADDED TO CALIBRATE TARGET FOR
809                                             ;                           POSITIONING THE MACHINE LOOP DURING
810                                             ;                           A POSITION FILE COMMAND
811                                             ; THE FOLLOWING 3 VALUES ARE THE LOOP VELOCITY IN THE MACHINE
812                                             ; COLUMN FOR THE 3 DRIVE SPEEDS.  THE UNITS ARE IN (COUNTS
813                                             ; PER 8 MS SAMPLE) * 256.  THUS, THE VALUES ARE CALCULATED AS
814                                             ; TAPE SPEED / 2 * SAMPLE TIME * COLUMN GAIN * 256.
815                                             ; FOR 200 IPS:  200/2 * .008 * 5.0 * 256 = 921.6
816   0400            VEL200:    EQU    1024          200 IPS MACHINE COLUMN LOOP VELOCITY
817   0280            VEL125:    EQU    640           125 IPS MACHINE COLUMN LOOP VELOCITY
818   0180            VEL75:     EQU    384           75 IPS MACHINE COLUMN LOOP VELOCITY
819                                             ; THE FOLLOWING 4 VALUES ARE USED ONLY DURING THE TIME THAT
820                                             ; THE TURNAROUND PULSE IS SET.
821   000E            VELOFFF:   EQU    14            VELOCITY OFFSET DURING TURNAROUND PULSE
822   00F7            FWDSRPF:   EQU    100H-9        FORWARD STOP REFERENCE POSITION
823   00F2            VELOFFM:   EQU    100H-14       VELOCITY OFFSET FOR MACHINE REEL
824   0009            FWDSRPM:   EQU    9             FORWARD STOP REFERENCE FOR MACHINE REEL
825                                             ;
826                                             *=====================================*
827                                             *      REFERENCE COUNTS FOR           *
828                                             *        LOADING  SPEEDS              *
829                                             *=====================================*
830                                             ;
831   0065            FCW1:      EQU    101           FILE REEL FAST FWD  (220 RPM)
832   001E            FCW2:      EQU    30            FILE REEL SLOW FWD  (42 RPM)
833   00B1            FCCW1:     EQU    256-79        FILE REEL FAST BWD  (126 RPM)
834   00E0            FCCW2:     EQU    256-32        FILE REEL SLOW BWD  (42 RPM)
835                                             ;
836   0056            MCW1:      EQU    86            MACH REEL FAST FWD  (128 RPM)
837   0064            MCW2:      EQU    100           MACH REEL VERY FAST FWD (GUESS)
838   00B9            MCCW1:     EQU    256-71        MACH REEL FAST BWD  (102 RPM)
839   00D8            MCCW2:     EQU    256-40        MACH REEL SLOW BWD  (GUESS)
840   0001            MLOGAINF:  EQU    01            THIS IS A SPECIAL FLAG VALUE USED TO
841                                             ;                           INDICATE THAT THE MACHINE COLUMN HAS BEEN
842                                             ;                           PUT INTO LOW GAIN MODE
843   0001            FLOGAINF:  EQU    01            SPECIAL FLAG TO INDICATE THAT THE FILE COLUMN
844                                             ;                           HAS BEEN PUT INTO LOW GAIN MODE
845                                             ;
846                                             *=====================================*
847                                             *     GAIN COMMANDS AND               *
848                                             *       CALIBRATION COMMANDS          *
849                                             *=====================================*
850                                             ;
851   0064            LOWGAIN:   EQU    064H          FILE LOW GAIN, MACH LOW GAIN COMMAND
852   006D            HIGHGAIN:  EQU    06DH          FILE HIGH GAIN, MACH HIGH GAIN COMMAND
853   003F            REWGAIN:   EQU    03FH          REWIND GAIN COMMAND W/O BIAS OR GROUND BITS
854                              IF     HITCHCMD
855   00ED            HITCHMOD:  EQU    0EDH          HITCH MODE (BYPASS TURNAROUND DELAY @ 200 IPS)
856                              ENDIF
857   00E0            LDMODE:    EQU    0E0H          SPACE FWD, CONSTANT CURRENT ON FILE REEL
858   00D6            UNLDMODE:  EQU    0D6H          SPACE BWD, CONSTANT CURRENT ON MACH REEL
859   00F6            STARTCAL:  EQU    0F6H          START CALIBRATION SEQUENCE COMMAND
860   00F0            POSFILE:   EQU    0F0H          POSITION FILE LOOP COMMAND
861   00F1            HOLDFILE:  EQU    0F1H          HOLD FILE REEL STEADY COMMAND
862   00F3            RFPOSMAC:  EQU    0F3H          READ FILE MIDPOINT, POSITION MACH LOOP CMD
863   00F2            HOLDMACH:  EQU    0F2H          HOLD MACHINE REEL STEADY COMMAND
864                                             ; NOTE:  A HIGHGAIN COMMAND FOLLOWING A HOLDMACH COMMAND CAUSES
865                                             ;   THE MACHINE MIDPOINT TO BE READ AND CALIBRATION TO BE EXITED.
866                                             ;
868                                                        ORG    0
869                                             ;
870                                             ****************************************************************
871                                             *                                                              *
872                                             *              ========== BASE ==========                       *
873                                             *                                                              *
874                                             * PROGRAM EXECUTION AT POWER UP PROCEEDS THROUGH "BASE"         *
875                                             * WHICH CARRIES OUT THE INITIALIZATION OF STACK POINTER         *
876                                             * INDEX REGISTERS, INPUT/OUTPUT PORTS, FLAGS AND SPECIAL        *
877                                             * PURPOSE MEMORY LOCATIONS.  BASE DIRECTS EXECUTION TO          *
878                                             * "STBYULD".                                                   *
879                                             *                                                              *
880                                             ****************************************************************
881                                             ;
882                                             ;                                     BEGINNING OF STANDARD PROGRAM
883   0000  31 80 10  RESET:     LD     SP,STACKLOC   PRESET STACK MEMORY LOCATION
884   0003  DD 21 00 20          LD     IX,X          IX POINTS TO I/O PORTS
885   0007  FD 21 00 10          LD     IY,Y          IY POINTS TO THE RAM
886                                             ;
887                                             *---------------------------------------*
888                                             *         INITIALIZE PPI'S              *
889                                             *---------------------------------------*
890                                             ;
891   000B  21 0B 20             LD     HL,X+PPICTRL
892   000E  36 88                LD     (HL),88H
893   0010  2D                   DEC    L
894   0011  36 0F                LD     (HL),0FH      CONTROL=0F
895   0013  2D                   DEC    L
896   0014  36 80                LD     (HL),80H      MACHMOT=80
```

```
897  0016  2D                       DEC   L
898  0017  36 80                    LD    (HL),80H              FILEMOT=80
899                          ;
900  0019  21 13 20                 LD    HL,X+PPI2CTRL
901  001C  36 89                    LD    (HL),89H              A, B OUTPUTS; C INPUTS
902  001E  2E 10                    LD    L,REGO                HL POINTS TO REGO
903                          ;                                  RESET GATE ENABLE ON PC CARD
904  0020  36 BF                    LD    (HL),OFFH-1.SHL.GATEENAB  REGO=BF (REEL MOTION FLAGS)
905                          ;
906                          *--------------------------------------*
907                          *           INITIALIZE PIT             *
908                          *--------------------------------------*
909                          ;
910  0022  21 33 20                 LD    HL,X+PITCTRL
911  0025  36 3A                    LD    (HL),SC0+RL3+MODE5    HARDWARE TRIGGERED STROBE
912  0027  36 7A                    LD    (HL),SC1+RL3+MODE5    HARDWARE TRIGGERED STROBE
913  0029  36 B0                    LD    (HL),SC2+RL3+MODE0    SET TOC AT END OF COUNT
914  002B
915  002B  2D                       DEC   L
916  002C  36 7A                    LD    (HL),.LOW.(MILLISEC)  START MILLISECOND COUNTER
917  002E  36 06                    LD    (HL),.HIGH.(MILLISEC)
918  0030  11 DC 05                 LD    DE,MIDPULSE           SET OFF DUTY PULSE GENERATORS
919  0033  CD 77 04                 CALL  SETPULSE                TO LOAD/UNLOAD PULSE WIDTH
920  0036  18 02                    JR    INIT                  GO CONTINUE INITIALIZATION
921                                 IF    $.UGT.38H
922                                 ERROR!! THE FOLLOWING CODE MUST BE AT ADDRESS 38H
923                                 ENDIF
924                                 ORG   38H
925  0038  18 C6                    JR    RESET                 IN CASE RST 38 IS HIT, RESET
926                          ;
927  003A  3E FF         INIT:      LD    A,OFFH                SET GATE ENABLE TO THE
928  003C  32 10 20                 LD    (X+REGO),A              TIMER CHIP
929  003F  21 32 10                 LD    HL,INIT0              CLEAR THE STORAGE LOCATIONS
930  0042  06 05                    LD    B,INITOCNT              WHICH ONLY NEED TO BE CLEARED
931  0044  AF                       XOR   A                       ON INITIAL STARTUP
932  0045  77            INITOLP:   LD    (HL),A
933  0046  2C                       INC   L
934  0047  10 FC                    DJNZ  INITOLP
935  0049  32 4E 10                 LD    (SAMPCTR),A           CLEAR THE CALIBRATION SAMPLE CTR
936                          ;
937  004C  21 88 00                 LD    HL,STBYULD            DO THE STANDBY UNLOADED ROUTINE
938  004F  0E 01                    LD    C,1                     AFTER ONE MILLISECOND
939                          ;
940                          ;
941                          *--------------------------------------*
942                          *           DISPATCH ROUTINE           *
943                          *--------------------------------------*
944  0051  22 3F 10      DISPATCH:  LD    (REELVECT),HL         STORE THE NEW REEL VECTOR
945  0054  79                       LD    A,C                    AND STORE THE NEW
946  0055  32 41 10                 LD    (REELCNTR),A          REEL DELAY COUNTER
947  0058  21 20 20      NEXTMS:    LD    HL,X+COMMAND          POINT TO THE BYTE CONTAINING
948                          ;                                  THE TIMER OUTPUT BIT
949  005B  0E 32                    LD    C,TIMER1              C=LOW BYTE OF TIMER ADDRESS
950                          ;
951  005D  CB 66         WAITLOOP:  BIT   TOC1,(HL)             WAIT FOR THE TIMER TO FINISH
952  005F  28 FC                    JR    Z,WAITLOOP            IF NOT DONE, LOOP AGAIN
953  0061  69                       LD    L,C                   TIME UP, POINT TO THE TIMER
954  0062  36 7A                    LD    (HL),.LOW.MILLISEC    SET TIMER UP FOR ANOTHER
955  0064  36 06                    LD    (HL),.HIGH.MILLISEC     MILLISECOND OF DELAY
956  0066  21 41 10                 LD    HL,REELCNTR           DECREMENT COUNT FOR WHEN NEXT
957  0069  35                       DEC   (HL)                    OPERATION SHOULD BE DONE
958  006A  20 EC                    JR    NZ,NEXTMS             IF TIME NOT DONE, WAIT
959  006C  CD 84 00                 CALL  DOIT                  GO DO THE NEXT OPERATION
960  006F  DD CB 20 66              BIT   TOC1,(IX+COMMAND)     IS THE TIMER ALREADY DONE?
961  0073  28 DC                    JR    Z,DISPATCH            NO, GO WAIT FOR IT
962  0075  11 32 20                 LD    DE,X+TIMER1           YES, THE TIMER EXPIRED DURING
963  0078  3E 7A                    LD    A,.LOW.MILLISEC         THE EXECUTION OF THE PREVIOUS
964  007A  12                       LD    (DE),A                  CODE MODULE, SO GET THE TIMER
965  007B  3E 06                    LD    A,.HIGH.MILLISEC        LOADED UP AGAIN AS SOON AS
966  007D  12                       LD    (DE),A                  POSSIBLE
967  007E  0D                       DEC   C                     DECREMENT THE DELAY COUNTER
968  007F  CC 87 00                 CALL  Z,DOITNOW             IF NEXT MODULE IS TO BE
969                          ;                                  EXECUTED AFTER ONLY ONE MS,
970                          ;                                  GO DO IT NOW
971  0082  18 CD                    JR    DISPATCH              GO WAIT FOR NEXT MILLISECOND
972                          ;
973  0084  2A 3F 10      DOIT:      LD    HL,(REELVECT)         GET THE ADDRESS OF THE NEXT
974  0087  E9            DOITNOW:   JP    (HL)                   OPERATION AND JUMP THERE
975                          ;
976                          *==============================================================*
977                          *==============================================================*
978                          ;
979  0088  21 88 00      STBYULD:   LD    HL,STBYULD            DO THIS AGAIN AFTER
980  008B  0E 01                    LD    C,1                     ONE MORE MILLISECOND
981  008D  3A 20 20                 LD    A,(X+COMMAND)         GET THE ENABLE REELS BIT
982  0090  CB 47                    BIT   ENBLRLS,A             REELS ENABLED?
983  0092  C0                       RET   NZ                    NO, JUST RETURN
984  0093  32 04 20                 LD    (X+FCOLSEN),A         YES,START A/D FOR FILE POSITION
985  0096  3A 28 20                 LD    A,(X+REELS)           LOOK AT THE FIRST COMMAND
986  0099  FE F6                    CP    STARTCAL              START CAL SEQUENCE COMMAND?
987  009B  20 12                    JR    NZ,GETATMOS           NO, GO GET ATMOSPHERIC READINGS
988                          ; START CALIBRATION SEQUENCE COMMAND. INITIALIZE THE SAMPLE COUNTER,
989                          ; ZERO THE GAIN AVERAGES AND CLEAR THE MIDPOINT STORAGE.
```

```
990   009D  21 4E 10                 LD      HL,SAMPCTR              POINT TO SAMPCTR AND THE AVERAGES
991   00A0  36 04                    LD      (HL),SAMPLES            WE WILL GATHER UP 4 SAMPLES
992   00A2  06 08                    LD      B,MGAVRGE-FMAVRGE+2     B=NUMBER OF BYTES OF AVERAGES
993   00A4  AF                       XOR     A                         TO BE CLEARED
994   00A5  2C              INITLP3: INC     L                       ZERO THE MIDPOINT AND
995   00A6  77                       LD      (HL),A                    GAIN AVERAGES
996   00A7  10 FC                    DJNZ    INITLP3
997   00A9  32 35 10                 LD      (FMIDDLE),A             CLEAR THE FILE AND MACHINE
998   00AC  32 36 10                 LD      (MMIDDLE),A               MIDPOINTS (FMIDDLE, MMIDDLE)
999                         ;
1000  00AF  CD B4 0C        GETATMOS:CALL    EOCWAIT                 WAIT FOR END OF CONVERSION
1001  00B2  20 08                    JR      NZ,GOTATMOS             IF DONE, GO READ VALUE
1002                        ;                                        REELS ENABLED DROPPED OR
1003  00B4  32 04 20                 LD      (X+FCOLSEN),A             ADC ERROR, TRY TO RESTART IT
1004  00B7  CD CF 0C                 CALL    EOCRETRY                WAIT FOR ADC DONE, HALT IF ERROR
1005  00BA  28 CC           TOSTULD: JR      Z,STBYULD               IF REELS ENABLED DROPPED, EXIT
1006  00BC  3A 04 20        GOTATMOS:LD      A,(X+FCOLSEN)           READ FILE COLUMN ATMOSPHERIC
1007  00BF  32 05 20                 LD      (X+MCOLSEN),A           START A/D FOR MACH POSTION
1008  00C2  32 4C 10                 LD      (FATMOSPH),A            STORE FILE ATMOSPHERE READING
1009  00C5  C6 2B                    ADD     A,FMGUESS               A=GUESS AT THE MIDPOINT
1010  00C7  47                       LD      B,A                     SAVE THE GUESSED MIDPOINT IN B
1011  00C8  21 35 10                 LD      HL,FMIDDLE              POINT TO FILE MIDPOINT VALUE
1012  00CB  7E                       LD      A,(HL)                  GET LAST CALCULATED MIDPOINT
1013  00CC  A7                       AND     A                       IS THERE A LAST MIDPOINT VALUE?
1014  00CD  20 01                    JR      NZ,STBYULD2             YES, USE IT RATHER THAN GUESS
1015  00CF  70                       LD      (HL),B                  NO MIDPOINT HAS BEEN CALCULATED
1016                        ;                                        YET SO USED THE GUESSED VALUE
1017  00D0  3E 00           STBYULD2:LD      A,0.SHL.ALPLGINF+0.SHL.ALPLGINM
1018  00D2  32 11 20                 LD      (X+REG1),A              DISABLE HARDWARE PLUG INHIBIT
1019  00D5  AF                       XOR     A                       START OUT WITH
1020  00D6  32 09 20                 LD      (X+MACHMOT),A             NO MACHINE REEL CURRENT
1021  00D9  21 42 10                 LD      HL,INIT1                CLEAR
1022  00DC  06 04                    LD      B,INIT1CNT                ALL
1023  00DE  77              INIT1LP: LD      (HL),A                    FLAG BITS AND
1024  00DF  2C                       INC     L                         CURRENT AVERAGE BITS
1025  00E0  10 FC                    DJNZ    INIT1LP
1026  00E2  3E 06                    LD      A,1+(STUBBYLT/20)       INITIALIZE THE DELAY BETWEEN MCOL
1027  00E4  32 3D 10                 LD      (LGDLYCTR),A              LGAIN CMD AND THE TIME THERE IS
1028                        ;                                          ENOUGH VACUUM TO DO SERVO CTRL
1029                                 IF      DEBUG2                  SAVE TRACE INFORMATION
1030                                 LD      HL,FSAVTABL             INITIALIZE THE TRACE BUFFER
1031                                 LD      (FILEPT),HL               POINTERS
1032                                 LD      H,.HIGH.MSAVTABL
1033                                 LD      (MACHPT),HL
1034                                 ENDIF
1035  00E7  3A 12 20                 LD      A,(X+VELREG)            GET THE DRIVE VELOCITY BITS
1036  00EA  E6 06                    AND     1.SHL.V125IPS+1.SHL.V75IPS  MASK OFF OTHER BITS
1037  00EC  FE 06                    CP      1.SHL.V125IPS+1.SHL.V75IPS  IS THIS A 200 IPS DRIVE?
1038  00EE  20 04                    JR      NZ,STBYULD3             NO, LEAVE V200FLAG CLEAR
1039  00F0  FD CB 42 FE              SET     V200FLAG,(IY+FLAGS)     YES, SET V200FLAG
1040                        ;
1041  00F4  CD B4 0C        STBYULD3:CALL    EOCWAIT                 WAIT FOR END OF CONVERSION
1042  00F7  20 08                    JR      NZ,STBYULD4             IF DONE, GO READ VALUE
1043                        ;                                        REELS ENABLED DROPPED OR
1044  00F9  32 05 20                 LD      (X+MCOLSEN),A             ADC ERROR, TRY TO RESTART IT
1045  00FC  CD CF 0C                 CALL    EOCRETRY                WAIT FOR ADC DONE, HALT IF ERROR
1046  00FF  28 B9                    JR      Z,TOSTULD               IF REELS ENABLED DROPPED, EXIT
1047  0101  3A 05 20        STBYULD4:LD      A,(X+MCOLSEN)           READ MACHINE COLUMN ATMOSPHERIC
1048                                 IF      DEBUG3
1049                                 LD      (X+FVACSEN),A           START A/D FOR FILE VACUUM READING
1050                                 ENDIF
1051  0104  32 4D 10                 LD      (MATMOSPH),A
1052  0107  C6 2B                    ADD     A,MMGUESS               A=GUESSED MACH COLUMN MIDPOINT
1053  0109  47                       LD      B,A                     STORE IT IN B
1054  010A  21 36 10                 LD      HL,MMIDDLE              POINT TO MACHINE MIDPOINT VALUE
1055  010D  7E                       LD      A,(HL)                  GET LAST CALCULATED MIDPOINT
1056  010E  A7                       AND     A                       IS THERE A LAST MIDPOINT VALUE?
1057  010F  20 01                    JR      NZ,STBYULD5             YES, USE IT RATHER THAN GUESS
1058  0111  70                       LD      (HL),B                  NO MIDPOINT HAS BEEN CALCULATED
1059                        ;                                        YET SO USED THE GUESSED VALUE
1060  0112            STBYULD5:
1061                                 IF      DEBUG3
1062                                 CALL    EOCWAIT                 WAIT FOR END OF CONVERSION
1063                                 JR      NZ,STBYULD6             IF DONE, GO READ VALUE
1064                        ;                                        REELS ENABLED DROPPED OR
1065                                 LD      (X+FVACSEN),A             ADC ERROR, TRY TO RESTART IT
1066                                 CALL    EOCRETRY                WAIT FOR ADC DONE, HALT IF ERROR
1067                        TOSTULD2:JR      Z,TOSTULD               IF REELS ENABLED DROPPED, EXIT
1068                        STBYULD6:LD      A,(X+FVACSEN)           READ FILE VAC SENSOR ATMOSPHERIC
1069                                 LD      (X+MVACSEN),A           START A/D FOR MACH VACUUM SENSOR
1070                                 LD      (ATMVACF),A             STORE FILE VAC SENSOR ATMOSPHERIC
1071                                 CALL    EOCWAIT                 WAIT FOR END OF CONVERSION
1072                                 JR      NZ,STBYULD7             IF DONE, GO READ VALUE
1073                        ;                                        REELS ENABLED DROPPED OR
1074                                 LD      (X+MVACSEN),A             ADC ERROR, TRY TO RESTART IT
1075                                 CALL    EOCRETRY                WAIT FOR ADC DONE, HALT IF ERROR
1076                                 JR      Z,TOSTULD2              IF REELS ENABLED DROPPED, EXIT
1077                        STBYULD7:LD      A,(X+MVACSEN)           READ MACH VAC SENSOR ATMOSPHERIC
1078                                 LD      (ATMVACM),A             STORE MACH VAC SENSOR ATMOSPHERIC
1079                                 ENDIF
1080                        ;
1081                        ;
```

```
1082         ****************************************************************************
1083         *                                                                          *
1084         * SECTION NAME: FEEDMOT                  DATE:02-OCT-81       LEVEL:00     *
1085         *                                                                          *
1086         * DESCRIPTION: THE FOLLOWING ROUTINE IMPLEMENTS THE MOTIONS COMMANDS       *
1087         * FROM THE MAIN CONTROLLER DURING THE LOAD AND UNLOAD SEQUENCES,USING      *
1088         * THE MOTOR'S BEMF TO MAINTAIN A CLOSED LOOP SPEED CONTROL.                *
1089         *                                                                          *
1090         * INVOCATION PARAMETERS: ENBRLS BIT IN COMMAND REGISTER RESET.             *
1091         *                                                                          *
1092         * SUBROUTINE: DECODE                                                       *
1093         *                                                                          *
1094         ****************************************************************************
1095         ;
1096  0112  3A 28 20       FEEDMOT:  LD    A,(X+REELS)          GET THE REEL VELOCITY COMMAND
1097  0115  FE 6D                    CP    HIGHGAIN             IS IT A HIGH GAIN COMMAND?
1098  0117  CA FB 02                 JP    Z,SRVGAIN            YES, GO INTO SERVO CONTROL
1099  011A  FE F0                    CP    POSFILE              FIRST CALIBRATION COMMAND?
1100  011C  CA CF 02                 JP    Z,PFILE              YES, GO START CALIBRATION
1101  011F  21 0A 20                 LD    HL,X+CONTROL         TURN ON MACHINE, TURN OFF FILE
1102  0122  36 0B                    LD    (HL),MONFOFF         REEL TO LET CURRENT DIE DOWN
1103         ;                                                  (DON'T FORCE PLUG INHIBIT)
1104  0124  21 32 10                 LD    HL,OLDCMD            POINT TO LAST VELOCITY COMMAND
1105  0127  BE                       CP    (HL)                 IS THE NEW ONE DIFFERENT?
1106  0128  C4 B2 0D                 CALL  NZ,DECODE            YES, PUT DESIRED EMF VALUES
1107         ;                                                  IN MVELREF AND FVELREF.
1108  012B  21 31 01                 LD    HL,FEEDMOT2          DO FEEDMOT2 NEXT
1109  012E  0E 07                    LD    C,7                  AFTER 7 MILLISECONDS
1110  0130  C9                       RET                       ;RETURN UNTIL THEN
1111         ;
1112  0131  3A 20 20       FEEDMOT2: LD    A,(X+COMMAND)        GET THE REELS ENABLED BIT
1113  0134  CB 47                    BIT   ENBLRLS,A            ARE REELS ENABLED?
1114  0136  C2 84 04                 JP    NZ,EXITSERV          NO, GO SHUT THINGS DOWN
1115         ;
1116         ;------ FILE COL SENSOR READING --------
1117         ;
1118  0139  32 04 20                 LD    (X+FCOLSEN),A        START FILE COL SENSOR CONVERSION
1119  013C  21 42 01                 LD    HL,FEEDMOT3          DO FEEDMOT3 NEXT,
1120  013F  0E 01                    LD    C,1                  AFTER 1 MILLISECOND
1121  0141  C9                       RET                       ;RETURN UNTIL THEN
1122         ;
1123  0142  CD B4 0C       FEEDMOT3: CALL  EOCWAIT              WAIT FOR END OF CONVERSION
1124  0145  20 0C                    JR    NZ,FM35              IF DONE, GO READ VALUE
1125  0147  D2 84 04                 JP    NC,EXITSERV          IF REELS ENABLED DROPPED, EXIT
1126  014A  32 04 20                 LD    (X+FCOLSEN),A        ADC ERROR, TRY TO RESTART IT
1127  014D  CD CF 0C                 CALL  EOCRETRY             WAIT FOR ADC DONE, HALT IF ERROR
1128  0150  CA 84 04                 JP    Z,EXITSERV           IF REELS ENABLED DROPPED, EXIT
1129  0153  3A 04 20       FM35:     LD    A,(X+FCOLSEN)        READ FILE COLUMN SENSOR
1130  0156  32 37 10                 LD    (YK),A               SAVE FILE COLUMN SENSOR READING
1131         ;
1132         ;
1133         ;------ FILE BEMF SENSOR READING -------
1134         ;
1135  0159  32 02 20                 LD    (X+FBEMFSEN),A       START FILE BEMF CONVERSION
1136  015C  21 62 01                 LD    HL,FEEDMOT4          DO FEEDMOT4 NEXT,
1137  015F  0E 01                    LD    C,1                  AFTER 1 MILLISECOND
1138  0161  C9                       RET                       ;RETURN UNTIL THEN
1139         ;
1140  0162  21 10 20       FEEDMOT4: LD    HL,X+REGO            POINT TO THE MOTION INDICATORS
1141  0165  CD B4 0C                 CALL  EOCWAIT              WAIT FOR END OF CONVERSION
1142  0168  20 0C                    JR    NZ,FM5               IF DONE, GO READ VALUE
1143  016A  D2 84 04                 JP    NC,EXITSERV          IF REELS ENABLED DROPPED, EXIT
1144  016D  32 02 20                 LD    (X+FBEMFSEN),A       ADC ERROR, TRY TO RESTART IT
1145  0170  CD CF 0C                 CALL  EOCRETRY             WAIT FOR ADC DONE, HALT IF ERROR
1146  0173  CA 84 04                 JP    Z,EXITSERV           IF REELS ENABLED DROPPED, EXIT
1147  0176  3A 02 20       FM5:      LD    A,(X+FBEMFSEN)       READ SENSOR VALUE
1148  0179  CB 3F                    SRL   A                    DIVIDE BY TWO
1149  017B  FE 08                    CP    MOTION               FILE REEL MOTION DETECTED?
1150         ;                                                  (CLEAR CARRY FLAG IF YES)
1151  017D  DD CB 0A 76              BIT   FBEMFPOL,(IX+CONTROL) IF FWD DIRECTION, RESET Z FLAG
1152         ;                                                  WAS MOTION DETECTED?
1153  0181  30 08                    JR    NC,FEEDMOT5          YES, GO DETERMINE DIRECTION
1154  0183  CB D6                    SET   FILEACW,(HL)         NO, RESET MOTION INDICATORS
1155  0185  CB DE                    SET   FILEACCW,(HL)
1156  0187  28 0E                    JR    Z,FEEDMOTC           BACKWARD? GO MAKE BEMF NEGATIVE
1157  0189  18 0E                    JR    SAVEBEMF             LEAVE BACK EMF POSITIVE
1158         ;
1159  018B  28 06          FEEDMOT5: JR    Z,FEEDMOTB           IF BACKWARD, GO SET INDICATOR
1160  018D  CB 96                    RES   FILEACW,(HL)         SET FORWARD INDICATOR
1161  018F  CB DE                    SET   FILEACCW,(HL)          AND RESET BACKWARD INDICATOR
1162  0191  18 06                    JR    SAVEBEMF
1163         ;
1164  0193  CB D6          FEEDMOTB: SET   FILEACW,(HL)         RESET CW INDICATOR
1165  0195  CB 9E                    RES   FILEACCW,(HL)        SET CCW INDICATOR
1166  0197  ED 44          FEEDMOTC: NEG                        CCW MOTION IS NEGATIVE
1167         ;
1168  0199  57             SAVEBEMF: LD    D,A                  SAVE FILE BEMF SENSOR READING
1169  019A  3A 32 10                 LD    A,(OLDCMD)           GET THE VELOCITY COMMAND
1170  019D  5F                       LD    E,A                  SAVE VELOCITY COMMAND IN E
1171  019E  FE E0                    CP    LDMODE               CONSTANT CURRENT ON FILE REEL?
1172  01A0  20 04                    JR    NZ,VELMODE           NO, DO VELOCITY SERVO CONTROL
1173  01A2  3E 82                    LD    A,LDTEN              YES, OUTPUT A CONSTANT CURRENT
1174  01A4  18 29                    JR    OUTPUTF                TO KEEP TENSION ON THE TAPE
1175  01A6  3A 34 10       VELMODE:  LD    A,(FVELREF)          A=FILE REEL VELOCITY REFERENCE
```

```
1176  01A9  FE 01                CP      FLOGAINF                 IF THE FILE REEL HAS BEEN PUT
1177  01AB  CC D8 01             CALL    Z,LDFCOL                   INTO LOW GAIN, DO SERVO CONTROL
1178  01AE  4F                   LD      C,A                      SAVE THE VELOCITY REFERENCE
1179                             IF      DEBUG2                   IF DEBUGGING, SAVE REF IN H
1180                             LD      H,A                      SAVE REFERENCE IN H TOO
1181                             ENDIF
1182  01AF  92                   SUB     D                        SUBTRACT BEMF READING TO GET ERR
1183  01B0  E2 B4 01             JP      PO,FLEOUT2               IF NO OVERFLOW, CONTINUE
1184  01B3  79                   LD      A,C                      OVERFLOW, USE REFERENCE AS LIMIT
1185                           ;
1186  01B4  06 80        FLEOUT2: LD     B,1.SHL.POLBIT           B=POLARITY BIT FOR POSITIVE ERR
1187  01B6  A7                   AND     A                        IS THE ERROR POSITIVE?
1188  01B7  F2 CE 01             JP      P,NOTMAX                 YES, CURRENT IN THIS DIRECTION
1189                           ;                                     WILL NOT STRETCH TAPE, SO
1190                           ;                                     DON'T LIMIT THE CURRENT
1191  01BA  ED 44                NEG                              NO, MAKE CURRENT POSITIVE
1192  01BC  06 00                LD      B,0                        AND CLEAR POLARITY BIT
1193  01BE  0D                   DEC     C                        IS THE FILE REEL IN LOW GAIN?
1194  01BF  28 0D                JR      Z,NOTMAX                 YES, DON'T LIMIT THE CURRENT
1195  01C1  4F                   LD      C,A                      SAVE CURRENT IN C
1196  01C2  7B                   LD      A,E                      GET THE VELOCITY CONTROL CMD
1197  01C3  FE D6                CP      UNLDMODE                 IS THIS AN UNLOAD MODE COMMAND?
1198  01C5  79                   LD      A,C                        (RESTORE THE CURRENT)
1199  01C6  20 06                JR      NZ,NOTMAX                NO, DON'T LIMIT THE CURRENT
1200  01C8  FE 24                CP      LOADMAX                  CURRENT WITHIN BOUNDS?
1201  01CA  38 02                JR      C,NOTMAX                 YES, GO ADD POLARITY BIT
1202  01CC  3E 24                LD      A,LOADMAX                NO, LIMIT CURRENT TO LOADMAX
1203  01CE  B0           NOTMAX: OR      B                        ADD THE POLARITY BIT
1204  01CF  32 08 20     OUTPUTF: LD     (X+FILEMOT),A            OUTPUT FILE CURRENT VALUE
1205                             IF      DEBUG2                   SAVE TRACE INFORMATION
1206                             LD      E,H                      PUT VELOCITY REFERENCE INTO E
1207                             LD      HL,(FILEPT)              GET TRACE BUFFER POINTER
1208                             LD      (HL),A                   SAVE CURRENT COMMAND
1209                             INC     L
1210                             LD      (HL),D                   SAVE BACK EMF READING
1211                             INC     L
1212                             JP      $+3                      ROOM FOR A LD A,(XXXXX) COMMAND
1213                             LD      (HL),E                   SAVE VELOCITY REFERENCE
1214                             INC     L
1215                             LD      A,(OLDCMD)
1216                             LD      (HL),A                   SAVE VELOCITY CONTROL COMMAND
1217                             INC     HL
1218                             LD      A,H
1219                             CP      .HIGH.(FSAVTABL+1000H)   WRAP AROUND IF BEYOND TABLE END
1220                             JR      C,STOREPT3
1221                             LD      H,.HIGH.FSAVTABL
1222                   STOREPT3: LD      (FILEPT),HL
1223                             ENDIF
1224                           ;
1225  01D2  21 F7 01             LD      HL,FEEDMOTM              DO FEEDMOTM NEXT,
1226  01D5  0E 01                LD      C,1                      AFTER 1 MILLISECOND
1227  01D7  C9                   RET                              ;RETURN UNTIL THEN
1228                           ;
1229                           ;------ FILE COLUMN LOW GAIN CALCULATIONS ------
1230                           ;
1231  01D8  3A 3D 10     LDFCOL: LD      A,(LGDLYCTR)             IS THERE ENOUGH COLUMN VACUUM
1232  01DB  A7                   AND     A                          TO DO SERVO CONTROL?
1233  01DC  3E F8                LD      A,-(LDVACTEN/2)          IF NOT, JUST TRY TO STOP THE REEL
1234  01DE  C0                   RET     NZ                         (WITH A VACUUM TENSION TERM)
1235                           ; NOTE:  THE VACUUM TENSION TERM IS DIVIDED BY 2 SO THAT IF THE LOOP
1236                           ; IS GOING TO DRIFT, IT WILL DRIFT FARTHER INTO THE COLUMN RATHER
1237                           ; THAT DRIFTING OUT THE TOP OF THE COLUMN.
1238  01DF  0E 40                LD      C,SLGMAX                 GET READY FOR POSITIVE OVERFLOW
1239  01E1  3A 37 10             LD      A,(YK)                   A=PRESENT LOOP POSITION
1240  01E4  21 35 10             LD      HL,FMIDDLE               REFERENCE THE LOOP POSITION
1241  01E7  96                   SUB     (HL)                       TO THE MIDDLE OF THE COLUMN
1242  01E8  F2 ED 01             JP      P,LDFCOL1                IF LOOP POSITION NEGATIVE,
1243  01EB  0E C0                LD      C,-SLGMAX                MAKE LIMIT VALUE NEGATIVE
1244  01ED  87           LDFCOL1: ADD    A,A                      MULTIPLY POSITION ERROR BY 2
1245  01EE  E2 F2 01             JP      PO,LDFCOL2               IF OVERFLOW, USE THE
1246  01F1  79                   LD      A,C                        LIMIT VALUE
1247  01F2  D6 10        LDFCOL2: SUB    LDVACTEN                 INCLUDE VACUUM TENSION TERM
1248  01F4  E0                   RET     PO                       IF NO OVERFLOW, GO BACK USING
1249                           ;                                     LOOP POSITION AS VEL REF
1250  01F5  79                   LD      A,C                      OVERFLOW, USE LIMIT
1251  01F6  C9                   RET                              ;  VALUE INSTEAD
1252                           ;
1253                           ;
1254  01F7  3E 0D        FEEDMOTM: LD    A,FONMOFF                TURN ON THE FILE REEL, AND
1255  01F9  32 0A 20             LD      (X+CONTROL),A              TURN OFF THE MACHINE REEL
1256                           ;                                     (DON'T FORCE PLUG INHIBIT)
1257  01FC  21 02 02             LD      HL,MMOT2                 DO MMOT2 NEXT,
1258  01FF  0E 07                LD      C,7                      AFTER 7 MILLISECONDS
1259  0201  C9                   RET                              ;RETURN UNTIL THEN
1260                           ;
1261  0202  3A 20 20     MMOT2:  LD      A,(X+COMMAND)            GET THE REELS ENABLED BIT
1262  0205  CB 47                BIT     ENBLRLS,A                ARE THE REELS ENABLED?
1263  0207  C2 84 04             JP      NZ,EXITSERV              NO, GO SHUT THINGS DOWN
1264                           ;
1265                           ;------ MACH COL SENSOR READING --------
1266                           ;
1267  020A  32 05 20             LD      (X+MCOLSEN),A            START MACH COL SENSOR CONVERSION
1268  020D  21 13 02             LD      HL,MEOCTSTO              DO MEOCTSTO NEXT,
1269  0210  0E 01                LD      C,1                      AFTER 1 MILLISECOND
1270  0212  C9                   RET                              ;RETURN UNTIL THEN
```

```
1271
1272  0213  CD B4 0C        MEOCTSTO: CALL  EOCWAIT               WAIT FOR END OF CONVERSION
1273  0216  20 0C                     JR    NZ,MM3                IF DONE, GO READ VALUE
1274  0218  D2 84 04                  JP    NC,EXITSERV           IF REELS ENABLED DROPPED, EXIT
1275  021B  32 05 20                  LD    (X+MCOLSEN),A         ADC ERROR, TRY TO RESTART IT
1276  021E  CD CF 0C                  CALL  EOCRETRY              WAIT FOR ADC DONE, HALT IF ERROR
1277  0221  CA 84 04                  JP    Z,EXITSERV            IF REELS ENABLED DROPPED, EXIT
1278  0224  3A 05 20        MM3:      LD    A,(X+MCOLSEN)         READ MACHINE COLUMN SENSOR
1279  0227  32 37 10                  LD    (YK),A                SAVE MACH COL SENSOR READING
1280
1281                                  ;------ MACH BEMF SENSOR READING -------
1282                                  ;
1283  022A  32 03 20                  LD    (X+MBEMFSEN),A        START MACH BEMF CONVERSION
1284  022D  21 33 02                  LD    HL,MMOT4              DO MMOT4 NEXT,
1285  0230  0E 01                     LD    C,1                     AFTER 1 MILLISECOND
1286  0232  C9                        RET                         ;RETURN UNTIL THEN
1287                                  ;
1288  0233  21 10 20        MMOT4:    LD    HL,X+REGO             POINT TO MOTION INDICATORS
1289  0236  CD B4 0C                  CALL  EOCWAIT               WAIT FOR END OF CONVERSION
1290  0239  20 0C                     JR    NZ,MM5                IF DONE, GO READ VALUE
1291  023B  D2 84 04                  JP    NC,EXITSERV           IF REELS ENABLED DROPPED, EXIT
1292  023E  32 03 20                  LD    (X+MBEMFSEN),A        ADC ERROR, TRY TO RESTART IT
1293  0241  CD CF 0C                  CALL  EOCRETRY              WAIT FOR ADC DONE, HALT IF ERROR
1294  0244  CA 84 04                  JP    Z,EXITSERV            IF REELS ENABLED DROPPED, EXIT
1295  0247  3A 03 20        MM5:      LD    A,(X+MBEMFSEN)        READ MACHINE BACK EMF
1296  024A  CB 3F                     SRL   A                     DIVIDE BEMF BY TWO
1297  024C  FE 08                     CP    MOTION                MACHINE REEL MOTION DETECTED?
1298                                                                (CLEAR CARRY FLAG IF YES)
1299  024E  DD CB 0A 7E               BIT   MBEMFPOL,(IX+CONTROL) SET Z FLAG IF BACKWARD DIRECTION.
1300                                  ;                           WAS MOTION DETECTED?
1301  0252  30 08                     JR    NC,FEEDMOT8           YES, GO DETERMINE DIRECTION
1302  0254  CB E6                     SET   MACHACW,(HL)          NO, RESET CW INDICATOR
1303  0256  CB EE                     SET   MACHACCW,(HL)           AND RESET CCW INDICATOR
1304  0258  28 0E                     JR    Z,FEEDMOTE            IF BACKWARD, MAKE BEMF NEGATIVE
1305  025A  18 0E                     JR    FEEDMOT9              LEAVE BACK EMF POSITIVE
1306                                  ;
1307  025C  28 06           FEEDMOT8: JR    Z,FEEDMOTD            IF CCW, GO SET CCW INDICATOR
1308  025E  CB A6                     RES   MACHACW,(HL)          SET CLOCKWISE INDICATOR
1309  0260  CB EE                     SET   MACHACCW,(HL)         RESET COUNTER CLOCKWISE INDICATOR
1310  0262  18 06                     JR    FEEDMOT9
1311                                  ;
1312  0264  CB E6           FEEDMOTD: SET   MACHACW,(HL)          RESET CW INDICATOR
1313  0266  CB AE                     RES   MACHACCW,(HL)         SET CCW INDICATOR
1314  0268  ED 44           FEEDMOTE: NEG                         MAKE BEMF NEGATIVE FOR CCW DIR
1315                                  ;
1316  026A  57              FEEDMOT9: LD    D,A                   D = MBEMFSEN / 2
1317  026B  3A 32 10                  LD    A,(OLDCMD)            GET THE VELOCITY COMMAND
1318  026E  5F                        LD    E,A                   SAVE IT IN E
1319  026F  FE D6                     CP    UNLDMODE              CONSTANT CURRENT ON FILE REEL?
1320  0271  20 04                     JR    NZ,VELMODEM           NO, DO VELOCITY SERVO CONTROL
1321  0273  3E 02                     LD    A,UNLDTEN             YES, OUTPUT A CONSTANT CURRENT
1322  0275  18 2B                     JR    OUTPUTM                 TO KEEP TENSION ON THE TAPE
1323                                  ;
1324  0277  3A 33 10        VELMODEM: LD    A,(MVELREF)           A=MACHINE REEL VELOCITY REF
1325  027A  FE 01                     CP    MLOGAINF              IF THE MACHINE REEL HAS BEEN PUT
1326  027C  CC AB 02                  CALL  Z,LDMCOL                INTO LOW GAIN, DO SERVO CONTROL
1327  027F  4F                        LD    C,A                   SAVE THE VELOCITY REFERENCE
1328                                  IF    DEBUG2                SAVE IT FOR TRACE PURPOSES
1329                                  LD    H,A                   SAVE VELOCITY REFERENCE IN H TOO
1330                                  ENDIF
1331  0280  92                        SUB   D                     GET DIFFERENCE OF REF & BEMF
1332  0281  E2 85 02                  JP    PO,MCHOUT2            IF NO OVERFLOW, CONTINUE
1333  0284  79                        LD    A,C                   OVERFLOW, USE REFERENCE AS LIMIT
1334                                  ;
1335  0285  06 80           MCHOUT2:  LD    B,1.SHL.POLBIT        B=POLARITY BIT FOR POSITIVE ERR
1336  0287  A7                        AND   A                     IS THE ERROR POSITIVE?
1337  0288  F2 91 02                  JP    P,POSERR2             YES, GO CHECK CURRENT MAGNITUDE
1338  028B  ED 44                     NEG                         NO, MAKE CURRENT POSITIVE
1339  028D  06 00                     LD    B,0                     AND CLEAR POLARITY BIT
1340  028F  18 10                     JR    NOTMAX2               CURRENT IN THIS DIRECTION WILL
1341                                  ;                             NOT STRETCH TAPE, SO DON'T
1342                                  ;                             LIMIT THE CURRENT
1343  0291  0D              POSERR2:  DEC   C                     IS THE MACHINE REEL IN LOW GAIN?
1344  0292  28 0D                     JR    Z,NOTMAX2             YES, DON'T LIMIT THE CURRENT
1345  0294  4F                        LD    C,A                   SAVE CURRENT IN C
1346  0295  7B                        LD    A,E                   GET THE VELOCITY CONTROL CMD
1347  0296  FE E0                     CP    LDMODE                IS THIS A LOAD MODE COMMAND?
1348  0298  79                        LD    A,C                     (RESTORE THE CURRENT)
1349  0299  20 06                     JR    NZ,NOTMAX2            NO, DON'T LIMIT THE CURRENT
1350  029B  FE 24                     CP    LOADMAX               CURRENT WITHIN BOUNDS?
1351  029D  38 02                     JR    C,NOTMAX2             YES, NO ADD POLARITY BIT
1352  029F  3E 24                     LD    A,LOADMAX             NO, LIMIT CURRENT TO LOADMAX
1353  02A1  B0              NOTMAX2:  OR    B                     ADD THE POLARITY BIT
1354  02A2  32 09 20        OUTPUTM:  LD    (X+MACHMOT),A         OUTPUT MACHINE CURRENT VALUE
1355                                  IF    DEBUG2                SAVE TRACE INFORMATION
1356                                  LD    E,H                   SAVE THE VELOCITY REFERENCE IN E
1357                                  LD    HL,(MACHPT)           GET TRACE BUFFER POINTER
1358                                  LD    (HL),A                SAVE CURRENT COMMAND
1359                                  INC   L
1360                                  LD    (HL),D                SAVE BACK EMF READING
1361                                  INC   L
1362                                  JP    $+3                   ROOM FOR A LD A,(XXXXX) COMMAND
1363                                  LD    (HL),E                SAVE VELOCITY REFERENCE
1364                                  INC   L
1365                                  LD    A,(OLDCMD)
```

```
1366                                    LD      (HL),A                  SAVE VELOCITY CONTROL COMMAND
1367                                    INC     HL
1368                                    LD      A,H
1369                                    CP      .HIGH.(MSAVTABL+1000H)  WRAP AROUND IF BEYOND TABLE END
1370                                    JR      C,STOREPT4
1371                                    LD      H,.HIGH.MSAVTABL
1372                            STOREPT4: LD    (MACHPT),HL
1373                                    ENDIF
1374  02A5  21 12 01                    LD      HL,FEEDMOT              DO FEEDMOT NEXT (NEW LOOP),
1375  02A8  0E 01                       LD      C,1                     AFTER 1 MILLISECOND
1376  02AA  C9                          RET                             ;RETURN UNTIL THEN
1377                            ;
1378                            ****************************************************************
1379                            *                                                               *
1380                            * SECTION NAME: OUTRLS              DATE:02-OCT-81   LEVEL:00   *
1381                            *                                                               *
1382                            * DESCRIPTION:  THIS SUBROUTINE GENERATES THE ADEQUATE CURRENT  *
1383                            * COMMANDS IN ORDER TO MAINTAIN A CONTROLLED CONSTANT SPEED.    *
1384                            *                                                               *
1385                            * INVOCATION PARAMETERS: NONE                                   *
1386                            *                                                               *
1387                            * SUBROUTINES: CHKCLK1                                          *
1388                            *                                                               *
1389                            * REGISTERS USED: B: STORES THE FILE REEL REFERENCE SPEED COUNT.*
1390                            *                 C: STORES THE MACH REEL REFERENCE SPEED COUNT.*
1391                            *                 D: STORES THE FILE REEL BEMF READING.         *
1392                            *                 E: STORES THE MACH REEL BEMF READING.         *
1393                            *                                                               *
1394                            *           I = K ( VREF - K1(VBEMF))                           *
1395                            *                                                               *
1396                            *                                                               *
1397                            ****************************************************************
1398                            ;
1399                            ;
1400                            ****************************************************************
1401                            *                                                               *
1402                            * NAME: LDMCOL                       DATE:02-OCT-81   LEVEL:00  *
1403                            *                                                               *
1404                            * DESCRIPTION: THIS PORTION OF THE CODE LOADS THE MACHINE COLUMN AND *
1405                            * KEEPS THE LOOP REFERENCED TO THE MIDDLE.                      *
1406                            *                                                               *
1407                            * INVOCATION PARAMETERS: MACHINE COLUMN LOW GAIN IN REELS REGISTER. *
1408                            *                                                               *
1409                            * SUBROUTINES:  NONE                                            *
1410                            *                                                               *
1411                            ****************************************************************
1412                            ;
1413                            ;
1414  02AB  21 3D 10            LDMCOL:  LD     HL,LGDLYCTR             IF THE LOW GAIN DELAY COUNTER
1415  02AE  7E                           LD     A,(HL)                    IS NOT ZERO, DECREMENT IT
1416  02AF  D6 01                        SUB    1                       IF IT IS ZERO, THERE IS ENOUGH
1417  02B1  38 04                        JR     C,LDMCOL1                 COLUMN VACUUM FOR SERVO CONTROL
1418  02B3  77                           LD     (HL),A                  STORE DECREMENTED COUNTER AND
1419  02B4  3E 08                        LD     A,LDVACTEN/2              TRY TO STOP THE REEL UNTIL THE
1420  02B6  C9                           RET                            ; COLUMN VACUUM CAN BE TRUSTED
1421                            ;
1422  02B7  0E 40               LDMCOL1: LD     C,SLGMAX                GET READY FOR POSITIVE OVERFLOW
1423  02B9  3A 36 10                     LD     A,(MMIDDLE)             A=MIDDLE OF COLUMN READING
1424  02BC  21 37 10                     LD     HL,YK                   REFERENCE THE LOOP POSITION
1425  02BF  96                           SUB    (HL)                      TO THE MIDDLE OF THE COLUMN
1426  02C0  F2 C5 02                     JP     P,LDMCOL2               IF LOOP POSITION NEGATIVE,
1427  02C3  0E C0                        LD     C,-SLGMAX               MAKE LIMIT VALUE NEGATIVE
1428  02C5  87                  LDMCOL2: ADD    A,A                     MULTIPLY POSITION ERROR BY 2
1429  02C6  E2 CA 02                     JP     PO,LDMCOL3              IF OVERFLOW, USE THE
1430  02C9  79                           LD     A,C                       LIMIT VALUE
1431  02CA  C6 10               LDMCOL3: ADD    A,LDVACTEN              INCLUDE VACUUM TENSION TERM
1432  02CC  E0                           RET    PO                      IF NO OVERFLOW, GO BACK USING
1433                            ;                                         LOOP POSITION AS VEL REF
1434  02CD  79                           LD     A,C                     OVERFLOW, USE LIMIT
1435  02CE  C9                           RET                            ; VALUE INSTEAD
1436                            ;
1437                            ;
1438  02CF  32 05 20            PFILE:   LD     (X+MCOLSEN),A           START MACH COLUMN SENSOR READING
1439  02D2  21 10 20                     LD     HL,X+REGO               POINT TO SLOW DOWN COND BITS
1440  02D5  7E                           LD     A,(HL)                  SET THE SLOW DOWN CONDITION BITS
1441  02D6  E6 FC                        AND    0FFH-1.SHL.SLDCFWD-1.SHL.SLDCBWD  (MINUS ACTIVE)
1442  02D8  77                           LD     (HL),A
1443                                     IF     MMIDDLE.EQ.(FMIDDLE+1)
1444  02D9  21 00 00                     LD     HL,0                    ZERO OUT THE MIDPOINT VALUES
1445  02DC  22 35 10                     LD     (FMIDDLE),HL              SO THAT THE RAW COLUMN READING
1446                            ;                                         WILL BE USED DURING CALIBRATION
1447                                     ELSE
1448                                     XOR    A                       ZERO OUT THE MIDPOINT VALUES
1449                                     LD     (FMIDDLE),A               SO THAT THE RAW COLUMN READING
1450                                     LD     (MMIDDLE),A               WILL BE USED DURING CALIBRATION
1451                                     LD     H,A                     HL=0
1452                                     LD     L,A
1453                                     ENDIF
1454  02DF  22 49 10                     LD     (AVRGECUR),HL           ZERO OUT THE AVERAGE CURRENT
1455  02E2  3E E0                        LD     A,1.SHL.CALIBFLG+1.SHL.CALRGMF+1.SHL.CALRGMM
1456  02E4  32 43 10                     LD     (Y+FLAGSCAL),A          SET CALIBRATE FLAG AND TURN OFF
1457                            ;                                         THE NORMAL REFERENCE GENERATOR
1458  02E7  3E 30                        LD     A,CCINIT                INITIALIZE THE
1459  02E9  32 4B 10                     LD     (CALCTR),A                CALIBRATION COUNTER
1460  02EC  3E F0                        LD     A,POSFILE               INITIALIZE THE
```

```
1461  02EE  21 32 10              LD    HL,OLDCMD              OLD COMMAND STORAGE
1462  02F1  CD 60 04              CALL  SETHGAIN               GO SET HIGH GAIN
1463  02F4  3E 00                 LD    A,O.SHL.ALPLGINF+O.SHL.ALPLGINM
1464  02F6  32 11 20              LD    (X+REG1),A             NO HARDWARE PLUG INHIBIT
1465                          ;                                DURING CALIBRATION
1466  02F9  18 06                 JR    SRVGAIN1               GO FINISH GETTING READY FOR
1467                          ;                                SERVO CONTROL
1468                          ;
1469  02FB  32 05 20      SRVGAIN:  LD  (X+MCOLSEN),A          START THE MACH COLUMN SENSOR
1470  02FE  CD 61 04              CALL  SETHG2                 GO SET HIGH GAIN AND
1471                          ;                                ALLOW HARDWARE PLUG INHIBIT
1472                          ; INITIALIZE COLUMN REFERENCES AND FILTERS WITH THE PRESENT
1473                          ; LOOP POSITION.
1474  0301  3A 36 10      SRVGAIN1: LD  A,(MMIDDLE)            C=A=MIDPOINT
1475  0304  4F                    LD    C,A
1476  0305  CD B4 0C              CALL  EOCWAIT                WAIT FOR END OF CONVERSION
1477  0308  20 0C                 JR    NZ,SRVGAIN2            IF DONE, GO READ VALUE
1478  030A  D2 84 04              JP    NC,EXITSERV            IF REELS ENABLED DROPPED, EXIT
1479  030D  32 05 20              LD    (X+MCOLSEN),A          ADC ERROR, TRY TO RESTART IT
1480  0310  CD CF 0C              CALL  EOCRETRY               WAIT FOR ADC DONE, HALT IF ERROR
1481  0313  CA 84 04              JP    Z,EXITSERV             IF REELS ENABLED DROPPED, EXIT
1482  0316  3A 05 20      SRVGAIN2: LD  A,(X+MCOLSEN)          GET PRESENT MACH LOOP POSITION
1483  0319  32 04 20              LD    (X+FCOLSEN),A          START READING FILE LOOP POSITION
1484  031C  91                    SUB   C                      REFERENCE POSITION TO MIDPOINT
1485  031D  21 08 10              LD    HL,MPOS8               LOAD THE POSITION INTO THE
1486  0320  06 07                 LD    B,FILTLENM             MACHINE COLUMN REFERENCE
1487  0322  77            SRVINIT1: LD  (HL),A                 FILTER AND POSITION FILTER
1488  0323  2C                    INC   L
1489  0324  10 FC                 DJNZ  SRVINIT1
1490  0326  32 22 10              LD    (MACHREF+1),A          INITIALIZE MACHINE REFERENCES
1491  0329  32 2A 10              LD    (MACHREFS+1),A
1492  032C  3E 09                 LD    A,09H                  ENABLE REELS, DON'T FORCE
1493  032E  32 0A 20              LD    (X+CONTROL),A          PLUG INHIBIT MODE
1494  0331  AF                    XOR   A                      INITIALIZE
1495  0332  21 37 10              LD    HL,INIT2               STORAGE
1496  0335  06 05                 LD    B,INIT2CNT             IN PREPARATION
1497  0337  77            INIT2LP:  LD  (HL),A                 FOR SERVO CONTROL
1498  0338  2C                    INC   L
1499  0339  10 FC                 DJNZ  INIT2LP
1500                              IF    DEBUG2.AND.DEBUG3
1501                              LD    HL,FILEPT              FORCE FILEPT AND MACHPT TO
1502                              LD    A,(HL)                 POINT TO AN ADDRESS ENDING
1503                              AND   0F8H                   IN 0 OR 8
1504                              LD    (HL),A
1505                              INC   L
1506                              INC   L
1507                              LD    A,(HL)
1508                              AND   0F8H
1509                              LD    (HL),A
1510                              ENDIF
1511  033B  21 00 10              LD    HL,FPOS8               POINT TO REF AND POSITION FILTERS
1512  033E  3A 35 10              LD    A,(FMIDDLE)            C=A=MIDPOINT
1513  0341  4F                    LD    C,A
1514  0342  CD B4 0C              CALL  EOCWAIT                WAIT FOR END OF CONVERSION
1515  0345  20 0C                 JR    NZ,SRVGAIN3            IF DONE, GO READ VALUE
1516  0347  D2 84 04              JP    NC,EXITSERV            IF REELS ENABLED DROPPED, EXIT
1517  034A  32 04 20              LD    (X+FCOLSEN),A          ADC ERROR, TRY TO RESTART IT
1518  034D  CD CF 0C              CALL  EOCRETRY               WAIT FOR ADC DONE, HALT IF ERROR
1519  0350  CA 84 04              JP    Z,EXITSERV             IF REELS ENABLED DROPPED, EXIT
1520  0353  3A 04 20      SRVGAIN3: LD  A,(X+FCOLSEN)          GET PRESENT FILE LOOP POSITION
1521  0356  91                    SUB   C                      REFERENCE TO MIDPOINT
1522  0357  06 07                 LD    B,FILTLENF             B=NUMBER OF FILTER BYTES TO LOAD
1523  0359  77            SRVINIT2: LD  (HL),A                 INITIALIZE THE FILE REFERENCE
1524  035A  2C                    INC   L                      AND POSITION FILTERS WITH
1525  035B  10 FC                 DJNZ  SRVINIT2               PRESENT FILE LOOP POSITION
1526  035D  32 11 10              LD    (FILEREF+1),A          AND INITIALIZE THE REFERENCES
1527  0360  32 19 10              LD    (FILEREFS+1),A         WITH THE PRESENT POSITION
1528                          ;
1529                          ****************************************************************
1530                          ****************************************************************
1531                          *                                                              *
1532                          * SECTION NAME: SRVMOT           DATE:02-OCT-81    LEVEL:00    *
1533                          *                                                              *
1534                          * DESCRIPTION:  THE FOLLOWING ROUTINE IMPLEMENTS THE REELS SERVO *
1535                          * SYSTEM  CURRENT COMMANDS TO FOLLOW THE CAPSTAN MOTIONS DURING THE *
1536                          * TAPE DRIVE NORMAL OPERATION (COLUMNS LOADED).                *
1537                          *                                                              *
1538                          * THE SERVO IS ZERO REFERENCED TO A NULL WITH THE TAPE LOOP    *
1539                          * POSITIONED AT A DISTANCE DETERMINED BY THE MOTION STATUS AND *
1540                          * DIRECTION OF THE CAPSTAN (DYNAMIC REFERENCE).                *
1541                          *                                                              *
1542                          * SUBROUTINES:  MULTIPLY,ADDHL,MULX2,TRNARDLY.                 *
1543                          *                                                              *
1544                          ****************************************************************
1545                          ****************************************************************
1546                          ;
1547                          ;
1548  0363  3A 20 20      SRVMOT:   LD  A,(X+COMMAND)          GET ENABLE REELS BIT
1549  0366  CB 47                 BIT   ENBLRLS,A              ARE THE REELS ENABLED?
1550  0368  C2 84 04              JP    NZ,EXITSERV            NO, GO SHUT THINGS DOWN
1551  036B  21 28 20              LD    HL,X+REELS             POINT TO THE REELS REGISTER
1552  036E  7E                    LD    A,(HL)                 LOAD AND DESKEW THE REELS REG
1553  036F  BE                    CP    (HL)                   DID THE VALUE CHANGE?
1554  0370  28 01                 JR    Z,GOTCMD               NO, THEN IT MUST BE VALID
1555  0372  7E                    LD    A,(HL)                 YES, GET THE VALID DATA
```

```
1556  0373  21 32 10    GOTCMD:    LD      HL,OLDCMD             POINT TO THE OLD COMMAND BYTE
1557  0376  BE                     CP      (HL)                  IS THIS COMMAND THE SAME?
1558  0377  C4 06 04               CALL    NZ,SETGAIN            NO, GO SET THE NEW GAIN COMMAND
1559                     ;
1560  037A  3A 38 10               LD      A,(INTCTR)            MACHINE REEL NEXT? (BIT 7 OF
1561  037D  17                     RLA                             INTCTR WILL BE SET IF IT IS)
1562  037E  38 06                  JR      C,STRTMSEN            YES, START MACH COLUMN READING
1563  0380  32 04 20               LD      (X+FCOLSEN),A         NO, START FILE COL SENSOR READING
1564  0383  C3 89 03               JP      SRVMOTO
1565                     ;
1566  0386  32 05 20    STRTMSEN:  LD      (X+MCOLSEN),A
1567                     ;
1568                     *----------------------------------------------------------*
1569                     *      CALCULATE THE UPDATED REFERENCE VALUE                *
1570                     *                                                           *
1571                     *      IF REWIND COMMAND:  OFFSET=REWIND OFFSET             *
1572                     *        ELSE:  OFFSET=GO OFFSET                            *
1573                     *      IF NOT CAPSTAN GO:  OFFSET=STOP OFFSET                *
1574                     *      IF FORWARD:  REF=REF*3/4+OFFSET                      *
1575                     *      IF BACKWARD: REF=REF*3/4-OFFSET                      *
1576                     *                                                           *
1577                     *      THE CALIBRATION ROUTINE CACLULATES THE VARIOUS       *
1578                     *      OFFSET VALUES BASED ON THE MEASURED COLUMN GAIN.     *
1579                     *      THE OFFSET VALUES ARE CALCULATED TO YIELD THE        *
1580                     *      FOLLOWING STEADY STATE REFERENCE POSITIONS WITH      *
1581                     *      RESPECT TO THE COLUMN MIDPOINT:                      *
1582                     *      FOR 200 IPS:     GO REFERENCE = +3 INCHES            *
1583                     *                       REWIND REFERENCE = +2.25 INCHES     *
1584                     *                       STOP REFERENCE = -.3 INCHES         *
1585                     *      FOR 75/125 IPS:  GO REFERENCE = +4.5 INCHES          *
1586                     *                       REWIND REFERENCE = +2.25 INCHES     *
1587                     *                       STOP REFERENCE = 0 INCHES           *
1588                     *                                                           *
1589                     *      THIS SIMULATES A SIMPLE RC FILTER WITH A TIME        *
1590                     *      CONSTANT OF 5 MS.  IN ORDER TO MAINTAIN SUFFICIENT   *
1591                     *      PRECISION IN CALCULATING THE REFERENCE VALUE, ALL    *
1592                     *      CALCULATIONS ARE CARRIED OUT WITH A 16 BIT NUMBER    *
1593                     *      WHICH MAY BE INTERPRETED AS HAVING 8 BITS TO THE     *
1594                     *      LEFT OF THE BINARY POINT (THE INTEGER PART) AND      *
1595                     *      8 BITS TO THE RIGHT OF THE BINARY POINT (THE         *
1596                     *      FRACTIONAL PART).  THE REMAINDER OF THE SERVO CODE   *
1597                     *      ONLY USES THE HIGH BYTE (THE INTEGER PART) OF THE    *
1598                     *      REFERENCE VALUE IN ITS CALCULATIONS.                 *
1599                     *                                                           *
1600                     *----------------------------------------------------------*
1601                     ;
1602  0389  21 10 10    SRVMOTO:   LD      HL,FILEREF            POINT TO THE REFERENCE VALUE
1603                     ;                                        CALCULATED ONE MILLISECOND AGO
1604  038C  FD CB 43 6E            BIT     CALRGMF,(IY+FLAGSCAL) IS THE CALIBRATE CODE
1605                     ;                                        CALCULATING FILE REFERENCES?
1606  0390  20 0C                  JR      NZ,CHKMCAL            YES, BYPASS FILE REF CALC'S
1607  0392  06 01                  LD      B,01                  FLAG FOR FAST REF CALCULATION
1608  0394  CD 97 04               CALL    CALCREF               GO CALCULATE FILE FAST REF
1609                     ;
1610                     *----------------------------------------------------------*
1611                     *      CALCULATE THE UPDATED SLOW REFERENCE VALUE           *
1612                     *                                                           *
1613                     *      IF REWIND COMMAND:  OFFSET=REWIND OFFSET             *
1614                     *        ELSE:  OFFSET=GO OFFSET                            *
1615                     *      IF NOT CAPSTAN GO:  OFFSET=STOP OFFSET                *
1616                     *      IF FORWARD:  REFS=REFS*63/64+OFFSET                  *
1617                     *      IF BACKWARD: REFS=REFS*63/64-OFFSET                  *
1618                     *                                                           *
1619                     *      THE STEADY STATE SLOW REFERENCE POSITIONS ARE THE    *
1620                     *      SAME AS THE STEADY STATE REFERENCE POSITIONS ABOVE.  *
1621                     *                                                           *
1622                     *      THIS SIMULATES A SIMPLE RC FILTER WITH A TIME        *
1623                     *      CONSTANT OF 63 MS.                                   *
1624                     *----------------------------------------------------------*
1625                     ;
1626  0397  2E 18                  LD      L,.LOW.FILEREFS       POINT TO FILE SLOW REF VALUE
1627  0399  06 FF                  LD      B,0FFH                FLAG FOR SLOW REF GENERATION
1628  039B  CD 97 04               CALL    CALCREF               GO CALCULATE FILE SLOW REF
1629  039E  FD CB 43 76 CHKMCAL:   BIT     CALRGMM,(IY+FLAGSCAL) IS THE CALIBRATE CODE
1630                     ;                                        CALCULATING MACH REFERENCES?
1631  03A2  20 0E                  JR      NZ,GOTREFS            YES, BYPASS MACH REF CALC'S
1632  03A4  2E 21                  LD      L,.LOW.MACHREF        POINT TO MACH SLOW REF VALUE
1633  03A6  06 01                  LD      B,01                  FLAG FOR FAST REF CALCULATION
1634  03A8  CD 97 04               CALL    CALCREF               GO CALCULATE MACHINE FAST REF
1635  03AB  2E 29                  LD      L,.LOW.MACHREFS       POINT TO MACH SLOW REF VALUE
1636  03AD  06 FF                  LD      B,0FFH                FLAG FOR SLOW REF GENERATION
1637  03AF  CD 97 04               CALL    CALCREF               GO CALCULATE MACHINE SLOW REF
1638                     ;
1639                     ; IF 200 IPS AND NOT REWIND, UPDATE THE SLOW DOWN CONDITION
1640                     ; BITS AND FLAGS
1641                     ;
1642  03B2  3A 42 10    GOTREFS:   LD      A,(Y+FLAGS)           IF WE ARE IN REWIND GAIN
1643  03B5  EE 80                  XOR     1.SHL.V200FLAG          OR THIS IS NOT A 200 IPS DRIVE
1644  03B7  E6 A0                  AND     1.SHL.V200FLAG+1.SHL.REWGAINF
1645  03B9  20 2B                  JR      NZ,CHKINTCT             THEN BYPASS TURNAROUND DELAY
1646                               IF      HITCHCMD
1647  03BB  3A 28 20               LD      A,(X+REELS)           GET THE CURRENT GAIN COMMAND
1648  03BE  FE ED                  CP      HITCHMOD              ARE WE DOING A HITCH?
1649  03C0  28 24                  JR      Z,CHKINTCT            YES, BYPASS TURNAROUND DELAY
1650                               ENDIF
```

```
1651                      ; 200 IPS DRIVE, NOT REWIND, HANDLE TURNAROUND DELAY STUFF
1652  03C2  3A 20 20              LD      A,(X+COMMAND)       GET THE FORWARD AND GO BITS
1653  03C5  CB 57                 BIT     FORWARD,A           FORWARD DIRECTION?
1654  03C7  28 07                 JR      Z,SETBSLDC          YES, DON'T ALLOW BACKWARD CMDS
1655  03C9  DD CB 10 86           RES     SLDCFWD,(IX+REGO)   NO, DON'T ALLOW FORWARD CMDS
1656  03CD  C3 D4 03              JP      CHKGO               GO CHECK FOR GO COMMAND
1657                      ;
1658  03D0  DD CB 10 8E   SETBSLDC: RES   SLDCBWD,(IX+REGO)   SET BACKWARD SLOW DOWN COND (LOW)
1659                      ;
1660  03D4  21 3E 10      CHKGO:  LD      HL,STEADYCT         POINT TO STEADY STATE COUNTER
1661  03D7  06 FB                 LD      B,STEADYDL          PUT NO-GO VALUE INTO B
1662  03D9  CB 4F                 BIT     GO,A                GO COMMAND? (ACTIVE LOW)
1663  03DB  20 08                 JR      NZ,PUTSTCT          NO, LEAVE TURN PULSE ALONE AND
1664                      ;                                   RELOAD STEADY STATE COUNTER
1665  03DD  FD 36 45 FA           LD      (IY+TRNPLSCT),TRNPLS SET TURN AROUND PULSE AND LOAD
1666                      ;                                   COUNTER SO THAT TURN PULSE WIL
1667                      ;                                   REMAIN SET FOR 24 MS FOLLOWING
1668                      ;                                   THE DROP OF GO.
1669  03E1  46                    LD      B,(HL)              B=STEADY STATE DELAY COUNTER
1670  03E2  05                    DEC     B                   IF COUNTER = 1, WE ARE AT STEADY
1671  03E3  28 01                 JR      Z,CHKINTCT          STATE OPERATION,LEAVE COUNTER=1
1672                      ;
1673  03E5  70            PUTSTCT: LD     (HL),B              UPDATE THE STEADY STATE COUNTER
1674                      ;
1675                      ; EXECUTE THE MODULE OF CODE SELECTED BY THE UPDATED VALUE OF INTCTR.
1676                      ; THE MODULES WHICH MAY BE SELECTED ARE:
1677                      ; INTCTR=80 -- CALCULATE FILE REEL CURRENT
1678                      ; INTCTR=A0 -- DO FILE REEL TURN-AROUND DELAY CALCULATIONS
1679                      ; INTCTR=00 -- CALCULATE MACHINE CURRENT
1680                      ; INTCTR=20 -- DO MACHINE REEL TURN-AROUND DELAY CALCULATIONS
1681                      ;
1682                      ;/ THE FOLLOWING CODE COULD ALSO BE PERFORMED BY PUSHING SRVMOT9 ON
1683                      ;/ THE STACK AND THEN "CALLING" THE APPORPRIATE MODULE.
1684                      ;
1685  03E6  21 38 10      CHKINTCT: LD    HL,INTCTR           POINT TO THE INTERRUPT COUNTER
1686  03E9  7E                    LD      A,(HL)              BY ADDING 20, AN OVERFLOW WILL
1687  03EA  C6 20                 ADD     A,20H               BE GENERATED AFTER 4 MS AND
1688  03EC  77                    LD      (HL),A              A CARRY WILL BE GENERATED AFTER
1689                      ;                                   8 MS. THIS PROCESS WILL REPEAT
1690                      ;                                   EVERY 8 MILLISECONDS.
1691  03ED  EA F9 04              JP      PE,OUTFILE          AFTER 4 MS, OUTPUT CURRENT
1692                      ;                                   TO THE FILE REEL
1693  03F0  DA 2F 08              JP      C,OUTMACH           AFTER 8 MS, OUTPUT CURRENT
1694                      ;                                   TO THE MACHINE REEL
1695                      ;
1696  03F3  21 00 04              LD      HL,SRVMOT9          PUSH THE ADDRESS OF SRVMOT9 ONTO
1697  03F6  E5                    PUSH    HL                  STACK SO THAT THE CHKSLDC
1698                      ;                                   SUBROUTINE WILL RETURN THERE
1699                      ;
1700  03F7  D6 21                 SUB     21H                 IS IT TIME TO CHECK SLOW DOWN?
1701                      ;                                   (WAS CURRENT OUTPUT LAST TIME?)
1702  03F9  EA 24 07              JP      PE,CHKSLDC          YES, FILE CURRENT OUTPUT LAST
1703                      ;                                   TIME, SO CHECK SLDC
1704  03FC  DA 24 07              JP      C,CHKSLDC           YES, MACH CURRENT OUTPUT LAST
1705                      ;                                   TIME, SO CHECK SLDC
1706                              IF      DEBUG3
1707                      ; WHEN INTCTR=60, DO FILE COLUMN VACUUM LEVEL ADJUSTMENTS
1708                      ; WHEN INTCTR=E0, DO MACHINE COLUMN VACUUM LEVEL ADJUSTMENTS
1709                              CP      60H-21H             TIME TO CHECK FILE COLUMN VACUUM?
1710                              JR      Z,VACADJF           YES, GO ADJUST FOR FILE VACUUM
1711                              CP      OE0H-21H            TIME TO CHECK MACH COLUMN VACUUM?
1712                              JR      Z,VACADJM           YES, GO ADJUST FOR MACH VACUUM
1713                              ENDIF
1714  03FF  E1                    POP     HL                  CLEAN UP THE STACK
1715                      ;
1716  0400  21 63 03      SRVMOT9: LD     HL,SRVMOT           DO SRVMOT AGAIN,
1717  0403  0E 01                 LD      C,1                 AFTER 1 MILLISECOND
1718  0405  C9                    RET                         ;RETURN UNTIL THEN
1719                      ;
1720                              IF      DEBUG3
1721                      ; THE LOOP POSITION AS MEASURED BY THE COLUMN SENSOR MAY BE CORRECTED
1722                      ; FOR THE EFFECTS OF VARYING COLUMN VACUUM BY EVALUATING THE FOLLOWING
1723                      ; EXPRESSIONS:
1724                      ;   VACUUM FACTOR = (FULL VACUUM - ATMOS2) / (PARTIAL VACUUM - ATMOS2)
1725                      ;   LOOP POSITION = (SENSOR - ATMOS1) * VAC FACTOR + ATMOS1 - ZERO POINT
1726                      ; WHERE FULL VACUUM IS THE MEASURED NOMINAL COLUMN VACUUM, PARTIAL
1727                      ; VACUUM IS THE ACTUAL COLUMN VACUUM AT THE TIME THE LOOP POSITION
1728                      ; SENSOR IS READ, ATMOS2 IS THE READING FROM THE COLUMN VACUUM SENSOR
1729                      ; AT ATMOSPHERIC PRESSURE, SENSOR IS THE LOOP POSITION SENSOR READING,
1730                      ; ATMOS1 IS THE LOOP POSITION SENSOR READING AT ATMOSPHERIC PRESSURE
1731                      ; AND ZERO POINT IS THE CALIBRATED COLUMN MIDPOINT.
1732                      VACADJF: LD     (X+FVACSEN),A       START A/D FOR FILE VACUUM SENSOR
1733                              LD      DE,(FULLVACF)       E=FULL VACUUM, D=ATMVACF
1734                              CALL    EOCWAIT             WAIT FOR END OF CONVERSION
1735                              JR      NZ,ADJF1            IF DONE, GO READ VALUE
1736                      ;                                   REELS ENABLED DROPPED OR
1737                              LD      (X+FVACSEN),A         ADC ERROR, TRY TO RESTART IT
1738                              CALL    EOCRETRY            WAIT FOR ADC DONE, HALT IF ERROR
1739                              JP      Z,EXITSERV          IF REELS ENABLED DROPPED, EXIT
1740                      ADJF1:  LD      A,(X+FVACSEN)       READ FILE COLUMN VACUUM SENSOR
1741                              CALL    VACADJ              CALCULATE THE ADJUSTMENT FACTOR
1742                              LD      (FVACFACT),A        STORE FILE VAC ADJUSTMENT FACTOR
1743                              RET
1744                      ;
```

```
1745                    ; CALCULATE MACHINE COLUMN VACUUM LEVEL ADJUSTMENT FACTOR
1746                    VACADJM:  LD    (X+MVACSEN),A      START A/D FOR MACH VACUUM SENSOR
1747                              LD    DE,(FULLVACM)      E=FULL VACUUM, D=ATMVACM
1748                              CALL  EOCWAIT            WAIT FOR END OF CONVERSION
1749                              JR    NZ,ADJM1           IF DONE, GO READ VALUE
1750                              ;                        REELS ENABLED DROPPED OR
1751                              LD    (X+MVACSEN),A        ADC ERROR, TRY TO RESTART IT
1752                              CALL  EOCRETRY           WAIT FOR ADC DONE, HALT IF ERROR
1753                              JP    Z,EXITSERV         IF REELS ENABLED DROPPED, EXIT
1754                    ADJM1:    LD    A,(X+MVACSEN)      READ MACH COLUMN VACUUM SENSOR
1755                              CALL  VACADJ             CALCULATE THE ADJUSTMENT FACTOR
1756                              LD    (MVACFACT),A       STORE MACH VAC ADJUSTMENT FACTOR
1757                              RET
1758                    ;
1759                    ; CALCULATE THE VACUUM ADJUSTMENT FACTOR.
1760                    ; ENTER WITH:  A = VACUUM SENSOR READING, E = FULL VACUUM,
1761                    ;              D = VACUUM SENSOR ATMOSPHERIC
1762                    ; RETURNS WITH: A = 64 * (FULL VAC - ATMOS2) / (PARTIAL VAC - ATMOS2)
1763                    ; THIS MAY BE INTERPRETED AS AN 8 BIT NUMBER WITH THE BINARY POINT
1764                    ; BETWEEN BITS 6 AND 5.  INTERPRETED IN THIS WAY, THE VACUUM FACTOR
1765                    ; MAY RANGE IN VALUE FROM 0 THROUGH (4 - 1/64).
1766                    ;
1767                    VACFUDGE: EQU   4                  ALLOW ROOM AROUND NOMINAL VACUUM
1768                    ;
1769                    VACADJ:   ADD   A,VACFUDGE         ADD IN FUDGE FACTOR
1770                              CP    E                  ARE WE NEAR (OR OVER) FULL VAC?
1771                              JR    NC,NOADJUST        YES, DON'T ADJUST LOOP POSITION
1772                              SUB   VACFUDGE           RESTORE MEASURED VACUUM
1773                              SUB   D
1774                              LD    L,A                L=PARTIAL VACUUM - ATMOSPHERIC
1775                              LD    A,E                A=FULL VACUUM
1776                              SUB   D                  A=FULL VACUUM - ATMOSPHERIC
1777                              LD    H,0                CONSIDER A AND H TO BE A
1778                              SRL   A                    16 BIT REGISTER
1779                              RR    H                  AH = A * 64
1780                              RRA
1781                              RR    H
1782                    ;
1783                    ; PERFORM THE DIVISION:  H = AH / L
1784                    ;
1785                              CP    L                  IF THE RESULT BE GREATER THAT
1786                              JR    NC,DIVMAX            8 BITS LONG, RETURN MAX VALUE
1787                              LD    B,8                B = LOOP COUNTER
1788                              SLA   H                  START BY SHIFTING DIVIDEND LEFT
1789                    DIVLOOP   RLA                      SHIFT HIGH BYTE OF DIVIDEND LEFT
1790                              JR    C,DIVSUB           IF THE SHIFT OF THE DIVIDEND
1791                              ;                          RESULTED IN A CARRY, SUBTRACT
1792                              ;                          THE DIVISOR AND SHIFT A 1 INTO
1793                              ;                          THE QUOTIENT
1794                              CP    L                  CAN THE DIVISOR BE TAKEN FROM
1795                              ;                          THE DIVIDEND?
1796                              JR    C,DIVSHIFT         NO, SHIFT A 0 INTO QUOTIENT
1797                              SUB   L                  YES, SUBTRACT THE DIVISOR FROM
1798                              ;                          THE DIVIDEND AND CLEAR CARRY
1799                              ;                          SO A 1 WILL BE SHIFTED INTO
1800                              ;                          THE QUOTIENT
1801                    DIVSHIFT: CCF                      SHIFT A 1 INTO THE QUOTIENT IF THE
1802                    DIVSHFT2: RL    H                    CARRY IS CLEAR, SHIFT A 0 INTO
1803                              ;                          THE QUOTIENT IF THE CARRY IS SET
1804                              ;                        SHIFT LOW BYTE OF DIVIDEND LEFT
1805                              DJNZ  DIVLOOP            IF NOT DONE, LOOP AGAIN
1806                              LD    A,H                PUT THE RESULT INTO A AND RETURN
1807                              RET
1808                    ;
1809                    ; AT THIS POINT, THE VALUE IN A WILL ALWAYS BE LESS THAN THE VALUE
1810                    ; IN L.  THEREFORE, THE SUB L COMMAND WILL ALWAYS SET THE CARRY BIT.
1811                    DIVSUB:   SUB   L                  SUBTRACT THE DIVISOR AND GO SHIFT
1812                              JR    DIVSHFT2             A 1 INTO THE QUOTIENT
1813                    ;
1814                    DIVMAX:   LD    A,0FFH             OVERFLOW, RETURN MAXIMUM VALUE
1815                              RET
1816                    ;
1817                    NOADJUST: XOR   A                  VACUUM FACTOR = 0 IS A FLAG FOR
1818                              RET                      ;  NO ADJUSTMENT NECESSARY
1819                              ENDIF                    END OF VACUUM ADJUSTMENT CODE
1820                    ;
1821                    ;************************************************************************
1822                    *  SETGAIN                                                              *
1823                    *     THIS ROUTINE INITIALIZES THE HARDWARE AND SOFTWARE AS NECESSARY   *
1824                    *     TO IMPLIMENT LOW GAIN, HIGH GAIN OR REWIND GAIN MODES.            *
1825                    *     NOTE:  IF NO STANDARD GAIN COMMAND IS RECOGNIZED, THE RETURN     *
1826                    *     ADDRESS WILL BE POPPED OFF THE STACK AND CONTROL PASSED DIRECTLY  *
1827                    *     TO FEEDMOT.                                                       *
1828                    ;************************************************************************
1829                    ;
1830  0406 47           SETGAIN:  LD    B,A                SAVE GAIN COMMAND IN B
1831  0407 FE 64                   CP    LOWGAIN            LOW GAIN COMMAND?
1832  0409 28 28                   JR    Z,CHKLGAIN         YES, CHECK LOW GAIN DELAY CNTR
1833  040B FD CB 43 7E             BIT   CALIBFLG,(IY+FLAGSCAL) CALIBRATION IN PROGRESS?
1834  040F C0                      RET   NZ                 YES, DON'T MESS WITH GAIN
1835  0410 FE 6D                   CP    HIGHGAIN           HIGH GAIN COMMAND?
1836  0412 28 4C                   JR    Z,SETHGAIN         YES, GO SET HIGH GAIN
1837                              IF    HITCHCMD
1838  0414 FE ED                   CP    HITCHMOD           CONTROLLER DOING FWD HITCH?
```

```
1839  0416  28 48              JR      Z,SETHGAIN          YES, GO SET HIGH GAIN
1840                            ENDIF
1841  0418  FE F0               CP      POSFILE             FIRST CALIBRATION COMMAND?
1842  041A  28 64               JR      Z,ENTCAL            YES, GET READY FOR CALIBRATION
1843  041C  E6 3F               AND     03FH                STRIP AWAY BIAS AND GROUND BITS
1844  041E  FE 3F               CP      REWGAIN             REWIND GAIN COMMAND?
1845  0420  28 32               JR      Z,SETRGAIN          YES, GO SET REWIND GAIN
1846                      ;  NO STANDARD GAIN COMMAND HAS BEEN RECOGNIZED, SO THE COMMAND MUST
1847                      ;  BE A VELOCITY CONTROL COMMAND.  THEREFORE EXIT SERVO CONTROL.
1848  0422  E1                  POP     HL                  THROW AWAY THE RETURN ADDRESS
1849                      ;/   SET     UNLOAD,(IY+FLAGS)   SET UNLOAD IN PROGRESS FLAG
1850  0423  11 DC 05            LD      DE,MIDPULSE         SET UP OFF PULSE WIDTH FOR
1851  0426  CD 77 04            CALL    SETPULSE              VELOCITY CONTROL MODE
1852  0429  21 11 20            LD      HL,X+REG1           DISABLE THE HARDWARE PLUG
1853  042C  7E                  LD      A,(HL)                INHIBIT CIRCUITRY
1854  042D  E6 E7               AND     0FFH-1.SHL.ALPLGINF-1.SHL.ALPLGINM
1855  042F  77                  LD      (HL),A                DURING VELOCITY CONTROL
1856  0430  C3 12 01            JP      FEEDMOT             JUMP TO LOAD/UNLOAD ROUTINES
1857                      ;
1858  0433  3A 3D 10    CHKLGAIN: LD    A,(LGDLYCTR)        HAS THE DELAY BEFORE SETTING
1859  0436  D6 01               SUB     1                     LOW GAIN EXPIRED?
1860  0438  38 04               JR      C,SETLGAIN          YES, GO SET LOW GAIN
1861  043A  32 3D 10            LD      (LGDLYCTR),A        NO, STORE THE UPDATED COUNTER
1862  043D  C9                  RET                         ;   AND RETURN
1863                      ;
1864  043E  70         SETLGAIN: LD     (HL),B              OLDCMD=LOWGAIN
1865  043F  21 42 10   SETLG2:   LD     HL,Y+FLAGS          HL POINTS TO THE GAIN FLAG BITS
1866  0442  7E                  LD      A,(HL)              SET THE LOW GAIN FLAGS AND
1867  0443  F6 18               OR      1.SHL.LOWGAINF+1.SHL.LOWGAINM
1868  0445  E6 DF               AND     0FFH-1.SHL.REWGAINF   RESET THE REWIND GAIN FLAG
1869  0447  77                  LD      (HL),A
1870  0448  21 11 20            LD      HL,X+REG1           DISABLE THE HARDWARE PLUG
1871  044B  7E                  LD      A,(HL)                INHIBIT CIRCUITRY
1872  044C  E6 E7               AND     0FFH-1.SHL.ALPLGINF-1.SHL.ALPLGINM
1873  044E  77                  LD      (HL),A                DURING LOW GAIN
1874  044F  11 18 08            LD      DE,LOWPULSE         SET THE OFF PULSE LENGTH FOR
1875  0452  18 23               JR      SETPULSE              LOW GAIN OPERAION
1876                      ;
1877  0454  70         SETRGAIN: LD     (HL),B              OLDCMD=REWIND GAIN
1878  0455  21 42 10            LD      HL,Y+FLAGS          HL POINTS TO THE GAIN FLAG BITS
1879  0458  7E                  LD      A,(HL)              RESET THE LOW GAIN FLAGS AND
1880  0459  E6 E7               AND     0FFH-1.SHL.LOWGAINF-1.SHL.LOWGAINM
1881  045B  F6 20               OR      1.SHL.REWGAINF        SET THE REWIND GAIN FLAG
1882  045D  77                  LD      (HL),A
1883  045E  18 08               JR      ENABHPLG            GO SET HI GAIN OFF PULSE LENGTH
1884                      ;
1885  0460  77         SETHGAIN: LD     (HL),A              OLDCMD=HIGHGAIN
1886  0461  21 42 10   SETHG2:   LD     HL,Y+FLAGS          HL POINTS TO THE GAIN FLAG BITS
1887  0464  7E                  LD      A,(HL)              RESET THE LOW GAIN AND THE
1888  0465  E6 C7               AND     0FFH-(1.SHL.LOWGAINF)-(1.SHL.LOWGAINM)-(1.SHL.REWGAINF)
1889  0467  77                  LD      (HL),A                REWIND GAIN BITS
1890  0468  21 11 20   ENABHPLG: LD     HL,X+REG1           ENABLE THE HARDWARE PLUG
1891  046B  7E                  LD      A,(HL)                INHIBIT GENERATION
1892  046C  F6 18               OR      1.SHL.ALPLGINF+1.SHL.ALPLGINM
1893  046E  77                  LD      (HL),A                DURING HIGH GAIN OR REW GAIN
1894                      ;
1895  046F  3E A0               LD      A,LOWDELAY          LOW GAIN COMMAND MUST BE
1896  0471  32 3D 10            LD      (LGDLYCTR),A          PRESENT FOR LOWDELAY MS
1897                      ;                                   BEFORE GAIN IS DROPPED
1898  0474  11 EA 02   SETHIP2:  LD     DE,HIPULSE          DE=HIGH GAIN OFF PULSE WIDTH
1899  0477  21 30 20   SETPULSE: LD     HL,X+FPULSEOF       POINT TO OFF PULSE TIMER
1900  047A  73                  LD      (HL),E              LOAD FILE OFF PULSE WIDTH
1901  047B  72                  LD      (HL),D
1902  047C  2C                  INC     L                   POINT TO MACHINE REEL TIMER
1903  047D  73                  LD      (HL),E              LOAD FILE OFF PULSE WIDTH
1904  047E  72                  LD      (HL),D
1905  047F  C9                  RET
1906                      ;
1907  0480  E1         ENTCAL:   POP    HL                  THROW AWAY THE RETURN ADDRESS
1908  0481  C3 CF 02            JP      PFILE               GO RE-ENTER SERVO GAIN READY
1909                      ;                                   TO DO CALIBRATION COMMANDS
1910                      ;
1911  0484  3E 0F      EXITSERV: LD     A,0FH               DISABLE THE REELS
1912  0486  32 0A 20            LD      (X+CONTROL),A
1913  0489  11 DC 05            LD      DE,MIDPULSE         SET OFF PULSE LENGTH FOR
1914  048C  CD 77 04            CALL    SETPULSE              VELOCITY CONTROL MODE
1915  048F  3E FF               LD      A,0FFH              CLEAR THE REEL MOTION INDICATORS
1916  0491  32 10 20            LD      (X+REG0),A
1917  0494  C3 88 00            JP      STBYULD             GO TO THE STANDBY UNLOADED LOOP
1918                      ;
1919                      ; CALCREF
1920                      ; THIS SUBROUTINE CALCULATES THE UPDATED REFERENCE POSITIONS
1921                      ; FOR BOTH THE FILE AND MACHINE REELS.
1922                      ; ENTER WITH:
1923                      ;    HL POINTS TO THE REFERENCE TO BE UPDATED.
1924                      ;    B = 01 FOR FAST REFERENCE CALCULATIONS OR B=FF FOR
1925                      ;       SLOW REFERENCE CALCULATIONS.
1926                      ; EACH REFERENCE VALUE MUST BE FOLLOWED BY A TABLE OF OFFSETS
1927                      ; TO BE USED DURING THE CALCULATION OF THE NEW REFERENCE VALUE.
1928                      ; A COMPLETE REFERENCE TABLE IS ARRANGED AS FOLLOWS:
1929                      ;    REFERENCE VALUE (TWO BYTES)
1930                      ;    OFFSET TO BE USED WHEN GO IS NOT SET (TWO BYTES)
1931                      ;    OFFSET TO BE USED WHEN GO IS SET AND NOT REWIND GAIN (TWO BYTES)
1932                      ;    OFFSET TO BE USED DURING REWIND OPERATIONS (TWO BYTES)
```

```
1933                        ;
1934  0497  E5              CALCREF:  PUSH  HL                    SAVE REFERENCE POINTER
1935  0498  5E                        LD    E,(HL)                PUT THE PRESENT REFERENCE
1936  0499  2C                        INC   L                       INTO DE
1937  049A  56                        LD    D,(HL)
1938  049B  2C                        INC   L                     POINT TO NO-GO OFFSET
1939  049C  EB                        EX    DE,HL                 SAVE POINTER IN DE, PUT
1940                        ;                                       REFERENCE IN HL
1941  049D  05                        DEC   B                     CALCULATE FAST REFERENCE?
1942  049E  28 1A                     JR    Z,CALREFF             YES, GO CALCULATE IT
1943                        ; CALCULATE THE NEXT SLOW REFERENCE VALUE
1944  04A0  44                        LD    B,H                   MULTIPLY THE REFERENCE
1945  04A1  7D                        LD    A,L                     BY 63/64
1946  04A2  CB 28                     SRA   B
1947  04A4  1F                        RRA
1948  04A5  CB 28                     SRA   B
1949  04A7  1F                        RRA
1950  04A8  CB 28                     SRA   B
1951  04AA  1F                        RRA
1952  04AB  CB 28                     SRA   B
1953  04AD  1F                        RRA
1954  04AE  CB 28                     SRA   B
1955  04B0  1F                        RRA
1956  04B1  CB 28                     SRA   B
1957  04B3  1F                        RRA                         LEAVE CARRY BIT SET FOR ROUNDING
1958  04B4  4F                        LD    C,A                   BC=HL/64
1959  04B5  ED 42                     SBC   HL,BC                 HL=HL-(HL/64)=HL*63/64
1960  04B7  C3 C5 04                  JP    ADDOFFST              GO ADD APPROPRIATE OFFSET
1961                        ; MULTIPLY THE PRESENT FAST REFERENCE BY 3/4
1962  04BA  44              CALREFF:  LD    B,H                   MULTIPLY REFERENCE BY 3/4
1963  04BB  7D                        LD    A,L                     BY SUBTRACTING HL/4 FROM HL
1964  04BC  CB 28                     SRA   B
1965  04BE  1F                        RRA
1966  04BF  CB 28                     SRA   B
1967  04C1  1F                        RRA                         LEAVE CARRY BIT SET FOR ROUNDING
1968  04C2  4F                        LD    C,A                   BC=HL/4
1969  04C3  ED 42                     SBC   HL,BC                 HL=HL-(HL/4)=HL*3/4
1970                        ;
1971  04C5  EB              ADDOFFST: EX    DE,HL                 DE=REF * REF FACTOR
1972                        ;                                       HL POINTS TO NO-GO OFFSET
1973                                  IF    HITCHCMD
1974  04C6  3A 28 20                  LD    A,(X+REELS)           IF WE ARE DOING A FWD HITCH,
1975  04C9  FE ED                     CP    HITCHMOD                THEN GO FORCE CALCULATION AS
1976  04CB  28 26                     JR    Z,HITCHREF              THOUGH IN BWD MODE, GO NOT SET
1977                                  ENDIF
1978  04CD  3A 20 20                  LD    A,(X+COMMAND)         GET THE GO AND FORWARD BITS
1979  04D0  CB 4F                     BIT   GO,A                  CAPSTAN GO? (MINUS ACTIVE)
1980  04D2  20 0A                     JR    NZ,CHKDIR2            NO, USE NO-GO OFFSET
1981  04D4  2C                        INC   L                     POINT TO THE
1982  04D5  2C                        INC   L                       GO OFFSET VALUE
1983  04D6  FD CB 42 6E               BIT   REWGAINF,(IY+FLAGS)   IN REWIND GAIN?
1984  04DA  28 02                     JR    Z,CHKDIR2             NO, USE REGULAR GO OFFSET
1985  04DC  2C                        INC   L                     POINT TO THE
1986  04DD  2C                        INC   L                       REWIND OFFSET VALUE
1987  04DE  4E              CHKDIR2:  LD    C,(HL)                LOAD THE OFFSET VALUE INTO BC
1988  04DF  2C                        INC   L
1989  04E0  46                        LD    B,(HL)
1990  04E1  EB                        EX    DE,HL                 PUT REF * REF FACTOR INTO HL
1991  04E2  CB 57                     BIT   FORWARD,A             FORWARD DIRECTION? (MINUS ACTIVE)
1992  04E4  20 04                     JR    NZ,SUBREF             NO, BACKWARD SO SUBTRACT OFFSET
1993  04E6  09                        ADD   HL,BC                 FORWARD, ADD THE OFFSET
1994  04E7  C3 ED 04                  JP    STREF                 GO STORE THE NEW REFERENCE
1995  04EA  A7              SUBREF:   AND   A                     CLEAR CARRY BIT
1996  04EB  ED 42                     SBC   HL,BC                 SUBTRACT THE OFFSET
1997  04ED  EB              STREF:    EX    DE,HL                 DE=NEW REFERENCE VALUE
1998. 04EE  E1                        POP   HL                    HL POINTS TO REFERENCE STORAGE
1999  04EF  73                        LD    (HL),E                PUT THE NEW REFERENCE
2000  04F0  2C                        INC   L                       INTO MEMORY
2001  04F1  72                        LD    (HL),D
2002  04F2  C9                        RET
2003                        ;
2004                                  IF    HITCHCMD
2005  04F3  4E              HITCHREF: LD    C,(HL)                LOAD THE NO-GO OFFSET
2006  04F4  2C                        INC   L                       INTO BC
2007  04F5  46                        LD    B,(HL)
2008  04F6  EB                        EX    DE,HL                 PUT REF * REF FACTOR INTO HL
2009  04F7  18 F1                     JR    SUBREF                GO SUBTRACT THE NO-GO OFFSET
2010                                  ENDIF
2011                        ;
2012                                  IF    DEBUG3
2013                        FMAXADJ:  LD    A,0FFH                OVERFLOW, USE MAXIMUM VALUE
2014                                  JR    OUTF11
2015                                  ENDIF
2016                        ;
2017                        *======================================*
2018                        *           FILE REEL OUTPUT           *
2019                        *======================================*
2020                        ;
2021  04F9              OUTFILE:
2022                        ;
2023                        ;------ FILE COL SENSOR READING --------
2024                        ;
2025                                  IF    DEBUG3.EQ.0
2026  04F9  3A 35 10                  LD    A,(FMIDDLE)           GET THE MID-COLUMN SENSOR READING
2027  04FC  57                        LD    D,A                   AND KEEP IT IN D
```

```
2028                              ENDIF
2029  04FD  DD CB 20 5E           BIT      EOC,(IX+EOCBYTE)        END OF CONVERSION?
2030  0501  C2 15 05              JP       NZ,OUTFILE1             YES, GO READ VALUE
2031  0504  CD B4 0C              CALL     EOCWAIT                 WAIT FOR END OF CONVERSION
2032  0507  20 0C                 JR       NZ,OUTFILE1             IF DONE, GO READ VALUE
2033  0509  D2 84 04              JP       NC,EXITSERV             IF REELS ENABLED DROPPED, EXIT
2034  050C  32 04 20              LD       (X+FCOLSEN),A           ADC ERROR, TRY TO RESTART IT
2035  050F  CD CF 0C              CALL     EOCRETRY                WAIT FOR ADC DONE, HALT IF ERROR
2036  0512  CA 84 04              JP       Z,EXITSERV              IF REELS ENABLED DROPPED, EXIT
2037  0515  3A 04 20     OUTFILE1: LD      A,(X+FCOLSEN)           INPUT FILE COLUMN SENSOR READING
2038                              IF       DEBUG3                  GENERATE ADJUSTED SENSOR READING
2039                              PUSH     AF                      SAVE RAW COLUMN SENSOR READING
2040                              LD       DE,(FVACFACT)           E=VACUUM ADJUSTMENT FACTOR
2041                              ;                                D=FMIDDLE, FILE MIDPOINT
2042                              INC      E                       IS THE ADJUSTMENT FACTOR
2043                              DEC      E                          EQUAL TO ZERO?
2044                              JR       Z,OUTF11                YES, DON'T NEED TO ADJUST
2045                              LD       HL,FATMOSPH             POINT TO ATMOSPHERIC READING
2046                              SUB      (HL)
2047                              LD       C,A                     C=COLSEN-ATMOSPH
2048                              LD       H,E                     H=ADJUSTMENT FACTOR
2049                              CALL     MULTIPLY                HL = H * C
2050                              ADD      HL,HL                   MULTIPLY THE RESULT BY 4
2051                              JR       C,FMAXADJ                  CHECKING FOR OVERFLOW
2052                              ADD      HL,HL
2053                              JR       C,FMAXADJ
2054                              LD       A,(FATMOSPH)            GET ATMOSPHERIC READING IN A
2055                              RL       L                       SET UP CARRY BIT FOR ROUNDING
2056                              ADC      A,H                     ADD ATMOSPHERIC BACK INTO THE
2057                              ;                                  HIGH BYTE OF THE RESULT
2058                              ;                                  (IN EFFECT, RESULT/256)
2059                    OUTF11:   SUB      D                       SUBTRACT THE ZERO POINT
2060                              LD       (YKA),A                 SAVE ADJUSTED LOOP POSITION
2061                              POP      AF                      RESTORE RAW SENSOR READING
2062                              ENDIF
2063                              IF       STRETCH3                ADJUST IF LOW COLUMN VACUUM
2064  0518  DD CB 0A 66           BIT      LOWVAC,(IX+CONTROL)     IS COLUMN VACUUM ABNORMALLY LOW?
2065  051C  CA 3D 05              JP       Z,OUTF15                NO, DON'T ADJUST SENSOR READING
2066                              IF       STRETCH4
2067  051F  FD CB 43 7E           BIT      CALIBFLG,(IY+FLAGSCAL)  ARE WE IN CALIBRATE MODE?
2068  0523  20 18                 JR       NZ,OUTF15               YES, DON'T ADJUST SENSOR READING
2069                              ENDIF
2070  0525  47                    LD       B,A                     SAVE COLUMN SENSOR READING IN A
2071  0526  3A 19 10              LD       A,(FILEREFS+1)          GET PRESENT SLOW REFERENCE
2072  0529  A7                    AND      A                       IS REF ABOVE MIDDLE OF COLUMN?
2073  052A  F2 31 05              JP       P,MODF                  YES, ADJUST THE SENSOR READING
2074  052D  FE F8                 CP       -8                      IS THE REF ABOVE -8 COUNTS
2075  052F  38 0B                 JR       C,OUTF14                NO, DON'T ADJUST SENSOR READING
2076                              ;
2077                              ; LOW COLUMN VACUUM HAS BEEN DETECTED.  ASSUME COLUMN VACUUM IS 2/3
2078                              ; OF NORMAL AND ADJUST THE MEASURED LOOP POSITION TO MAKE UP FOR
2079                              ; LOW COLUMN VACUUM:
2080                              ;    ADJUSTED COUNT = ATMOSPH + 1.5*(MEASURED COUNT - ATMOSPH)
2081                              ;
2082  0531  78           MODF:    LD       A,B                     RESTORE COLUMN SENSOR READING
2083  0532  21 4C 10              LD       HL,FATMOSPH             POINT TO ATMOSPHERIC READING
2084  0535  96                    SUB      (HL)                    A=(MEASURED - ATMOSPH)
2085  0536  47                    LD       B,A                     MULTIPLY
2086  0537  CB 3F                 SRL      A                          (MEASURED - ATMOSPH)
2087  0539  80                    ADD      A,B                        BY 1.5
2088  053A  86                    ADD      A,(HL)                  A=ATMOSPH+1.5(MEASURED-ATMOSPH)
2089  053B  47                    LD       B,A                     STORE RESULT IN B TEMPORARILY
2090  053C  78           OUTF14:  LD       A,B                     PUT (ADJUSTED) SENSOR IN A
2091  053D               OUTF15:
2092                              ENDIF
2093  053D  92                    SUB      D                       ADJUST THE LOOP POSITION
2094  053E  57                    LD       D,A                     D=LOOP POSITION (MIDDLE=0,
2095                              ;                                  TOP POSITIVE, BOTTOM NEGATIVE)
2096  053F  32 37 10              LD       (YK),A                  SAVE LOOP POSITION IN YK
2097                              IF       DEBUG1                  ;/DEBUG CODE
2098                              BIT      REWGAINF,(IY+FLAGS)     ;/ARE WE IN REWIND GAIN?
2099                              JR       NZ,JUNK1                ;/ YES, REWIND CODE HANDLES LED'S
2100                              AND      A                       ;/CHECK SIGN OF LOOP POSITION
2101                              LD       HL,X+REG1               ;/POINT TO LED'S
2102                              RES      FILEHIGH,(HL)           ;/SAY THAT FILE LOOP IS BELOW
2103                              ;                                ;/  THE CALIBRATED MIDPOINT
2104                              JP       M,JUNK1                 ;/IS LOOP ABOVE MIDPOINT?
2105                              SET      FILEHIGH,(HL)           ;/ YES, OH WELL, NEVER MIND
2106                    JUNK1:                                     ;/ NO, LEAVE BIT CLEAR
2107                              ENDIF                            ;/
2108  0542  2A 1F 10              LD       HL,(FLIM-1)             SET LIMFLG IF LOOP POSITION IS
2109  0545  CD 79 0C              CALL     LIMTST                     OUTSIDE LIMITS
2110  0548  21 01 10              LD       HL,FPOS16               POINT TO OLD LOOP POSITION
2111  054B  FD CB 42 6E           BIT      REWGAINF,(IY+FLAGS)     REWIND GAIN?
2112  054F  28 02                 JR       Z,CALVEL                NO, GO CALCULATE LOOP VELOCITY
2113  0551  2E 04                 LD       L,.LOW.FPOS40           YES, CALCULATE THE LOOP VELOCITY
2114                              ;                                  OVER A LONGER PERIOD OF TIME
2115  0553  96           CALVEL:  SUB      (HL)                    A=NEW POSITION - OLD POSITION
2116                              IF       CALMOD1
2117  0554  2E 3A                 LD       L,.LOW.PREDVELF         SUBTRACT THE PREDICTED LOOP VEL
2118  0556  96                    SUB      (HL)                       FROM THE ACTUAL LOOP VELOCITY
2119                              ENDIF
2120  0557  32 3C 10              LD       (LOOPVEL),A             SAVE THE LOOP VELOCITY (GO FWD:
2121  055A  47                    LD       B,A                        POSITIVE VEL, GO BWD: NEG VEL)
```

```
2122                                                          SHIFT THE POSITION FIFO
2123  055B  2A 02 10              LD    HL,(FPOS24)            L=FPOS24, H=FPOS32
2124  055E  22 03 10              LD    (FPOS32),HL            FPOS32=L, FPOS40=H
2125  0561  2A 00 10              LD    HL,(FPOS8)             L=FPOS8, H=FPOS16
2126  0564  22 01 10              LD    (FPOS16),HL            FPOS16=L, FPOS24=H
2127  0567  7A                    LD    A,D                    THE PRESENT POSITION WILL BE
2128  0568  32 00 10              LD    (FPOS8),A                 8 MS OLD NEXT TIME THROUGH
2129                        ;
2130  056B  3A 19 10              LD    A,(FILEREFS+1)         GET THE SLOW REFERENCE
2131  056E  5F                    LD    E,A                       AND SAVE IT IN E
2132  056F  21 07 10              LD    HL,FREFS8              POINT TO THE OLD SLOW REFERENCE
2133  0572  96                    SUB   (HL)                   PUT THE ABSOLUTE VALUE OF THE
2134  0573  F2 78 05              JP    P,OUTFILE2                DIFFERENCE BETWEEN THE PREVIOUS
2135  0576  ED 44                 NEG                             SLOW REFERENCE AND THE PRESENT
2136  0578  F5         OUTFILE2:  PUSH  AF                        SLOW REFERENCE ON THE STACK
2137  0579  73                    LD    (HL),E                 SAVE VALUE FOR USE NEXT TIME
2138                        ;
2139  057A  3A 11 10              LD    A,(FILEREF+1)          GET THE PRESENT REFERENCE VALUE
2140  057D  5F                    LD    E,A                       AND SAVE IT IN E
2141  057E  21 06 10              LD    HL,FREF16              POINT TO THE OLD REFERENCE
2142  0581  96                    SUB   (HL)                   A = NEW REF - OLD REF (REF16)
2143  0582  CB 2F                 SRA   A                      A=REFDIFF/2
2144  0584  CB 2F                 SRA   A                      A=REFDIFF/4
2145                        ;
2146  0586  80         OUTFILE3:  ADD   A,B                    ADD THE LOOP VELOCITY
2147  0587  47                    LD    B,A                    B=LOOP VELOCITY + FEED FORWARD
2148                        ;                                  SHIFT THE REFERENCE FIFO
2149  0588  21 05 10              LD    HL,FREF8               POINT TO THE REFERENCE FILTER
2150  058B  7E                    LD    A,(HL)                 A=REF8
2151  058C  73                    LD    (HL),E                 THE CURRENT REFERENCE WILL BE
2152  058D  2C                    INC   L                         8 MS OLD THE NEXT TIME THROUGH
2153  058E  77                    LD    (HL),A                 REF16=A
2154                        ;
2155  058F  7A                    LD    A,D                    A=PRESENT POSITION
2156  0590  2E 19                 LD    L,.LOW.(FILEREFS+1)    POINT TO SLOW REFERENCE VALUE
2157  0592  96                    SUB   (HL)                   C=A=PRESENT POSITION - SLOW REF
2158  0593  4F                    LD    C,A
2159  0594  32 47 10              LD    (CALERR),A             SAVE POSITION ERROR FOR CALIBRATE
2160                        ;
2161  0597  7A                    LD    A,D                    FETCH PRESENT POSITION
2162  0598  93                    SUB   E                      ERROR=POSITION-YREF(K)
2163  0599  2E 42                 LD    L,.LOW.(Y+FLAGS)       POINT TO THE POLARITY FLAG
2164  059B  CB CE                 SET   POLFLAG,(HL)           IF ERROR IS POSITIVE,
2165  059D  F2 A4 05              JP    P,OUTFILE4                THEN SET ERROR POLARITY FLAG
2166  05A0  CB 8E                 RES   POLFLAG,(HL)           ELSE RESET ERROR POLARITY FLAG
2167  05A2  ED 44                 NEG
2168                        ;
2169  05A4  67         OUTFILE4:  LD    H,A                    H=MAGNITUDE OF THE DIFFERENCE
2170                        ;                                     BETWEEN THE TARGET LOOP
2171                        ;                                     POSITION AND THE ACTUAL
2172                        ;                                     LOOP POSITION
2173                        ;************************************************************
2174                        *                                                            *
2175                        *   TWO TYPES OF ALGORITHMS ARE USED TO CALCULATE THE AMOUNT OF  *
2176                        *   CURRENT TO BE APPLIED TO THE REEL MOTOR. THE NONLINEAR ALGORITHM *
2177                        *   IS DESIGNED TO GENERATE A CONSTANT ACCELERATION (AND THEREFORE *
2178                        *   CONSTANT CURRENT) PROFILE FOR THE REEL DURING TAPE VELOCITY *
2179                        *   CHANGES. HOWEVER THE NONLINEAR ALGORITHM IS NOT APPROPRIATE FOR *
2180                        *   STEADY STATE TYPE OPERATION OR FOR INSTANCES WHEN THE TAPE LOOP *
2181                        *   HAS OVERSHOT THE TARGET LOOP POSITION. UNDER THESE CIRCUMSTANCES, *
2182                        *   THE LINEAR ALGORITHM IS USED.                           *
2183                        *                                                            *
2184                        *   THE FOLLOWING CODE WILL CAUSE THE LINEAR ALGORITHM TO BE USED *
2185                        *   UNDER THESE CIRCUMSTANCES:                              *
2186                        *      1) THE SLOW REFERENCE VALUE HAS CHANGED VALUE BY AN AMOUNT *
2187                        *         SMALLER THAN 2. (STEADY STATE OR FAST REP RATE)  *
2188                        *      2) THE TURNAROUND FLAG IS SET (I.E. THE CONTROLLER HAS *
2189                        *         INDICATED ITS DESIRE TO CHANGE DIRECTION).         *
2190                        *      3) THE DIFFERENCE BETWEEN THE TARGET POSITION (FAST REFERENCE) *
2191                        *         AND THE ACTUAL POSITION IS LESS THAN 9.           *
2192                        *      4) THE DIFFERENCE BETWEEN THE FAST REFERENCE AND THE SLOW *
2193                        *         REFERENCE IS LESS THAN 17.                        *
2194                        *      5) THE LOOP POSITION HAS OVERSHOT THE FAST REFERENCE (THE *
2195                        *         FAST REFERENCE IS THE TARGET FOR THE NONLINEAR ALGORITHM). *
2196                        *      6) THE LOOP HAS GONE OVER 15% BEYOND THE GO REFERENCE *
2197                        *         POSITION.                                          *
2198                        *      7) THE REELS SYSTEM IS IN LOW GAIN MODE AND GO IS NOT SET *
2199                        *         (I.E. THE TAPE HAS NOT BEEN IN MOTION FOR QUITE A WHILE). *
2200                        *   IF THESE CONDITIONS ARE NOT MET, THE NONLINEAR ALGORITHM IS USED. *
2201                        *                                                            *
2202                        *************************************************************
2203                        ;
2204  05A5  F1                    POP   AF                     IF AMOUNT SLOW REF HAS MOVED
2205  05A6  FE 02                 CP    2                         DURING LAST 8 MS IS LESS THAN
2206  05A8  38 41                 JR    C,FLINEAR                 2, USE LINEAR ALGORITHM
2207  05AA  FD CB 43 6E           BIT   CALRGMF,(IY+FLAGSCAL)  IF CALIBRATE CODE IS HANDLING REF
2208  05AE  20 48                 JR    NZ,FLINCAL                GENERATION, USE LINEAR
2209  05B0  FD CB 44 7E           BIT   TRNFLAG,(IY+TRNFLGCT)  IS THE TURN AROUND FLAG SET
2210  05B4  20 35                 JR    NZ,FLINEAR             YES, USE LINEAR ALGORITHM
2211  05B6  7C                    LD    A,H                    A=IABS(POS-REF)
2212  05B7  FE 09                 CP    9                      POSITION NEAR FAST REFERENCE?
2213  05B9  38 30                 JR    C,FLINEAR              YES, USE LINEAR ALGORITHM
2214  05BB  3A 42 10              LD    A,(Y+FLAGS)            GET THE FLAGS BYTE
2215  05BE  6F                    LD    L,A                       AND SAVE IT IN L
2216  05BF  E6 20                 AND   1.SHL.REWGAINF         REWIND GAIN SET?
```

```
2217  05C1  20 28                   JR      NZ,FLINEAR              YES, USE LINEAR ALGORITHM
2218  05C3  3A 19 10                LD      A,(FILEREFS+1)          GET THE ABSOLUTE VALUE OF THE
2219  05C6  93                      SUB     E                          DIFFERENCE BETWEEN THE FAST
2220  05C7  F2 CC 05                JP      P,CPLNEAR3                 AND SLOW REFERENCES
2221  05CA  ED 44                   NEG
2222  05CC  FE 11         CPLNEAR3: CP      17                      IF IT IS LESS THAN 17
2223  05CE  38 1B                   JR      C,FLINEAR                  THEN USE LINEAR ALGORITHM
2224  05D0  78                      LD      A,B                     A=LOOP VELOCITY+FEED FORWARD
2225  05D1  CB 4D                   BIT     POLFLAG,L               IS THE DIFFERENCE BETWEEN ACTUAL
2226                    ;                                              POSITION AND TARGET POSITION
2227                    ;                                              POSITIVE? (IS THE LOOP ABOVE
2228                    ;                                              THE TARGET?)
2229  05D3  28 6B                   JR      Z,OUTFILEG              NO, LOOK FOR OVERSHOOT BELOW REF
2230  05D5  A7                      AND     A                       IF (LOOP VELOCITY+FEED FWD)>-3
2231  05D6  F2 EB 05                JP      P,FLINEAR                  THEN THE LOOP HAS PROBABLY
2232  05D9  FE FE                   CP      -2                         OVERSHOT THE TARGET POSITION
2233  05DB  30 0E                   JR      NC,FLINEAR                 SO USE THE LINEAR ALGORITHM
2234                    ;
2235  05DD  CB 45         OUTFILE5: BIT     LIMFLG,L                LIMIT FLAG ON? LOOP OVERSHOT?
2236  05DF  20 0A                   JR      NZ,FLINEAR              YES, USE LINEAR ALGORITHM
2237  05E1  DD CB 20 4E             BIT     GO,(IX+COMMAND)         CAPSTAN GO?
2238  05E5  28 17                   JR      Z,FNONLIN               YES, USE NONLINEAR ALGORITHM
2239  05E7  CB 5D                   BIT     LOWGAINF,L              LOW GAIN MODE?
2240  05E9  28 13                   JR      Z,FNONLIN               NO, USE NONLINEAR ALGORITHM
2241                    ;
2242                    ;
2243  05EB  DD CB 11 96   FLINEAR:  RES     FNONLINB,(IX+REG1)      RESET NON-LINEAR INDICATOR
2244  05EF  11 F7 0E                LD      DE,VELOFFF.SHL.8+FWDSRPF LOAD UP TURNAROUND VALUES
2245  05F2  CD 84 06                CALL    LINEAR                  GO CALCULATE CURRENT
2246  05F5  C3 06 06                JP      OUTFCUR                 AND OUTPUT THE CURRENT COMMAND
2247                    ;
2248  05F8  FD 36 3E 01   FLINCAL:  LD      (IY+STEADYCT-Y),1       INDICATE STEADY STATE OPERATION
2249  05FC  18 ED                   JR      FLINEAR                    TO FORCE LOWER VELOCITY GAIN
2250                    ;
2251                    ;
2252  05FE  DD CB 11 D6   FNONLIN:  SET     FNONLINB,(IX+REG1)      SET NONLINEAR MODE INDICATOR
2253  0602  54                      LD      D,H                     D=IABS(FCOLSEN-YREF)
2254  0603  CD 4B 06                CALL    NONLIN                  CALCULATE CURRENT VALUE
2255                    ;
2256                    ;
2257  0606  EE 80         OUTFCUR:  XOR     1.SHL.POLBIT            REVERSE CURRENT POLARITY
2258  0608  4F                      LD      C,A                     KEEP THE CURRENT CMD IN C
2259  0609  17                      RLA                             REVERSE CURRENT?
2260  060A  30 0D                   JR      NC,NOBRAKEF             YES, DON'T FORCE DYNAMIC BRAKE
2261  060C  FD CB 42 6E             BIT     REWGAINF,(IY+FLAGS)     REWIND MODE?
2262  0610  28 07                   JR      Z,NOBRAKEF              YES, DON'T FORCE DYNAMIC BRAKE
2263  0612  DD CB 0A 86             RES     FBRAKE,(IX+CONTROL)     NO, FORWARD CURRENT DURING
2264                    ;                                              REWIND: FORCE DYNAMIC BRAKE
2265  0616  C3 1D 06                JP      CHKCALF                 GO LOOK AT CALIBRATION FLAG
2266                    ;
2267  0619  DD CB 0A C6   NOBRAKEF: SET     FBRAKE,(IX+CONTROL)     DON'T FORCE DYNAMIC BRAKE
2268                    ;
2269  061D  3A 43 10      CHKCALF:  LD      A,(Y+FLAGSCAL)          IS CALIBRATION IN PROGRESS?
2270  0620  17                      RLA                                (CHECK BIT 7 OF FLAGSCAL)
2271  0621  DC 79 09                CALL    C,CALIBRF               YES, DO CALIBRATION COMMAND
2272  0624  21 08 20                LD      HL,X+FILEMOT            POINT TO THE CURRENT COMMAND
2273  0627  7E                      LD      A,(HL)                  GET LAST CURRENT VALUE
2274  0628  A9                      XOR     C                       IS THE POLARITY DIFFERENT?
2275  0629  F2 3C 06                JP      P,OUTFCUR2              NO, GO OUTPUT THE CURRENT
2276  062C  DD CB 0A CE             SET     FREELENB,(IX+CONTROL)   DISABLE THE POWER AMPLIFIER
2277  0630  06 02                   LD      B,CURTADLY              DELAY FOR THE TRANSISTORS
2278  0632  10 FE                   DJNZ    $                          TO TURN OFF
2279  0634  71                      LD      (HL),C                  OUTPUT THE NEW CURRENT VALUE
2280  0635  DD CB 0A 8E             RES     FREELENB,(IX+CONTROL)   TURN THE POWER AMP BACK ON
2281                            IF  DEBUG2
2282                                JR      OUTFCUR3                GO SAVE TRACE INFORMATION
2283                            ELSE
2284  0639  C3 00 04                JP      SRVMOT9                 GO WAIT FOR NEXT MILLISECOND
2285                            ENDIF
2286                    ;
2287  063C  71            OUTFCUR2: LD      (HL),C                  OUTPUT CURRENT TO FILE MOTOR
2288                            IF  DEBUG2
2289                                JR      OUTFCUR3                GO SAVE TRACE INFORMATION
2290                            ELSE
2291  063D  C3 00 04                JP      SRVMOT9                 GO WAIT FOR NEXT MILLISECOND
2292                            ENDIF
2293                    ;
2294                    ;
2295  0640  A7            OUTFILEG: AND     A                       IF (LOOP VELOCITY+FEED FWD)<3
2296  0641  FA EB 05                JP      M,FLINEAR                  THEN USE THE LINEAR ALGORITHM
2297  0644  FE 03                   CP      3
2298  0646  30 95                   JR      NC,OUTFILE5
2299  0648  C3 EB 05                JP      FLINEAR
2300                    ;
2301                            IF  DEBUG2                          SAVE TRACE INFORMATION
2302                    OUTFCUR3: LD       HL,(FILEPT)
2303                             LD       (HL),C                   SAVE CURRENT COMMAND
2304                             INC      L
2305                             LD       A,(YK)
2306                             LD       (HL),A                   SAVE LOOP POSITION
2307                             INC      L
2308                             LD       A,(FILEREFS+1)
2309                             LD       (HL),A                   SAVE SLOW REFERENCE VALUE
2310                             INC      L
```

```
2311                           LD    A,(X+REG0)        GET THE SLOW DOWN CONDITION BITS
2312                           RRCA                    AND MOVE THEM INTO
2313                           RRCA                    BITS 6 AND 7
2314                           AND   0C0H              STRIP OFF OTHER BITS
2315                           LD    B,A
2316                           LD    A,(X+REELS)       GET THE GAIN OR CALIBRATION CMD
2317                           AND   3FH               RESET UPPER TWO BITS
2318                           OR    B                 COMBINE WITH SLDC BITS
2319                           LD    (HL),A            SAVE SLDC BITS AND COMMAND
2320                           IF    DEBUG3            SAVE ADJUSTED LOOP POSITION
2321                           INC   L
2322                           LD    A,(FILEREF+1)
2323                           LD    (HL),A            SAVE FAST REFERENCE POSITION
2324                           INC   L
2325                           LD    A,(FVACFACT)
2326                           LD    (HL),A            SAVE VACUUM ADJUSTMENT FACTOR
2327                           INC   L
2328                           LD    A,(YKA)
2329                           LD    (HL),A            SAVE ADJUSTED LOOP POSITION
2330                           INC   L
2331                           LD    A,(X+CONTROL)     GET COLUMN VACUUM AVAILABLE SW
2332                           AND   1.SHL.LOWVAC      MASK OUT OTHER BITS
2333                           LD    (HL),A            SAVE COLUMN VACUUM AVAILABLE SW
2334                           ENDIF
2335                           INC   HL
2336                           LD    A,H
2337                           CP    .HIGH.(FSAVTABL+1000H) WRAP AROUND IF AT TABLE END
2338                           JR    C,STOREPT
2339                           LD    H,.HIGH.FSAVTABL
2340                   STOREPT: LD   (FILEPT),HL
2341                           JP    SRVMOT9           GO WAIT FOR NEXT MILLISECOND
2342                           ENDIF
2343                   ;
2344                   ;
2345                   ;
2346                   *----------------------------------------------------------------*
2347                   *     NON LINEAR ALGORITHM                                       *
2348                   *     GENERATES CONSTANT CURRENT TRAJECTORY DURING TAPE SPEED CHANGES *
2349                   *                                                                *
2350                   *     I = KDB*((YLDIFF)**2)/(YLERR))                             *
2351                   *     WHERE:  KDB=(656/16)=41                                    *
2352                   *             YLDIFF=(POS-POS16)+((REF-REF16)/4)   (FILE REEL)   *
2353                   *                   =LOOP VELOCITY + FEED FORWARD                *
2354                   *             YLDIFF=(POS-POS16)                  (MACHINE REEL) *
2355                   *                   =LOOP VELOCITY                               *
2356                   *             YLERR=POS-REF                                      *
2357                   *                                                                *
2358                   *     THIS ROUTINE IS ENTERED WITH:                              *
2359                   *        D=IABS(POS-REF)                                         *
2360                   *        B=(POS-POS16)+(REF-REF16)/4  (FILE REEL)                *
2361                   *        B=(POS-POS16)                (MACHINE REEL)             *
2362                   *        POLFLAG SET OR CLEARED ACCORDING TO DIRECTION OF ERROR  *
2363                   *                                                                *
2364                   *----------------------------------------------------------------*
2365                   ;
2366  064B  78         NONLIN:  LD    A,B               A=LOOP VELOCITY + FEED FORWARD
2367  064C  A7                  AND   A                 IS THE VALUE NEGATIVE?
2368  064D  F2 52 06            JP    P,NONLIN2         NO, A CONTAINS MAGNITUDE OF B
2369  0650  ED 44               NEG                     NEGATE VALUE TO GET MAGNITUDE
2370                   ;
2371  0652  FE 17      NONLIN2: CP    22+1              LIMIT THE MAGNITUDE OF THE
2372  0654  38 02               JR    C,NONLIN3         LOOP VELOCITY + FEED FORWARD
2373  0656  3E 16               LD    A,22              TERM
2374                   ;
2375  0658  26 0D      NONLIN3: LD    H,.HIGH.DIFFSQR   POINT TO A TABLE OF SQUARES
2376  065A  6F                  LD    L,A               POINT TO DESIRED ELEMENT OF TABLE
2377  065B  4E                  LD    C,(HL)            C=0.5*((LOOPVEL+FEEDFWD)**2)
2378  065C  7A                  LD    A,D               A=(POS-REF), DIFFERENCE BETWEEN
2379                   ;                                   PRESENT POSITION AND TARGET
2380  065D  FE 49               CP    72+1              ERROR > 72?
2381  065F  38 02               JR    C,NONMAX          NO, DON'T USE LIMIT
2382  0661  3E 48               LD    A,72              YES, USE LIMIT OF 72
2383  0663  26 0C      NONMAX:  LD    H,.HIGH.ERRTBLE   POINT TO ERROR TABLE
2384  0665  6F                  LD    L,A               POINT TO DESIRED ELEMENT OF TABLE
2385  0666  66                  LD    H,(HL)            H=656/A
2386  0667  CD 8C 0C            CALL  MULTIPLY          MULTIPLY SQUARE OF DIFF AND ERROR
2387  066A  7D                  LD    A,L                 (HL=C*H)
2388  066B  CB 3C               SRL   H                 DIVIDE RESULT BY 8
2389  066D  1F                  RRA
2390  066E  CB 3C               SRL   H
2391  0670  1F                  RRA
2392  0671  CB 3C               SRL   H                 CHECK FOR OVERFLOW CONDITION
2393  0673  20 05               JR    NZ,OUTMAX         IF HIGH BYTE NONZERO, USE MAX
2394  0675  1F                  RRA                     COMPLETE DIVISION
2395  0676  FE 7F               CP    FILEMAX           CURRENT COMMAND > MAX?
2396  0678  38 02               JR    C,NONLIN5         NO, DON'T USE LIMIT
2397                   ;
2398  067A  3E 7F      OUTMAX:  LD    A,FILEMAX         YES,OUTPUT MAXIMUM CURRENT LIMIT
2399                   ;
2400  067C  FD CB 42 4E NONLIN5: BIT  POLFLAG,(IY+FLAGS) FORWARD DIRECTION?
2401  0680  C8                  RET   Z                 YES,LEAVE FWD CURRENT COMMAND
2402  0681  F6 80               OR    1.SHL.POLBIT      NO, SET BWD CURRENT COMMAND
2403  0683  C9                  RET
2404                   ;
```

```
2405
2406                      *---------------------------------------------------------------*
2407                      *                                                               *
2408                      *             LINEAR ALGORITHM                                  *
2409                      *   CALCULATES CURRENT FOR STEADY STATE TYPE OPERATION          *
2410                      * FOR HIGH GAIN:                                                *
2411                      *    200 IPS:    I = MIN((6*(POS-POS16)+(POS-REFS))*4-8,127)    *
2412                      *             OR I = MIN((2*(POS-POS16)+(POS-REFS))*4-8,127)    *
2413                      *    75/125 IPS: I = MIN((4*(POS-POS16)+(POS-REFS))*4-8,127)    *
2414                      * FOR REW GAIN:  I = MIN((2*(POS-POS40)+(POS-REFS))*4-8,127)    *
2415                      * FOR LOW GAIN:                                                 *
2416                      *    200 IPS:    I = (6*(POS-POS16)+(POS-REFS))-7               *
2417                      *    75/125 IPS: I = (4*(POS-POS16)+(POS-REFS))-7               *
2418                      *                                                               *
2419                      * THIS ROUTINE IS ENTERED WITH:                                 *
2420                      *    YK=PRESENT LOOP POSITION                                   *
2421                      *    C=YK-REFS                                                  *
2422                      *    LOOPVEL=POS-POS16  (HIGH OR LOW GAIN)                      *
2423                      *        OR LOOPVEL=POS-POS40 (REWIND GAIN)                     *
2424                      *    D=VELOCITY OFFSET USED DURING THE TURNAROUND PULSE         *
2425                      *    E=FORWARD STOP REFERENCE POSITION (MUST BE NEGATIVE        *
2426                      *        FOR FILE REEL AND POSITIVE FOR MACHINE REEL)           *
2427                      *                                                               *
2428                      *---------------------------------------------------------------*
2429                      ;
2430
2431                      ;
2432
2433  0684  21 42 10       LINEAR:   LD    HL,Y+FLAGS            POINT TO THE FLAGS BYTE
2434  0687  CB 86                    RES   LIMFLG,(HL)
2435  0689  7E                       LD    A,(HL)                LOOK AT THE V200FLAG (BIT 7)
2436  068A  47                       LD    B,A                   SAVE REW'ND FLAG IN B
2437  068B  17                       RLA                         200 IPS TAPE DRIVE?
2438  068C  3A 3C 10                 LD    A,(LOOPVEL)           FETCH LOOP VELOCITY (POS-POS16)
2439  068F  30 2E                    JR    NC,LIN125             IF NOT 200 IPS, GO DO
2440                      ;                                       THE CALCULATIONS DIFFERENTLY
2441  0691  2E 44                    LD    L,.LOW.(Y+TRNFLGCT)   POINT TO THE TURN AROUND FLAG
2442  0693  CB 7E                    BIT   TRNFLAG,(HL)          IS THE TURN AROUND FLAG SET?
2443  0695  28 34                    JR    Z,MULVELL             NO, GO MULTIPLY THE VELOCITY
2444  0697  2C                       INC   L                     POINT TO THE TURN AROUND PULSE
2445
2446                      ; TURN AROUND FLAG IS SET.  IF THE TURN AROUND PULSE IS SET AND THE
2447                      ; NEW DIRECTION IS FORWARD, ADD AN OFFSET TO MAKE UP FOR SENSOR LAG
2448                      ; AND SAMPLING DELAY.  IF THE TURN AROUND PULSE IS SET AND THE NEW
2449                      ; DIRECTION IS BACKWARD, SUBTRACT THE OFFSET.
2450                      ;
2451  0698  CB 7E                    BIT   TRNPULSE,(HL)         IS THE TURN AROUND PULSE SET?
2452  069A  20 02                    JR    NZ,CKTRNDIR           YES, GO LOOK AT NEW DIRECTION
2453  069C  16 00                    LD    D,0                   NO, MAKE THE VELOCITY OFFSET 0
2454  069E  82             CKTRNDIR: ADD   A,D                   ADD THE OFFSET
2455  069F  DD CB 20 56              BIT   FORWARD,(IX+COMMAND)  IS NEW DIRECTION FORWARD?
2456  06A3  28 08                    JR    Z,MULVELH             YES, GO MULTIPLY MODIFIED VEL
2457  06A5  92                       SUB   D                     NO, NULIFY THE PREVIOUS
2458  06A6  92                       SUB   D                     ADDITION AND SUBTRACT THE
2459                      ;                                       OFFSET VALUE
2460  06A7  57                       LD    D,A                   KEEP THE VELOCITY TERM IN D
2461  06A8  7B                       LD    A,E                   NEGATE THE FORWARD REFERENCE
2462  06A9  ED 44                    NEG                         POSITION TO TURN IT INTO
2463  06AB  5F                       LD    E,A                   THE BACKWARD REF POSITION
2464  06AC  7A                       LD    A,D                   RESTORE THE VELOCITY
2465                      ;
2466
2467                      ; DURING TURNAROUND, THE VELOCITY TERM IS DOUBLED IN SIGNIFICANCE
2468                      ; UNDER THE FOLLOWING CONDITIONS:
2469                      ;   FILE REEL:
2470                      ;     BWD TO FWD TURNAROUND AND POSITIVE LOOP VELOCITY
2471                      ;     FWD TO BWD TURNAROUND AND NEGATIVE LOOP VELOCITY
2472                      ;   MACHINE REEL:
2473                      ;     BWD TO FWD TURNAROUND AND NEGATIVE LOOP VELOCITY
2474                      ;     FWD TO BWD TURNAROUND AND POSITIVE LOOP VELOCITY
2475                      ; IF THESE CONDITIONS ARE NOT MET, IT MEANS THAT THE REEL HAS
2476                      ; DECELERATED TO ZERO VELOCITY AND IS NOW BEGINNING TO MOVE IN THE
2477                      ; NEW DIRECTION.  AT THIS TIME, THE VELOCITY TERM IS MADE 1/2 AS
2478                      ; SIGNIFICANT AS NORMAL TO HELP GET THE REEL GOING IN THE NEW
2479                      ; DIRECTION A LITTLE BIT FASTER.
2480                      ;
2481                      ; THE SLOW ERROR (YK-YREFS) IS REPLACED WITH AN ERROR TERM WHICH IS
2482                      ; YK+9 FOR NEW DIRECTION=FORWARD AND YK-9 FOR NEW DIRECTION=BACKWARD.
2483                      ; THIS HAS THE EFFECT OF INSTANTLY MAKING THE LOOP POSITION REFERENCE
2484                      ; -9 IF THE NEW DIRECTION IS FORWARD AND 9 IF THE NEW DIRECTION IS
2485                      ; BACKWARD.  (ALL OF THE SIGNS ARE REVERSED DURING CALCULATION OF
2486                      ; THE MACHINE REEL CURRENT.)
2487
2488  06AD  26 3C          MULVELH:  LD    H,60                  USE HIGH LIMIT FOR VELOCITY TERM
2489  06AF  CD 64 0C                 CALL  MULTX3                MULTIPLY THE VELOCITY BY 3
2490                      ;                                       CHECKING FOR OVERFLOW
2491  06B2  57                       LD    D,A                   SAVE VELOCITY TERM IN D
2492  06B3  AB                       XOR   E                     FLIP SIGN OF VELOCITY IF FILE
2493                      ;                                       REEL AND NEW DIRECTION=FORWARD,
2494                      ;                                       OR IF MACHINE REEL AND
2495                      ;                                       NEW DIRECTION = BACKWARD
2496  06B4  7A                       LD    A,D                   RESTORE THE VELOCITY TERM
2497                      ;                                       WITHOUT AFFECTING THE SIGN BIT
2498  06B5  FC 49 0C                 CALL  M,MULTX4              IF THE SIGN BIT ENDED UP 1, THEN
```

```
2499                                                                       MULITPLY VELOCITY TERM BY 4
2500  06B8  93                 ;         SUB    E                          SUBTRACT THE NEW REF POSITION
2501  06B9  FD 4E 37                     LD     C,(IY+YK-Y)                C=YK, GO FINISH GENERATING
2502  06BC  C3 EF 06                     JP     ADDERROR                   ERROR TERM + VELOCITY TERM
2503                           ;
2504                           ; 75/125 IPS LINEAR CONTROL
2505                           ;
2506  06BF  CB 68              LIN125:   BIT    REWGAINF,B                 ARE WE IN REWIND GAIN?
2507  06C1  20 54                        JR     NZ,LINREW                  YES, MULTIPLY VELOCITY BY 2
2508  06C3  26 28                        LD     H,40                       75/125 IPS VELOCITY TERM LIMIT
2509  06C5  CD 4C 0C                     CALL   MULTX2                     MULTIPLY LOOP VELOCITY BY 4
2510  06C8  C3 EC 06                     JP     MULVEL2                    AND GO ADD THE ERROR TERM
2511                           ;
2512                           ; 200 IPS LINEAR CONTROL, NON-TURNAROUND
2513                           ;
2514  06CB  26 20              MULVELL:  LD     H,32                       THE NON-TURNAROUND LIMIT IS LOWER
2515  06CD  CB 68                        BIT    REWGAINF,B                 ARE WE IN REWIND GAIN?
2516  06CF  20 46                        JR     NZ,LINREW                  YES, MULTIPLY VELOCITY BY 2
2517  06D1  FD 46 3E                     LD     B,(IY+STEADYCT-Y)          GET STEADY STATE COUNTER
2518  06D4  05                           DEC    B                          COUNTER=1? (STEADY STATE GO?)
2519  06D5  28 45                        JR     Z,LINS                     YES, ONLY MULTIPLY VEL BY 4
2520                           ;
2521                           ; AT 200 IPS, THE VELOCITY GAIN IS NORMALLY 6.  HOWEVER, UNDER THE
2522                           ; FOLLOWING CIRCUMSTANCES, THE VELOCITY GAIN IS REDUCED TO 2.
2523                           ;  FILE REEL:
2524                           ;    FORWARD DIRECTION, POSITIVE POSITION ERROR, NEGATIVE LOOP VELOCITY
2525                           ;    BACKWARD DIRECTION, NEGATIVE POSITION ERROR, POSITIVE LOOP VELOCITY
2526                           ;  MACHINE REEL:
2527                           ;    FORWARD DIRECTION, NEGATIVE POSITION ERROR, POSITIVE LOOP VELOCITY
2528                           ;    BACKWARD DIRECTION, POSITIVE POSITION ERROR, NEGATIVE LOOP VELOCITY
2529                           ; THUS, WHEN THE LOOP IS OUTSIDE (TOWARD THE LOOPOUT HOLE) OF THE SLOW
2530                           ; REFERENCE BUT THE LOOP IS MOVING TOWARD THE MIDDLE OF THE COLUMN,
2531                           ; THE REEL CONTROL IS MADE UNDERDAMPED IN ORDER TO ENCOURAGE THE LOOP
2532                           ; TO STAY NEARER THE MIDDLE OF THE COLUMN.
2533                           ;
2534  06D7  47                           LD     B,A                        SAVE THE LOOP VELOCITY IN B
2535  06D8  A9                           XOR    C                          SAME POLARITY AS POSITION ERROR?
2536  06D9  78                           LD     A,B                        (RESTORE VELOCITY)
2537  06DA  F2 E9 06                     JP     P,MULVEL6                  YES, NORMAL VELOCITY GAIN
2538  06DD  DD CB 20 56                  BIT    FORWARD,(IX+COMMAND)       FORWARD DIRECTION?
2539  06E1  28 01                        JR     Z,MULVELA                  YES, LEAVE VELOCITY ALONE
2540  06E3  2F                           CPL                               NO, FLIP POLARITY OF VELOCITY
2541  06E4  AB                 MULVELA:  XOR    E                          IF FILE REEL, FLIP POLARITY
2542  06E5  78                           LD     A,B                        (RESTORE VELOCITY)
2543  06E6  F2 EC 06                     JP     P,MULVEL2                  IF RESULTING POLARITY IS PLUS
2544                           ;                                             THEN LOWER VELOCITY GAIN
2545  06E9  CD 64 0C           MULVEL6:  CALL   MULTX3                     MULTIPLY VELOCITY BY 6
2546  06EC  CD 4C 0C           MULVEL2:  CALL   MULTX2                     MULTIPLY BY 2
2547                           ;
2548  06EF  81                 ADDERROR: ADD    A,C                        ADD ERROR TERM TO VELOCITY TERM
2549  06F0  21 42 10                     LD     HL,Y+FLAGS                 POINT TO GAIN FLAGS
2550  06F3  FD CB 38 7E                  BIT    FILEOUT,(IY+INTCTR-Y)      FILE REEL CURRENT BEING OUTPUT?
2551  06F7  28 07                        JR     Z,CHKMLG                   NO, CHECK MACH LOW GAIN FLAG
2552  06F9  CB 5E                        BIT    LOWGAINF,(HL)              LOW GAIN INDICATOR SET?
2553  06FB  28 0C                        JR     Z,LINHGAIN                 NO, CALCULATE HIGH GAIN CURRENT
2554  06FD  C3 04 07                     JP     LINLGAIN                   YES, CALC LOW GAIN CURRENT
2555                           ;
2556  0700  CB 66              CHKMLG:   BIT    LOWGAINM,(HL)              LOW GAIN INDICATOR SET?
2557  0702  28 05                        JR     Z,LINHGAIN                 NO,CALCULATE HIGH GAIN CURRENT
2558  0704  D6 07              LINLGAIN: SUB    VACTEN                     COMPENSATE FOR VACUUM TENSION
2559  0706  C3 11 07                     JP     CHKSIGN                    AND CHECK SIGN OF RESULT
2560                           ;
2561  0709  D6 02              LINHGAIN: SUB    VACTENHG                   VACUUM TENSION TERM WILL BE 8
2562                           ;                                           AFTER THE MULTIPLICATION
2563  070B  26 7F                        LD     H,FILEMAX                  LIMIT MULTIPLICATION
2564  070D  CD 49 0C                     CALL   MULTX4                     MULTIPLY CURRENT BY 4
2565  0710  A7                           AND    A                          CHECK POLARITY OF THE CURRENT
2566                           ;
2567  0711  F0                 CHKSIGN:  RET    P                          IF POSITIVE CURRENT, RETURN
2568  0712  ED 44                        NEG                               NEGATE THE NEGATIVE CURRENT
2569  0714  F6 80                        OR     1.SHL.POLBIT               AND SET REVERSE CURRENT
2570  0716  C9                           RET
2571                           ;
2572  0717  26 14              LINREW:   LD     H,20                       H=LOOP VEL TERM LIMIT (REW GAIN)
2573  0719  C3 EC 06                     JP     MULVEL2                    MULTIPLY VELOCITY BY 2
2574                           ;
2575  071C  26 14              LINS:     LD     H,20                       H=LOOP VEL TERM LIMIT
2576  071E  CD 4C 0C                     CALL   MULTX2                     MULTIPLY LOOP VELOCITY
2577  0721  C3 EC 06                     JP     MULVEL2                    AND GO ADD THE ERROR TERM
2578                           ;
2579                           *----------------------------------------------------------------------*
2580                           *                                                                      *
2581                           *   CHECK FOR TURN AROUND DELAYS DURING NORMAL OPERAION AND            *
2582                           *   SLOW DOWN CONDITION DURING REWIND                                  *
2583                           *                                                                      *
2584                           *----------------------------------------------------------------------*
2585                           ;
2586  0724  47                 CHKSLDC:  LD     B,A                        BIT 7 OF B IS 0 IF FILE REEL
2587                           ;                                             WAS LAST OUTPUT, 1=MACH REEL
2588                                     IF     HITCHCMD
2589  0725  3A 28 20                     LD     A,(X+REELS)                IF WE ARE DOING A FWD HITCH,
2590  0728  FE ED                        CP     HITCHMOD                    THEN JUST BYPASS ALL THE
2591  072A  C8                           RET    Z                           TURNAROUND DELAY STUFF
2592                                     ENDIF
2593  072B  3A 43 10                     LD     A,(Y+FLAGSCAL)             IS CALIBRATION IN PROGRESS?
2594  072E  17                           RLA                                (CHECK BIT 7 OF FLAGSCAL)
```

```
2595  072F  D8                              RET     C                           YES, LEAVE SLDC BITS ALONE
2596  0730  3A 12 20                        LD      A,(X+VELREG)                GET THE VELOCITY BITS
2597  0733  E6 06                           AND     1.SHL.V125IPS+1.SHL.V75IPS  PUT A VALUE INTO C WHICH
2598  0735  D6 05                           SUB     1.SHL.V125IPS+1.SHL.V75IPS-1 WHEN DECREMENTED WILL BE
2599  0737  4F                              LD      C,A                         ZERO FOR A 200 IPS DRIVE
2600  0738  21 20 20                        LD      HL,X+COMMAND                POINT TO THE GO AND FWD BITS
2601  073B  7E                              LD      A,(HL)                      DESKEW THE BITS AND IGNORE
2602  073C  BE                              CP      (HL)                        ANY SPURIOUS NOISE
2603  073D  28 01                           JR      Z,GOTCMD2                   IF BOTH SAMPLES SAME, GOT COMMAND
2604  073F  7E                              LD      A,(HL)                      IF NOT, GET COMMAND NOW
2605  0740  32 46 10            GOTCMD2:    LD      (Y+DIRSAV),A                SAVE THE FORWARD BIT
2606  0743  21 44 10                        LD      HL,Y+TRNFLGCT               POINT TO THE TURN FLAG COUNTER
2607  0746  CB 4F                           BIT     GO,A                        IS GO SET?
2608  0748  CA E2 07                        JP      Z,CKRWSLDC                  YES, CHECK FOR REWIND SLDC
2609  074B  0D                              DEC     C                           IS THIS A 200 IPS DRIVE?
2610  074C  C2 D6 07                        JP      NZ,NOSLDC                   NO, RESET SLDC BITS
2611  074F  FD AE 42                        XOR     (IY+FLAGS)                  XOR THE OLD DIRECTION BIT
2612                                        ;                                   WITH NEW DIRECTION BIT
2613  0752  E6 04                           AND     1.SHL.FORWARD               HAS THE DIRECTION CHANGED?
2614  0754  28 10                           JR      Z,CHKTPCT                   NO, SAME DIRECTION AS BEFORE
2615  0756  7E                              LD      A,(HL)                      YES, A=TURNAROUND FLAG AND CTR
2616  0757  A7                              AND     A                           IS THE TURNAROUND FLAG SET?
2617  0758  20 0C                           JR      NZ,CHKTPCT                  YES, LEAVE IT SET
2618                              ; TURNAROUND DETECTED:  SET TURNAROUND FLAG AND SET HIGH GAIN
2619  075A  36 FC                           LD      (HL),-4                     SET TURNAROUND FLAG AND CTR
2620  075C  E5                              PUSH    HL                          SAVE POINTER TO TURNAROUND FLAG
2621  075D  3E 6D                           LD      A,HIGHGAIN                  A=HIGH GAIN COMMAND
2622  075F  21 32 10                        LD      HL,OLDCMD                   HL POINTS TO THE OLD GAIN COMMAND
2623  0762  CD 60 04                        CALL    SETHGAIN                    GO SET HIGH GAIN
2624  0765  E1                              POP     HL                          RESTORE POINTER TO TURN FLAG
2625                              ; INCREMENT THE TURNAROUND PULSE COUNT IF IT IS NONZERO
2626  0766  2C                  CHKTPCT:    INC     L                           HL=TRNPLSCT, TURN PULSE COUNTER
2627  0767  7E                              LD      A,(HL)                      GET THE TURNAROUND PULSE COUNTER
2628  0768  A7                              AND     A                           IS IT ZERO?
2629  0769  20 66                           JR      NZ,INCTPCT                  NO, INCREMENT THE COUNTER
2630  076B  2D                              DEC     L                           POINT TO THE TURNAROUND FLAG
2631  076C  7E                              LD      A,(HL)
2632  076D  A7                              AND     A                           IS THE FLAG ZERO?
2633  076E  28 48                           JR      Z,CANGO                     YES, ALLOW CAPSTAN MOTION
2634                                        ;
2635                                        ; THE TURN AROUND FLAG IS SET AND THE TURN AROUND PULSE IS ZERO.
2636                                        ; CALCULATE THE PREDICTED CURRENT COMMAND.
2637                                        ;
2638                                        ; FILE REEL: FWD:  POSITIVE VELOCITY OFFSET, POSITIVE TARGET POSITION
2639                                        ;            BWD:  NEGATIVE VELOCITY OFFSET, NEGATIVE TARGET POSITION
2640                                        ; MACH REEL: FWD:  NEGATIVE VELOCITY OFFSET, NEGATIVE TARGET POSITION
2641                                        ;            BWD:  POSITIVE VELOCITY OFFSET, POSITIVE TARGET POSITION
2642                                        ;
2643                                        ; IF THE PREDICTED TARGET POSITION IS POSITIVE
2644                                        ;    IF THE LOOP POSITION IS GREATER THAN (TARGET POSITION - 5)
2645                                        ;       THEN THE LOOP OVERSHOT, DON'T ALLOW CAPSTAN MOTION
2646                                        ;    ELSE NO OVERSHOOT, CALL NONLINEAR TO SEE IF WE CAN
2647                                        ;         HANDLE CAPSTAN MOTION
2648                                        ; ELSE (THE PREDICTED TARGET POSITION IN NEGATIVE)
2649                                        ;    IF THE LOOP POSITION IS LESS THAN (TARGET POSITION + 5)
2650                                        ;       THEN THE LOOP OVERSHOT, DON'T ALLOW CAPSTAN MOTION
2651                                        ;    ELSE NO OVERSHOOT, CALL NONLINEAR TO SEE IF WE CAN
2652                                        ;         HANDLE CAPSTAN MOTION
2653                                        ;
2654                                                IF      STRETCH
2655  0012                      NEWTARG:    EQU     18                          PREDICTED TARGET POSITION IF
2656                                        ;                                   THE CAPSTAN WERE TO START NOW
2657                                                ELSE
2658                              NEWTARG:  EQU     27                          PREDICTED TARGET POSITION IF
2659                                        ;                                   THE CAPSTAN WERE TO START NOW
2660                                                ENDIF
2661  0009                      VELOFFST:   EQU     9                           PREDICTED CHANGE IN LOOP VELOCITY
2662                                        ;                                   WHICH WOULD OCCUR IF THE
2663                                        ;                                   CAPSTAN WERE TO START NOW
2664                                        ;
2665  0770  3A 38 10                        LD      A,(INTCTR)                  BIT 7 = 1 FOR FILE REEL OUTPUT
2666  0773  FD CB 46 56                     BIT     FORWARD,(IY+DIRSAV)         NEW DIRECTION = FORWARD?
2667  0777  28 01                           JR      Z,PICKSIGN                  YES, LEAVE BIT 7 OF A ALONE
2668  0779  2F                              CPL                                 NO, INVERT BIT 7 OF A
2669  077A  17                  PICKSIGN:   RLA                                 WILL THE NEW TARGET POSITION
2670                                        ;                                   BE POSITIVE?
2671  077B  3A 37 10                        LD      A,(YK)                      (A=PRESENT LOOP POSITION)
2672                              ; IF FILE REEL OUTPUT AND NEW DIRCTION = FORWARD OR MACHINE REEL OUTPUT
2673                              ;    AND NEW DIRECTION = BWD, THEN USE POSITIVE TARGET POSITION AND
2674                              ;    VELOCITY OFFSET
2675  077E  38 0F                           JR      C,POSTARG
2676                              ; ELSE FILE REEL OUTPUT AND NEW DIRECTION = BACKWARD OR MACHINE REEL
2677                              ;      OUTPUT AND NEW DIRECTION = FORWARD, USE NEGATIVE TARGET POSITION
2678                              ;      AND VELOCITY OFFSET
2679  0780  06 F7                           LD      B,-VELOFFST                 B=VELOCITY OFFSET=-9
2680  0782  A7                              AND     A                           IS THE LOOP POSITION POSITIVE?
2681  0783  F2 8A 07                        JP      P,NEGTARG2                  YES, NO OVERSHOOT PROBLEM
2682  0786  FE F3                           CP      -NEWTARG+5                  IS THE LOOP POSITION BEYOND OR
2683                                        ;                                   NEAR THE TARGET POSITION?
2684  0788  38 49                           JR      C,TOOMUCH                   YES, DON'T ALLOW CAPSTAN MOTION
2685  078A  D6 EE                 NEGTARG2: SUB     -NEWTARG                    SUBTRACT THE PREDICTED TARGET
2686                                        ;                                   POSITION FROM THE LOOP POSITION
2687  078C  C3 9B 07                        JP      CKSIGN                      GO FIND ABSOLUTE VALUE
2688                                        ;
```

| | | | | | | |
|---|---|---|---|---|---|---|
| 2689 | 078F | 06 09 | POSTARG: | LD | B,VELOFFST | B=VELOCITY OFFSET=9 |
| 2690 | 0791 | A7 | | AND | A | IS THE LOOP POSITION NEGATIVE? |
| 2691 | 0792 | FA 99 07 | | JP | M,POSTARG2 | YES, NO OVERSHOOT PROBLEM |
| 2692 | 0795 | FE OD | | CP | NEWTARG-5 | IS THE LOOP POSITION BEYOND OR |
| 2693 | | | ; | | | NEAR THE TARGET POSITION? |
| 2694 | 0797 | 30 3A | | JR | NC,TOOMUCH | YES, DON'T ALLOW CAPSTAN MOTION |
| 2695 | 0799 | D6 12 | POSTARG2: | SUB | NEWTARG | SUBTRACT THE PREDICTED TARGET |
| 2696 | | | ; | | | POSITION FROM THE LOOP POSITION |
| 2697 | 079B | F2 A0 07 | CKSIGN: | JP | P,SAVERROR | AND STORE THE ABSOLUTE |
| 2698 | 079E | ED 44 | | NEG | | VALUE OF THE LOOP POSITION |
| 2699 | 07A0 | 57 | SAVERROR: | LD | D,A | ERROR IN D |
| 2700 | | | ; | | | |
| 2701 | 07A1 | 3A 3C 10 | | LD | A,(LOOPVEL) | A=LOOP VELOCITY |
| 2702 | 07A4 | 80 | | ADD | A,B | B=PREDICTED LOOP VEL + FF |
| 2703 | 07A5 | 47 | | LD | B,A | |
| 2704 | 07A6 | CD 4B 06 | | CALL | NONLIN | CALCULATE THE PREDICTED CURRENT |
| 2705 | | | ; | | | COMMAND IN NONLINEAR MODE |
| 2706 | 07A9 | E6 7F | | AND | 0FFH-(1.SHL.POLBIT) | STRIP OFF THE POLARITY BIT |
| 2707 | 07AB | 21 44 10 | | LD | HL,Y+TRNFLGCT | POINT TO THE TURNAROUND COUNTER |
| 2708 | 07AE | FE 7F | | CP | TRNMAX | CURRENT ABOVE ALLOWED MAXIMUM? |
| 2709 | 07B0 | 30 21 | | JR | NC,TOOMUCH | YES, RELOAD TURNAROUND COUNTER |
| 2710 | 07B2 | 7E | | LD | A,(HL) | A=TURN AROUND COUNTER |
| 2711 | 07B3 | A7 | | AND | A | IS IT ZERO? |
| 2712 | 07B4 | 28 02 | | JR | Z,CANGO | YES, ALLOW CAPSTAN TO GO |
| 2713 | 07B6 | 34 | | INC | (HL) | NO, INCREMENT TURNAROUND COUNT |
| 2714 | 07B7 | C0 | | RET | NZ | IF ZERO ALLOW CAPSTAN TO GO |
| 2715 | | | ; | | | ELSE, RETURN |
| 2716 | | | ; | | | |
| 2717 | | | ; THE PREDICTED CURRENT VALUE FOR BOTH REELS HAS BEEN ACCEPTABLE FOR | | | |
| 2718 | | | ; TWO CALCULATIONS IN A ROW SO RESET THE APPROPRIATE SLOW DOWN | | | |
| 2719 | | | ; CONDITION BIT TO ALLOW THE CAPSTAN TO GO. | | | |
| 2720 | | | ; | | | |
| 2721 | 07B8 | 3A 46 10 | CANGO: | LD | A,(Y+DIRSAV) | GET THE FORWARD BIT |
| 2722 | 07BB | E6 04 | | AND | 1.SHL.FORWARD | NEW DIRECTION=FORWARD? |
| 2723 | 07BD | 47 | | LD | B,A | SAVE THE FORWARD BIT IN B |
| 2724 | 07BE | 21 10 20 | | LD | HL,X+REGO | POINT TO THE SLDC BITS |
| 2725 | 07C1 | 3E 01 | | LD | A,1.SHL.SLDCFWD | GET READY TO CLEAR THE FORWARD |
| 2726 | | | ; | | | SLOW DOWN CONDITION BIT |
| 2727 | 07C3 | 28 01 | | JR | Z,SETBIT | IF FORWARD, CLEAR FWD SLDC BIT |
| 2728 | 07C5 | 87 | | ADD | A,A | A=1.SHL.SLDCBWD |
| 2729 | 07C6 | B6 | SETBIT: | OR | (HL) | SET THE APPROPRIATE BIT |
| 2730 | 07C7 | 77 | | LD | (HL),A | (SLDC BITS ARE ACTIVE LOW) |
| 2731 | 07C8 | 21 42 10 | | LD | HL,Y+FLAGS | POINT TO THE OLD DIRECTION BIT |
| 2732 | 07CB | 7E | | LD | A,(HL) | READ THE FLAG BITS |
| 2733 | 07CC | E6 FB | | AND | 0FFH-1.SHL.OLDDIR | AND STRIP OUT OLD DIR BIT |
| 2734 | 07CE | B0 | | OR | B | PUT THE NEW DIRECTION IN OLDDIR |
| 2735 | 07CF | 77 | | LD | (HL),A | (OLDDIR AND FORWARD MUST |
| 2736 | | | ; | | | OCCUPY THE SAME BIT POSITION) |
| 2737 | 07D0 | C9 | | RET | | |
| 2738 | | | ; | | | |
| 2739 | 07D1 | 34 | INCTPCT: | INC | (HL) | INCREMENT THE TURNAROUND PULSE |
| 2740 | 07D2 | C9 | | RET | | ; COUNTER AND RETURN |
| 2741 | | | ; | | | |
| 2742 | | | ; REINITIALIZE THE TURNAROUND COUNTER SO THAT A MINIMUM OF TWO SAMPLES | | | |
| 2743 | | | ; OF ACCEPTABLE CURRENT MUST BE SEEN BEFORE ALLOWING CAPSTAN GO. | | | |
| 2744 | 07D3 | 36 FC | TOOMUCH: | LD | (HL),-4 | TRNFLGCT=-4 |
| 2745 | 07D5 | C9 | | RET | | |
| 2746 | | | ; | | | |
| 2747 | | | ; FOR NON-REWIND OPERATION AT 75/125 IPS, MAKE SURE THE TURNAROUND | | | |
| 2748 | | | ; FLAG IS CLEAR AND THE SLOWDOWN CONDITION BITS ARE CLEAR BECAUSE | | | |
| 2749 | | | ; THERE ARE NO TURNAROUND DELAYS AT 75/125 IPS. | | | |
| 2750 | | | ; | | | |
| 2751 | 07D6 | FD 36 44 00 | NOSLDC: | LD | (IY+TRNFLGCT),0 | CLEAR THE TURNAROUND FLAG |
| 2752 | 07DA | 21 10 20 | NOSLDC2: | LD | HL,X+REGO | MAKE SURE THE TURNAROUND |
| 2753 | 07DD | 7E | | LD | A,(HL) | FLAG BITS ARE CLEAR SO |
| 2754 | 07DE | F6 03 | | OR | 1.SHL.SLDCFWD+1.SHL.SLDCBWD | THERE WILL BE NO |
| 2755 | 07E0 | 77 | | LD | (HL),A | TURNAROUND DELAY |
| 2756 | 07E1 | C9 | | RET | | |
| 2757 | | | ; | | | |
| 2758 | | | ; CHECK FOR SLOW DOWN CONDITION DURING A REWIND COMMAND | | | |
| 2759 | | | ; | | | |
| 2760 | 07E2 | 36 00 | CKRWSLDC: | LD | (HL),0 | MAKE SURE THE TURNAROUND |
| 2761 | | | ; | | | FLAG IS CLEAR |
| 2762 | 07E4 | FD CB 42 6E | | BIT | REWGAINF,(IY+FLAGS) | ARE WE IN REWIND GAIN? |
| 2763 | 07E8 | 20 06 | | JR | NZ,TSTRWCUR | YES, GO CHECK THE CURRENT CMD |
| 2764 | 07EA | 0D | | DEC | C | IS THIS A 200 IPS DRIVE? |
| 2765 | 07EB | 20 ED | | JR | NZ,NOSLDC2 | NO, GO MAKE SURE THE |
| 2766 | | | ; | | | TURNAROUND FLAGS ARE CLEAR |
| 2767 | 07ED | C3 B8 07 | | JP | CANGO | YES, GO TAKE CARE OF THE |
| 2768 | | | ; | | | POSSIBILITY THAT GO WAS SET |
| 2769 | | | ; | | | BEFORE THE TURNAROUND DELAY |
| 2770 | | | ; | | | EXPIRED |
| 2771 | 07F0 | 21 39 10 | TSTRWCUR: | LD | HL,REWDLYCT | POINT TO THE DELAY COUNTER |
| 2772 | 07F3 | CB 78 | | BIT | 7,B | MACHINE REEL OUTPUT LAST TIME? |
| 2773 | 07F5 | 20 12 | | JR | NZ,TSTRWPOS | YES, LOOK AT MACH LOOP POSITION |
| 2774 | 07F7 | 3A 08 20 | | LD | A,(X+FILEMOT) | GET LAST FILE CURRENT COMMAND |
| 2775 | 07FA | A7 | | AND | A | FORWARD ACCELERATION CURRENT? |
| 2776 | 07FB | FA 1B 08 | | JP | M,REWCUROK | YES, NOT SLOW DOWN CONDITION |
| 2777 | 07FE | FE 49 | | CP | IMAXREW+1 | MORE THAN ALLOWED REWIND CURRENT? |
| 2778 | 0800 | 38 19 | | JR | C,REWCUROK | NO, NOT SLOW DOWN CONDITION |
| 2779 | 0802 | 36 03 | | LD | (HL),3 | RELOAD THE DELAY-BEFORE-RESETTING |
| 2780 | | | ; | | | SLOW-DOWN-CONDITION COUNTER |
| 2781 | 0804 | DD CB 10 86 | | RES | SLDCFILE,(IX+REGO) | SET FILE REEL SLOW DOWN CONDITION |
| 2782 | | | | IF | DEBUG1 | SIGNAL SLOW DOWN CONDITION IN LED |

```
2783                                   SET     FILEHIGH,(IX+REG1)      TURN ON UPPER LED, FILE REEL
2784                                   ENDIF
2785   0808  C9                        RET
2786                          ;
2787   0809  3A 47 10   TSTRWPOS: LD    A,(CALERR)              GET MOST RECENT POS-SREF VALUE
2788   080C  A7                        AND     A                       IS LOOP ABOVE REFERENCE
2789   080D  FA 1B 08                  JP      M,REWCUROK               YES, NO SLOW DOWN CONDITION
2790   0810  FE 0D                     CP      MAXREWER+1              IS LOOP TOO FAR BELOW REFERENCE?
2791   0812  38 07                     JR      C,REWCUROK               NO, NO SLOW DOWN CONDITION
2792   0814  36 03                     LD      (HL),3                  RELOAD THE DELAY-BEFORE-RESETTING
2793                          ;                                          SLOW-DOWN-CONDITION COUNTER
2794   0816  DD CB 10 8E               RES     SLDCMACH,(IX+REG0)      SET MACH REEL SLOW DOWN CONDITION
2795                                   IF      DEBUG1                  SIGNAL SLOW DOWN CONDITION IN LED
2796                                   SET     MACHHIGH,(IX+REG1)      TURN ON UPPER LED, MACHINE REEL
2797                                   ENDIF
2798   081A  C9                        RET
2799
2800                          ;  THE REWIND CURRENT FOR THIS REEL IS WITHIN BOUNDS.  IF THE REWIND
2801                          ;  CURRENT FOR BOTH REELS HAS BEEN WITHIN BOUNDS FOR TWO SAMPLES IN A
2802                          ;  ROW, THEN RESET THE APPROPRIATE SLOW DOWN CONDITION BIT.
2803                          ;
2804   081B  7E         REWCUROK: LD    A,(HL)                  GET THE DELAY COUNTER
2805   081C  D6 01                     SUB     1                       IS THE COUNTER ZERO?
2806   081E  38 02                     JR      C,RSTSLDC                YES, RESET SLOW DOWN CONDITION
2807   0820  77                        LD      (HL),A                   NO, DECREMENT THE COUNTER
2808   0821  C9                        RET
2809                          ;
2810   0822  21 10 20   RSTSLDC:  LD    HL,X+REG0               POINT TO SLDC BITS
2811   0825  3E 01                     LD      A,1.SHL.SLDCFILE        PREPARE TO CLEAR FILE SLDC
2812   0827  CB 78                     BIT     7,B                     WAS FILE CURRENT OUTUT LAST TIME?
2813   0829  28 01                     JR      Z,SETBIT2                YES, RESET FILE SLDC
2814   082B  87                        ADD     A,A                      NO, A=1.SHL.SLDCMACH
2815                                   IF      DEBUG1                  PUT SLOW DOWN CONDITION IN LED'S
2816                          SETBIT2: LD     C,A                      SAVE THE BIT IN C
2817                                   OR      (HL)                    CLEAR THE APPROPRIATE SLDC BIT
2818                                   LD      (HL),A                   (THE BITS ARE ACTIVE LOW)
2819                                   INC     L                       POINT TO REG1
2820                                   LD      A,C                     GET SLDC BIT WHICH WAS CLEARED
2821                                   RRCA                            MOVE BITS 1,0 TO BITS 7,6
2822                                   RRCA
2823                                   OR      0FFH-1.SHL.FILEHIGH-1.SHL.MACHHIGH  SET OTHER BITS
2824                                   AND     (HL)                    ZERO APPROPRIATE LED BIT
2825                                   LD      (HL),A
2826                                   RET
2827                                   ELSE                            NORMAL CODE
2828   082C  B6         SETBIT2:  OR    (HL)                    CLEAR THE APPROPRIATE SLDC BIT
2829   082D  77                        LD      (HL),A                   (THE BITS ARE ACTIVE LOW)
2830   082E  C9                        RET
2831                                   ENDIF
2832
2833                                   IF      DEBUG3
2834                          MMAXADJ:  LD     A,0FFH                  OVERFLOW, USE MAXIMUM VALUE
2835                                   JR      OUTM11
2836                                   ENDIF
2837                          ;
2838                          *=======================================*
2839                          *       MACHINE REEL OUTPUT
2840                          *=======================================*
2841                          ;
2842                          ;------ MACH COL SENSOR READING --------
2843                          ;
2844   082F              OUTMACH:
2845                                   IF      DEBUG3.EQ.0
2846   082F  3A 36 10                  LD      A,(MMIDDLE)             GET THE MID-COLUMN SENSOR READING
2847   0832  57                        LD      D,A
2848                                   ENDIF
2849   0833  DD CB 20 5E               BIT     EOC,(IX+EOCBYTE)        END OF CONVERSION?
2850   0837  C2 4B 08                  JP      NZ,OUTMACH1              YES, GO READ VALUE
2851   083A  CD B4 0C                  CALL    EOCWAIT                 WAIT FOR END OF CONVERSION
2852   083D  20 0C                     JR      NZ,OUTMACH1             IF DONE, GO READ VALUE
2853   083F  D2 84 04                  JP      NC,EXITSERV             IF REELS ENABLED DROPPED, EXIT
2854   0842  32 05 20                  LD      (X+MCOLSEN),A           ADC ERROR, TRY TO RESTART IT
2855   0845  CD CF 0C                  CALL    EOCRETRY                WAIT FOR ADC DONE, HALT IF ERROR
2856   0848  CA 84 04                  JP      Z,EXITSERV              IF REELS ENABLED DROPPED, EXIT
2857   084B  3A 05 20   OUTMACH1: LD    A,(X+MCOLSEN)           INPUT MACH COLUMN SENSOR READING
2858                                   IF      DEBUG3                  GENERATE ADJUSTED SENSOR READING
2859                                   PUSH    AF                      SAVE RAW COLUMN SENSOR READING
2860                                   LD      DE,(MVACFACT)           E=VACUUM ADJUSTMENT FACTOR
2861                          ;                                        D=MMIDDLE, MACHINE MIDPOINT
2862                                   INC     E                       IS THE ADJUSTMENT FACTOR
2863                                   DEC     E                        EQUAL TO ZERO?
2864                                   JR      Z,OUTM11                 YES, DON'T NEED TO ADJUST
2865                                   LD      HL,MATMOSPH             POINT TO ATMOSPHERIC READING
2866                                   SUB     (HL)
2867                                   LD      C,A                     C=COLSEN-ATMOSPH
2868                                   LD      H,E                     H=ADJUSTMENT FACTOR
2869                                   CALL    MULTIPLY                HL = H * C
2870                                   ADD     HL,HL                   MULTIPLY THE RESULT BY 4
2871                                   JR      C,MMAXADJ                 CHECKING FOR OVERFLOW
2872                                   ADD     HL,HL
2873                                   JR      C,MMAXADJ
2874                                   LD      A,(MATMOSPH)            GET ATMOSPHERIC READING IN A
2875                                   RL      L                       SET UP CARRY BIT FOR ROUNDING
2876                                   ADC     A,H                     ADD ATMOSPHERIC BACK INTO THE
```

```
2877                                                             HIGH BYTE OF THE RESULT
2878             ;                                                 (IN EFFECT, RESULT/256)
2879             OUTM11:    SUB    D                             SUBTRACT THE ZERO POINT
2880                        LD     (YKA),A                       SAVE ADJUSTED LOOP POSITION
2881                        POP    AF                            RESTORE RAW SENSOR READING
2882                        ENDIF
2883                        IF     STRETCH3                      ADJUST IF LOW COLUMN VACUUM
2884  084E  DD CB 0A 66     BIT    LOWVAC,(IX+CONTROL)           IS COLUMN VACUUM ABNORMALLY LOW?
2885  0852  CA 73 08        JP     Z,OUTM15                      NO, DON'T ADJUST SENSOR READING
2886                        IF     STRETCH4
2887  0855  FD CB 43 7E     BIT    CALIBFLG,(IY+FLAGSCAL)        ARE WE IN CALIBRATE MODE?
2888  0859  20 18           JR     NZ,OUTM15                     YES, DON'T ADJUST SENSOR READING
2889                        ENDIF
2890  085B  47              LD     B,A                           SAVE COLUMN SENSOR READING IN A
2891  085C  3A 2A 10        LD     A,(MACHREFS+1)                GET PRESENT SLOW REFERENCE
2892  085F  A7              AND    A                             IS REF BELOW MIDDLE OF COLUMN?
2893  0860  F2 67 08        JP     P,MODM                        YES, ADJUST THE SENSOR READING
2894  0863  FE F8           CP     -8                            IS THE REF ABOVE -8 COUNTS
2895  0865  38 0B           JR     C,OUTM14                      YES, DON'T ADJUST SENSOR READING
2896             ;
2897             ; LOW COLUMN VACUUM HAS BEEN DETECTED. ASSUME COLUMN VACUUM IS 2/3
2898             ; OF NORMAL AND ADJUST THE MEASURED LOOP POSITION TO MAKE UP FOR
2899             ; LOW COLUMN VACUUM:
2900             ;    ADJUSTED COUNT = ATMOSPH + 1.5*(MEASURED COUNT - ATMOSPH)
2901             ;
2902  0867  78              MODM:  LD     A,B                    RESTORE COLUMN SENSOR READING
2903  0868  21 4D 10               LD     HL,MATMOSPH            POINT TO ATMOSPHERIC READING
2904  086B  96                     SUB    (HL)                   A=(MEASURED - ATMOSPH)
2905  086C  47                     LD     B,A                    MULTIPLY
2906  086D  CB 3F                  SRL    A                        (MEASURED - ATMOSPH)
2907  086F  80                     ADD    A,B                      BY 1.5
2908  0870  86                     ADD    A,(HL)                 A=ATMOSPH+1.5(MEASURED-ATMOSPH)
2909  0871  47                     LD     B,A                    STORE RESULT IN B TEMPORARILY
2910  0872  78              OUTM14: LD    A,B                    PUT (ADJUSTED) SENSOR IN A
2911  0873            OUTM15:
2912                        ENDIF
2913  0873  92              SUB    D                             REFERENCE POSITION TO MIDDLE
2914  0874  57              LD     D,A                           D=LOOP POSITION (MIDDLE=0,
2915             ;                                                 TOP NEGATIVE, BOTTOM POSITIVE)
2916  0875  32 37 10        LD     (YK),A                        SAVE LOOP POSITION IN YK
2917                        IF     DEBUG1                        ;/DEBUG CODE
2918                        BIT    REWGAINF,(IY+FLAGS)           ;/ARE WE IN REWIND GAIN?
2919                        JR     NZ,JUNK2                      ;/ YES, REWIND CODE HANDLES LED'S
2920                        AND    A                             ;/CHECK SIGN OF LOOP POSITION
2921                        LD     HL,X+REG1                     ;/DEBUG CODE:  POINT TO LED'S
2922                        RES    MACHHIGH,(HL)                 ;/SAY THAT MACH LOOP IS BELOW
2923                                                             ;/ THE CALIBRATED MIDPOINT
2924                        JP     P,JUNK2                       ;/IS LOOP ABOVE MIDPOINT?
2925                        SET    MACHHIGH,(HL)                 ;/ YES, OH WELL, NEVER MIND
2926             JUNK2:                                           ;/ NO, LEAVE BIT CLEAR
2927                        ENDIF                                ;/
2928  0878  2A 30 10        LD     HL,(MLIM-1)                   SET LIMFLG IF LOOP POSITION IS
2929  087B  CD 79 0C        CALL   LIMTST                          OUTSIDE LIMITS
2930  087E  21 09 10        LD     HL,MPOS16                     POINT TO OLD LOOP POSITION
2931  0881  FD CB 42 6E     BIT    REWGAINF,(IY+FLAGS)           REWIND GAIN?
2932  0885  28 02           JR     Z,CALVELM                     NO, GO CALCULATE LOOP VELOCITY
2933  0887  2E 0C           LD     L,.LOW.MPOS40                 YES, CALCULATE THE LOOP VELOCITY
2934                                                               OVER A LONGER PERIOD OF TIME
2935  0889  96              CALVELM: SUB  (HL)                   A=NEW POSITION - OLD POSITION
2936                        IF     CALMOD1
2937  088A  2E 3B           LD     L,.LOW.PREDVELM               SUBTRACT THE PREDICTED LOOP VEL
2938  088C  96              SUB    (HL)                            FROM THE ACTUAL LOOP VELOCITY
2939                        ENDIF
2940  088D  32 3C 10        LD     (LOOPVEL),A                   SAVE THE LOOP VELOCITY
2941  0890  47              LD     B,A                           B=LOOP VELOCITY
2942             ;                                               SHIFT THE POSITION FIFO
2943  0891  2A 0A 10        LD     HL,(MPOS24)                   L=MPOS24, H=MPOS32
2944  0894  22 0B 10        LD     (MPOS32),HL                   MPOS32=L, MPOS40=H
2945  0897  2A 08 10        LD     HL,(MPOS8)                    L=MPOS8, H=MPOS16
2946  089A  22 09 10        LD     (MPOS16),HL                   MPOS16=L, MPOS24=H
2947  089D  7A              LD     A,D                           THE PRESENT POSITION WILL BE
2948  089E  32 08 10        LD     (MPOS8),A                       8 MS OLD NEXT TIME THROUGH
2949             ;
2950  08A1  3A 2A 10        LD     A,(MACHREFS+1)                GET THE SLOW REFERENCE
2951  08A4  5F              LD     E,A                             AND SAVE IT IN E
2952  08A5  21 0F 10        LD     HL,MREFS8                     POINT TO THE OLD SLOW REFERENCE
2953  08A8  96              SUB    (HL)                          PUT THE ABSOLUTE VALUE OF THE
2954  08A9  F2 AE 08        JP     P,OUTMACH2                      DIFFERENCE BETWEEN THE PREVIOUS
2955  08AC  ED 44           NEG                                    SLOW REFERENCE AND THE PRESENT
2956  08AE  F5              OUTMACH2: PUSH AF                      SLOW REFERENCE ON THE STACK
2957  08AF  73              LD     (HL),E                        SAVE VALUE FOR USE NEXT TIME
2958             ;
2959  08B0  3A 22 10        LD     A,(MACHREF+1)                 GET THE PRESENT REFERENCE VALUE
2960  08B3  5F              LD     E,A                             AND SAVE IT IN E
2961             ;                                               SHIFT THE REFERENCE FIFO
2962  08B4  21 0D 10        LD     HL,MREF8                      POINT TO THE REFERENCE FILTER
2963  08B7  7E              LD     A,(HL)                        A=REF8
2964  08B8  73              LD     (HL),E                        THE CURRENT REFERENCE WILL BE
2965  08B9  2C              INC    L                               8 MS OLD THE NEXT TIME THROUGH
2966  08BA  77              LD     (HL),A                        REF16=A
2967                                                             (THE REFERENCE IS INVERTED
2968             ;                                                 FOR THIS COLUMN)
2969  08BB  7A              LD     A,D                           A=PRESENT POSITION
2970  08BC  2E 2A           LD     L,.LOW.(MACHREFS+1)           POINT TO SLOW REFERENCE VALUE
2971  08BE  96              SUB    (HL)                          C=A=PRESENT POSITION - SLOW REF
2972  08BF  4F              LD     C,A
```

```
2973  08C0  32 47 10              LD     (CALERR),A              SAVE POSITION ERROR FOR CALIBRATE
2974                               ;
2975  08C3  7A                    LD     A,D                     FETCH PRESENT POSITION
2976  08C4  93                    SUB    E                       ERROR=POSITION-YREF(K)
2977  08C5  2E 42                 LD     L,.LOW.(Y+FLAGS)        POINT TO THE POLARITY FLAG
2978  08C7  CB CE                 SET    POLFLAG,(HL)            IF ERROR IS POSITIVE,
2979  08C9  F2 D0 08               JP     P,OUTMACH4                THEN SET ERROR POLARITY FLAG
2980  08CC  CB 8E                 RES    POLFLAG,(HL)            ELSE RESET ERROR POLARITY FLAG
2981  08CE  ED 44                 NEG
2982                               ;
2983  08D0  67            OUTMACH4: LD   H,A                     H=MAGNITUDE OF THE DIFFERENCE
2984                                                               BETWEEN THE TARGET LOOP
2985                               ;                               POSITION AND THE ACTUAL
2986                               ;                               LOOP POSITION
2987  ;************************************************************************
2988  *                                                                        *
2989  *        CHOOSE BETWEEN THE LINEAR AND THE NONLINEAR ALGORITHM           *
2990  *                                                                        *
2991  ;************************************************************************
2992                               ;
2993  08D1  F1                    POP    AF                      IF AMOUNT SLOW REF HAS MOVED
2994  08D2  FE 02                 CP     2                         DURING LAST 8 MS IS LESS THAN
2995  08D4  38 41                 JR     C,MLINEAR                 2, USE LINEAR ALGORITHM
2996  08D6  FD CB 43 76           BIT    CALRGMM,(IY+FLAGSCAL)   IF CALIBRATE CODE IS HANDLING REF
2997  08DA  20 48                 JR     NZ,MLINCAL                GENERATION, USE LINEAR
2998  08DC  FD CB 44 7E           BIT    TRNFLAG,(IY+TRNFLGCT)   IS THE TURN AROUND FLAG SET
2999  08E0  20 35                 JR     NZ,MLINEAR                YES, USE LINEAR ALGORITHM
3000  08E2  7C                    LD     A,H                     A=IABS(POS-REF)
3001  08E3  FE 09                 CP     9                       POSITION NEAR FAST REFERENCE?
3002  08E5  38 30                 JR     C,MLINEAR                 YES, USE LINEAR ALGORITHM
3003  08E7  3A 42 10              LD     A,(Y+FLAGS)             GET THE FLAGS BYTE
3004  08EA  6F                    LD     L,A                       AND SAVE IT IN L
3005  08EB  E6 20                 AND    1.SHL.REWGAINF          REWIND GAIN?
3006  08ED  20 28                 JR     NZ,MLINEAR                YES, USE LINEAR ALGORITHM
3007  08EF  3A 2A 10              LD     A,(MACHREFS+1)          GET THE ABSOLUTE VALUE OF THE
3008  08F2  93                    SUB    E                         DIFFERENCE BETWEEN THE FAST
3009  08F3  F2 F8 08              JP     P,CPLNEAR4                AND SLOW REFERENCES
3010  08F6  ED 44                 NEG
3011  08F8  FE 11         CPLNEAR4: CP    17                     IF IT IS LESS THAN 17
3012  08FA  38 1B                 JR     C,MLINEAR                 THEN USE LINEAR ALGORITHM
3013  08FC  78                    LD     A,B                     A=LOOP VELOCITY+FEED FORWARD
3014  08FD  CB 4D                 BIT    POLFLAG,L               IS THE DIFFERENCE BETWEEN ACTUAL
3015                                                               POSITION AND TARGET POSITION
3016                               ;                               POSITIVE? (IS THE LOOP BELOW
3017                               ;                               THE TARGET?)
3018  08FF  28 69                 JR     Z,OUTMACHG              NO, LOOK FOR OVERSHOOT ABOVE REF
3019  0901  A7                    AND    A                       IF (LOOP VELOCITY+FEED FWD)>-3
3020  0902  F2 17 09              JP     P,MLINEAR                 THEN THE LOOP HAS PROBABLY
3021  0905  FE FE                 CP     -2                        OVERSHOT THE TARGET POSITION
3022  0907  30 0E                 JR     NC,MLINEAR                SO USE THE LINEAR ALGORITHM
3023                               ;
3024  0909  CB 45         OUTMACH5: BIT  LIMFLG,L                LIMIT FLAG ON? LOOP OVERSHOT?
3025  090B  20 0A                 JR     NZ,MLINEAR                YES, USE LINEAR ALGORITHM
3026  090D  DD CB 20 4E           BIT    GO,(IX+COMMAND)         CAPSTAN GO?
3027  0911  28 17                 JR     Z,MNONLIN                 YES, USE NONLINEAR ALGORITHM
3028  0913  CB 65                 BIT    LOWGAINM,L              LOW GAIN MODE?
3029  0915  28 13                 JR     Z,MNONLIN                 NO, USE NONLINEAR ALGORITHM
3030                               ;
3031                               ;
3032  0917  DD CB 11 8E   MLINEAR: RES   MNONLINB,(IX+REG1)      RESET NON-LINEAR INDICATOR
3033  091B  11 09 F2              LD     DE,VELOFFM.SHL.8+FWDSRPM LOAD UP TURNAROUND VALUES
3034  091E  CD 84 06              CALL   LINEAR                  GO CALCULATE CURRENT
3035  0921  C3 32 09              JP     OUTMCUR                 AND OUTPUT THE CURRENT COMMAND
3036                               ;
3037  0924  FD 36 3E 01   MLINCAL: LD    (IY+STEADYCT-Y),1       INDICATE STEADY STATE OPERATION
3038  0928  18 ED                 JR     MLINEAR                   TO FORCE LOWER VELOCITY GAIN
3039                               ;
3040                               ;
3041  092A  DD CB 11 CE   MNONLIN: SET   MNONLINB,(IX+REG1)      SET NONLINEAR MODE INDICATOR
3042  092E  54                    LD     D,H                     D=IABS(FCOLSEN-YREF)
3043  092F  CD 4B 06              CALL   NONLIN                  CALCULATE CURRENT VALUE
3044                               ;
3045                               ;
3046  0932  4F            OUTMCUR: LD    C,A                     SAVE THE CURRENT CMD IN C
3047  0933  17                    RLA                            REVERSE CURRENT?
3048  0934  30 0D                 JR     NC,NOBRAKEM               YES, DON'T FORCE DYNAMIC BRAKE
3049  0936  FD CB 42 6E           BIT    REWGAINF,(IY+FLAGS)     REWIND MODE?
3050  093A  28 07                 JR     Z,NOBRAKEM                YES, DON'T FORCE DYNAMIC BRAKE
3051  093C  DD CB 0A 9E           RES    MBRAKE,(IX+CONTROL)     NO, FORWARD CURRENT DURING
3052                               ;                               REWIND: FORCE DYNAMIC BRAKE
3053  0940  C3 47 09              JP     CHKCALM                 GO LOOK AT CALIBRATION FLAG
3054                               ;
3055  0943  DD CB 0A DE   NOBRAKEM: SET  MBRAKE,(IX+CONTROL)     DON'T FORCE DYNAMIC BRAKE
3056                               ;
3057  0947  3A 43 10      CHKCALM: LD    A,(Y+FLAGSCAL)          IS CALIBRATION IN PROGRESS?
3058  094A  17                    RLA                              (CHECK BIT 7 OF FLAGSCAL)
3059  094B  DC 75 09              CALL   C,CALIBRM                 YES, DO CALIBRATION COMMAND
3060  094E  21 09 20              LD     HL,X+MACHMOT            POINT TO THE CURRENT COMMAND
3061  0951  7E                    LD     A,(HL)                  GET LAST CURRENT VALUE
3062  0952  A9                    XOR    C                       IS THE POLARITY DIFFERENT?
3063  0953  F2 66 09              JP     P,OUTMCUR2              NO, GO OUTPUT THE CURRENT
3064  0956  DD CB 0A D6           SET    MREELENB,(IX+CONTROL)   DISABLE THE POWER AMPLIFIER
3065  095A  06 02                 LD     B,CURTADLY              DELAY FOR THE TRANSISTORS
3066  095C  10 FE                 DJNZ   $                         TO TURN OFF
3067  095E  71                    LD     (HL),C                  OUTPUT THE NEW CURRENT VALUE
```

```
3068  095F  DD CB 0A 96              RES      MREELENB,(IX+CONTROL)  TURN THE POWER AMP BACK ON
3069                                  IF       DEBUG2
3070                                  JR       OUTMCUR3              GO SAVE TRACE INFORMATION
3071                                  ELSE
3072  0963  C3 00 04                  JP       SRVMOT9               GO WAIT FOR NEXT MILLISECOND
3073                                  ENDIF
3074                         ;
3075  0966  71              OUTMCUR2: LD       (HL),C                OUTPUT CURRENT TO MACH MOTOR
3076                                  IF       DEBUG2
3077                                  JR       OUTMCUR3              GO SAVE TRACE INFORMATION
3078                                  ELSE
3079  0967  C3 00 04                  JP       SRVMOT9               GO WAIT FOR NEXT MILLISECOND
3080                                  ENDIF
3081                         ;
3082  096A  A7              OUTMACHG: AND      A                     IF (LOOP VELOCITY+FEED FWD)<3
3083  096B  FA 17 09                  JP       M,MLINEAR                 THEN USE THE LINEAR ALGORITHM
3084  096E  FE 03                     CP       3
3085  0970  30 97                     JR       NC,OUTMACH5
3086  0972  C3 17 09                  JP       MLINEAR
3087                         ;
3088                                  IF       DEBUG2                SAVE TRACE INFORMATION
3089                         OUTMCUR3: LD       HL,(MACHPT)
3090                                  LD       (HL),C                SAVE CURRENT COMMAND
3091                                  INC      L
3092                                  LD       A,(YK)
3093                                  LD       (HL),A                SAVE LOOP POSITION
3094                                  INC      L
3095                                  LD       A,(MACHREFS+1)
3096                                  LD       (HL),A                SAVE SLOW REFERENCE VALUE
3097                                  INC      L
3098                                  LD       A,(X+REG0)            GET THE SLOW DOWN CONDITION BITS
3099                                  RRCA                               AND MOVE THEM INTO
3100                                  RRCA                               BITS 6 AND 7
3101                                  AND      0C0H                  STRIP OFF OTHER BITS
3102                                  LD       B,A
3103                                  LD       A,(X+REELS)           GET THE GAIN OR CALIBRATION CMD
3104                                  AND      3FH                   RESET UPPER TWO BITS
3105                                  OR       B                     COMBINE WITH SLDC BITS
3106                                  LD       (HL),A                SAVE SLDC BITS AND COMMAND
3107                                  IF       DEBUG3                SAVE ADJUSTED LOOP POSITION
3108                                  INC      L
3109                                  LD       A,(MACHREF+1)
3110                                  LD       (HL),A                SAVE FAST REFERENCE POSITION
3111                                  INC      L
3112                                  LD       A,(MVACFACT)
3113                                  LD       (HL),A                SAVE VACUUM ADJUSTMENT FACTOR
3114                                  INC      L
3115                                  LD       A,(YKA)
3116                                  LD       (HL),A                SAVE ADJUSTED LOOP POSITION
3117                                  INC      L
3118                                  LD       A,(X+CONTROL)         GET COLUMN VACUUM AVAILABLE SW
3119                                  AND      1.SHL.LOWVAC          MASK OUT OTHER BITS
3120                                  LD       (HL),A                SAVE COLUMN VACUUM AVAILABLE SW
3121                                  ENDIF
3122                                  INC      HL
3123                                  LD       A,H
3124                                  CP       .HIGH.(MSAVTABL+1000H) WRAP AROUND IF AT TABLE END
3125                                  JR       C,STOREPT2
3126                                  LD       H,.HIGH.MSAVTABL
3127                         STOREPT2: LD      (MACHPT),HL
3128                                  JP       SRVMOT9               GO WAIT FOR NEXT MILLISECOND
3129                                  ENDIF
3131                         ;
3132                         ****************************************************************
3133                         *                                                               *
3134                         * SECTION NAME: CALIBR                 DATE:18-NOV-82           *
3135                         *                                                               *
3136                         * DESCRIPTION:THE FOLLOWING ROUTINE IMPLEMENTS                  *
3137                         *                                                               *
3138                         *                                                               *
3139                         *                                                               *
3140                         *                                                               *
3141                         *                                                               *
3142                         *                                                               *
3143                         * AT ENTRY: C=CURRENT COMMAND                                   *
3144                         *                                                               *
3145                         *                                                               *
3146                         *                                                               *
3147                         ****************************************************************
3148                         ;
3149                         ;
3150                         ;
3151  0975  06 FF           CALIBRM:  LD       B,0FFH                SET UP B SO THAT THE RESULT
3152  0977  18 02                     JR       CALIBR                OF DECREMENTING B IS NON-ZERO
3153                         ;                                       IF MACHINE CURRENT BEING OUTPUT
3154  0979  06 01           CALIBRF:  LD       B,01                  AND ZERO IF FILE CURRENT IS
3155                         ;                                       BEING OUTPUT
3156                         ;
3157                         ; DISPATCH THE CALIBRATION COMMANDS
3158                         ;     BECAUSE THE COMMANDS POSFILE, HOLDFILE, HOLDMACH AND
3159                         ;     RFPOSMAC ARE IN ASSENDING NUMERICAL ORDER, THE FOLLOWING
3160                         ;     CODE USES DECREMENTS RATHER THAN COMPARES TO SORT OUT
3161                         ;     THE VARIOUS CALIBRATION COMMANDS.
3162                         ;
```

```
3163  097B  3A 28 20   CALIBR:   LD    A,(X+REELS)              GET THE PRESENT CALIBRATION CMD
3164  097E  FE 6D                CP    HIGHGAIN                 READ MACHINE MIDDLE AND EXIT
3165             ;                                                 CALIBRATION?
3166  0980  CA 5D 0B             JP    Z,RMACH                  YES, GO READ MACHINE MIDDLE
3167  0983  D6 F0                SUB   POSFILE                  POSITION FILE COMMAND?
3168  0985  28 0D                JR    Z,PF                     YES, GO POSITION FILE LOOP
3169  0987  3D                   DEC   A                        HOLD FILE REEL COMMAND?
3170  0988  CA 4C 0A             JP    Z,HFILE                  YES, GO HOLD FILE REEL STEADY
3171  098B  3D                   DEC   A                        HOLD MACHINE REEL COMMAND?
3172  098C  CA 56 0B             JP    Z,HMACH                  YES, GO HOLD MACH REEL STEADY
3173  098F  3D                   DEC   A                        READ FILE, POSITION MACH CMD?
3174  0990  CA 9C 0A             JP    Z,RFPM                   YES, GO DO IT
3175  0993  C9                   RET                            ;UNKNOWN COMMAND, RETURN
3176
3177             ;    POSITION FILE REEL COMMAND
3178             ;
3179  0994  05        PF:        DEC   B                        IS THE FILE CURRENT BEING OUTPUT?
3180  0995  C0                   RET   NZ                       NO, JUST RETURN
3181  0996  3A 19 10             LD    A,(FILEREFS+1)           GET HIGH BYTE OF FILE REEL
3182  0999  47                   LD    B,A                        SLOW REFERENCE
3183  099A  21 4C 10             LD    HL,FATMOSPH              SUBTRACT THE
3184  099D  96                   SUB   (HL)                       ATMOSPHERIC VALUE
3185  099E  FE 0E                CP    FCALTARG                 PRESENT REF = ATMOSPHERIC + 14?
3186  09A0  28 4A                JR    Z,ONTARGF                YES, FILE REF IS ON TARGET
3187  09A2  05                   DEC   B                        DECREMENT REF BY 1 FOR
3188  09A3  FE 19                CP    FCALTARG+10+1              REF BETWEEN ATMOS+15
3189  09A5  38 06                JR    C,PUTREF1                  AND ATMOS+24
3190  09A7  05                   DEC   B                        DECREMENT REF BY 2 FOR
3191  09A8  FE 23                CP    FCALTARG+20+1              REF BETWEEN ATMOS+25
3192  09AA  38 01                JR    C,PUTREF1                  AND ATMOS+34
3193  09AC  05                   DEC   B                        DECREMENT REF BY 3 FOR
3194             ;                                                REF GREATER THAN ATMOS+34
3195  09AD  78        PUTREF1:   LD    A,B                      STORE THE
3196  09AE  32 19 10             LD    (FILEREFS+1),A             UPDATED REFERENCE VALUE
3197  09B1  32 11 10             LD    (FILEREF+1),A
3198                             IF    CALMOD1
3199  09B4  21 06 10             LD    HL,FREF16                GET THE PREDICTED
3200  09B7  96                   SUB   (HL)                       LOOP VELOCITY
3201  09B8  FE FE                CP    -2                       IF WE ARE NEAR TARGET, ZERO
3202  09BA  20 01                JR    NZ,PUTPVF                  THE PREDICTED LOOP VELOCITY
3203  09BC  AF                   XOR   A                          TO KEEP FROM OVERSHOOTING
3204  09BD  32 3A 10  PUTPVF:    LD    (PREDVELF),A             SAVE IT FOR USE BY LINEAR ALG
3205                             ENDIF
3206             ;
3207  09C0  3A 2A 10             LD    A,(MACHREFS+1)           GET HIGH BYTE OF MACHINE
3208  09C3  47                   LD    B,A                        REEL SLOW REFERENCE
3209  09C4  21 4D 10             LD    HL,MATMOSPH              SUBTRACT THE
3210  09C7  96                   SUB   (HL)                       ATMOSPHERIC VALUE
3211  09C8  FE 38                CP    MCALTARG+MPOFFST         IF MACH REF EQUAL TO TARGET,
3212                             IF    CALMOD1
3213  09CA  CA 94 0A             JP    Z,CLRPVM                   JUST LEAVE IT THERE
3214                             ELSE
3215                             RET   Z                          JUST RETURN
3216                             ENDIF
3217  09CD  FA DF 09  CKMREF2:   JP    M,INCMREF                IF MACH REF LESS THAN TARGET,
3218             ;                                                 GO INCREMENT THE REFERENCE
3219  09D0  05                   DEC   B                        DEC REF BY 1 FOR REF
3220  09D1  FE 43                CP    MCALTARG+MPOFFST+10+1      WITHIN 10 OF TARGET POSITION
3221  09D3  38 06                JR    C,PUTREF2
3222  09D5  05                   DEC   B                        DEC REF BY 2 FOR REF
3223  09D6  FE 4D                CP    MCALTARG+MPOFFST+20+1      WITHIN 20 OF TARGET POSITION
3224  09D8  38 01                JR    C,PUTREF2
3225  09DA  05                   DEC   B                        DEC REF BY 3 FOR REF MORE THAN
3226             ;                                                20 AWAY FROM TARGET POSITION
3227                             IF    CALMOD1
3228  09DB  60        PUTREF2:   LD    H,B                      H=UPDATED REFERENCE VALUE
3229  09DC  C3 85 0A             JP    PUTREF                   GO STORE NEW REFERENCE
3230                             ELSE
3231                   PUTREF2:  LD    A,B                      STORE THE
3232                             LD    (MACHREFS+1),A             UPDATED REFERENCE VALUE
3233                             LD    (MACHREF+1),A
3234                             RET
3235                             ENDIF
3236             ;
3237  09DF  04        INCMREF:   INC   B                        INC REF BY 1 FOR REF
3238  09E0  FE 2E                CP    MCALTARG+MPOFFST-10        WITHIN 10 OF TARGET POSITION
3239  09E2  30 F7                JR    NC,PUTREF2
3240  09E4  04                   INC   B                        INC REF BY 2 FOR REF
3241  09E5  FE 24                CP    MCALTARG+MPOFFST-20        WITHIN 20 OF TARGET POSITION
3242  09E7  30 F2                JR    NC,PUTREF2
3243  09E9  04                   INC   B                        INC REF BY 3 FOR REF MORE THAN
3244  09EA  18 EF                JR    PUTREF2                    20 AWAY FROM TARGET POSITION
3245             ;
3246  09EC            ONTARGF:
3247                             IF    CALMOD1
3248  09EC  AF                   XOR   A                        CLEAR THE PREDICTED
3249  09ED  32 3A 10             LD    (PREDVELF),A               LOOP VELOCITY TERM
3250                             ENDIF
3251  09F0  3A 2A 10             LD    A,(MACHREFS+1)           GET HIGH BYTE OF MACHINE
3252  09F3  47                   LD    B,A                        REEL SLOW REFERENCE
3253  09F4  21 4D 10             LD    HL,MATMOSPH              SUBTRACT THE
3254  09F7  96                   SUB   (HL)                       ATMOSPHERIC VALUE
3255  09F8  FE 38                CP    MCALTARG+MPOFFST         IF MACH REF IS NOT ON TARGET,
3256  09FA  20 D1                JR    NZ,CKMREF2                 GO MOVE MACHINE REFERENCE
```

```
3257                                  ; BOTH FILE AND MACHINE REFERENCES ARE ON TARGET
3258                                  ;
3259                                  ;
3260    09FC  3A 47 10                        LD      A,(CALERR)              SAVE THE MOST RECENT
3261    09FF  32 48 10                        LD      (CALERSAV),A              POSITION ERROR TERM
3262    0A02  21 4B 10                        LD      HL,CALCTR
3263    0A05  7E                              LD      A,(HL)                  GET THE CALIBRATION COUNTER
3264    0A06  47                              LD      B,A                       AND SAVE IT IN B
3265    0A07  A7                              AND     A                       COUNTER = 0?
3266    0A08  28 2C                           JR      Z,PFDONE                  YES, FILE LOOP IS POSITIONED
3267    0A0A  F8                              RET     M                       IF COUNTER < 0, WAIT FOR NEXT CMD
3268    0A0B  35                              DEC     (HL)                    DECREMENT THE CALIBRATION COUNTER
3269    0A0C  FE 1C                           CP      SLGTIME                 TIME TO SET LOW GAIN?
3270    0A0E  20 0B                           JR      NZ,CKAVT                  NO, GO CHECK FOR AVERAGING TIME
3271    0A10  FD CB 42 DE                     SET     LOWGAINF,(IY+FLAGS)     SET FILE REEL LOW GAIN
3272    0A14  21 30 20                        LD      HL,X+FPULSEOF           SET THE LOW GAIN
3273    0A17  36 18                           LD      (HL),.LOW.LOWPULSE        OFF DUTY PULSE WIDTH
3274    0A19  36 08                           LD      (HL),.HIGH.LOWPULSE
3275    0A1B  FE 11           CKAVT:          CP      AVTIME+1                TIME TO AVERAGE THE CURRENT?
3276    0A1D  D0                              RET     NC                        NO, RETURN
3277                                  ; GATHER UP 16 CURRENT SAMPLES TO DETERMINE THE CURRENT NECESSARY
3278                                  ; TO HOLD THE FILE REEL STEADY.
3279    0A1E  21 49 10        SUMCUR:         LD      HL,AVRGECUR             POINT TO LOW BYTE OF
3280                                  ;                                         CURRENT AVERAGE
3281    0A21  79                              LD      A,C                     GET THE CURRENT COMMAND
3282    0A22  A7                              AND     A                       IS THE CURRENT POSITIVE?
3283    0A23  F2 30 0A                        JP      P,ADDIT                   YES, GO ADD CURRENT TO AVERAGE
3284    0A26  E6 7F                           AND     0FFH-1.SHL.POLBIT         NO, STRIP OFF POLARITY BIT
3285    0A28  47                              LD      B,A                     SAVE CURRENT MAGNITUDE IN B
3286    0A29  7E                              LD      A,(HL)                  SUBTRACT CURRENT FROM
3287    0A2A  90                              SUB     B                         LOW BYTE OF AVERAGE
3288    0A2B  77                              LD      (HL),A
3289    0A2C  D0                              RET     NC                      IF NO BORROW, RETURN
3290    0A2D  2C                              INC     L                       POINT TO HIGH BYTE
3291    0A2E  35                              DEC     (HL)                    PROPAGATE BORROW
3292    0A2F  C9                              RET
3293                                  ;
3294    0A30  86              ADDIT           ADD     A,(HL)                  ADD CURRENT TO
3295    0A31  77                              LD      (HL),A                    LOW BYTE OF AVERAGE
3296    0A32  D0                              RET     NC                      IF NO CARRY, RETURN
3297    0A33  2C                              INC     L                       POINT TO HIGH BYTE
3298    0A34  34                              INC     (HL)                    PROPAGATE CARRY
3299    0A35  C9                              RET
3300                                  ;
3301                                  ; THE FILE LOOP IS PROPERLY POSITIONED, CALCULATE THE AVERAGE HOLDING
3302                                  ; CURRENT AND SIGNAL CONTROL PROCESSOR TO PROCEED WITH CALIBRATION.
3303                                  ;
3304    0A36  DD CB 10 C6     PFDONE:         SET     SLDCFWD,(IX+REGO)       ALLOW FORWARD MOTION
3305    0A3A  35              CALAVCUR:       DEC     (HL)                    MAKE CALCTR NEGATIVE SO WE DON'T
3306                                  ;                                         CALCULATE AVERAGE MORE THAN ONCE
3307    0A3B  21 4A 10                        LD      HL,AVRGECUR+1           POINT TO HIGH BYTE OF AVERAGE
3308    0A3E  ED 67                           RRD                             DIVIDE AVERAGE BY 16
3309    0A40  2D                              DEC     L
3310    0A41  ED 67                           RRD
3311    0A43  7E                              LD      A,(HL)                  GET THE AVERAGE CURRENT
3312    0A44  A7                              AND     A                       IS THE CURRENT POSITIVE?
3313    0A45  F0                              RET     P                         YES, JUST LEAVE IT POSITIVE
3314    0A46  ED 44                           NEG                             NO, MAKE IT POSITIVE
3315    0A48  F6 80                           OR      1.SHL.POLBIT              AND SET THE POLARITY BIT
3316    0A4A  77                              LD      (HL),A                  STORE THE AVERAGE CURRENT VALUE
3317    0A4B  C9                              RET
3318                                  ;
3319                                  ; HOLD FILE REEL COMMAND
3320                                  ;
3321    0A4C  05              HFILE:          DEC     B                       FILE REEL CURRENT BEING OUTPUT?
3322    0A4D  C0                              RET     NZ                        NO, JUST RETURN
3323    0A4E  3A 49 10                        LD      A,(AVRGECUR)            OUTPUT THE AVERAGE CURRENT
3324    0A51  4F                              LD      C,A                       TO HOLD THE FILE REEL STEADY
3325    0A52  3E 30                           LD      A,CCINIT                INITIALIZE THE CALIBRATION
3326    0A54  32 4B 10                        LD      (CALCTR),A                COUNTER FOR THE MACHINE REEL
3327    0A57  3A 4D 10                        LD      A,(MATMOSPH)            PUT THE MACHINE COLUMN
3328    0A5A  47                              LD      B,A                       ATMOSPHERIC READING INTO B
3329    0A5B  2A 29 10                        LD      HL,(MACHREFS)           HL=MACHINE REEL REFERENCE
3330    0A5E  7C                              LD      A,H                     A=HIGH BYTE OF REFERENCE
3331    0A5F  90                              SUB     B                       REFERENCE IT TO ATMOSPHERIC
3332    0A60  FE 0E                           CP      MCALTARG                REF=ATMOS+14?
3333                                          IF      CALMOD1
3334    0A62  CA 94 0A                        JP      Z,CLRPVM                  YES, LEAVE IT THERE
3335                                          ELSE
3336                                          RET     Z                         YES, LEAVE IT THERE
3337                                          ENDIF
3338    0A65  FE 16                           CP      MCALTARG+7+1            IF REF BETWEEN ATMOS+15 AND
3339    0A67  38 30                           JR      C,MOVREF2                 ATMOS+21, THEN MOVE REF SLOWLY
3340    0A69  DD CB 20 4E                     BIT     GO,(IX+COMMAND)         IF GO IS NOT SET
3341    0A6D  20 2A                           JR      NZ,MOVREF2                THEN MOVE REFERENCE SLOWLY
3342    0A6F  3A 12 20                        LD      A,(X+VELREG)
3343    0A72  11 80 02                        LD      DE,VEL125               DE=OFFSET FOR 125 IPS OPERATION
3344    0A75  CB 4F                           BIT     V125IPS,A               IS THIS A 125 IPS DRIVE?
3345    0A77  28 0A                           JR      Z,MOVREF                  YES, GO USE 125 IPS OFFSET
3346    0A79  11 00 04                        LD      DE,VEL200               DE=OFFSET FOR 200 IPS OPERATION
3347    0A7C  CB 57                           BIT     V75IPS,A                IS THIS A 75 IPS DRIVE?
3348    0A7E  20 03                           JR      NZ,MOVREF                 NO, 200 IPS DRIVE
3349    0A80  11 80 01                        LD      DE,VEL75                  YES, USE 75 IPS OFFSET
3350    0A83  ED 52           MOVREF:         SBC     HL,DE                   MOVE THE REFERENCE AT THE SAME
```

| Line | Addr | Bytes | Label | Op | Operand | Comment |
|---|---|---|---|---|---|---|
| 3351 | | | | | | SPEED THE TAPE IS MOVING |
| 3352 | 0A85 | 22 29 10 | PUTREF: | LD | (MACHREFS),HL | STORE THE UPDATED |
| 3353 | 0A88 | 22 21 10 | | LD | (MACHREF),HL | REFERENCE VALUES |
| 3354 | | | | IF | CALMOD1 | |
| 3355 | 0A8B | 7C | | LD | A,H | GET THE PREDICTED |
| 3356 | 0A8C | 21 0E 10 | | LD | HL,MREF16 | LOOP VELOCITY |
| 3357 | 0A8F | 96 | | SUB | (HL) | |
| 3358 | 0A90 | FE FE | | CP | -2 | IF WE ARE NEAR THE TARGET, ZERO |
| 3359 | 0A92 | 20 01 | | JR | NZ,PUTPVM | THE PREDICTED LOOP VELOCITY |
| 3360 | | | ; | | | TO PREVENT OVERSHOOT |
| 3361 | 0A94 | AF | CLRPVM: | XOR | A | CLEAR PREDICTED LOOP VELOCITY |
| 3362 | 0A95 | 32 3B 10 | PUTPVM: | LD | (PREDVELM),A | SAVE VELOCITY IN PREDVELM FOR USE |
| 3363 | | | ; | | | IN THE LINEAR ALGORITHM |
| 3364 | | | | ENDIF | | |
| 3365 | 0A98 | C9 | | RET | | |
| 3366 | | | ; | | | |
| 3367 | 0A99 | 25 | MOVREF2: | DEC | H | DECREMENT HIGH BYTE OF REFERENCE |
| 3368 | 0A9A | 18 E9 | | JR | PUTREF | GO STORE UPDATED REFERENCE |
| 3369 | | | ; | | | |
| 3370 | | | ; READ FILE MIDDLE, POSITION MACHINE LOOP COMMAND. | | | |
| 3371 | | | ; | | | |
| 3372 | 0A9C | 21 4B 10 | RFPM: | LD | HL,CALCTR | POINT TO CALIBRATION COUNTER |
| 3373 | 0A9F | 7E | | LD | A,(HL) | |
| 3374 | 0AA0 | FE 30 | | CP | CCINIT | IS THIS THE FIRST TIME THROUGH? |
| 3375 | 0AA2 | C2 17 0B | | JP | NZ,POSMACH | NO, DON'T CALCULATE FILE PARMS |
| 3376 | | | ; | | | |
| 3377 | | | ; CALCULATE FILE COLUMN MIDPOINT AND GAIN | | | |
| 3378 | | | ; | | | |
| 3379 | | | | IF | DEBUG3 | |
| 3380 | | | | LD | (X+FVACSEN),A | START A/D FOR FILE VACUUM SENSOR |
| 3381 | | | | ENDIF | | |
| 3382 | 0AA5 | 35 | | DEC | (HL) | INDICATE THAT FILE PARMS ARE DONE |
| 3383 | 0AA6 | DD CB 10 86 | | RES | SLDCFWD,(IX+REG0) | DON'T ALLOW FWD MOTION |
| 3384 | 0AAA | C5 | | PUSH | BC | SAVE CURRENT AND REEL FLAG |
| 3385 | 0AAB | 3A 00 10 | | LD | A,(FPOS8) | A=LATEST FILE COLUMN POSITION |
| 3386 | 0AAE | 21 48 10 | | LD | HL,CALERSAV | SUBTRACT THE POSITION ERROR WHEN |
| 3387 | 0AB1 | 96 | | SUB | (HL) | THE CAPSTAN STARTED MOVING TO |
| 3388 | 0AB2 | 32 35 10 | | LD | (FMIDDLE),A | OBTAIN THE TRUE MIDPOINT |
| 3389 | 0AB5 | 4F | | LD | C,A | SAVE THE MIDPOINT IN C |
| 3390 | 0AB6 | 21 4E 10 | | LD | HL,SAMPCTR | GET THE NUMBER OF MIDPOINTS |
| 3391 | 0AB9 | 56 | | LD | D,(HL) | YET TO BE CALCULATED |
| 3392 | | | | IF | DEBUG2 | |
| 3393 | | | | LD | A,D | ;/THIS DEBUG CODE PUTS |
| 3394 | | | | ADD | A,.LOW.FMTAB | ;/TABLE OF MIDPOINTS |
| 3395 | | | | LD | L,A | ;/INTO MEMORY STARTING AT |
| 3396 | | | | LD | H,.HIGH.FMTAB | ;/FMTAB+4 AND GOING BACK |
| 3397 | | | | LD | (HL),C | ;/THROUGH FMTAB+1 |
| 3398 | | | | LD | A,C | ;/RESTORE A |
| 3399 | | | | ENDIF | | |
| 3400 | 0ABA | 21 4F 10 | | LD | HL,FMAVRGE | POINT TO MIDPOINT AVERAGE |
| 3401 | 0ABD | 86 | | ADD | A,(HL) | ADD IN THIS MIDPOINT |
| 3402 | 0ABE | 77 | | LD | (HL),A | |
| 3403 | 0ABF | 2C | | INC | L | POINT TO HIGH BYTE |
| 3404 | 0AC0 | 30 01 | | JR | NC,CHKSAMP | IF NO CARRY, CHECK SAMPCTR |
| 3405 | 0AC2 | 34 | | INC | (HL) | PROPAGATE CARRY |
| 3406 | 0AC3 | 15 | CHKSAMP: | DEC | D | IS THIS THE LAST SAMPLE? |
| 3407 | 0AC4 | 20 0D | | JR | NZ,FILESERV | NO, PUT FILE INTO SERVO MODE |
| 3408 | | | ; THIS WAS THE 4TH MIDPOINT, CALCULATE THE AVERAGE MIDPOINT | | | |
| 3409 | 0AC6 | 46 | | LD | B,(HL) | B=HIGH BYTE OF AVERAGE |
| 3410 | 0AC7 | CB 18 | | RR | B | DIVIDE AVERAGE BY 4 |
| 3411 | 0AC9 | 1F | | RRA | | |
| 3412 | 0ACA | CB 18 | | RR | B | |
| 3413 | 0ACC | 1F | | RRA | | |
| 3414 | 0ACD | CE 00 | | ADC | A,0 | ROUND BY ADDING IN CARRY BIT |
| 3415 | | | ; | | | FROM THE LAST SHIFT |
| 3416 | 0ACF | 32 35 10 | | LD | (FMIDDLE),A | STORE THE AVERAGED MIDPOINT |
| 3417 | 0AD2 | 4F | | LD | C,A | AND SAVE IT IN C |
| 3418 | | | ; | | | |
| 3419 | 0AD3 | 21 42 10 | FILESERV: | LD | HL,Y+FLAGS | POINT TO GAIN FLAG |
| 3420 | 0AD6 | CB 9E | | RES | LOWGAINF,(HL) | RESET THE LOW GAIN FLAG |
| 3421 | 0AD8 | 2C | | INC | L | POINT TO THE CALIBRATION FLAGS |
| 3422 | 0AD9 | CB AE | | RES | CALRGMF,(HL) | RES CALIBRATE REF GENERATION MODE |
| 3423 | 0ADB | 21 30 20 | | LD | HL,X+FPULSEOF | SET THE OFF DUTY PULSE WIDTH |
| 3424 | 0ADE | 36 EA | | LD | (HL),.LOW.HIPULSE | BACK TO THE HIGH GAIN VALUE |
| 3425 | 0AE0 | 36 02 | | LD | (HL),.HIGH.HIPULSE | |
| 3426 | 0AE2 | 21 00 10 | | LD | HL,FPOS8 | POINT TO THE FIRST POSITION |
| 3427 | 0AE5 | 06 07 | | LD | B,FILTLENF | FILTER, LOAD UP THE FILTER |
| 3428 | 0AE7 | AF | | XOR | A | LENGTH AND CLEAR A |
| 3429 | 0AE8 | 77 | CLRLP10: | LD | (HL),A | CLEAR THE POSITION AND |
| 3430 | 0AE9 | 2C | | INC | L | REFERENCE FILTERS |
| 3431 | 0AEA | 10 FC | | DJNZ | CLRLP10 | |
| 3432 | | | | IF | CALMOD1 | |
| 3433 | 0AEC | 32 3A 10 | | LD | (PREDVELF),A | CLEAR PREDICTED VELOCITY TERM |
| 3434 | | | | ENDIF | | |
| 3435 | 0AEF | 21 53 10 | | LD | HL,FGAVRGE | POINT TO FILE GAIN AVERAGE |
| 3436 | 0AF2 | 3A 4C 10 | | LD | A,(FATMOSPH) | A=FILE ATMOSPHERIC READING |
| 3437 | 0AF5 | C6 0D | | ADD | A,FCALTARG-1 | A=-(ATMOSPH+FCALTARG) THROUGH |
| 3438 | 0AF7 | 2F | | CPL | | SOME MATHEMATICAL SLIGHT |
| 3439 | | | ; | | | OF HAND |
| 3440 | 0AF8 | CD 17 0D | | CALL | GAINCAL | USE THE MEASURED COLUMN GAIN TO |
| 3441 | | | ; | | | CALCULATE THE REFERENCE |
| 3442 | | | ; | | | GENERATION OFFSETS APPROPRIATE |
| 3443 | | | ; | | | FOR A COLUMN WITH THIS GAIN |
| 3444 | 0AFB | 21 23 10 | | LD | HL,MREFNG0 | THE OFFSETS WERE PUT INTO THE |

```
3445  0AFE  11 12 10              LD    DE,FREFNGO              THE MACHINE REEL TABLES SO
3446  0B01  01 0F 00              LD    BC,15                   MOVE THE VALUES INTO THE
3447  0B04  ED B0                 LDIR                          THE FILE REEL TABLE
3448  0B06  21 00 00              LD    HL,0                    START OUT SERVO CONTROL WITH
3449  0B09  22 10 10              LD    (FILEREF),HL            THE REFERENCE VALUES ZEROED
3450  0B0C  22 18 10              LD    (FILEREFS),HL
3451                              IF    DEBUG3                  MEASURE NOMINAL COLUMN VACUUM
3452                              CALL  EOCWAIT                 WAIT FOR END OF CONVERSION
3453                              JR    NZ,GETFVAC              IF DONE, GO READ VALUE
3454                        ;                                   REELS ENABLED DROPPED OR
3455                              LD    (X+FVACSEN),A           ADC ERROR, TRY TO RESTART IT
3456                              CALL  EOCRETRY                WAIT FOR ADC DONE, HALT IF ERROR
3457                              JR    Z,CALEXIT1              IF REELS ENABLED DROPPED, EXIT
3458                      GETFVAC: LD   A,(X+FVACSEN)           READ FILE COLUMN VACUUM SENSOR
3459                              LD    (FULLVACF),A            STORE NOMINAL COLUMN VACUUM
3460                      CALEXIT1:                             ;?? SLOPPY EXIT
3461                              ENDIF
3462  0B0F  C1                    POP   BC                      RESTORE CURRENT AND REEL FLAG
3463  0B10  05                    DEC   B                       FILE REEL CURRENT BEING OUTPUT?
3464  0B11  C0                    RET   NZ                      NO, OUTPUT THE CALCULATED
3465                        ;                                   MACHINE REEL CURRENT
3466  0B12  3A 49 10              LD    A,(AVRGECUR)            THE FILE CURRENT
3467  0B15  4F                    LD    C,A                     CALCULATED THIS TIME WAS
3468  0B16  C9                    RET                         ; INVALID SO JUST OUTPUT
3469                        ;                                   THE HOLDING CURRENT
3470                        ;
3471                        ;   POSITION MACHINE REEL COMMAND
3472                        ;
3473  0B17  05            POSMACH: DEC  B                       MACHINE REEL OUTPUT?
3474  0B18  C8                    RET   Z                       NO, JUST RETURN
3475  0B19  3A 4D 10              LD    A,(MATMOSPH)            ADD OFFSET TO ATMOSPHERIC READING
3476  0B1C  C6 0E                 ADD   A,MCALTARG              TO GET DESIRED REF POSITION
3477  0B1E  21 2A 10              LD    HL,MACHREFS+1           POINT TO HIGH BYTE OF REF
3478  0B21  BE                    CP    (HL)                    ARE WE THERE YET?
3479  0B22  28 02                 JR    Z,ONTARG2               YES, AVERAGE CURRENT ETC.
3480  0B24  35                    DEC   (HL)                    NO, MOVE REF A LITTLE BIT
3481  0B25  C9                    RET
3482                        ;
3483  0B26                ONTARG2:
3484                              IF    CALMOD1
3485  0B26  AF                    XOR   A                       CLEAR THE PREDICTED
3486  0B27  32 3B 10              LD    (PREDVELM),A            LOOP VELOCITY TERM
3487                              ENDIF
3488  0B2A  3A 47 10              LD    A,(CALERR)              SAVE THE MOST RECENT
3489  0B2D  32 48 10              LD    (CALERSAV),A            POSITION ERROR TERM
3490  0B30  21 4B 10              LD    HL,CALCTR               GET THE CALIBRATION
3491  0B33  7E                    LD    A,(HL)                  COUNTER AND
3492  0B34  47                    LD    B,A                     PUT IT INTO B
3493  0B35  A7                    AND   A                       IF THE CALIBRATION COUNTER IS 0,
3494  0B36  28 17                 JR    Z,PMDONE                THEN WE'RE READY TO GO ON
3495  0B38  F8                    RET   M                       IF CALCTR IS NEGATIVE, WE'RE
3496                        ;                                   STILL WAITING FOR NEXT COMMAND
3497  0B39  35                    DEC   (HL)                    CALCTR.GT.0, DECREMENT IT
3498  0B3A  FE 1C                 CP    SLGTIME                 TIME TO SET LOW GAIN?
3499  0B3C  20 0B                 JR    NZ,CHKAVT2              NO, CHECK AVERAGING TIME
3500  0B3E  FD CB 42 E6           SET   LOWGAINM,(IY+FLAGS)     PUT MACH REEL IN LOW GAIN
3501  0B42  21 31 20              LD    HL,X+MPULSEOF           SET THE LOW GAIN OFF
3502  0B45  36 18                 LD    (HL),.LOW.LOWPULSE      DUTY PULSE WIDTH
3503  0B47  36 08                 LD    (HL),.HIGH.LOWPULSE
3504  0B49  FE 11         CHKAVT2: CP   AVTIME+1                TIME TO AVERAGE CURRENT?
3505  0B4B  DA 1E 0A              JP    C,SUMCUR                YES, CALCTR IS BETWEEN 16 AND 1
3506                        ;                                   SO GO ADD CURRENT TO AVERAGE
3507  0B4E  C9                    RET                         ; NO, JUST RETURN
3508                        ;
3509                        ;   THE MACH LOOP IS PROPERLY POSITIONED, SIGNAL THE CONTROL PROCESSOR
3510                        ;   TO PROCEED WITH CALIBRATION SEQUENCE AND GO CALCULATE THE AVERAGE
3511                        ;   HOLDING CURRENT.
3512                        ;
3513  0B4F  DD CB 10 CE   PMDONE: SET   SLDCBWD,(IX+REGO)       ALLOW BACKWARD MOTION
3514  0B53  C3 3A 0A              JP    CALAVCUR                GO CALCULATE AVERAGE CURRENT
3515                        ;
3516                        ;   HOLD MACHINE REEL COMMAND
3517                        ;
3518  0B56  05            HMACH:  DEC   B                       FILE REEL OUTPUT?
3519  0B57  C8                    RET   Z                       YES, DON'T MESS WITH THE CURRENT
3520  0B58  3A 49 10              LD    A,(AVRGECUR)            OUTPUT THE
3521  0B5B  4F                    LD    C,A                     AVERAGE CURRENT
3522  0B5C  C9                    RET
3523                        ;
3524                        ;   READ MACHINE MIDDLE COMMAND (HIGH GAIN WITH CALIBFLG SET)
3525                        ;
3526  0B5D  DD CB 10 8E   RMACH:  RES   SLDCBWD,(IX+REGO)       DON'T ALLOW BACKWARD MOTION
3527                              IF    DEBUG3
3528                              LD    (X+MVACSEN),A           START A/D FOR MACH VACUUM SENSOR
3529                              ENDIF
3530  0B61  C5                    PUSH  BC                      SAVE CURRENT AND REEL FLAG
3531  0B62  3A 08 10              LD    A,(MPOS8)               GET MOST RECENT LOOP POSITION
3532  0B65  21 48 10              LD    HL,CALERSAV             SUBTRACT THE POSITION ERROR
3533  0B68  96                    SUB   (HL)                    BEFORE GO WAS SET TO OBTAIN
3534  0B69  32 36 10              LD    (MMIDDLE),A             THE TRUE COLUMN MIDPOINT
3535  0B6C  4F                    LD    C,A                     SAVE THE MIDPOINT IN C
3536  0B6D  21 4E 10              LD    HL,SAMPCTR              GET THE NUMBER OF MIDPOINTS
3537  0B70  56                    LD    D,(HL)                  YET TO BE CALCULATED
3538                              IF    DEBUG2
```

```
3539                                        LD      A,D                 ;/MORE DEBUG CODE TO STORE
3540                                        ADD     A,.LOW.MMTAB        ;/THE 4 MIDPOINT VALUES
3541                                        LD      L,A                 ;/IN MMTAB+1 THROUGH MMTAB+4
3542                                        LD      H,.HIGH.MMTAB       ;/
3543                                        LD      (HL),C              ;/
3544                                        LD      A,C                 ;/RESTORE A
3545                                        ENDIF
3546    0B71   21 51 10                     LD      HL,MMAVRGE          ADD THIS MIDPOINT TO THE
3547    0B74   86                           ADD     A,(HL)                 MIDPOINT AVERAGE
3548    0B75   77                           LD      (HL),A
3549    0B76   2C                           INC     L                   POINT TO HIGH BYTE OF AVERAGE
3550    0B77   30 01                        JR      NC,CHKSAMP2         IF NO CARRY, CHECK SAMPLE CTR
3551    0B79   34                           INC     (HL)                PROPAGATE CARRY
3552    0B7A   7A              CHKSAMP2:    LD      A,D                 A=NUMBER OF SAMPLES YET TO TAKE
3553    0B7B   D6 01                        SUB     1                   DON'T DECREMENT COUNTER PAST
3554    0B7D   38 14                        JR      C,MACHSERV             ZERO IF MORE THAN 4 CALIBRATES
3555    0B7F   32 4E 10                     LD      (SAMPCTR),A         STORE DECREMENTED SAMPLE COUNTER
3556    0B82   20 0F                        JR      NZ,MACHSERV         IF THIS IS NOT THE 4TH SAMPLE,
3557                                        ;                               THEN DON'T CALCULATE AVERAGE
3558                                        ; CALCULATE AVERAGE MIDPOINT VALUE
3559    0B84   46                           LD      B,(HL)              B=HIGH BYTE
3560    0B85   2D                           DEC     L                   POINT TO LOW BYTE OF AVERAGE
3561    0B86   7E                           LD      A,(HL)              A=LOW BYTE OF AVERAGE
3562    0B87   CB 18                        RR      B                   DIVIDE BY 4
3563    0B89   1F                           RRA
3564    0B8A   CB 18                        RR      B
3565    0B8C   1F                           RRA
3566    0B8D   CE 00                        ADC     A,0                 ADD IN THE CARRY TO ROUND
3567    0B8F   32 36 10                     LD      (MMIDDLE),A         STORE THE AVERAGED MIDPOINT
3568    0B92   4F                           LD      C,A                    AND KEEP IT IN C
3569    0B93   FD CB 43 B6     MACHSERV:    RES     CALRGMM,(IY+FLAGSCAL) RESET CALIBRATION REFERENCE
3570                                        ;                               GENERATION MODE
3571    0B97   3E 6D                        LD      A,HIGHGAIN          GO SET HIGH GAIN, COMPLETE
3572    0B99   21 32 10                     LD      HL,OLDCMD              WITH LOADING OLDCMD
3573    0B9C   CD 60 04                     CALL    SETHGAIN
3574    0B9F   21 08 10                     LD      HL,MPOS8            POINT TO FIRST MACH REEL FILTER
3575    0BA2   06 07                        LD      B,FILTLENM          B=NUMBER OF FILTER BYTES
3576    0BA4   AF                           XOR     A
3577    0BA5   77              CLRLP11:     LD      (HL),A              ZERO THE MACHINE REEL POSITION
3578    0BA6   2C                           INC     L                      AND REFERENCE FILTERS
3579    0BA7   10 FC                        DJNZ    CLRLP11
3580                                        IF      CALMOD1
3581    0BA9   32 3B 10                     LD      (PREDVELM),A        CLEAR PREDICTED VELOCITY TERM
3582                                        ENDIF
3583    0BAC   21 55 10                     LD      HL,MGAVRGE          POINT TO MACHINE GAIN AVERAGE
3584    0BAF   3A 4D 10                     LD      A,(MATMOSPH)        A=MACHINE COLUMN ATMOSPHERIC
3585    0BB2   C6 0D                        ADD     A,MCALTARG-1        A=-(ATMOSPH+MCALTARG) THROUGH
3586    0BB4   2F                           CPL                            SOME MATHEMATICAL SLIGHT
3587                                        ;                              OF HAND
3588    0BB5   CD 17 0D                     CALL    GAINCAL             GO CALCULATE THE REFERENCE
3589                                        ;                              GENERATION PARAMETERS FOR
3590                                        ;                              THIS COLUMN GAIN
3591                                        ; THE PARAMETERS CALCULATED BY GAINCAL ARE APPROPRIATE FOR THE FILE
3592                                        ; REEL BUT THEY MUST BE INVERTED FOR THE MACHINE REEL REF GENERATION.
3593                                        ;
3594    0BB8   21 23 10                     LD      HL,MREFNGO          POINT TO THE FIRST OFFSET VALUE
3595    0BBB   3E 07                        LD      A,7                 NEGATE 7 WORDS
3596    0BBD   4E              NEGLOOP:     LD      C,(HL)              LOAD UP BC
3597    0BBE   23                           INC     HL                     WITH THE VALUE
3598    0BBF   46                           LD      B,(HL)                 TO BE NEGATED
3599    0BC0   EB                           EX      DE,HL               SAVE POINTER IN DE
3600    0BC1   21 00 00                     LD      HL,0                NEGATE THE VALUE IN BC
3601    0BC4   A7                           AND     A                      BY SUBTRACTING IT
3602    0BC5   ED 42                        SBC     HL,BC                  FROM 0
3603    0BC7   EB                           EX      DE,HL               PUT POINTER IN HL, VALUE IN DE
3604    0BC8   72                           LD      (HL),D              WRITE THE NEGATED VALUE
3605    0BC9   2B                           DEC     HL                     BACK WHERE IT CAME FROM
3606    0BCA   73                           LD      (HL),E
3607    0BCB   23                           INC     HL                  POINT TO
3608    0BCC   23                           INC     HL                     THE NEXT WORD
3609    0BCD   3D                           DEC     A                   WAS THAT THE LAST WORD?
3610    0BCE   20 ED                        JR      NZ,NEGLOOP          NO, GO NEGATE THE NEXT WORD
3611    0BD0   21 00 00                     LD      HL,0                ZERO THE
3612    0BD3   22 21 10                     LD      (MACHREF),HL            MACHINE REEL REFERENCES
3613    0BD6   22 29 10                     LD      (MACHREFS),HL
3614    0BD9   21 11 20                     LD      HL,X+REG1           CALIBRATION DONE SO ALLOW
3615    0BDC   7E                           LD      A,(HL)                 THE HARDWARE TO GENERATE
3616    0BDD   F6 18                        OR      1.SHL.ALPLGINF+1.SHL.ALPLGINM   PLUG INHIBIT
3617    0BDF   77                           LD      (HL),A
3618    0BE0   FD CB 42 7E                  BIT     V200FLAG,(IY+FLAGS) IS THIS A 200 IPS DRIVE?
3619    0BE4   20 07                        JR      NZ,SETTA            YES, SET TURNAROUND FLAG
3620    0BE6   2D                           DEC     L                   HL POINTS TO X+REG0
3621                                        ;                           FOR 75/125 IPS OPERATION,
3622    0BE7   7E                           LD      A,(HL)                 TURNAROUND DELAYS ARE NOT
3623    0BE8   F6 03                        OR      1.SHL.SLDCFWD+1.SHL.SLDCBWD  USED SO MAKE THE SLOW
3624    0BEA   77                           LD      (HL),A              DOWN CONDITION BITS
3625                                        ;                              UNASSERTED.
3626    0BEB   18 04                        JR      CLRCAL              GO CLEAR CALIBRATE FLAG
3627                                        ;
3628    0BED   FD 36 44 FC     SETTA:       LD      (IY+TRNFLGCT),-4    INITIALIZE THE TURNAROUND CTR
3629                                        ;                              TO LET THE MAIN CODE HANDLE
3630                                        ;                              THE TURNAROUND BITS
3631    0BF1   FD CB 43 BE     CLRCAL:      RES     CALIBFLG,(IY+FLAGSCAL) RESET CALIBRATION IN PROGRESS
3632                                        IF      DEBUG3              MEASURE NOMINAL COLUMN VACUUM
```

```
3633                                    CALL    EOCWAIT             WAIT FOR END OF CONVERSION
3634                                    JR      NZ,GETMVAC          IF DONE, GO READ VALUE
3635                            ;                                   REELS ENABLED DROPPED OR
3636                                    LD      (X+MVACSEN),A         ADC ERROR, TRY TO RESTART IT
3637                                    CALL    EOCRETRY            WAIT FOR ADC DONE, HALT IF ERROR
3638                                    JR      Z,CALEXIT2          IF REELS ENABLED DROPPED, EXIT
3639                            GETMVAC: LD     A,(X+MVACSEN)       READ MACHINE COLUMN VACUUM SENSOR
3640                                    LD      (FULLVACM),A        STORE NOMINAL COLUMN VACUUM
3641                            CALEXIT2:
3642                                    ENDIF                       ;?? SLOPPY EXIT
3643   OBF5  C1                         POP     BC                  GET CURRENT AND REEL FLAG
3644   OBF6  05                         DEC     B                   FILE CURRENT BEING OUTPUT?
3645   OBF7  C8                         RET     Z                   YES, CURRENT IN C IS VALID
3646   OBF8  3A 49 10                   LD      A,(AVRGECUR)        CURRENT VALUE IN C IN NO GOOD
3647   OBFB  4F                         LD      C,A                   SO OUTPUT THE AVERAGE CURRENT
3648   OBFC  C9                         RET                         ;  ONE LAST TIME
3649                            ;
3650                            ;
3651                                    ORG     (($-1).AND.OFFOOH)+100H  START ON AN ADDRESS WITH THE
3652                            ;                                   BOTTOM BYTE EQUAL TO ZERO
3653                            ;
3654                            *----------------------------------*
3655                            ;
3656                            ;  THIS APPROXIMATES THE FUNCTION:  ERRTBL(X)=656/X
3657                            ;
3658   OCOO  6D 6D 6D 6D        ERRTBLE: DB     109,109,109,109,109,109,109,094,082,073,066
3659   OCO4  6D 6D 6D 5E
3660   OCO8  52 49 42
3661   OCOB  3C 37 32 2F                DB      060,055,050,047,044,041,039,036,035,033
3662   OCOF  2C 29 27 24
3663   OC13  23 21
3664   OC15  1F 1E 1D 1B                DB      031,030,029,027,026,025,024,023,023,022
3665   OC19  1A 19 18 17
3666   OC1D  17 16
3667   OC1F  15 15 14 13                DB      021,021,020,019,019,018,018,017,017,016
3668   OC23  13 12 12 11
3669   OC27  11 10
3670   OC29  10 10 OF OF                DB      016,016,015,015,015,014,014,014,013,013
3671   OC2D  OF OE OE OE
3672   OC31  OD OD
3673   OC33  OD OD OC OC                DB      013,013,012,012,012,012,012,011,011,011
3674   OC37  OC OC OC OB
3675   OC3B  OB OB
3676   OC3D  OB OB OA OA                DB      011,011,010,010,010,010,010,010,010,009
3677   OC41  OA OA OA OA
3678   OC45  OA 09
3679   OC47  09 09                      DB      009,009
3680                            ;%---------------------------------*
3681                            ;%
3682                            ;% THIS APPROXIMATES THE FUNCTION:  ERRTBL(X)=1130/X
3683                            ;%
3684                            ;%ERRTBLE1: DB   189,189,189,189,189,189,189,162,141,126,113
3685                            ;%      DB      103,094,087,081,075,071,067,063,060,057
3686                            ;%      DB      054,051,049,047,045,044,042,040,039,038
3687                            ;%      DB      037,035,033,033,032,031,031,030,029,028
3688                            ;%      DB      028,027,026,026,025,025,024,024,023,023
3689                            ;%      DB      022,022,021,021,021,020,020,020,019,019
3690                            ;%      DB      019,018,018,018,017,017,017,017,016,016
3691                            ;%      DB      016,016
3692                            ;
3693                                    IF      ($-ERRTBLE).GT.100H    CHECK LENGTH OF TABLES
3694                                    ERROR ... ERRTBLE AND ERRTBLE1 ARE TOO LONG
3695                                    ENDIF
3696                            ; THE CODE FOLLOWING THE LABEL NONMAX ASSUMES THAT ERRTBLE STARTS
3697                            ; AT ADDRESS XXOOH AND THAT THE TABLES TOGETHER ARE LESS THAN
3698                            ; 256 BYTES LONG.  THIS SAME RESTRICTION ALSO APPLIES TO THE
3699                            ; DIFFSQR TABLE.  (SEE CODE FOLLOWING THE LABEL NONLIN3.)
3700                            ;
3701   OC49  CD 4C OC           MULTX4:  CALL   MULTX2              GO MULTIPLY BY 2 AND THEN
3702                            ;                                   FALL THROUGH TO MULTIPLY AGAIN
3703                            ******************************************
3704                            *  MULTIPLY BY 2 SUBROUTINE               *
3705                            *                                         *
3706                            *  THE NUMBER IN A IS MULITPLIED BY 2     *
3707                            *  AND THE ABSOLUTE VALUE OF THE RESULT   *
3708                            *  IS LIMITED TO THE VALUE IN H           *
3709                            ******************************************
3710                            ;
3711   OC4C  A7                 MULTX2:  AND    A                   NEGATIVE NUMBER TO BE MULTIPLIED?
3712   OC4D  FA 58 OC                    JP     M,MULTX2M           YES, GO HANDLE IT
3713   OC50  87                          ADD    A,A                 MULTIPLY THE NUMBER IN A BY 2
3714   OC51  EA 56 OC           MULTCHKP: JP    PE,MULTMAXP         IF OVERFLOW, USE LIMIT INSTEAD
3715   OC54  BC                          CP     H                   IS RESULT LESS THAN LIMIT?
3716   OC55  D8                          RET    C                   YES, RETURN
3717   OC56  7C                 MULTMAXP: LD    A,H                 NO, USE THE LIMIT
3718   OC57  C9                          RET
3719                            ;
3720   OC58  87                 MULTX2M: ADD    A,A                 MULTIPLY THE NUMBER IN A BY 2
3721   OC59  EA 60 OC           MULTCHKM: JP    PE,MULTMAXM         IF OVERFLOW, USE LIMIT INSTEAD
3722   OC5C  2F                          CPL                        A=-A-1 TEMPORARILY
3723   OC5D  BC                          CP     H                   IS THE RESULT WITHIN THE LIMIT?
3724   OC5E  2F                          CPL                        RESTORE A WITHOUT
3725                            ;                                      AFFECTING THE C FLAG
3726   OC5F  D8                          RET    C                   IF WITHIN LIMIT, RETURN
```

```
3727  0C60  7C              MULTMAXM: LD    A,H                 USE LIMIT INSTEAD
3728  0C61  ED 44                     NEG                       MAKE THE LIMIT NEGATIVE
3729  0C63  C9                        RET
3730                        ;
3731                        ***********************************
3732                        *   MULTIPLY BY 3 SUBROUTINE      *
3733                        ***********************************
3734                        ;
3735  0C64  6F              MULTX3:   LD    L,A                 SAVE THE VALUE IN L
3736  0C65  A7                        AND   A                   NEGATIVE NUMBER TO BE MULITPLIED?
3737  0C66  FA 71 0C                  JP    M,MULTX3M           YES, GO HANDLE IT
3738  0C69  87                        ADD   A,A                 MULTIPLY THE NUMBER IN A BY 2
3739  0C6A  EA 56 0C                  JP    PE,MULTMAXP         IF OVERFLOW, USE LIMIT INSTEAD
3740  0C6D  85                        ADD   A,L                 A=ORIGINAL VALUE * 3
3741  0C6E  C3 51 0C                  JP    MULTCHKP            GO CHECK FOR OUT OF LIMIT RESULT
3742                        ;
3743  0C71  87              MULTX3M:  ADD   A,A                 MULTIPLY THE NUMBER IN A BY 2
3744  0C72  EA 60 0C                  JP    PE,MULTMAXM         IF OVERFLOW, USE LIMIT INSTEAD
3745  0C75  85                        ADD   A,L                 A=ORIGINAL VALUE * 3
3746  0C76  C3 59 0C                  JP    MULTCHKM            GO CHECK FOR OUT OF LIMIT RESULT
3747                        ;
3748                        ;
3749                        ;
3750  0C79  A7              LIMTST:   AND   A
3751  0C7A  FA 81 0C                  JP    M,LIMTSTA
3752  0C7D  BC                        CP    H
3753  0C7E  D8                        RET   C
3754  0C7F  18 06                     JR    LIMTSTB
3755                        ;
3756  0C81  ED 44           LIMTSTA:  NEG
3757  0C83  BC                        CP    H
3758  0C84  2F                        CPL                       DO A TWO'S COMPLEMENT
3759  0C85  3C                        INC   A                     WITHOUT AFFECTING THE C FLAG
3760  0C86  D8                        RET   C                   IF VALUE LESS THAN LIMIT, RETURN
3761                        ;
3762  0C87  FD CB 42 C6     LIMTSTB:  SET   LIMFLG,(IY+FLAGS)   GREATER THAN LIMIT,SET LIMIT FLAG
3763  0C8B  C9                        RET
3764                        ;
3765                        ;
3766                        ********************************************************************
3767                        *                                                                  *
3768                        * THE FOLLOWING ROUTINE MULTIPLIES TWO UNSIGNED 8  BIT INTEGERS AND *
3769                        * LEAVES THE RESULTANT IN THE "HL" REGISTER PAIR                   *
3770                        * INPUT:  C = MULTIPLICAND                                         *
3771                        *         H = MULTIPLIER           OUTPUT:  "HL"                   *
3772                        * DESTROYS:  B                     RETURNS WITH CARRY = 0          *
3773                        * TIMING INCLUDING CALL:  BEST CASE=211 CLOCKS, WORST CASE=268 CLOCKS *
3774                        *                         AVERAGE = APPROXIMATELY 240 CLOCKS       *
3775                        *                                                                  *
3776                        ********************************************************************
3777                        ;
3778                        ;
3779  0C8C  2E 00           MULTIPLY: LD    L,0                 CLEAR "L"
3780  0C8E  45                        LD    B,L                 CLEAR "B"
3781                        ;
3782  0C8F  29                        ADD   HL,HL
3783  0C90  30 01                     JR    NC,MULTJP1
3784  0C92  09                        ADD   HL,BC
3785  0C93  29              MULTJP1:  ADD   HL,HL
3786  0C94  30 01                     JR    NC,MULTJP2
3787  0C96  09                        ADD   HL,BC
3788  0C97  29              MULTJP2:  ADD   HL,HL
3789  0C98  30 01                     JR    NC,MULTJP3
3790  0C9A  09                        ADD   HL,BC
3791  0C9B  29              MULTJP3:  ADD   HL,HL
3792  0C9C  30 01                     JR    NC,MULTJP4
3793  0C9E  09                        ADD   HL,BC
3794  0C9F  29              MULTJP4:  ADD   HL,HL
3795  0CA0  30 01                     JR    NC,MULTJP5
3796  0CA2  09                        ADD   HL,BC
3797  0CA3  29              MULTJP5:  ADD   HL,HL
3798  0CA4  30 01                     JR    NC,MULTJP6
3799  0CA6  09                        ADD   HL,BC
3800  0CA7  29              MULTJP6:  ADD   HL,HL
3801  0CA8  30 01                     JR    NC,MULTJP7
3802  0CAA  09                        ADD   HL,BC
3803  0CAB  29              MULTJP7:  ADD   HL,HL
3804  0CAC  D0                        RET   NC
3805  0CAD  09                        ADD   HL,BC
3806  0CAE  C9                        RET
3807                        ;
3808                        *--------------------------------------*
3809                        * ADD ACC TO HL REGISTER               *
3810                        *--------------------------------------*
3811                        ;
3812  0CAF  85              ADDHL:    ADD   A,L
3813  0CB0  6F                        LD    L,A
3814  0CB1  D0                        RET   NC
3815  0CB2  24                        INC   H
3816  0CB3  C9                        RET
3817                        ;
3818                        ;  WAIT FOR END OF CONVERSION ROUTINES
3819                        ;
3820  0007            EOCTIME:  EQU   7                   ALLOW ABOUT 120 US FOR CONVERSION
3821                        ;
```

```
3822  OCB4  06 07              EOCWAIT:  LD    B,EOCTIME              GET LOOP COUNTER FOR TIMEOUT
3823  OCB6  DD CB 11 AE                  RES   ADCERR,(IX+REG1)       RESET HARDWARE ERROR FLAG
3824                           ;
3825  OCBA  3A 20 20           EOCLOOP:  LD    A,(X+COMMAND)          GET EOC AND REELS ENABLED BITS
3826  OCBD  CB 5F                        BIT   EOC,A                  IS THE CONVERSION DONE?
3827  OCBF  C0                           RET   NZ                     YES, RETURN WITH Z FLAG CLEAR
3828  OCC0  CB 47                        BIT   ENBLRLS,A              ARE REELS STILL ENABLED
3829  OCC2  20 09                        JR    NZ,EOCEXIT             NO, RETURN WITH Z SET AND C CLR
3830  OCC4  10 F4                        DJNZ  EOCLOOP                IF THE TIME IS NOT UP, LOOP
3831                           ; ERROR:  A/D CONVERTER DID NOT RESPOND WITH EOC IN 120 US
3832  OCC6  DD CB 11 EE                  SET   ADCERR,(IX+REG1)       SET HARDWARE ERROR FLAG
3833  OCCA  AF                           XOR   A                      SET Z FLAG TO INDICATE NOT DONE
3834  OCCB  37                           SCF                          SET C FLAG TO INDICATE FAILURE
3835  OCCC  C9                           RET
3836                           ;
3837                           ; CONTROL PROCESSOR DROPPED REELS ENABLED
3838  OCCD  AF                 EOCEXIT:  XOR   A                      SET Z FLAG TO INDICATE NOT DONE
3839  OCCE  C9                           RET                          ; CLEAR C FLAG TO INDICATE EXIT
3840                           ;
3841                           ; RETRY ROUTINE TO BE CALLED AFTER ADC FAILURE HAS BEEN DETECTED
3842                           ; OR IF ENABLE REELS WAS DROPPED WHILE WAITING FOR END OF CONVERSION
3843                           ;
3844  OCCF  06 0E              EOCRETRY: LD    B,EOCTIME*2            ALLOW EVEN LONGER THIS TIME
3845  OCD1  CD BA OC                     CALL  EOCLOOP                GO WAIT FOR END OF CONVERSION
3846  OCD4  20 OB                        JR    NZ,FIXEDUP             IF CONVERSION DONE, RETURN
3847  OCD6  D0                           RET   NC                     IF REELS ENABLED DROPPED, RETURN
3848  OCD7  DD CB 11 C6                  SET   ADCDEAD,(IX+REG1)      SET HARDWARE FLAG FOR CAN'T
3849                           ;                                      RESTART THE A/D CONVERTER
3850  OCDB  3E OF                        LD    A,OFH                  TURN OFF THE POWER BOARD
3851  OCDD  32 OA 20                     LD    (X+CONTROL),A
3852  OCE0  76                           HALT                         ROLL OVER AND PLAY DEAD
3853                           ;
3854  OCE1  DD CB 11 AE        FIXEDUP:  RES   ADCERR,(IX+REG1)       RESET THE THE HARDWARE ERROR BIT
3855  OCE5  C9                           RET                          ;THE CONVERSION RETRY WORKED!!!
3856                           ;
3857                                     ORG   (($-1).AND.OFFOOH)+100H  START THIS TABLE AT THE NEXT
3858                           ;                                         ADDRESS ENDING IN 00
3859                           *----------------------------------------*
3860                           ;
3861                           ; THIS APPROXIMATES THE FUNCTION:  DIFFSQR(X)=0.5*(X**2)
3862                           ;
3863  OD00  01 01 02 05        DIFFSQR:  DB    001,001,002,005,008,012,018,024,032,040
3864  OD04  08 OC 12 18
3865  OD08  20 28
3866  OD0A  32 3D 48 53                  DB    050,061,072,083,098,113,127,145,162,180
3867  OD0E  62 71 7F 91
3868  OD12  A2 B4
3869  OD14  C8 DC F2                     DB    200,220,242
3870                           ;
3871                           ; GAINCAL
3872                           ; THIS SUBROUTINE USES THE COLUMN GAIN TO CALCULATE THE OFFSET VALUES
3873                           ; USED IN REFERENCE GENERATION.
3874                           ; ENTER WITH:  A=-(ATMOSPHERIC READING FROM COLUMN SENSOR +
3875                           ;                    CALIBRATE TARGET)
3876                           ;              C=LOOP MIDPOINT
3877                           ;              HL POINTS TO GAIN AVERAGE BYTES
3878                           ;              D=CONTENTS OF SAMPLE COUNTER - 1
3879                           ;
3880                           ; THE RESULTING OFFSETS ARE PUT INTO THE MACHINE REEL REFERENCE
3881                           ; GENERATION TABLES.
3882                           ;
3883  OD17  81                 GAINCAL:  ADD   A,C                    A=CALIBRATE DISTANCE
3884  OD18  5F                           LD    E,A                    SAVE THE DISTANCE IN E
3885  OD19  86                           ADD   A,(HL)                 ADD THIS DISTANCE VALUE INTO
3886  OD1A  77                           LD    (HL),A                   THE AVERAGE DISTANCE STORAGE
3887  OD1B  2C                           INC   L                      POINT TO HIGH BYTE
3888  OD1C  30 01                        JR    NC,GCCHKSC             IF NO CARRY, CHECK SAMPLE CTR
3889  OD1E  34                           INC   (HL)                   PROPAGATE CARRY
3890  OD1F  14                 GCCHKSC:  INC   D                      IS THIS THE LAST OF THE
3891  OD20  15                           DEC   D                        FOUR SAMPLES?
3892  OD21  20 OA                        JR    NZ,GCOFFSET            NO, DON'T CALCULATE AVERAGE
3893  OD23  46                           LD    B,(HL)                 B=HIGH BYTE OF ACCUMULATED SUM
3894  OD24  CB 18                        RR    B                      DIVIDE THE SUM BY 4
3895  OD26  1F                           RRA
3896  OD27  CB 18                        RR    B
3897  OD29  1F                           RRA
3898  OD2A  CE 00                        ADC   A,0                    ADD CARRY BIT TO ROUND RESULT
3899  OD2C  5F                           LD    E,A                    E=AVERAGE DISTANCE
3900                                     IF    STRETCH                CALCULATE NEW OFFSET VALUES
3901  OD2D  4B                 GCOFFSET: LD    C,E                    THE FAST GO REFERENCE OFFSET
3902  OD2E  26 3C                        LD    H,60                     IS THE CALIBRATE DISTANCE
3903  OD30  FD CB 42 7E                  BIT   V200FLAG,(IY+FLAGS)      MULTIPLIED BY 60 OR 89 AND
3904  OD34  20 02                        JR    NZ,GCMULDIS              THEN DIVIDED BY 2
3905  OD36  26 59                        LD    H,89
3906  OD38                     GCMULDIS:
3907                                     ELSE
3908                           GCOFFSET: LD    C,E                    THE FAST GO REFERENCE OFFSET
3909                                     LD    H,89                     IS THE CALIBRATE DISTANCE
3910                           ;                                        MULTIPLIED BY 89 AND
3911                           ;                                        THEN DIVIDED BY 2
3912                                     ENDIF
3913  OD38  CD 8C OC                     CALL  MULTIPLY               MULTIPLY THE CALIBRATE DISTANCE
3914  OD3B  CB 3C                        SRL   H                        THEN DIVIDE IT BY 2
```

```
3915    0D3D    CB 1D                           RR      L
3916    0D3F    30 01                           JR      NC,CALREFF2             IF NO CARRY, DON'T ROUND UP
3917    0D41    23                              INC     HL                      CARRY SO ROUND UP
3918                            ; GO CALCULATE THE REWIND REFERENCE OFFSET AND THE STOP REFERENCE
3919                            ; OFFSET AND PUT THE RESULTS IN THE SLOW REFERENCE TABLE.
3920    0D42    CD 83 0D        CALREFF2: CALL  GAINCAL2
3921    0D45    7B                              LD      A,E                     SAVE CALIBRATE DISTANCE IN A
3922    0D46    21 2B 10                        LD      HL,MREFSNGO             MOVE THE OFFSETS FROM THE
3923    0D49    11 23 10                        LD      DE,MREFNGO              SLOW REFERENCE TABLE TO
3924    0D4C    01 06 00                        LD      BC,6                    THE FAST REFERENCE TABLE
3925    0D4F    ED B0                           LDIR
3926    0D51    4F                              LD      C,A                     SAVE THE CALIBRATE DISTANCE
3927                            ; CALCULATE THE POINT WHICH IS EQUAL TO THE GO REFERENCE
3928    0D52    CB 3F                           SRL     A                       A = CALIBRATE DISTANCE / 2
3929                                            IF      STRETCH
3930    0D54    FD CB 42 7E                     BIT     V200FLAG,(IY+FLAGS)     IF 200 IPS, LIMIT VALUE =
3931    0D58    20 0B                           JR      NZ,PUTMLIM              CALIBRATE DISTANCE / 2
3932                                            ENDIF
3933    0D5A    CB 3F                           SRL     A                       MULTIPLY THE CALIBRATE DISTANCE
3934    0D5C    47                              LD      B,A                     BY 11/16 TO GET THE POINT
3935    0D5D    CB 3F                           SRL     A                       WHICH IS EQUAL TO THE
3936    0D5F    CB 3F                           SRL     A                       GO REFERENCE
3937    0D61    80                              ADD     A,B
3938    0D62    91                              SUB     C
3939    0D63    ED 44                           NEG
3940    0D65    32 31 10        PUTMLIM: LD     (MLIM),A                        STORE THE LIMIT VALUE
3941                                            IF      STRETCH                 CALCULATE NEW OFFSET VALUES
3942    0D68    26 0F                           LD      H,15                    THE SLOW GO REFERENCE OFFSET
3943    0D6A    FD CB 42 7E                     BIT     V200FLAG,(IY+FLAGS)     IS THE CALIBRATE DISTANCE
3944    0D6E    20 02                           JR      NZ,GCMULDI2             MULTIPLIED BY 15 OR 22 AND
3945    0D70    26 16                           LD      H,22                    THEN DIVIDED BY 8
3946    0D72            GCMULDI2:
3947                                            ELSE
3948                                            LD      H,22                    THE SLOW GO REFERENCE OFFSET
3949                            ;                                               IS THE CALIBRATE DISTANCE
3950                            ;                                               MULTIPLIED BY 22 AND
3951                            ;                                               THEN DIVIDED BY 8
3952                                            ENDIF
3953    0D72    CD 8C 0C                        CALL    MULTIPLY                MULITPLY THE CALIBRATE DISTANCE
3954    0D75    7D                              LD      A,L                     THEN DIVIDE IT BY 8
3955    0D76    CB 3C                           SRL     H
3956    0D78    1F                              RRA
3957    0D79    CB 3C                           SRL     H
3958    0D7B    1F                              RRA
3959    0D7C    CB 3C                           SRL     H
3960    0D7E    1F                              RRA
3961    0D7F    6F                              LD      L,A
3962    0D80    30 01                           JR      NC,CALREFS              IF NO CARRY, DON'T ROUND UP
3963    0D82    23                              INC     HL                      CARRY, SO ROUND RESULT UP
3964    0D83            CALREFS:
3965                            ; JUST FALL THROUGH TO CALCULATE THE SLOW REFERENCE REWIND AND
3966                            ; STOP OFFSETS. THEN RETURN TO THE ROUTINE WHICH CALLED GAINCAL
3967                            ;
3968                                            IF      STRETCH
3969                            ;
3970                            ; GAINCAL2
3971                            ; USING THE GO OFFSET VALUE IN HL, CALCULATE THE REWIND OFFSET
3972                            ; AND THE STOP OFFSET.
3973                            ;   200 IPS:
3974                            ;      REWIND OFFSET = GO OFFSET * 3/4
3975                            ;      STOP OFFSET = -GO OFFSET
3976                            ;   75/125 IPS:
3977                            ;      REWIND OFFSET = GO OFFSET / 2
3978                            ;      STOP OFFSET = 0
3979                            ;
3980                            ; ENTER WITH: HL=GO OFFSET
3981                            ;
3982                            ; THE RESULTS ARE WRITTEN INTO THE MACHINE REEL SLOW REFERENCE TABLE
3983                            ; DE IS PRESERVED
3984                            ;
3985    0D83    22 2D 10        GAINCAL2: LD    (MREFSGO),HL                    STORE THE GO OFFSET
3986    0D86    FD CB 42 7E                     BIT     V200FLAG,(IY+FLAGS)     IS THIS A 200 IPS DRIVE?
3987    0D8A    28 1A                           JR      Z,GAINCAL3              NO, CALCUALTE 75/125 OFFSETS
3988    0D8C    E5                              PUSH    HL                      SAVE THE GO OFFSET
3989    0D8D    44                              LD      B,H                     BC = GO OFFSET
3990    0D8E    4D                              LD      C,L
3991    0D8F    CB 38                           SRL     B                       DIVIDE GO OFFSET BY 4
3992    0D91    CB 19                           RR      C
3993    0D93    CB 38                           SRL     B
3994    0D95    CB 19                           RR      C
3995    0D97    ED 42                           SBC     HL,BC                   HL = GO OFFSET - (GO OFFSET/4)
3996                            ;                                                  = GO OFFSET * 3/4
3997                            ;                                                  (CLEAR CARRY BIT TOO)
3998    0D99    22 2F 10                        LD      (MREFSREW),HL           REW OFFSET = GO OFFSET * 3/4
3999    0D9C    C1                              POP     BC                      BC = GO OFFSET
4000    0D9D    21 00 00                        LD      HL,0                    CLEAR HL
4001    0DA0    ED 42                           SBC     HL,BC                   HL = -GO OFFSET
4002    0DA2    22 2B 10        PUTNGO:  LD     (MREFSNGO),HL                   STORE THE NO-GO OFFSET
4003    0DA5    C9                              RET                             ;ALL DONE, RETURN
4004                            ;
4005    0DA6    CB 3C           GAINCAL3: SRL   H                               DIVIDE GO OFFSET BY 2
```

```
4006  ODA8  CB 1D                  RR    L
4007  ODAA  22 2F 10               LD    (MREFSREW),HL      REW OFFSET = GO OFFSET / 2
4008  ODAD  21 00 00               LD    HL,0               NO-GO OFFSET = 0
4009  ODB0  18 F0                  JR    PUTNG0             GO STORE IT
4010                         ;
4011                         ;     ELSE                     OLD REW AND STOP OFFSET CODE
4012                         ;
4013                         ; GAINCAL2
4014                         ; USING THE GO OFFSET VALUE IN HL, CALCULATE THE REWIND OFFSET
4015                         ; WHICH IS (GO OFFSET)/2 AND THE STOP OFFSET WHICH IS
4016                         ; (GO OFFSET)*(-5/16)
4017                         ; ENTER WITH:  HL=GO OFFSET
4018                         ;
4019                         ; THE RESULTS ARE WRITTEN INTO THE MACHINE REEL SLOW REFERENCE TABLE
4020                         ; DE IS PRESERVED
4021                         ;
4022                         GAINCAL2: LD  (MREFSGO),HL      STORE THE GO OFFSET
4023                                   SRL H                DIVIDE GO OFFSET BY 2
4024                                   RR  L
4025                                   LD  (MREFSREW),HL    REW OFFSET = GO OFFSET / 2
4026                                   LD  B,H              BC = GO OFFSET / 2
4027                                   LD  C,L
4028                                   LD  HL,0             CLEAR HL
4029                                   BIT V200FLAG,(IY+FLAGS) IS THIS A 200 IPS DRIVE?
4030                                   JR  Z,PUTNG0         NO, NO-GO OFFSET = 0
4031                                   SRL B                BC=GO OFFSET/4
4032                                   RR  C
4033                                   SBC HL,BC            HL=(-1/4)*GO OFFSET
4034                                   SRL B                DIVIDE BC BY 4 AGAIN TO LEAVE
4035                                   RR  C                   BC=GO OFFSET/16
4036                                   SRL B
4037                                   RR  C
4038                                   SBC HL,BC            HL=-(GO OFFSET/4)-(GO OFFSET/16)
4039                         ;                                 =GO OFFSET*(-5/16)
4040                         PUTNG0:   LD  (MREFSNGO),HL    STORE THE NO-GO OFFSET
4041                                   RET                  ;ALL DONE, RETURN
4042                         ;
4043                         ;         ENDIF                (STRETCH)
4044
4045                         *==========================================*
4046                         *      THREAD/LOAD - UNLOAD                *
4047                         *==========================================*
4048                         ;
4049  ODB2  77               DECODE:   LD  (HL),A           STORE THE OLD COMMAND IN OLDCMD
4050  ODB3  47                         LD  B,A              SAVE REELS CODE
4051  ODB4  E6 07                      AND 07H
4052                         ;
4053                         *------------------------------------------*
4054                         *  REELS REGISTER MACH COMMAND DECODE
4055                         *------------------------------------------*
4056                         ;
4057                         ;
4058  ODB6  21 CF 0D                   LD  HL,MTABLE
4059  ODB9  CD AF 0C                   CALL ADDHL
4060  ODBC  4E                         LD  C,(HL)
4061                         ;
4062  ODBD  78                         LD  A,B
4063  ODBE  1F                         RRA
4064  ODBF  1F                         RRA
4065  ODC0  1F                         RRA
4066  ODC1  E6 07                      AND 07H
4067                         ;
4068                         *------------------------------------------*
4069                         *  REELS REGISTER FILE COMMAND DECODE
4070                         *------------------------------------------*
4071                         ;
4072                         ;
4073  ODC3  21 D7 0D                   LD  HL,FTABLE
4074  ODC6  CD AF 0C                   CALL ADDHL
4075  ODC9  46                         LD  B,(HL)
4076  ODCA  ED 43 33 10                LD  (MVELREF),BC     STORE C IN MVELREF AND
4077                         ;                              B IN FVELREF
4078  ODCE  C9                         RET
4079                         ;
4080                         ; NOTE THAT THE VELOCITY OF 01 IS RESERVED AS A FLAG FOR
4081                         ; RECOGNIZING THE LOW GAIN COMMAND
4082                         ;
4083  ODCF  56 64 B9 D8      MTABLE:   DB  MCW1,MCW2,MCCW1,MCCW2,MLOGAINF,0,0,0
4084  ODD3  01 00 00 00
4085                         ;
4086  ODD7  65 1E B1 E0      FTABLE:   DB  FCW1,FCW2,FCCW1,FCCW2,FLOGAINF,0,0,0
4087  ODDB  01 00 00 00
4088                         ;
4089                                   IF  $.UGT.1000H
4090                                   ERROR!! THE CODE IS TOO LONG.
4091                                   ENDIF
4092                         ;
4093  ODDF                             END

ASSEMBLER ERRORS =    0
```

CROSS REFERENCE

| LABEL | VALUE | REFERENCE | | | | | | |
|---|---|---|---|---|---|---|---|---|
| ADCDEAD | 0000 | -424 | 3848 | | | | | |
| ADCERR | 0005 | -429 | 3823 | 3832 | 3854 | | | |
| ADDERROR | 06EF | 2502 | -2548 | | | | | |
| ADDHL | 0CAF | -3812 | 4059 | 4074 | | | | |
| ADDIT | 0A30 | 3283 | -3294 | | | | | |
| ADDOFFST | 04C5 | 1960 | -1971 | | | | | |
| ALPLGINF | 0003 | -427 | 1017 | 1463 | 1854 | 1872 | 1892 | 3616 |
| ALPLGINM | 0004 | -428 | 1017 | 1463 | 1854 | 1872 | 1892 | 3616 |
| AVRGECUR | 1049 | -684 | 1454 | 3279 | 3307 | 3323 | 3466 | 3520 | 3646 |
| AVTIME | 0010 | -795 | 3275 | 3504 | | | | |
| BIAS | 0007 | -476 | | | | | | |
| CALAVCUR | 0A3A | -3305 | 3514 | | | | | |
| CALCREF | 0497 | 1608 | 1628 | 1634 | 1637 | -1934 | | |
| CALCTR | 104B | -685 | 1459 | 3262 | 3326 | 3372 | 3490 | |
| CALERR | 1047 | -682 | 2159 | 2787 | 2973 | 3260 | 3488 | |
| CALERSAV | 1048 | -683 | 3261 | 3386 | 3489 | 3532 | | |
| CALIBFLG | 0007 | -650 | 1455 | 1833 | 2067 | 2887 | 3631 | |
| CALIBR | 097B | 3152 | -3163 | | | | | |
| CALIBRF | 0979 | 2271 | -3154 | | | | | |
| CALIBRM | 0975 | 3059 | -3151 | | | | | |
| CALMOD1 | 0001 | -6 | 590 | 2116 | 2936 | 3198 | 3212 | 3227 | 3247 |
| | | 3333 | 3354 | 3432 | 3484 | 3580 | | |
| CALREFF | 04BA | 1942 | -1962 | | | | | |
| CALREFF2 | 0D42 | 3916 | -3920 | | | | | |
| CALREFS | 0D83 | 3962 | -3964 | | | | | |
| CALRGMF | 0005 | -647 | 1455 | 1604 | 2207 | 3422 | | |
| CALRGMM | 0006 | -648 | 1455 | 1629 | 2996 | 3569 | | |
| CALVEL | 0553 | 2112 | -2115 | | | | | |
| CALVELM | 0889 | 2932 | -2935 | | | | | |
| CANGO | 07B8 | 2633 | 2712 | -2721 | 2767 | | | |
| CCINIT | 0030 | -786 | 1458 | 3325 | 3374 | | | |
| CHKAVT2 | 0B49 | 3499 | -3504 | | | | | |
| CHKCALF | 061D | 2265 | -2269 | | | | | |
| CHKCALM | 0947 | 3053 | -3057 | | | | | |
| CHKDIR2 | 04DE | 1980 | 1984 | -1987 | | | | |
| CHKGO | 03D4 | 1656 | -1660 | | | | | |
| CHKINTCT | 03E6 | 1645 | 1649 | 1671 | -1685 | | | |
| CHKLGAIN | 0433 | 1832 | -1858 | | | | | |
| CHKMCAL | 039E | 1606 | -1629 | | | | | |
| CHKMLG | 0700 | 2551 | -2556 | | | | | |
| CHKSAMP | 0AC3 | 3404 | -3406 | | | | | |
| CHKSAMP2 | 0B7A | 3550 | -3552 | | | | | |
| CHKSIGN | 0711 | 2559 | -2567 | | | | | |
| CHKSLDC | 0724 | 1702 | 1704 | -2586 | | | | |
| CHKTPCT | 0766 | 2614 | 2617 | -2626 | | | | |
| CKAVT | 0A1B | 3270 | -3275 | | | | | |
| CKMREF2 | 09CD | -3217 | 3256 | | | | | |
| CKRWSLDC | 07E2 | 2608 | -2760 | | | | | |
| CKSIGN | 079B | 2687 | -2697 | | | | | |
| CKTRNDIR | 069E | 2452 | -2454 | | | | | |
| CLRCAL | 0BF1 | 3626 | -3631 | | | | | |
| CLRLP10 | 0AE8 | -3429 | 3431 | | | | | |
| CLRLP11 | 0BA5 | -3577 | 3579 | | | | | |
| CLRPVM | 0A94 | 3213 | 3334 | -3361 | | | | |
| COMMAND | 0020 | -452 | 453 | 947 | 960 | 981 | 1112 | 1261 | 1548 |
| | | 1652 | 1978 | 2237 | 2455 | 2538 | 2600 | 3026 | 3340 |
| | | 3825 | | | | | | |
| CONTROL | 000A | -381 | 1101 | 1151 | 1255 | 1299 | 1493 | 1912 | 2064 |
| | | 2263 | 2267 | 2276 | 2280 | 2884 | 3051 | 3055 | 3064 |
| | | 3068 | 3851 | | | | | |
| CPLNEAR3 | 05CC | 2220 | -2222 | | | | | |
| CPLNEAR4 | 08F8 | 3009 | -3011 | | | | | |
| CURTADLY | 0002 | -761 | 2277 | 3065 | | | | |
| DEBUG1 | 0000 | -2 | 430 | 2097 | 2782 | 2795 | 2815 | 2917 |
| DEBUG2 | 0000 | -4 | 704 | 1029 | 1179 | 1205 | 1328 | 1355 | 1500 |
| | | 2281 | 2288 | 2301 | 3069 | 3076 | 3088 | 3392 | 3538 |
| DEBUG3 | 0000 | -16 | 357 | 567 | 695 | 1048 | 1061 | 1500 | 1706 |
| | | 1720 | 2012 | 2025 | 2038 | 2833 | 2845 | 2858 | 3379 |
| | | 3451 | 3527 | 3632 | | | | |
| DECODE | 0DB2 | 1106 | -4049 | | | | | |
| DIFFSQR | 0D00 | 2375 | -3863 | | | | | |
| DIRSAV | 0046 | -669 | 2605 | 2666 | 2721 | | | |
| DISPATCH | 0051 | -944 | 961 | 971 | | | | |
| DOIT | 0084 | 959 | -973 | | | | | |
| DOITNOW | 0087 | 968 | -974 | | | | | |
| ENABHPLG | 0468 | 1883 | -1890 | | | | | |
| ENBLRLS | 0000 | -455 | 982 | 1113 | 1262 | 1549 | 3828 | |
| ENTCAL | 0480 | 1842 | -1907 | | | | | |
| EOC | 0003 | -458 | 2029 | 2849 | 3826 | | | |
| EOCBYTE | 0020 | -453 | 2029 | 2849 | | | | |
| EOCEXIT | 0CCD | 3829 | -3838 | | | | | |
| EOCLOOP | 0CBA | -3825 | 3830 | 3845 | | | | |
| EOCRETRY | 0CCF | 1004 | 1045 | 1127 | 1145 | 1276 | 1293 | 1480 | 1518 |
| | | 2035 | 2855 | -3844 | | | | |
| EOCTIME | 0007 | -3820 | 3822 | 3844 | | | | |
| EOCWAIT | 0CB4 | 1000 | 1041 | 1123 | 1141 | 1272 | 1289 | 1476 | 1514 |
| | | 2031 | 2851 | -3822 | | | | |
| ERRTBLE | 0C00 | 2383 | -3658 | 3693 | | | | |
| EXITSERV | 0484 | 1114 | 1125 | 1128 | 1143 | 1146 | 1263 | 1274 | 1277 |
| | | 1291 | 1294 | 1478 | 1481 | 1516 | 1519 | 1550 | -1911 |

| | | | | | | | | |
|---|---|---|---|---|---|---|---|---|
| | | 2033 | 2036 | 2853 | 2856 | | | |
| FATMOSPH | 104C | -686 | 1008 | 2083 | 3183 | 3436 | | |
| FBEMFPOL | 0006 | -393 | 1151 | | | | | |
| FBEMFSEN | 0002 | -339 | 1135 | 1144 | 1147 | | | |
| FBRAKE | 0000 | -383 | 2263 | 2267 | | | | |
| FCALTARG | 000E | -802 | 3185 | 3188 | 3191 | 3437 | | |
| FCCW1 | 00B1 | -833 | 4086 | | | | | |
| FCCW2 | 00E0 | -834 | 4086 | | | | | |
| FCOLSEN | 0004 | -347 | 984 | 1003 | 1006 | 1118 | 1126 | 1129 | 1483 |
| | | 1517 | 1520 | 1563 | 2034 | 2037 | | |
| FCW1 | 0065 | -831 | 4086 | | | | | |
| FCW2 | 001E | -832 | 4086 | | | | | |
| FEEDMOT | 0112 | -1096 | 1374 | 1856 | | | | |
| FEEDMOT2 | 0131 | 1108 | -1112 | | | | | |
| FEEDMOT3 | 0142 | 1119 | -1123 | | | | | |
| FEEDMOT4 | 0162 | 1136 | -1140 | | | | | |
| FEEDMOT5 | 018B | 1153 | -1159 | | | | | |
| FEEDMOT8 | 025C | 1301 | -1307 | | | | | |
| FEEDMOT9 | 026A | 1305 | 1310 | -1316 | | | | |
| FEEDMOTB | 0193 | 1159 | -1164 | | | | | |
| FEEDMOTC | 0197 | 1156 | -1166 | | | | | |
| FEEDMOTD | 0264 | 1307 | -1312 | | | | | |
| FEEDMOTE | 0268 | 1304 | -1314 | | | | | |
| FEEDMOTM | 01F7 | 1225 | -1254 | | | | | |
| FGAVRGE | 1053 | -693 | 3435 | | | | | |
| FILEACCW | 0003 | -414 | 1155 | 1161 | 1165 | | | |
| FILEACW | 0002 | -413 | 1154 | 1160 | 1164 | | | |
| FILEMAX | 007F | -764 | 2395 | 2398 | 2563 | | | |
| FILEMOT | 0008 | -364 | 1204 | 2272 | 2774 | | | |
| FILEOUT | 0007 | -587 | 2550 | | | | | |
| FILEREF | 1010 | -534 | 1526 | 1602 | 2139 | 3197 | 3449 | |
| FILEREFS | 1018 | -539 | 1527 | 1626 | 2071 | 2130 | 2156 | 2218 | 3181 |
| | | 3196 | 3450 | | | | | |
| FILESERV | 0AD3 | 3407 | -3419 | | | | | |
| FILTLENF | 0007 | -518 | 1522 | 3427 | | | | |
| FILTLENM | 0007 | -530 | 1486 | 3575 | | | | |
| FIXEDUP | 0CE1 | 3846 | -3854 | | | | | |
| FLAGS | 0042 | -624 | 1039 | 1642 | 1865 | 1878 | 1886 | 1983 | 2111 |
| | | 2163 | 2214 | 2261 | 2400 | 2433 | 2549 | 2611 | 2731 |
| | | 2762 | 2931 | 2977 | 3003 | 3049 | 3271 | 3419 | 3500 |
| | | 3618 | 3762 | 3903 | 3930 | 3943 | 3986 | | |
| FLAGSCAL | 0043 | -640 | 1456 | 1604 | 1629 | 1833 | 2067 | 2207 | 2269 |
| | | 2593 | 2887 | 2996 | 3057 | 3569 | 3631 | | |
| FLEOUT2 | 0184 | 1183 | -1186 | | | | | |
| FLIM | 1020 | -543 | 2108 | | | | | |
| FLINCAL | 05F8 | 2208 | -2248 | | | | | |
| FLINEAR | 05EB | 2206 | 2210 | 2213 | 2217 | 2223 | 2231 | 2233 | 2236 |
| | | -2243 | 2249 | 2296 | 2299 | | | |
| FLOGAINF | 0001 | -843 | 1176 | 4086 | | | | |
| FM35 | 0153 | 1124 | -1129 | | | | | |
| FM5 | 0176 | 1142 | -1147 | | | | | |
| FMAVRGE | 104F | -691 | 992 | 3400 | | | | |
| FMGUESS | 002B | -799 | 1009 | | | | | |
| FMIDDLE | 1035 | -576 | 997 | 1011 | 1240 | 1443 | 1445 | 1512 | 2026 |
| | | 3388 | 3416 | | | | | |
| FNONLIN | 05FE | 2238 | 2240 | -2252 | | | | |
| FNONLINB | 0002 | -426 | 2243 | 2252 | | | | |
| FONMOFF | 000D | -756 | 1254 | | | | | |
| FORWARD | 0002 | -457 | 1653 | 1991 | 2455 | 2538 | 2613 | 2666 | 2722 |
| FPOS16 | 1001 | -509 | 2110 | 2126 | | | | |
| FPOS24 | 1002 | -510 | 2123 | | | | | |
| FPOS32 | 1003 | -511 | 2124 | | | | | |
| FPOS40 | 1004 | -512 | 2113 | | | | | |
| FPOS8 | 1000 | -508 | 518 | 1511 | 2125 | 2128 | 3385 | 3426 | |
| FPULSEOF | 0030 | -480 | 1899 | 3272 | 3423 | | | |
| FREELENB | 0001 | -384 | 2276 | 2280 | | | | |
| FREF16 | 1006 | -515 | 518 | 2141 | 3199 | | | |
| FREF8 | 1005 | -514 | 2149 | | | | | |
| FREFGO | 1014 | -536 | | | | | | |
| FREFNGO | 1012 | -535 | 3445 | | | | | |
| FREFREW | 1016 | -537 | | | | | | |
| FREFS8 | 1007 | -516 | 2132 | | | | | |
| FREFSGO | 101C | -541 | | | | | | |
| FREFSNGO | 101A | -540 | | | | | | |
| FREFSREW | 101E | -542 | | | | | | |
| FTABLE | 0DD7 | 4073 | -4086 | | | | | |
| FVELREF | 1034 | -565 | 1175 | | | | | |
| FWDSRPF | 00F7 | -822 | 2244 | | | | | |
| FWDSRPM | 0009 | -824 | 3033 | | | | | |
| GAINCAL | 0D17 | 3440 | 3588 | -3883 | | | | |
| GAINCAL2 | 0D83 | 3920 | -3985 | | | | | |
| GAINCAL3 | 0DA6 | 3987 | -4005 | | | | | |
| GATEENAB | 0006 | -417 | 904 | | | | | |
| GCCHKSC | 0D1F | 3888 | -3890 | | | | | |
| GCMULDI2 | 0D72 | 3944 | -3946 | | | | | |
| GCMULDIS | 0D38 | 3904 | -3906 | | | | | |
| GCOFFSET | 0D2D | 3892 | -3901 | | | | | |
| GETATMOS | 00AF | 987 | -1000 | | | | | |
| GO | 0001 | -456 | 1662 | 1979 | 2237 | 2607 | 3026 | 3340 | |
| GOTATMOS | 00BC | 1001 | -1006 | | | | | |
| GOTCMD | 0373 | 1554 | -1556 | | | | | |
| GOTCMD2 | 0740 | 2603 | -2605 | | | | | |
| GOTREFS | 03B2 | 1631 | -1642 | | | | | |
| HFILE | 0A4C | 3170 | -3321 | | | | | |

| | | | | | | | | |
|---|---|---|---|---|---|---|---|---|
| HIGHGAIN | 006D | -852 | 1097 | 1835 | 2621 | 3164 | 3571 | |
| HIPULSE | 02EA | -782 | 1898 | 3424 | 3425 | | | |
| HITCHCMD | 0001 | -8 | 854 | 1646 | 1837 | 1973 | 2004 | 2588 |
| HITCHMOD | 00ED | -855 | 1648 | 1838 | 1975 | 2590 | | |
| HITCHREF | 04F3 | 1976 | -2005 | | | | | |
| HMACH | 0B56 | 3172 | -3518 | | | | | |
| HOLDFILE | 00F1 | -861 | | | | | | |
| HOLDMACH | 00F2 | -863 | | | | | | |
| IMAXREW | 0048 | -769 | 2777 | | | | | |
| INCMREF | 09DF | 3217 | -3237 | | | | | |
| INCTPCT | 07D1 | 2629 | -2739 | | | | | |
| INIT | 003A | 920 | -927 | | | | | |
| INIT0 | 1032 | -558 | 580 | 929 | | | | |
| INIT0CNT | 0005 | -580 | 930 | | | | | |
| INIT0LP | 0045 | -932 | 934 | | | | | |
| INIT1 | 1042 | -608 | 665 | 1021 | | | | |
| INIT1CNT | 0004 | -665 | 1022 | | | | | |
| INIT1LP | 00DE | -1023 | 1025 | | | | | |
| INIT2 | 1037 | -582 | 596 | 1495 | | | | |
| INIT2CNT | 0005 | -596 | 1496 | | | | | |
| INIT2LP | 0337 | -1497 | 1499 | | | | | |
| INITLP3 | 00A5 | -994 | 996 | | | | | |
| INTCTR | 1038 | -586 | 1560 | 1685 | 2550 | 2665 | | |
| LDFCOL | 01D8 | 1177 | -1231 | | | | | |
| LDFCOL1 | 01ED | 1242 | -1244 | | | | | |
| LDFCOL2 | 01F2 | 1245 | -1247 | | | | | |
| LDMCOL | 02AB | 1326 | -1414 | | | | | |
| LDMCOL1 | 02B7 | 1417 | -1422 | | | | | |
| LDMCOL2 | 02C5 | 1426 | -1428 | | | | | |
| LDMCOL3 | 02CA | 1429 | -1431 | | | | | |
| LDMODE | 00E0 | -857 | 1171 | 1347 | | | | |
| LDTEN | 0082 | -778 | 1173 | | | | | |
| LDVACTEN | 0010 | -777 | 1233 | 1247 | 1419 | 1431 | | |
| LGDLYCTR | 103D | -600 | 1027 | 1231 | 1414 | 1858 | 1861 | 1896 |
| LIMFLG | 0000 | -626 | 2235 | 2434 | 3024 | 3762 | | |
| LIMTST | 0C79 | 2109 | 2929 | -3750 | | | | |
| LIMTSTA | 0C81 | 3751 | -3756 | | | | | |
| LIMTSTB | 0C87 | 3754 | -3762 | | | | | |
| LIN125 | 06BF | 2439 | -2506 | | | | | |
| LINEAR | 0684 | 2245 | -2433 | 3034 | | | | |
| LINHGAIN | 0709 | 2553 | 2557 | -2561 | | | | |
| LINLGAIN | 0704 | 2554 | -2558 | | | | | |
| LINREW | 0717 | 2507 | 2516 | -2572 | | | | |
| LINS | 071C | 2519 | -2575 | | | | | |
| LOADMAX | 0024 | -766 | 1200 | 1202 | 1350 | 1352 | | |
| LOOPVEL | 103C | -598 | 2120 | 2438 | 2701 | 2940 | | |
| LOWDELAY | 00A0 | -757 | 1895 | | | | | |
| LOWGAIN | 0064 | -851 | 1831 | | | | | |
| LOWGAINF | 0003 | -631 | 1867 | 1880 | 1888 | 2239 | 2552 | 3271 | 3420 |
| LOWGAINM | 0004 | -632 | 1867 | 1880 | 1888 | 2556 | 3028 | 3500 |
| LOWPULSE | 0818 | -784 | 1874 | 3273 | 3274 | 3502 | 3503 | |
| LOWVAC | 0004 | -388 | 2064 | 2884 | | | | |
| LTHRSHLD | 0002 | -748 | | | | | | |
| MACHACCW | 0005 | -416 | 1303 | 1309 | 1313 | | | |
| MACHACW | 0004 | -415 | 1302 | 1308 | 1312 | | | |
| MACHMAX | 007F | -765 | | | | | | |
| MACHMOT | 0009 | -372 | 1020 | 1354 | 3060 | | | |
| MACHREF | 1021 | -547 | 1490 | 1632 | 2959 | 3353 | 3612 | |
| MACHREFS | 1029 | -552 | 1491 | 1635 | 2891 | 2950 | 2970 | 3007 | 3207 |
| | | 3251 | 3329 | 3352 | 3477 | 3613 | | |
| MACHSERV | 0B93 | 3554 | 3556 | -3569 | | | | |
| MATMOSPH | 104D | -687 | 1051 | 2903 | 3209 | 3253 | 3327 | 3475 | 3584 |
| MAXREWER | 000C | -773 | 2790 | | | | | |
| MBEMFPOL | 0007 | -394 | 1299 | | | | | |
| MBEMFSEN | 0003 | -343 | 1283 | 1292 | 1295 | | | |
| MBRAKE | 0003 | -386 | 3051 | 3055 | | | | |
| MCALTARG | 000E | -805 | 3211 | 3220 | 3223 | 3238 | 3241 | 3255 | 3332 |
| | | 3338 | 3476 | 3585 | | | | |
| MCCW1 | 00B9 | -838 | 4083 | | | | | |
| MCCW2 | 00D8 | -839 | 4083 | | | | | |
| MCHOUT2 | 0285 | 1332 | -1335 | | | | | |
| MCOLSEN | 0005 | -353 | 1007 | 1044 | 1047 | 1267 | 1275 | 1278 | 1438 |
| | | 1469 | 1479 | 1482 | 1566 | 2854 | 2857 | |
| MCW1 | 0056 | -836 | 4083 | | | | | |
| MCW2 | 0064 | -837 | 4083 | | | | | |
| MEMORY | M 0000 | 0 | | | | | | |
| MEOCTSTO | 0213 | 1268 | -1272 | | | | | |
| MGAVRGE | 1055 | -694 | 992 | 3583 | | | | |
| MIDPULSE | 05DC | -783 | 918 | 1850 | 1913 | | | |
| MILLISEC | 067A | -781 | 917 | 954 | 955 | 963 | 965 | |
| MLIM | 1031 | -556 | 2928 | 3940 | | | | |
| MLINCAL | 0924 | 2997 | -3037 | | | | | |
| MLINEAR | 0917 | 2995 | 2999 | 3002 | 3006 | 3012 | 3020 | 3022 | 3025 |
| | | -3032 | 3038 | 3083 | 3086 | | | |
| MLOGAINF | 0001 | -840 | 1325 | 4083 | | | | |
| MM3 | 0224 | 1273 | -1278 | | | | | |
| MM5 | 0247 | 1290 | -1295 | | | | | |
| MMAVRGE | 1051 | -692 | 3546 | | | | | |
| MMGUESS | 002B | -801 | 1052 | | | | | |
| MMIDDLE | 1036 | -577 | 998 | 1054 | 1423 | 1443 | 1474 | 2846 | 3534 |
| | | 3567 | | | | | | |
| MMOT2 | 0202 | 1257 | -1261 | | | | | |
| MMOT4 | 0233 | 1284 | -1288 | | | | | |

| | | | | | | | |
|---|---|---|---|---|---|---|---|
| MNONLIN | 092A | 3027 | 3029 | -3041 | | | |
| MNONLINB | 0001 | -425 | 3032 | 3041 | | | |
| MODE0 | 0000 | -726 | 913 | | | | |
| MODE1 | 0002 | -727 | | | | | |
| MODE2 | 0004 | -728 | | | | | |
| MODE3 | 0006 | -729 | | | | | |
| MODE4 | 0008 | -730 | | | | | |
| MODE5 | 000A | -731 | 911 | 912 | | | |
| MODF | 0531 | 2073 | -2082 | | | | |
| MODM | 0867 | 2893 | -2902 | | | | |
| MONFOFF | 000B | -755 | 1102 | | | | |
| MOTION | 0008 | -749 | 1149 | 1297 | | | |
| MOVREF | 0A83 | 3345 | 3348 | -3350 | | | |
| MOVREF2 | 0A99 | 3339 | 3341 | -3367 | | | |
| MPOFFST | 002A | -808 | 3211 | 3220 | 3223 | 3238 | 3241 | 3255 |
| MPOS16 | 1009 | -521 | 2930 | 2946 | | | |
| MPOS24 | 100A | -522 | 2943 | | | | |
| MPOS32 | 100B | -523 | 2944 | | | | |
| MPOS40 | 100C | -524 | 2933 | | | | |
| MPOS8 | 1008 | -520 | 530 | 1485 | 2945 | 2948 | 3531 | 3574 |
| MPULSEOF | 0031 | -484 | 3501 | | | | |
| MREELENB | 0002 | -385 | 3064 | 3068 | | | |
| MREF16 | 100E | -527 | 530 | 3356 | | | |
| MREF8 | 100D | -526 | 2962 | | | | |
| MREFGO | 1025 | -549 | | | | | |
| MREFNGO | 1023 | -548 | 3444 | 3594 | 3923 | | |
| MREFREW | 1027 | -550 | | | | | |
| MREFS8 | 100F | -528 | 2952 | | | | |
| MREFSGO | 102D | -554 | 3985 | | | | |
| MREFSNGO | 102B | -553 | 3922 | 4002 | | | |
| MREFSREW | 102F | -555 | 3998 | 4007 | | | |
| MTABLE | 0DCF | 4058 | -4083 | | | | |
| MULTCHKM | 0C59 | -3721 | 3746 | | | | |
| MULTCHKP | 0C51 | -3714 | 3741 | | | | |
| MULTIPLY | 0C8C | 2386 | -3779 | 3913 | 3953 | | |
| MULTJP1 | 0C93 | 3783 | -3785 | | | | |
| MULTJP2 | 0C97 | 3786 | -3788 | | | | |
| MULTJP3 | 0C9B | 3789 | -3791 | | | | |
| MULTJP4 | 0C9F | 3792 | -3794 | | | | |
| MULTJP5 | 0CA3 | 3795 | -3797 | | | | |
| MULTJP6 | 0CA7 | 3798 | -3800 | | | | |
| MULTJP7 | 0CAB | 3801 | -3803 | | | | |
| MULTMAXM | 0C60 | 3721 | -3727 | 3744 | | | |
| MULTMAXP | 0C56 | 3714 | -3717 | 3739 | | | |
| MULTX2 | 0C4C | 2509 | 2546 | 2576 | 3701 | -3711 | |
| MULTX2M | 0C58 | 3712 | -3720 | | | | |
| MULTX3 | 0C64 | 2489 | 2545 | -3735 | | | |
| MULTX3M | 0C71 | 3737 | -3743 | | | | |
| MULTX4 | 0C49 | 2498 | 2564 | -3701 | | | |
| MULVEL2 | 06EC | 2510 | 2543 | -2546 | 2573 | 2577 | |
| MULVEL6 | 06E9 | 2537 | -2545 | | | | |
| MULVELA | 06E4 | 2539 | -2541 | | | | |
| MULVELH | 06AD | 2456 | -2488 | | | | |
| MULVELL | 06CB | 2443 | -2514 | | | | |
| MVELREF | 1033 | -564 | 1324 | 4076 | | | |
| NARG | 0000 | 0 | | | | | |
| NEGLOOP | 0BBD | -3596 | 3610 | | | | |
| NEGTARG2 | 078A | 2681 | -2685 | | | | |
| NEWTARG | 0012 | -2655 | 2682 | 2685 | 2692 | 2695 | |
| NEXTMS | 0058 | -947 | 958 | | | | |
| NOBRAKEF | 0619 | 2260 | 2262 | -2267 | | | |
| NOBRAKEM | 0943 | 3048 | 3050 | -3055 | | | |
| NONLIN | 064B | 2254 | -2366 | 2704 | 3043 | | |
| NONLIN2 | 0652 | 2368 | -2371 | | | | |
| NONLIN3 | 0658 | 2372 | -2375 | | | | |
| NONLIN5 | 067C | 2396 | -2400 | | | | |
| NONMAX | 0663 | 2381 | -2383 | | | | |
| NOSLDC | 07D6 | 2610 | -2751 | | | | |
| NOSLDC2 | 07DA | -2752 | 2765 | | | | |
| NOTMAX | 01CE | 1188 | 1194 | 1199 | 1201 | -1203 | |
| NOTMAX2 | 02A1 | 1340 | 1344 | 1349 | 1351 | -1353 | |
| OLDCMD | 1032 | -561 | 1104 | 1169 | 1317 | 1461 | 1556 | 2622 | 3572 |
| OLDDIR | 0002 | -630 | 2733 | | | | |
| ONTARG2 | 0B26 | 3479 | -3483 | | | | |
| ONTARGF | 09EC | 3186 | -3246 | | | | |
| OUTF14 | 053C | 2075 | -2090 | | | | |
| OUTF15 | 053D | 2065 | 2068 | -2091 | | | |
| OUTFCUR | 0606 | 2246 | -2257 | | | | |
| OUTFCUR2 | 063C | 2275 | -2287 | | | | |
| OUTFILE | 04F9 | 1691 | -2021 | | | | |
| OUTFILE1 | 0515 | 2030 | 2032 | -2037 | | | |
| OUTFILE2 | 0578 | 2134 | -2136 | | | | |
| OUTFILE3 | 0586 | -2146 | | | | | |
| OUTFILE4 | 05A4 | 2165 | -2169 | | | | |
| OUTFILE5 | 05DD | -2235 | 2298 | | | | |
| OUTFILEG | 0640 | 2229 | -2295 | | | | |
| OUTM14 | 0872 | 2895 | -2910 | | | | |
| OUTM15 | 0873 | 2885 | 2888 | -2911 | | | |
| OUTMACH | 082F | 1693 | -2844 | | | | |
| OUTMACH1 | 084B | 2850 | 2852 | -2857 | | | |
| OUTMACH2 | 08AE | 2954 | -2956 | | | | |
| OUTMACH4 | 08D0 | 2979 | -2983 | | | | |
| OUTMACH5 | 0909 | -3024 | 3085 | | | | |

| Symbol | Addr | | | | | | | |
|---|---|---|---|---|---|---|---|---|
| OUTMACHG | 096A | 3018 | -3082 | | | | | |
| OUTMAX | 067A | 2393 | -2398 | | | | | |
| OUTMCUR | 0932 | 3035 | -3046 | | | | | |
| OUTMCUR2 | 0966 | 3063 | -3075 | | | | | |
| OUTPUTF | 01CF | 1174 | -1204 | | | | | |
| OUTPUTM | 02A2 | 1322 | -1354 | | | | | |
| PF | 0994 | 3168 | -3179 | | | | | |
| PFDONE | 0A36 | 3266 | -3304 | | | | | |
| PFILE | 02CF | 1100 | -1438 | 1908 | | | | |
| PICKSIGN | 077A | 2667 | -2669 | | | | | |
| PITCTRL | 0033 | -492 | 910 | | | | | |
| PMDONE | 0B4F | 3494 | -3513 | | | | | |
| POLBIT | 0007 | -377 | 1186 | 1335 | 2257 | 2402 | 2569 | 2706 | 3284 |
| | | 3315 | | | | | | |
| POLFLAG | 0001 | -627 | 2164 | 2166 | 2225 | 2400 | 2978 | 2980 | 3014 |
| POSERR2 | 0291 | 1337 | -1343 | | | | | |
| POSFILE | 00F0 | -860 | 1099 | 1460 | 1841 | 3167 | | |
| POSMACH | 0B17 | 3375 | -3473 | | | | | |
| POSTARG | 078F | 2675 | -2689 | | | | | |
| POSTARG2 | 0799 | 2691 | -2695 | | | | | |
| PPI2CTRL | 0013 | -448 | 900 | | | | | |
| PPICTRL | 000B | -399 | 891 | | | | | |
| PREDVELF | 103A | -591 | 2117 | 3204 | 3249 | 3433 | | |
| PREDVELM | 103B | -593 | 2937 | 3362 | 3486 | 3581 | | |
| PUTMLIM | 0D65 | 3931 | -3940 | | | | | |
| PUTNGO | 0DA2 | -4002 | 4009 | | | | | |
| PUTPVF | 09BD | 3202 | -3204 | | | | | |
| PUTPVM | 0A95 | 3359 | -3362 | | | | | |
| PUTREF | 0A85 | 3229 | -3352 | 3368 | | | | |
| PUTREF1 | 09AD | 3189 | 3192 | -3195 | | | | |
| PUTREF2 | 09DB | 3221 | 3224 | -3228 | 3239 | 3242 | 3244 | |
| PUTSTCT | 03E5 | 1663 | -1673 | 956 | | | | |
| REELCNTR | 1041 | -606 | 946 | | | | | |
| REELS | 0028 | -467 | 985 | 1096 | 1551 | 1647 | 1974 | 2589 | 3163 |
| REELVECT | 103F | -605 | 944 | 973 | | | | |
| REG0 | 0010 | -403 | 902 | 928 | 1140 | 1288 | 1439 | 1655 | 1658 |
| | | 1916 | 2724 | 2752 | 2781 | 2794 | 2810 | 3304 | 3383 |
| | | 3513 | 3526 | | | | | |
| REG1 | 0011 | -422 | 1018 | 1464 | 1852 | 1870 | 1890 | 2243 | 2252 |
| | | 3032 | 3041 | 3614 | 3823 | 3832 | 3848 | 3854 | |
| REG2 | 0012 | -438 | 439 | | | | | |
| RESET | 0000 | -883 | 925 | | | | | |
| REWCUROK | 081B | 2776 | 2778 | 2789 | 2791 | -2804 | | |
| REWDLYCT | 1039 | -589 | 2771 | | | | | |
| REWGAIN | 003F | -853 | 1844 | | | | | |
| REWGAINF | 0005 | -633 | 1644 | 1868 | 1881 | 1888 | 1983 | 2111 | 2216 |
| | | 2261 | 2506 | 2515 | 2762 | 2931 | 3005 | 3049 | |
| RFPM | 0A9C | 3174 | -3372 | | | | | |
| RFPOSMAC | 00F3 | -862 | | | | | | |
| RL0 | 0000 | -735 | | | | | | |
| RL1 | 0010 | -736 | | | | | | |
| RL2 | 0020 | -737 | | | | | | |
| RL3 | 0030 | -738 | 911 | 912 | 913 | | | |
| RMACH | 0B5D | 3166 | -3526 | | | | | |
| RSTSLDC | 0822 | 2806 | -2810 | | | | | |
| SAMPCTR | 104E | -690 | 935 | 990 | 3390 | 3536 | 3555 | |
| SAMPLES | 0004 | -797 | 991 | | | | | |
| SAVEBEMF | 0199 | 1157 | 1162 | -1168 | | | | |
| SAVERROR | 07A0 | 2697 | -2699 | | | | | |
| SC0 | 0000 | -742 | 911 | | | | | |
| SC1 | 0040 | -743 | 912 | | | | | |
| SC2 | 0080 | -744 | 913 | | | | | |
| SETBIT | 07C6 | 2727 | -2729 | | | | | |
| SETBIT2 | 082C | 2813 | -2828 | | | | | |
| SETBSLDC | 03D0 | 1654 | -1658 | | | | | |
| SETGAIN | 0406 | 1558 | -1830 | | | | | |
| SETHG2 | 0461 | 1470 | -1886 | | | | | |
| SETHGAIN | 0460 | 1462 | 1836 | 1839 | -1885 | 2623 | 3573 | |
| SETHIP2 | 0474 | -1898 | | | | | | |
| SETLG2 | 043F | -1865 | | | | | | |
| SETLGAIN | 043E | 1860 | -1864 | | | | | |
| SETPULSE | 0477 | 919 | 1851 | 1875 | -1899 | 1914 | | |
| SETRGAIN | 0454 | 1845 | -1877 | | | | | |
| SETTA | 0BED | 3619 | -3628 | | | | | |
| SLDCBWD | 0001 | -412 | 1441 | 1658 | 2754 | 3513 | 3526 | 3623 |
| SLDCFILE | 0000 | -406 | 2781 | 2811 | | | | |
| SLDCFWD | 0000 | -411 | 1441 | 1655 | 2725 | 2754 | 3304 | 3383 | 3623 |
| SLDCMACH | 0001 | -407 | 2794 | | | | | |
| SLGMAX | 0040 | -771 | 1238 | 1243 | 1422 | 1427 | | |
| SLGTIME | 001C | -787 | 3269 | 3498 | | | | |
| SRVGAIN | 02FB | 1098 | -1469 | | | | | |
| SRVGAIN1 | 0301 | 1466 | -1474 | | | | | |
| SRVGAIN2 | 0316 | 1477 | -1482 | | | | | |
| SRVGAIN3 | 0353 | 1515 | -1520 | | | | | |
| SRVINIT1 | 0322 | -1487 | 1489 | | | | | |
| SRVINIT2 | 0359 | -1523 | 1525 | | | | | |
| SRVMOT | 0363 | -1548 | 1716 | | | | | |
| SRVMOT0 | 0389 | 1564 | -1602 | | | | | |
| SRVMOT9 | 0400 | 1696 | -1716 | 2284 | 2291 | 3072 | 3079 | |
| STACK | S 0000 | 0 | | | | | | |
| STACKLOC | 1080 | -326 | 883 | | | | | |
| STARTCAL | 00F6 | -859 | 986 | | | | | |
| STBYULD | 0088 | 937 | -979 | 979 | 1005 | 1917 | | |

| Symbol | Addr | Col1 | Col2 | Col3 | Col4 | Col5 | Col6 | Col7 | Col8 |
|---|---|---|---|---|---|---|---|---|---|
| STBYULD2 | 00D0 | 1014 | -1017 | | | | | | |
| STBYULD3 | 00F4 | 1038 | -1041 | | | | | | |
| STBYULD4 | 0101 | 1042 | -1047 | | | | | | |
| STBYULD5 | 0112 | 1057 | -1060 | | | | | | |
| STEADYCT | 103E | -602 | 1660 | 2248 | 2517 | 3037 | | | |
| STEADYDL | 00FB | -793 | 1661 | | | | | | |
| STREF | 04ED | 1994 | -1997 | | | | | | |
| STRETCH | 0001 | -10 | 2654 | 3900 | 3929 | 3941 | 3968 | | |
| STRETCH3 | 0001 | -13 | 387 | 2063 | 2883 | | | | |
| STRETCH4 | 0001 | -18 | 2066 | 2886 | | | | | |
| STRTMSEN | 0386 | 1562 | -1566 | | | | | | |
| STUBBYLT | 0064 | -788 | 1026 | | | | | | |
| SUBREF | 04EA | 1992 | -1995 | 2009 | | | | | |
| SUMCUR | 0A1E | -3279 | 3505 | | | | | | |
| TIMER1 | 0032 | -488 | 949 | 962 | | | | | |
| TOC1 | 0004 | -459 | 951 | 960 | | | | | |
| TOOMUCH | 07D3 | 2684 | 2694 | 2709 | -2744 | | | | |
| TOSTULD | 00BA | -1005 | 1046 | | | | | | |
| TRNFLAG | 0007 | -657 | 2209 | 2442 | 2998 | | | | |
| TRNFLGCT | 0044 | -654 | 2209 | 2441 | 2606 | 2707 | 2751 | 2998 | 3628 |
| TRNMAX | 007F | -767 | 2708 | | | | | | |
| TRNPLS | 00FA | -759 | 1665 | | | | | | |
| TRNPLSCT | 0045 | -661 | 1665 | | | | | | |
| TRNPULSE | 0007 | -663 | 2451 | | | | | | |
| TSTRWCUR | 07F0 | 2763 | -2771 | | | | | | |
| TSTRWPOS | 0809 | 2773 | -2787 | | | | | | |
| UNLDMODE | 00D6 | -858 | 1197 | 1319 | | | | | |
| UNLDTEN | 0002 | -779 | 1321 | | | | | | |
| V125IPS | 0001 | -442 | 1036 | 1037 | 2597 | 2598 | 3344 | | |
| V200FLAG | 0007 | -636 | 1039 | 1643 | 1644 | 3618 | 3903 | 3930 | 3943 |
| | | 3986 | | | | | | | |
| V75IPS | 0002 | -443 | 1036 | 1037 | 2597 | 2598 | 3347 | | |
| VACTEN | 0007 | -775 | 2558 | | | | | | |
| VACTENHG | 0002 | -776 | 2561 | | | | | | |
| VEL125 | 0280 | -817 | 3343 | | | | | | |
| VEL200 | 0400 | -816 | 3346 | | | | | | |
| VEL75 | 0180 | -818 | 3349 | | | | | | |
| VELMODE | 01A6 | 1172 | -1175 | | | | | | |
| VELMODEM | 0277 | 1320 | -1324 | | | | | | |
| VELOFFF | 000E | -821 | 2244 | | | | | | |
| VELOFFM | 00F2 | -823 | 3033 | | | | | | |
| VELOFFST | 0009 | -2661 | 2679 | 2689 | | | | | |
| VELREG | 0012 | -439 | 1035 | 2596 | 3342 | | | | |
| WAITLOOP | 005D | -951 | 952 | | | | | | |
| X | 2000 | -328 | 884 | 891 | 900 | 910 | 928 | 947 | 962 |
| | | 981 | 984 | 985 | 1003 | 1006 | 1007 | 1018 | 1020 |
| | | 1035 | 1044 | 1047 | 1096 | 1101 | 1112 | 1118 | 1126 |
| | | 1129 | 1135 | 1140 | 1144 | 1147 | 1204 | 1255 | 1261 |
| | | 1267 | 1275 | 1278 | 1283 | 1288 | 1292 | 1295 | 1354 |
| | | 1438 | 1439 | 1464 | 1469 | 1479 | 1482 | 1483 | 1493 |
| | | 1517 | 1520 | 1548 | 1551 | 1563 | 1566 | 1647 | 1652 |
| | | 1852 | 1870 | 1890 | 1899 | 1912 | 1916 | 1974 | 1978 |
| | | 2034 | 2037 | 2272 | 2589 | 2596 | 2600 | 2724 | 2752 |
| | | 2774 | 2810 | 2854 | 2857 | 3060 | 3163 | 3272 | 3342 |
| | | 3423 | 3501 | 3614 | 3825 | 3851 | | | |
| Y | 1000 | -324 | 326 | 504 | 619 | 665 | 680 | 885 | 1456 |
| | | 1642 | 1865 | 1878 | 1886 | 2163 | 2214 | 2248 | 2269 |
| | | 2433 | 2441 | 2501 | 2517 | 2549 | 2550 | 2593 | 2605 |
| | | 2606 | 2707 | 2721 | 2731 | 2977 | 3003 | 3037 | 3057 |
| | | 3419 | | | | | | | |
| YK | 1037 | -585 | 1130 | 1239 | 1279 | 1424 | 2096 | 2501 | 2671 |

We claim:

1. An improved H-bridge power amplifier for controlling the current delivered to an inductive load, said H-bridge power amplifier comprising:

an upper pair of transistors, a first upper transistor of which couples a first terminal of said load to a positive potential of a dc power source, and a second upper transistor of which couples a second terminal of said load to said positive potential of said power source;

a lower pair of transistors, a first lower transistor of which couples said first terminal of said load to a negative potential of said dc power source, and a second lower transistor of which couples said second terminal of said load to said negative potential of said dc power source;

free wheeling diode means for providing a path for current from said inductive load to said dc power source when all four of said transistors are turned off;

current sensing means for sensing the current flowing from said dc power source to said upper transistors, whereby said current sensing means senses current only when one of said upper transistors is turned on, and further whereby the current sensed by said current sensing means will always be flowing in the same direction;

comparison means for comparing the current sensed by said current sensing means to a desired current signal, and for generating a drive satisfied signal whenever the sensed current reaches a predefined value of the desired current signal; and control means for generating switching control signals in response to said drive satisfied signal and external control signals, said control means comprising:

polarity means for enabling either a first transistor pair comprising said first upper transistor and said second lower transistor, or a second transistor pair comprising said second upper transistor and said first lower transistor, in response to a polarity signal, whereby the direction of current flow through said inductive load can be selected constant off-time means for turning off the upper transistor of said selected first or second transistor pair for a fixed off-time period whenever said drive satisfied signal indicates the sensed current is at least equal to the desired current drive means for turning on the upper transistor selected by said polarity means whenever said off-time means indicates said fixed off-time period has expired and said drive satisfied signal indicates the sensed current is less than the desired current and plug inhibit means for disabling the lower transistors in response to a plug inhibit signal, said plug inhibit signal being generated whenever said drive satisfied signal indicates the sensed current has become greater than the desired current during a prescribed time period, said time period being substantially less than said fixed off-time period.

2. The improved H-bridge amplifier as defined in claim 1 wherein said current sensing means comprises:
   a resistor connected between the positive potential of said dc power source and an upper terminal of said upper transistor pair; and
   a differential amplifier having its two inputs connected across said resistor.

3. The improved H-bridge amplifier as defined in claim 2 wherein said free wheeling diode means comprises first and second pairs of diodes, each pair comprising an upper and lower diode, the lower diode of said first pair having its cathode connected to said negative potential of said dc power source and its anode connected to said first terminal of said load, the upper diode of said first pair having its cathode connected to said first terminal of said load and its anode connected to said positive potential of said dc power source, the lower diode of said second pair having its cathode connected to said negative potential of said dc power source and its anode connected to said second terminal of said load, and the upper diode of said second pair having its cathode connected to said second terminal of said load and its anode connected to said positive potential of said dc power source.

4. The improved H-bridge amplifier as defined in claim 2 wherein a microprocessor control unit generates said polarity signal, said desired current signal, and said plug inhibit signal.

5. An improved method for controlling an inductive load, such as a dc motor, driven by an H-bridge power amplifier, said H-bridge power amplifier including an upper pair of transistors coupling respective sides of said motor to a positive potential of a dc power source, a lower pair of transistors coupling respective sides of said load to a negative potential of said dc power source, and a plurality of free wheeling diodes coupled in reverse bias direction between both sides of said load and said positive and negative potentials of said dc power source, said method comprising the steps of:

(a) selectively turning ON one upper transistor on one side of said load and the lower transistor on the other side of said load so as to cause a current to flow through said load in a desired direction;

(b) sensing with sensing means the magnitude of said load current by measuring the current flowing from said power source;

(c) comparing the value of said measured load current to a desired current;

(d) maintaining both of said selected upper and lower transistors ON until the measured load current assumes a fixed relationship with regard to said desired current as determined by the comparison of step (c);

(e) turning OFF the selected upper transistor having the sensed current flowing thereto or therefrom for a fixed off-time period as soon as the comparison of step (c) indicates the measured load current has reached the value specified in step (d), and maintaining the selected lower transistor ON during this fixed off-time period, whereby the load current may decay through a path comprising said ON lower transistor, one of said free wheeling diodes, and said load without being measured by the sensing means of step (b);

(f) turing ON the upper transistor that was turned OFF in step (e) at the conclusion of the fixed off-time period; and (g) repeating steps (c) through (f) as desired, thereby causing a load current of a desired average value to flow through the load in a desired direction.

6. The method as defined in claim 5 further including:
(h) braking the motor when desired by:
   (1) turning OFF and maintaining OFF the lower transistor normally left ON in step (e), and
   (2) continuing to selectively turn the upper transistor OFF for said fixed OFF-time period and ON for a time period determined by the comparison of the measured motor current to said desired current as in step (d).

7. The method as defined in claim 5 wherein step (b) comprises measuring the voltage across a resistor connected between said power source and one of said transistors.

8. The method as defined in claim 7 wherein said resistor is connected between said positive potential of said dc power source and a common connection point of said upper transistors, whereby the transistor maintained ON in step (e) is the lower transistor selected in step (a), and the transistor selectively turned ON and OFF is the upper transistor selected in step (a).

9. The method as defined in claim 8 further including introducing an overlap protection time during which all four of the transistors are maintained OFF whenever it is desired to change the direction of the current flowing through said motor.

* * * * *